United States Patent [19]

Furgerson

[11] Patent Number: 4,533,997

[45] Date of Patent: Aug. 6, 1985

[54] COMPUTER MONITORED OR CONTROLLED SYSTEM WHICH MAY BE MODIFIED AND DE-BUGGED ON-LINE BY ONE NOT SKILLED IN COMPUTER PROGRAMMING

[75] Inventor: Donald F. Furgerson, Murrysville, Pa.

[73] Assignee: Westinghouse Electric Corp., Pittsburgh, Pa.

[21] Appl. No.: 112,972

[22] Filed: Jan. 17, 1980

Related U.S. Application Data

[63] Continuation of Ser. No. 283,653, Aug. 25, 1972, abandoned.

[51] Int. Cl.[3] .............................................. G06F 11/00

[52] U.S. Cl. .................................... 364/200; 364/300; 371/19

[58] Field of Search ... 364/200 MS File, 900 MS File, 364/300, 120, 121; 371/19

[56] References Cited

U.S. PATENT DOCUMENTS 3,588,835 6/1971 Enabnit .............................. 364/200

OTHER PUBLICATIONS

Evans et al, "On-Line Debugging Techniques: A Survey", 1966 *Fall Joint Computer Conference,* vol. 29, pp. 37-50.

*Primary Examiner*—Raulfe B. Zache

*Attorney, Agent, or Firm*—E. F. Possessky

[57] ABSTRACT

A computer monitored or controlled system is equipped with an interactive debugging system which enables a systems engineer to modify the system configuration in a simple manner. At any time, the systems engineer may obtain from the system a complete, understandable description of the system's present operating configuration. He may then modify any part of the system. Operation of portions of the system may be simulated, and detailed records of system and simulation operations may be automatically obtained.

7 Claims, 21 Drawing Figures

SOFTWARE STRUCTURE OF DEBUGGING PACKAGE

CONTROL CHAIN

```
     CHAIN     AS00072
     LVL     = X'8007'
     TRIG    = PC045BM

10   PERM
       TRUE  = PC045BM
       TRUE  = PC045DS*
       BLK   = 250

20   PROG
       SUB   = ENCPOS
       ARGS  = DEV015
       ARGS  = REFVAL

30   PROG
       SUB   = ODMEAS
       ARGS  = REFVAL
       ARGS  = POSREF

40   PROG
       SUB   = POSREG
       ARGS  = DEV015
       ARGS  = POSREF

50   DIAG
       ACTION = 00072
       LVL    = AS00073
       INPUT  = SF00072
       OUTPUT = SF00073
       SEC    = 10.0

250  EXIT
```

*DEVICE STATUS FLAG FOR PC045

1 = DEVICE HEALTHY

0 = DEVICE OUT OF SERVICE

CONTROL EXAMPLE

SOFTWARE STRUCTURE OF DEBUGGING PACKAGE

SYMBOL TABLE #1

- ASCII FETCH
- 4 WORDS/ENTRY
- OCCUPIES 2/3 OF TOTAL STORAGE SPACE

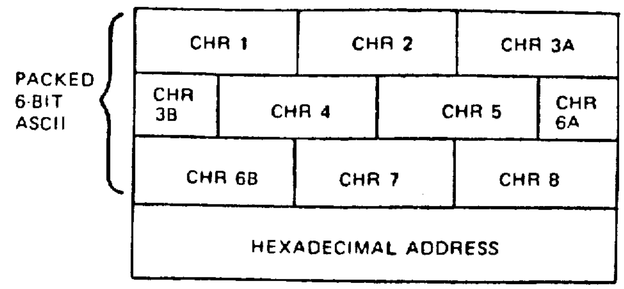

SYMBOL TABLE #2

- HEXADECIMAL FETCH
- 2 WORDS/ENTRY
- OCCUPIES 1/3 OF TOTAL STORAGE SPACE

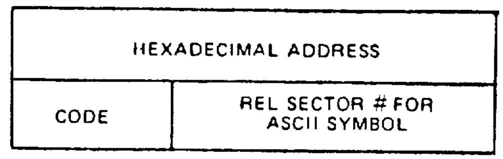

To fetch ASCII name, given hex address:

1. Compute Pseudo-Random Number Modulo the size of Symbol Table #2 using HEX ADDR as seed.
2. Read in sector # derived from 1 and search linearly (128 max entries) for hex address.
3. If not found*, compute new sector # using old sector # as seed in step 1 and iterate.
4. When entry is found, compute correct sector # in Symbol Table #1, using low order 12 bits of entry #2.
5. Read in sector # for Symbol Table #1 and search linearly (64 max entries) for hex address matchup. When found, return corresponding ASCII to caller.

To fetch hex address, given ASCII name:

1. Pack ASCII in 3 words and compute Pseudo-Random Number from sum of 3 words.
2. Read Symbol Table #1 sector and search for ASCII.
3. If not found, get new sector as in hex case and iterate.
4. If found, return associated hex # to caller.

*Both code and hex address must agree.

HASH CODED SYMBOL TABLE

FIG. 3

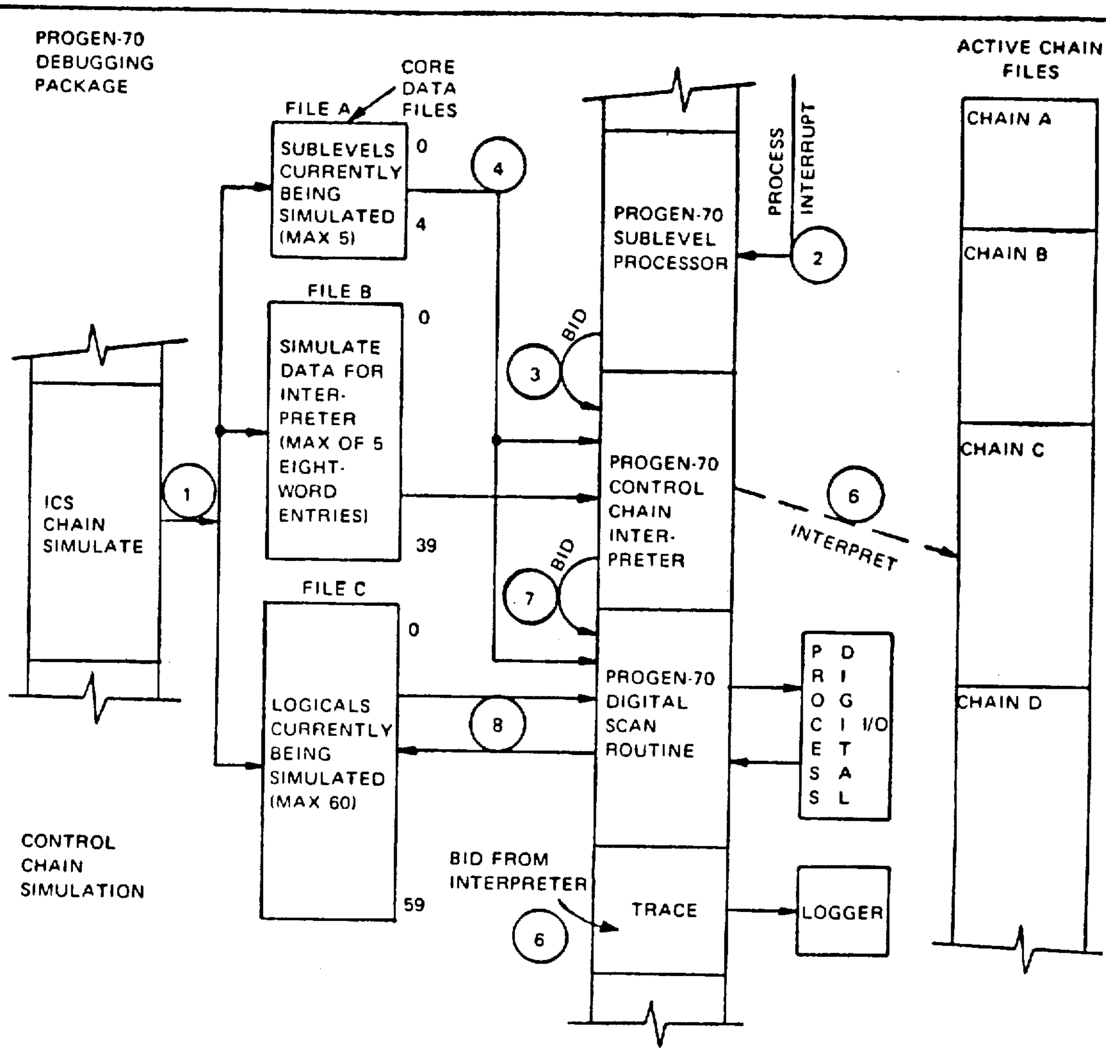

STEPS

1. User generates entries in files A, B, and C thru use of ICS.
2. Process Interrupt causes Sublevel Processor to run.
3. Sublevel associated with Interrupt is a 'CHAIN', so Interpreter is bid to interpret Chain Data.
4. Interpreter checks File A and sees request to simulate this particular sublevel.
5. Interpreter further looks at File B to get specific simulation and trace instructions.
6. Interpreter executes Chain and bids Trace when needed.
7. Digital Scan is bid from Interpreter for Digital I/O.
8. Digital Scan checks A and C, and uses Bit 13 of File C entry for simulation of logical state, if required.

CONTROL CHAIN SIMULATION

FIG. 4

CONTROL CHAIN MODIFICATION

EXAMPLE 1. MODIFICATION BY REPLACEMENT

```
!GP,14,D,$

 ENTER CONTROL COMMAND
=!CO,TEST

LOC = C1E5,  SIZE = 0012
 ACQUIRE COMPLETE
 ENTER CONTROL COMMAND
=!CD

  0   CHAIN
        LVL    =  TEST
 10   TSTBRL
        IN     =  LITE
        TRUE   =     20
        FALSE  =     40
 20   RESET
        FALSE  =  LITE
 30   GOTO
        BLK    =     50
 40   SET
        TRUE   =  LITE
 50   DELAY
        SEC    =     3.0
250   EXIT

 ENTER CONTROL COMMAND
=!CM,20-30

 ENTER BLOCK # AND ALGORITHM NAME
=20 PERM
 TRUE    =  LITE
 TRUE    =  /
 FALSE   =  /
 BLK     =  250
```

FIG. 5A

```
EXAMPLE 1 (CONT.)


INSERT COMPLETE          OLD SIZE = 18       NEW SIZE = 21
MODIFY COMPLETE
ENTER CONTROL COMMAND
=!CD,,,19

  002    80DF     0    CHAIN
  002    80DF            LVL       =    TEST
  003    0A08    10    TSTBRL
  004    803E            IN        =    LITE
  005    0007            TRUE      =      20
  006    000E            FALSE     =      40
  007    140D    20    PERM
  008    0001
  009    803E            TRUE      =    LITE
  00A    0000
  00B    0015            BLK       =     250
  00C    1E0C    30    GOTO
  00D    0010            BLK       =      50
  00E    2809    40    SET
  00F    803E            TRUE      =    LITE
  010    3205    50    DELAY
  011    001E            SEC       =     3.0
  015    FAFF   250    EXIT

ENTER CONTROL COMMAND
=!CV

ERROR 103
ENTER CONTROL COMMAND
=!CV

012 LOCS REL AT C1E5
015 LOCS ACO AT C1FA
ACTIVATE COMPLETE
ENTER CONTROL COMMAND
=/
```

FIG.5B

ERR 1

CONTROL CHAIN MODIFICATION

EXAMPLE 2. MODIFICATION BY INSERTION

```
!GP,14,D,$

ENTER CONTROL COMMAND
=!CD,0-30,,19

 002   80DF    0   CHAIN
 002   80DF          LVL      =   TEST
 003   0A08   10   TSTBRL
 004   803E          IN       =   LITE
 005   0007          TRUE     =     20
 006   000E          FALSE    =     40
 007   140D   20   PERM
 008   0001
 009   803E          TRUE     =   LITE
 00A   0000
 00B   0015          BLK      =    250
 00C   1E0C   30   GOTO
 00D   0010          BLK      =     50

ENTER CONTROL COMMAND
=!CM,30-30

ENTER BLOCK # AND ALGORITHM NAME
=25LOGTDT
 SEC      =14.000000
 IN       =LITE
 OUT      =LITE

 INSERT COMPLETE        OLD SIZE = 21     NEW SIZE = 27
 ENTER BLOCK # ALGORITHM NAME
=/
```

FIG.5C

EXAMPLE 2 (CONT.)

```
 ENTER CONTROL COMMAND
=!CV

 015 LOCS REL AT C1FA
 01B LOCS ACO AT EC54
 ACTIVATE COMPLETE
 ENTER CONTROL COMMAND
=!CD,,,19
```

| | | | | | |
|---|---|---|---|---|---|
| 002 | 80DF | 0 | CHAIN | | |
| 002 | 80DF | | LVL | = | TEST |
| 003 | 0A08 | 10 | TSTBRL | | |
| 004 | 803E | | IN | = | LITE |
| 005 | 0007 | | TRUE | = | 20 |
| 006 | 0014 | | FALSE | = | 40 |
| 007 | 140D | 20 | PERM | | |
| 008 | 0001 | | | | |
| 009 | 803E | | TRUE | = | LITE |
| 00A | 0000 | | | | |
| 00B | 001B | | BLK | = | 250 |
| 00C | 1904 | 25 | LOGTDT | | |
| 00F | 008C | | SEC | = | 14.0 |
| 010 | 803E | | IN | = | LITE |
| 011 | 803E | | OUT | = | LITE |
| 012 | 1E0C | 30 | GOTO | | |
| 013 | 0016 | | BLK | = | 50 |
| 014 | 2809 | 40 | SET | | |
| 015 | 803E | | TRUE | = | LITE |
| 016 | 3205 | 50 | DELAY | | |
| 017 | 001E | | SEC | = | 3.0 |
| 01B | FAFF | 250 | EXIT | | |

FIG. 5D

```
                              CONTROL CHAIN MODIFICATION
 EXAMPLE 3.        MODIFICATION BY DELETION


 !GP,14,D,$

 ENTER CONTROL COMMAND
=!CO,TEST

 LOC = EC54,    SIZE = 001B
 ACQUIRE COMPLETE
 ENTER CONTROL COMMAND
=!CD

   0     CHAIN
           LVL    =     TEST
  10     TSTBRL
           IN     =     LITE
           TRUE   =        20
           FALSE  =        40
  20     PERM
           TRUE   =     LITE
           BLK    =       250
  25     LOGTDT
           SEC    =      14.0
           IN     =     LITE
           OUT    =     LITE
  30     GOTO
           BLK    =        50
  40     SET
           TRUE   =     LITE
  50     DELAY
           SEC    =       3.0
 250     EXIT


 ENTER CONTROL COMMAND
=!CM,10-25

 ENTER BLOCK # AND ALGORITHM NAME
```

FIG.5E

EXAMPLE 3 (CONT.)

```
=10 TSTBRL
 IN     =  LITE
 TRUE   =  20
 FALSE  =  40

 INSERT COMPLETE        OLD SIZE = 27        NEW SIZE = 22
 MODIFY COMPLETE
 ENTER CONTROL COMMAND
=!CD,,,19

   002   80DF    0    CHAIN
   002   80DF           LVL       =   TEST
   003   0A08   10    TSTBRL
   004   803E           IN        =   LITE
   005   0002           TRUE      =      128
   006   000F           FALSE     =       40
   007   1904   25    LOGTDT
   00A   008C           SEC       =     14.0
   00B   803E           IN        =   LITE
   00C   803E           OUT       =   LITE
   00D   1E0C   30    GOTO
   00E   0011           BLK       =       50
   00F   2809   40    SET
   010   803E           TRUE      =   LITE
   011   3205   50    DELAY
   012   001E           SEC       =      3.0
   016   FAFF  250    EXIT

 ENTER CONTROL COMMAND
=!CV

 01B LOCS REL AT EC54
 016 LOCS ACO AT EC54
 ACTIVATE COMPLETE
 ENTER CONTROL COMMAND
=/
```

FIG.5F

CREATION OF A NEW CONTROL CHAIN

```
 !GP,14,D,$

 ENTER CONTROL COMMAND
=!CO,DUMMY

 LOC = C1E2,  SIZE = 0003
 ACQUIRE COMPLETE
 ENTER CONTROL COMMAND
=!CD,,,19

   002    80DE    0     CHAIN
   002    80DE            LVL         =     DUMMY
   003    FAFF   250    EXIT

 ENTER CONTROL COMMAND
=!CM,250-250

 ENTER BLOCK # AND ALGORITHM NAME
=10 TSTBRL
 IN      =  LITE
 TRUE    =  20
 FALSE   =  40

 INSERT COMPLETE        OLD SIZE = 3     NEW SIZE = 7
 ENTER BLOCK # AND ALGORITHM NAME
=20 RESET
 FALSE = LITE

 INSERT COMPLETE        OLD SIZE = 7     NEW SIZE = 9
 ENTER BLOCK # AND ALGORITHM NAME
=30 GOTO
 BLK = 50

 INSERT COMPLETE        OLD SIZE = 9     NEW SIZE = 11
 ENTER BLOCK # AND ALGORITHM NAME
```

FIG.6A

```
=40 SET
 TRUE = LITE

 INSERT COMPLETE        OLD SIZE = 11     NEW SIZE = 13
 ENTER BLOCK # AND ALGORITHM NAME
=50 DELAY
 SEC = 3.000000

 INSERT COMPLETE        OLD SIZE = 13     NEW SIZE = 18
 ENTER BLOCK # AND ALGORITHM NAME
=/

 ENTER CONTROL COMMAND
=!CD,,,19

   002   80DE     0    CHAIN
   002   80DE            LVL       =    DUMMY
   003   0A08    10    TSTBRL
   004   803E            IN        =    LITE
   005   0007            TRUF      =       20
   006   000B            FALSE     =       40
   007   140A    20    RESET
   008   803E            FALSE     =    LITE
   009   1E0C    30    GOTO
   00A   000D            BLK       =       50
   00B   2809    40    SET
   00C   803E            TRUF      =    LITE
   00D   3205    50    DELAY
   00E   001E            SEC       =      3.0
   012   FAFF   250    EXIT

 ENTER CONTROL COMMAND
=!CM,0-10


 ENTER BLOCK # AND ALGORITHM NAME
=0 CHAIN
 LVL     =    TEST
 TRIG    =    /
```

FIG.6B

```
 INSERT COMPLETE        OLD SIZE = 18     NEW SIZE = 18
 MODIFY COMPLETE
 ENTER CONTROL COMMAND
=!CD,0-10

 0       CHAIN
           LVL    =  TEST
10       TSTBRL
           IN     =  LITE
           TRUE   =     20
           FALSE  =     40


 ENTER CONTROL COMMAND
=!CD,0-10,,19

   002    80DF     0    CHAIN
   002    80DF              LVL       =    TEST
   003    0A08    10    TSTBRL
   004    803E              IN        =    LITE
   005    0007              TRUE      =       20
   006    000B              FALSE     =       40

 ENTER CONTROL COMMAND
=!CV

 ERROR 103
 ENTER CONTROL COMMAND
=!CV

 012 LOCS ACO AT C1E5
 ACTIVATE COMPLFTE
 ENTER CONTROL COMMAND
=/
```

FIG. 6C

SIMULATED EXECUTION WITH TRACE

```
!GP,14,D,$

ENTER CONTROL COMMAND
=!CO,TEST

LOC = C1E2,     SIZE = 0014
ACQUIRE COMPLETE
ENTER CONTROL COMMAND
=!CD,,,19

  002   80DF     0    CHAIN
  002   80DF            LVL     =   TEST
  003   0A08    10    TSTBRL
  004   803E            IN      =   LITE
  005   0007            TRUE    =     20
  006   000B            FALSE   =     40
  007   140A    20    RESET
  008   803E            FALSE   =   LITE
  009   1E0C    30    GOTO
  00A   000D            BLK     =     50
  00B   2809    40    SET
  00C   803E            TRUE    =   LITE
  00D   3205    50    DELAY
  00E   001E            SEC     =    3.0
  012   3C06    60    BID
  013   80DF            SLVL    =   TEST
  014   FAFF   250    EXIT

EXAMPLE 1

ENTER CONTROL COMMAND
=!CS,TEST,0-250,0-250
SIMULATE VARIABLES ?
=LITE
BID CHAIN NOW ?
=YES

(SEE LOG PRINTOUT IN FIGURE 7C)
```

FIG. 7A

```
 EXAMPLE 2

 ENTER CONTROL COMMAND
=!CS,TEST,0-250,0-250,4
 SIMULATE VARIABLES ?
=YES
 BID CHAIN NOW ?
=YES

 (SEE LOG PRINTOUT IN FIGURE 7D)


 EXAMPLE 3

 ENTER CONTROL COMMAND
=!CS,TEST,0-250,0-250,4,3
 SIMULATE VARIABLES ?
=LITE
 BID CHAIN NOW ?
=YES

 (SEE LOG PRINTOUT IN FIGURE 7E)

 ENTER CONTROL COMMAND
=!CS,TEST,FFFF


 ENTER CONTROL COMMAND
=!CS,TEST,FFFD


 ENTER CONTROL COMMAND
=/
```

FIG. 7B

TRACE PRINTOUTS (FROM SEPARATE LOGGER)

TRACE PRINTOUT FOR FIGURE 7A , EXAMPLE 1: (SINGLE RUN, NO TIME EXPANSION)

| | | | | |
|---|---|---|---|---|
| 000.000 | TEST | 0 | CHAIN | |
| 000.000 | TEST | 10 | TSTBRL | LITE/0 |
| 000.006 | TEST | 40 | SET | LITE/1 |
| 000.009 | TEST | 50 | DELAY | SEC/3.0 |
| 003.014 | TEST | 60 | BID | TEST |
| 003.015 | TEST | 250 | EXIT | |

FIG. 7C

TRACE PRINTOUT FOR FIGURE 7B , EXAMPLE 2: (MULTIPLE RUN, NO TIME EXPANSION)

| | | | | |
|---|---|---|---|---|
| 000.000 | TEST | 0 | CHAIN | |
| 000.001 | TEST | 10 | TSTBRL | LITE/0 |
| 000.007 | TEST | 40 | SET | LITE/1 |
| 000.010 | TEST | 50 | DELAY | SEC/3.0 |
| 003.019 | TEST | 60 | BID | TEST |
| 003.021 | TEST | 250 | EXIT | |
| 003.033 | TEST | 0 | CHAIN | |
| 003.033 | TEST | 10 | TSTBRL | LITE/1 |
| 003.037 | TEST | 20 | RESET | LITE/0 |
| 003.041 | TEST | 30 | GOTO | |
| 003.042 | TEST | 50 | DELAY | SEC/3.0 |
| 006.050 | TEST | 60 | BID | TEST |
| 006.051 | TEST | 250 | EXIT | |
| 006.064 | TEST | 0 | CHAIN | |
| 006.064 | TEST | 10 | TSTBRL | LITE/0 |
| 006.067 | TEST | 40 | SET | LITE/1 |
| 006.072 | TEST | 50 | DELAY | SEC/3.0 |
| 009.080 | TEST | 60 | BID | TEST |
| 009.084 | TEST | 250 | EXIT | |
| 009.096 | TEST | 0 | CHAIN | |
| 009.096 | TEST | 10 | TSTBRL | LITE/1 |
| 009.101 | TEST | 20 | RESET | LITE/0 |
| 009.106 | TEST | 30 | GOTO | |
| 009.107 | TEST | 50 | DELAY | SEC/3.0 |
| 012.121 | TEST | 60 | BID | TEST |
| 012.124 | TEST | 250 | EXIT | |

FIG. 7D

TRACE PRINTOUT FOR FIGURE 7B , EXAMPLE 3: (MULTIPLE RUN, TIME EXPANSION)

| | | | | |
|---|---|---|---|---|
| 000.000 | TEST | 0 | CHAIN | |
| 000.000 | TEST | 10 | TSTBRL | LITE/1 |
| 000.006 | TEST | 20 | RESET | LITE/0 |
| 000.009 | TEST | 30 | GOTO | |
| 000.010 | TEST | 50 | DELAY | SEC/9.0 |
| 009.021 | TEST | 60 | BID | TEST |
| 009.024 | TEST | 250 | EXIT | |
| 009.036 | TEST | 0 | CHAIN | |
| 009.037 | TEST | 10 | TSTBRL | LITE/0 |
| 009.042 | TEST | 40 | SET | LITE/1 |
| 009.046 | TEST | 50 | DELAY | SEC/9.0 |
| 018.062 | TEST | 60 | BID | TEST |
| 018.066 | TEST | 250 | EXIT | |
| 018.075 | TEST | 0 | CHAIN | |
| 018.075 | TEST | 10 | TSTBRL | LITE/1 |
| 018.082 | TEST | 20 | RESET | LITE/0 |
| 018.088 | TEST | 30 | GOTO | |
| 018.089 | TEST | 50 | DELAY | SEC/9.0 |
| 027.099 | TEST | 60 | BID | TEST |
| 027.104 | TEST | 250 | EXIT | |
| 027.115 | TEST | 0 | CHAIN | |
| 027.116 | TEST | 10 | TSTBRL | LITE/0 |
| 027.120 | TEST | 40 | SET | LITE/1 |
| 027.126 | TEST | 50 | DELAY | SEC/9.0 |
| 036.134 | TEST | 60 | BID | TEST |
| 036.137 | TEST | 250 | EXIT | |

FIG. 7E

COMPUTER MONITORED OR CONTROLLED SYSTEM WHICH MAY BE MODIFIED AND DE-BUGGED ON-LINE BY ONE NOT SKILLED IN COMPUTER PROGRAMMING

This is a continuation of application Ser. No. 283,653, filed Aug. 25, 1972, now abandoned.

CROSS-REFERENCE TO RELATED APPLICATION

Background material for the present invention is contained in application Ser. No. 250,826, filed by John W. Gomola, et al. on May 5, 1972 and assigned to the same assignee as the present application. In particular, the various programs and subroutines disclosed herein are designed to interface with programs and subroutines disclosed in application Ser. No. 250,826.

BACKGROUND OF THE INVENTION a. Field of the Invention

The present invention relates to monitored and controlled systems, and more particularly to a computer monitored or controlled system the operational configuration of which may be modified on-line.

b. Brief Description of the Prior Art

Many systems are available which permit the operating configuration of a monitored or controlled system to be automatically established. Typically, a systems engineer defines the operating configuration which he desires to achieve by filling in blanks on coding forms and by feeding data from the coding forms into an automatically programmable computer system. Particularly in the field of data monitoring, relatively complex operating configurations may be achieved in this manner.

However, once a system is established and operating, typically it is difficult to modify the operating configuration of a system. After compilation or assembly, conventional computer programs no longer contain the meaningful names for variables and for subroutines which they contain prior to assembly and it is almost impossible for anyone save a skilled programmer to interpret the data which a typical computer system spills forth as its contents. Hence, one who wishes to work with such a system is dependent upon whatever documentation of the system operating configuration is available. If the documentation is lost, destroyed, or erroneous, then typically a prior art system must be reconfigured in its entirety when any changes are made.

In prior art systems, the compilation of software entities is a one-way, irreversible process. Once a program system is established and operating, there is no way that the system may regenerate the language originally written out by a systems engineer or programmer—that language is lost. Only numeric machine language remains which is understandable only to the machine itself.

In prior art systems, modifications are made by altering computer programs written in a language such as FORTRAN IV. Once a modified program has been prepared, it is compiled, fed into the operating system, and the program which it replaces is removed from the operating system. Typically a skilled programmer has to make such modifications. Programs may to some extent be tested and debugged using a time sharing computer which stores programs in their uncompiled form, but no such editing may normally be carried out on a monitoring or control computer due to their limited memory size and the impossibility of storing uncompiled copies of all programs in such a machine.

The need for an easily editable system is particularly acute in process control systems where most of the programming is conventional as opposed to fill-in-the-blank programming. Even in the so-called "interpretive" systems where control operations are defined by interpretable data files, there is typically no way of reconstructing from any given data file the language which was originally used by a systems engineer to define the data file.

SUMMARY OF THE INVENTION

Briefly stated, the present invention enables a systems engineer to decompile any portion or all of the data or software which defines an operating system and return it to a form which is understandable to a systems engineer. The invention contemplates that interactive editing of any portion of an operating system may be carried out by a systems engineer who is not skilled in computer programming. The present invention also enables portions of an operating system to be exercised in a simulation mode without affecting the operating process. Means are also provided for "tracing" or making a record of any desired system operations during either actual or simulated operations. The invention is thus a combined debugging, editing, and documenting system.

In the preferred embodiment of the invention, control operations are implemented through the use of data files called control chains which instruct an interpreter or processing program as to precisely how control actions are to be carried out. The present invention enables a systems engineer to remove a copy of any control action defining data file from the system, decompile the data film back into language which the engineer can understand, modify the data file, and then return the data file to the system for either actual or simulated operation.

Briefly stated, the preferred embodiment of the invention contemplates providing an interactive processor which includes the necessary software to carry on two-way conversations with a systems engineer via typewriter or other equivalent communications device. Chain acquiring or dumping subroutines are provided for retrieving copies of control chain data files from the operating system. These subroutines have access to at least one symbol table which enables the subroutines to replace the numeric language of each control chain block with symbols understandable to a systems engineer. A Boolean or logical expression decompiler is also provided for decompiling logical expressions and for converting such expressions into a FORTRAN IV format which is also understandable to the systems engineer. Another subroutine determines what events trigger the execution of each control chain and prints out a specification of all trigger connections.

Once having retrieved and decompiled a control chain, the systems engineer can have the interactive processor call upon chain modify subroutines which may make modifications and changes in control chains. The chain modify subroutines are also interactive and may accept instructions from the systems engineer in a language which is meaningful to him.

After a chain has been modified, the systems engineer may have the interactive processor call upon a chain activate subroutine to place a modified control chain back into service.

If actual operation of one or more chains is not desired, operation of the chains may be simulated. A chain simulate subroutine is called upon to store in a special table data identifying the chains whose operation is to be simulated and the variables associated with the chains whose states are not to be altered by the identified chains. Once activated, chains whose operations are to be simulated are executed in the conventional manner but are not permitted to communicate directly with the listed variables. Each time a chain whose operations are to be simulated calls for the value of or requests a change in the state of a variable that is identified in the special table, the call is intercepted by bit manipulation routines. These routines retrieve the value of the variable from a bit location within the special table and change the state of this same bit location and do not permit the control chain to alter or check the status of the actual variable in the operating system. Special data modules which are active only during simulation operations may be inserted into any control chain so as to set up initial conditions for simulated chain execution.

The operation of any control chain, whether actually operating or whether simulating actual operation, may be followed through the use of tracing features of the invention. Trace flags are established within the control chains, and data relating to the execution of any such control chain is printed out when the chain is executed. The data is transferred into a circular trace printout buffer and is printed out by a low priority trace printout routine so as not to unduly slow system operations. A counter is provided to limit the number of trace printouts which occur. The counter enables controlled tracing even when an operator is not supervising the computer system.

Further objects and advantages of the invention are apparent in the detailed description which follows. The points of novelty which characterize the invention are pointed out with particularity in the claims annexed to and forming a part of this specification.

BRIEF DESCRIPTION OF THE DRAWINGS

FIG. 3 is a representation of the symbol table used in implementing the invention.

FIG. 4 illustrates the mechanism whereby control chain execution may be simulated and then traced.

FIGS. 5A to 5F illustrate how a control chain may be modified. Example 1 illustrates modification by replacement, example 2 illustrates modification by insertion, and example 3, illustrates modification by deletion.

FIGS. 6A to 6C illustrate how a new control chain may be created.

FIGS. 7A to 7E illustrate simulated chain execution with tracing in effect.

DETAILED DESCRIPTION OF THE PREFERRED EMBODIMENT

The description which follows includes an overview description of the invention (Sections I-VI and FIGS. 1-7), a detailed description of the software programs which depict the precise details of the invention (Section VII and FIGS. 8-12), and a series of appendicies.

The overview description is self-contained. The detailed description of the software programs (Section VI) preferably should be studied only after one has studied the background material presented in application Ser. No. 250,826 filed by John W. Gomola, et al. on May 5, 1972 and assigned to the same assignee as the present invention. That application presents detailed descriptions of all the software elements shown in FIG. 8 which are not described in the present application. The Gomola, et al. application also fully describes the host PROGEN (trademark) computer system with which the preferred embodiment of the invention is intended to be used.

To aid one wishing to pursue the details of the programs and subroutines presented in Section VII, each of the programs and subroutines has been assigned a number. FIGS. 8-12 then illustrate the precise nature of the interactions which may occur between the various program elements. Most all of the blocks in FIGS. 8-12 corresponds to a specific numbered program or subroutine, and each such block contains the number of the corresponding program or subroutine. If a block contains no number (for example, the "LOGIC INITIATOR" block in FIG. 8), then that block corresponds to a program or subroutine that is described fully in the Gomola, et al. application.

I. THE LOGIC DIRECTOR PROCESS CONTROL SYSTEM

Application Ser. No. 250,826 filed by John W. Gomola, et al. presents a complete description of a logic director system in which a computer and its associated software are used to replace a larger number of relays and other hardware logic elements in performing simple time-sequential operations, such as conveyor control or the like. As that application explains, an operative system is established by interconnecting various hardware sensors and controllers to the contact-closure inputs and outputs of a small digital computer system. A description of the desired system configuration is then prepared using coding forms, and data from the forms is then fed into the computer system. As each block of data is fed into the system, the control actions defined by that data are immediately rendered operational. The software system described in the above application will hereafter be referred to as the PROGEN-70 (trademark) system, or the PROGEN (trademark) system.

Figure 1:
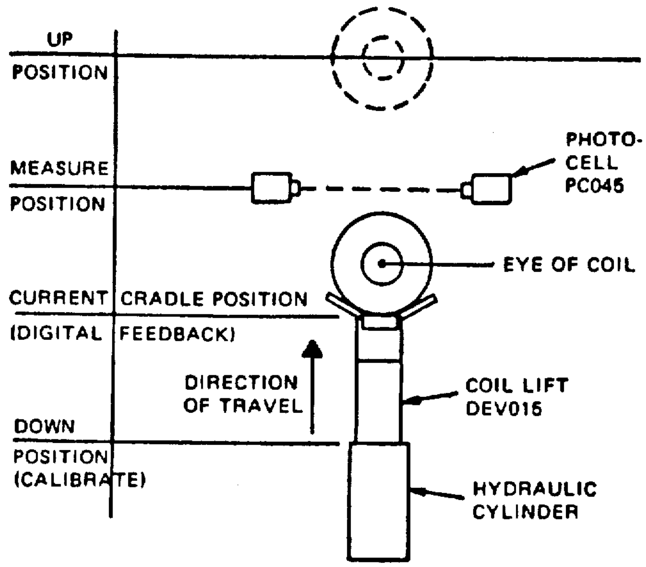
FIG. 1 illustrates a simple control situation.

The working environment for this particular process control application requires the solution of a large number of logic equations either in the direct form of logic expressions; or in some more complicated form involving computer time delays, program bids, subroutine calls, etc. The basic motivation for this computer application is the replacement of electro-mechanical devices such as relays and timers used to perform numerous logic sequencing functions in process control. To solve this logic sequencing problem, a sub-set of a PROGEN-70 process control language is utilized. Only 16 unique algorithms are utilized in this application, and a more detailed description of each of these is contained in Appendix B. FIG. 1 shows a typical control example utilizing PROGEN-70.

In this example, a coil is moving up at a known speed, approaching a photo-cell PC045. When the coil breaks the beam of light that is shining upon the photo-cell, a "control chain" or sequence of algorithms within the computer system is "triggered" by PC045 to carry out the following steps: it reads a digital position feedback from a coil lift device DEV015; it calls upon a FORTRAN routine to calculate the outside diameter of the coil, taking the geometry of the coil cradle into account; and it then generates a new reference for a positioning system so that the coil is ultimately stopped at the proper height for the next operation. The sequence of algorithms are initially selected by the applications programmer from the sixteen standard algorithms, and they are written out in sequence, as is shown in FIG. 1. A detailed explanation of the control chain algorithm language may be found in the Gyres, et al. application cited above.

Applying these basic algorithms, the applications programmer will generate a PROGEN-70 program which is referred to as a control chain. The chain is subsequently compiled into packed strings of data by an off-line PROGEN-70 compiler. These data records are then loaded into the actual target process control machine by a PROGEN-70 loader. Once the chain is loaded into the target machine, it is available for execution in an interpretive mode by the core resident PROGEN-70 interpreter. This interpreter will systematically interpret the data strings that have been pre-stored into the machine. Such a system is normally stored entirely in core, with a high speed data link to a neighboring machine which does in fact have disc capabilities.

The core size required for this type of system varies with the magnitude of the logic sequencing to be performed. Characteristically, however, the operating system required to support such a package, plus the storage of the control chains themselves, occupies somewhere between 32 and 48 thousand 16 bit words. Process inputs to this system are received as interrupts, and subsequently bid the PROGEN-70 control chain designated to solve this particular logic sequence step. When a PROGEN-70 chain is executed, logical inputs are interrogated and a logical output is generated, depending upon the state of the various logical inputs. This logical output is then routed to the process via the computer output hardware.

Once such a system is operational, it must perform reliably with a minimum of down time, even though the customer's control philosophy may change. It is therefore desirable to provide the capability of editing the control software while continuing to perform on-line control. Once the change has been made, it is further necessary to provide some means of testing its performance thoroughly prior to placing it on-line. Both of these features are provided in the debugging package under discussion here.

In summary, therefore, this type of installation requires a relatively small, highly reliable, process control computer. It may be all core and normally is provided with a data link to a more sophisticated machine. It basically performs logical functions with some calculation capability. The logic functions are interpreted by a run-time interpreter, rather than executed in machine code, at a sacrifice in time but at a savings in core storage needed. No sophisticated operating system or control system is provided in this type of computing environment. The present invention was designed for this type of process control system.

II. THE PROBLEM

A. The Process Environment

In the previous section the need for an interactive debugging package for process control was discussed. In this section we shall consider the problems encountered in interfacing such a debugging system into the three operational environments to be found in process control.

The first operational environment under consideration is the process environment itself. This environment varies greatly with the process being controlled. The scope of this discussion shall be limited to the logic sequencing environment. In this application the PROGEN-70 control language will be utilized to initiate and monitor the movements of various mechanical apparatus in such a way as to achieve optimal control. Considering that the computer is a replacement for electromechanical devices such as relays and timers which exhibit fairly slow reaction time, the problem of CPU turnaround time, i.e. the time lapse between the contact closure input to the computer, and the subsequent contact closure output generated by the control logic as a result of that input, is not a critical parameter in the evaluation of the effect of this debugging system on the entire process environment. Because these devices operate on millisecond timing as opposed to microsecond timing, even the more complicated CPU actions are completed at a rate which is considerably faster than the electro-mechanical counterpart. Therefore, in the analysis of this particular environment, it is determined that if it becomes necessary to increase the time required to service a given process variable, such a measure would be justified, because the CPU turn-around time is much, much shorter than the equivalent relay turn-around time; and therefore, an extension of this time would have a trivial effect upon the operation of the system.

B. The Software Environment

As a result of the conditions and restrictions indicated in Section A., the software environment has been structured so as to allow a saving in the amount of storage space needed for specific control programs, but at a sacrifice in actual execution time of these control programs. Due to the timing involved, this is entirely consistent with good process control philosophy. The software execution philosophy employed in this environment is one of interpretive execution of packed data strings as opposed to a pre-compilation into machine code, and an actual machine-speed execution of that machine code. Due to this environment, the data structure which forms the storage of actual control algorithms is much simpler than the storage of the equivalent amount of machine code to perform the identical function. The machine code sophistication is therefore included in the run-time interpreter, and the data structures used to depict the 16 basic algorithms used in this type of control is quite elemental indeed, and enhances the ability to generate a fairly sophisticated on-line debugging system without requiring a large, inefficient, run-time support system for such a package. As an example of this premise, because there is no machine code realization of the program, it is unnecessary to add such pseudo-control features as program break points, at which time control would branch out to specialized simulation, debugging, and tracing packages. In this instance, the more pleasing task of actually modifying the structure of the control chain interpreter, the run-time package which interprets each control algorithm, is undertaken. In other words, the method of interpretive execution employed in relation to the control algorithm is the vehicle by which changes are instituted. The data storage which physically represents the control algorithm is not changed in any way and therefore remains the same in both the normal, non-debug environment, and in the artificial debug environment created by this package.

C. The User's Environment

As in the two previously discussed environments, there are unique sets of conditions surrounding the third environment, which is referred to as the user's environment. These conditions, by and large, dictate the degree of inter-activity desired to be designed into this package. The level of sophistication of the user has been one of the key factors in the decision to design into this package a fairly high degree of man-machine inter-activity. In hard wired relay control systems, the maintenance function which is analogous to the debugging function in computer systems is performed by a special breed of control engineer, using well defined, classical relay theory, and lacking significantly in the sophistication normally associated with even the smallest of computer operating systems. If the computer is truly to replace the relay in this type of environment, the user must be capable of rapid and effective cross-training, in that he now must be able to adapt rapidly to a new method of control implementation which still embodies the basic precepts of his previously learned control philosophy. In theory, the computer, its hardware and its software operating system, should be entirely transparent to the user so that he can make the transition to computer logic maintenance as smooth as possible.

In the ensuing sections, design criteria for the debugging package which hopefully will allow it to operate effectively in each of these three environments will be established.

III. OBJECTIVES

A. Use of High Level Syntax

The initial operating version of the debugging system discussed herein was a system involving only hexadecimal input and output. While satisfactory for use as a debugging tool by those skilled in computer programming, this initial version is not easily used by others because a control engineer not familiar with computer terminology and hexadecimal notation has some difficulty in adapting to this type of notation to describe his various control parameters. The typical control diagram indicates contact inputs and contact outputs in symbolic notations where up to eight symbolic characters may be used to reference a given variable. In addition to this, the basic language for process control, the PROGEN-70 language, also allows the control engineer to communicate with the process in essentially an English language type of syntax; where the algorithm names and control statements are clearly and precisely stated in English, and symbol names are entered in a character notation which in some way relates to an English definition (see Appendix B). Hence, an improved operating version of the system has been developed which permits the use of a high level syntax for inter-communication between the control engineer and the debugging package.

Since the original syntax created by the PROGEN-70 compiler is highly legible in itself, the decision was made to attempt in every case which is possible, to duplicate the exact syntax that would have been used if the control engineer was communicating directly with the PROGEN-70 compiler or control chain generator. Hence, the compiler source statements, as they would appear on a coding sheet, are entirely suitable as input to the debugging package in question, providing that the proper entry to the package has been made through certain prescribed procedures. In essence, therefore, the control engineer need only by trained once; if he is competent in the use of the PROGEN-70 compiler, with a small amount of cross-training, he should become quite competent in the use of the debugging package extensions under consideration here.

B. Symbolic Reference to Variables

Symbolic referencing of process variables shall be a design objective for the debugging package extension, with the following qualifications. The symbolic reference to variables will be accomplished through external sources. The computer-to-computer data link which exists in most cases between the small all-core logic computer, and the larger core and disc oriented supervisory computer, shall be utilized in this instance to extract the symbolic representation of process variables from a symbol table stored on the disc of the supervisory machine. For efficiency of process variable extraction from the symbol table, hash code techniques are used to structure the symbol table; hash coded for both access to the name of the variable (in ASCII), or the address of the data, the computer number (bit address) associated with this symbolic reference (hexadecimal).

In the current version of the debugging package, the symbolic referencing of process variables represents the only umbilical tie between the satellite logic computer and the main supervisory computer in the execution of this debugging system. All other debugging functions are contained within the logic computer itself. In extremely small applications supporting only the logic computer in absence of the larger supervisory computer, one could envision the establishment of some more primitive type of symbolic referencing; a method not requiring the extensive symbol table utilized herein, but tying each process variable to some form of alphanumeric representation. This would admittedly not be as understandable as the version indicated herein; but would suffice in those cases where it would be impractical to attempt to store the symbol table necessary to return all the variable syntax indicated in a typical control situation.

C. Ease of Human Interaction

In addition to direct communication with this package in the algorithmic symbolism utilized by the PROGEN-70 compiler, a control structure which accesses the various elements of this package must be created in such a way that the user is not over-burdened in the use of the syntax necessary to activate the various sections of this package. To this end a simple, but rather powerful, control structure has been implemented. The user is provided with an IBM selectric 735 logger, which serves to provide both an input and an output medium for the debugging package. It is therefore desirable that access to the debugging package be implemented in the easiest and most straight-forward manner. The decision to use a two character mnemonic to represent each of the available control functions existing in the package has been made. Hence the operator quickly overcomes the handicaps of learning a new control procedure, and spends the majority of his time actually worrying about the specific control structures in his program, without worrying about the methods of utilization of the debugging package itself.

D. Compiler/Decompiler for Boolean Functions

The only non-trivial control algorithm available in this particular logic application is the logic expression algorithm. This algorithm allows the control engineer to write actual logic expressions of a form Y=A.AND.-B.OR.C. much as would be done in a classical circuit theory example. The PROGEN-70 compiler than analyzes this logic expression and stores away the packed data string necessary to be passed to the PROGEN-70 run-time interpreter; which in turn, unpacks the data string, interprets the data that exists, and takes the necessary action based upon an evaluation of that data.

The design objective is to create two packages:

1. A logic expression compiler, which allows as input from the typewriter keyboard a data string similar to that accepted by the PROGEN-70 control chain generator; and will in turn create the packed data string necessary to be utilized by the PROGEN-70 run-time interpreter, is the first package needed. In essence it will perform the identical function of the PROGEN-70 compiler, but only for the 16 algorithms given in Appendix A.
2. A logic expression decompiler, which will take as input the packed data associated with a previously stored logic expression, and return to the user the original syntax as it was presented to the control chain generator. In case of ambiguous situations, an equivalent logic expression will be returned to the user which will represent the desired control action.

E. Simulated Program Execution

One of the major problems surrounding any control situation is that of testing and debugging the actual control algorithms employed without having any adverse effect upon the real-world hardware, i.e. without causing damage to process equipment. The provide for a simulated mode of control algorithm execution in such a way that the process variables are in turn substituted for dummy variables so as to isolate the control algorithm being tested from the actual process environment itself. The control algorithm may then be tested in this simulated environment until the control engineer has a relatively high degree of assurance that the algorithm is performing in a consistent and correct manner. Then, under control of the engineer, the algorithm may be placed systematically into the on-line environment, thus drastically reducing the risk of causing any problems with its insertion.

F. Debug Trace Printouts

In order to monitor the operational performance of a single control chain, or a group of control chains performing a related function, an extensive debug trace printout section has been added to this overall package. The debug trace printout section performs two tasks.

During the simulated program execution phase the debug trace printout gives a hard copy indication of the performance of each of the control chains being simulated; however, if no chains are being simulated, and the process is performing its normal on-line function, the debug trace printout may be used to selectively place "windows" around certain sections of the process control, to allow an on-line printout of the actual control procedures being invoked at any given point in time.

The actual hard copy trace printout is also broken down into two sections (see Appendix D). One section, the basic printout format, involves the printout of only those parameters necessary to indicate time of execution in milliseconds, the control chain which is currently being traced, and the specific block in the control chain. These parameters print on the left hand side of the output page, one line of print for each block in the chain that is executed under the trace printout control. The second section, an extended printout format, is included so that the control engineer may have more detailed information concerning the operation of the control chain than is provided by the simplified trace just described. The extended trace is identical to the simulated trace on the left hand side of the page; however, for each algorithm being traced, certain important parameters unique to that algorithm are printed out to the right of the normal trace information. Such information would include dynamic subroutine arguments passed to the Progran algorithm; logical bit addresses, and the corresponding logical state of these bit addresses in the logical oriented algorithms; actual core transfer data in the Data Transfer algorithm; and the name of the program being bid in the Bid algorithm. This capability can be modified or extended quite easily. Thus when the control engineer invokes the full power of this trace printout package, he has provided to him a very meaningful source of information as to the actual performance of each of the control chains being traced; whether he is tracing their performance in the simulated environment or in the actual on-line environment. This dual function approach makes this part of the overall package one of the most important sections, certainly an invaluable tool in finding problems associated with the actual or simulated control.

G. Additional Algorithms

When trying to simulate a control chain or a group of control chains, one sometimes encounters difficulties in initializing certain parameters which in a real-time environment would have been initialized by a prior process. However, in a simulated environment, this initialization is not provided by any prior element, and therefore should be conveniently provided by some function of this debugging package. The section which accomplishes this goal is a section which includes the addition of 16 algorithms. Each algorithm is analogous to its corresponding real-time algorithm. However, the additional algorithms only execute in the simulated program environment. During real-time control these algorithms serve as passive data structures in the control chain storage file. They are scanned by the real-time interpreter, but are not executed. In the simulated execution mode, however, the interpreter executes the additional algorithms in a manner identical to their real-time counterparts.

An example of the typical use of the algorithm extension feature would be the initialization of certain control parameters at the entry to a control chain which is going to be simulated. An algorithm which one may choose to use would to the Set-Reset algorithm. If this algorithm were inserted at the beginning of a control chain to be simulated, the control engineer could specify a number of logical or Boolean variables whose initial state would be indicated to be that included in the text of the algorithm. Hence, four process contacts could be simulated to be in the set or true position, and six process contacts could be simulated to be in the reset or false condition, prior to the execution of the simulated chain. When the simulation option had been selected for that chain, and execution had been demanded, the Set-Reset algorithm would be executed by the run-time interpreter in the manner normally used to execute all S-R algorithms. If in fact the simulated execution was continued to completion and the control engineer was satisfied with the simulated results, the control chain in question could be then linked into the active system, executed in a real-time environment, and actually used to control the process. This could be accomplished without any further modification to the control chain itself. The Set-Reset module included at the beginning of the control chain would now be a passive element. It would occupy space in the data structure, but would be scanned by the run-time interpreter and not executed in the real-time mode.

The other algorithms can be used in this same mode of operation, to enhance the ability of the control engineer to set up or create the proper simulation environment, prior to the commencement of any control chain simulation.

H. Self-Documenting Output

Normal debugging procedures would dictate that a control programmer would debug his on-line program using a multitude of patching techniques until he would arrive at such a point where the program was operating correctly. At which time he would update a source deck image of his program to indicate the current state of changes; and then submit each a program to a batch compiler or assembler, which would then recompile or reassemble his program so that the output would resemble the actual operational state of the program. This is somewhat of a complicated and time consuming procedure which, if possible, should be eliminated. In the case of PROGEN-70 and the debugging package in question, the elimination of this need to spend the time to recompile has been included as part of the operational objectives.

In actuality, the output from any compile operation would consist of an object program output on either binary tape or binary cards, and a hard copy listing output readable by the programmer. If these features can be incorporated into the debugging package itself then the need for the control engineer to accomplish this task through other means would be eliminated. Therefore, much effect has been expended upon the generation of self-documenting output from the debugging package.

The hard copy output is an accurate representation of the source syntax, similar if not identical to the syntax developed by the PROGEN-70 compiler itself; hence if a control chain is modified using this package, the hard copy listing output of the modification can be substituted on a one-to-one basis for the currently existing documentation from the control chain compiler. Therefore, one constantly keeps his documentation up to date without the need to go through a recompile procedure. In regard to the object program, a feature of the debugging package allows a binary copy of the debugged program to be punched on paper tape as a permanent copy of the program change; another feature allows the data linking of the debugged program to the mass memory device associated with the supervisory machine located adjacent to the logic control machine.

With these capabilities it is a very rare circumstance indeed that would require the use of the batch control chain compiler. Unless extensive modifications were made, and a mass updating of control chains was required, there would be no need to perform anything above and beyond the actual output performance of the debugging package itself.

IV. DESIGN REALIZATION

A. The Original Package

1. Software Structure

The original PROGEN-70 editing package consisted of three levels of software organization. Level One contained the editing package main processor and a number of support subroutines incidental to the operation of the main processor. Level Two consisted of five special purpose subroutines, each one of which was used to implement the five basic editing functions that formed the original package. These five functions were as follows:

a. Chain Acquire—which allowed the movement of a chain from the active chain working area into the editing package working area for future modification;
b. Chain Modify—which allowed modification of a single PROGEN-70 control block or a number of PROGEN-70 control blocks;
c. Chain Dump—which allowed one to request a hard copy printout of an entire chain or a certain portion thereof;
d. Chain Activate—which allowed a completely modified and tested chain to be placed back into the on-line environment and linked up with the on-line process;
e. Chain Punch—which allowed the user to obtain a paper tape reproduction of his finished control chain in compiled form.

Figure 2:
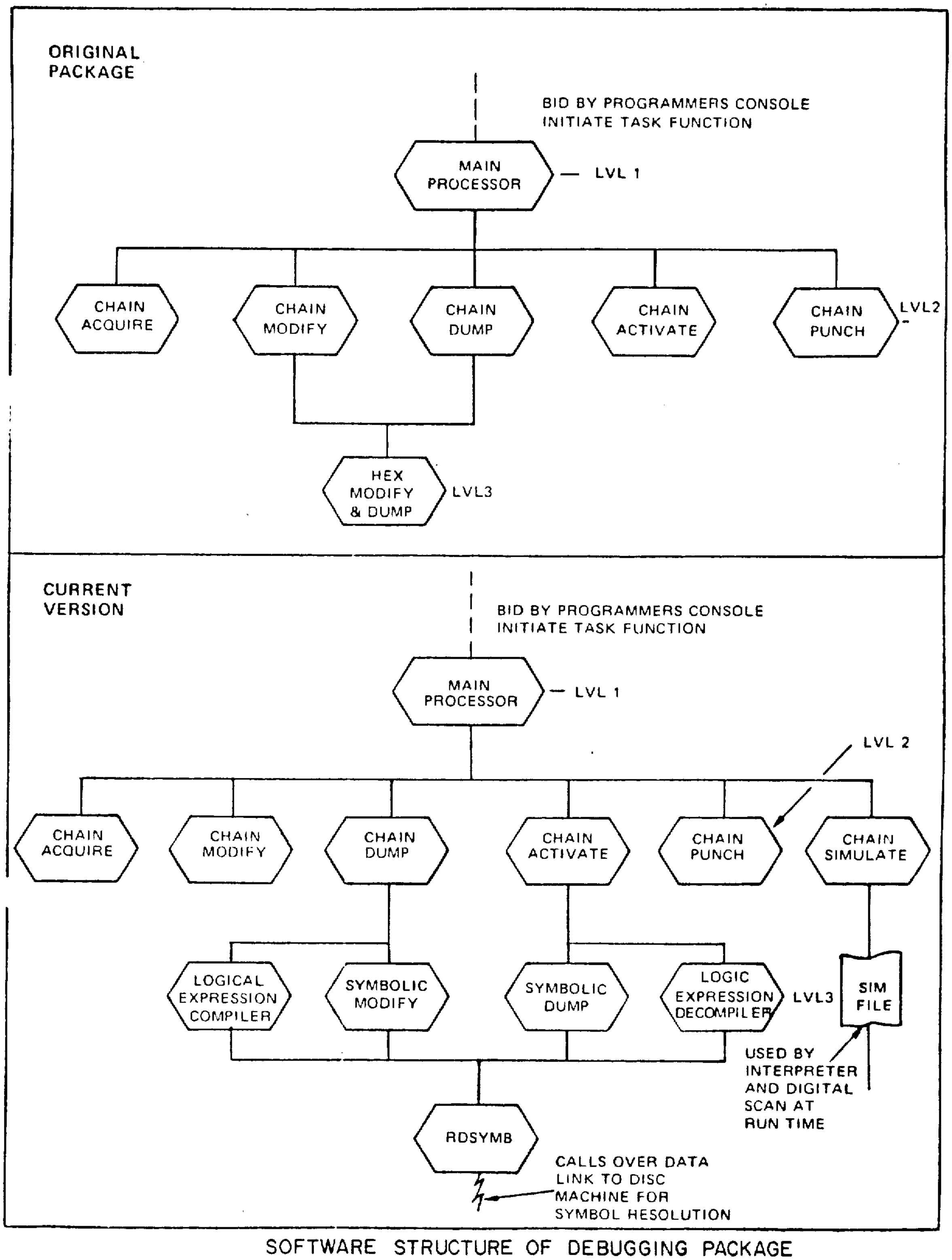
FIG. 2 is a block diagram of special software which is used in implementing the present invention.
Figure 8:
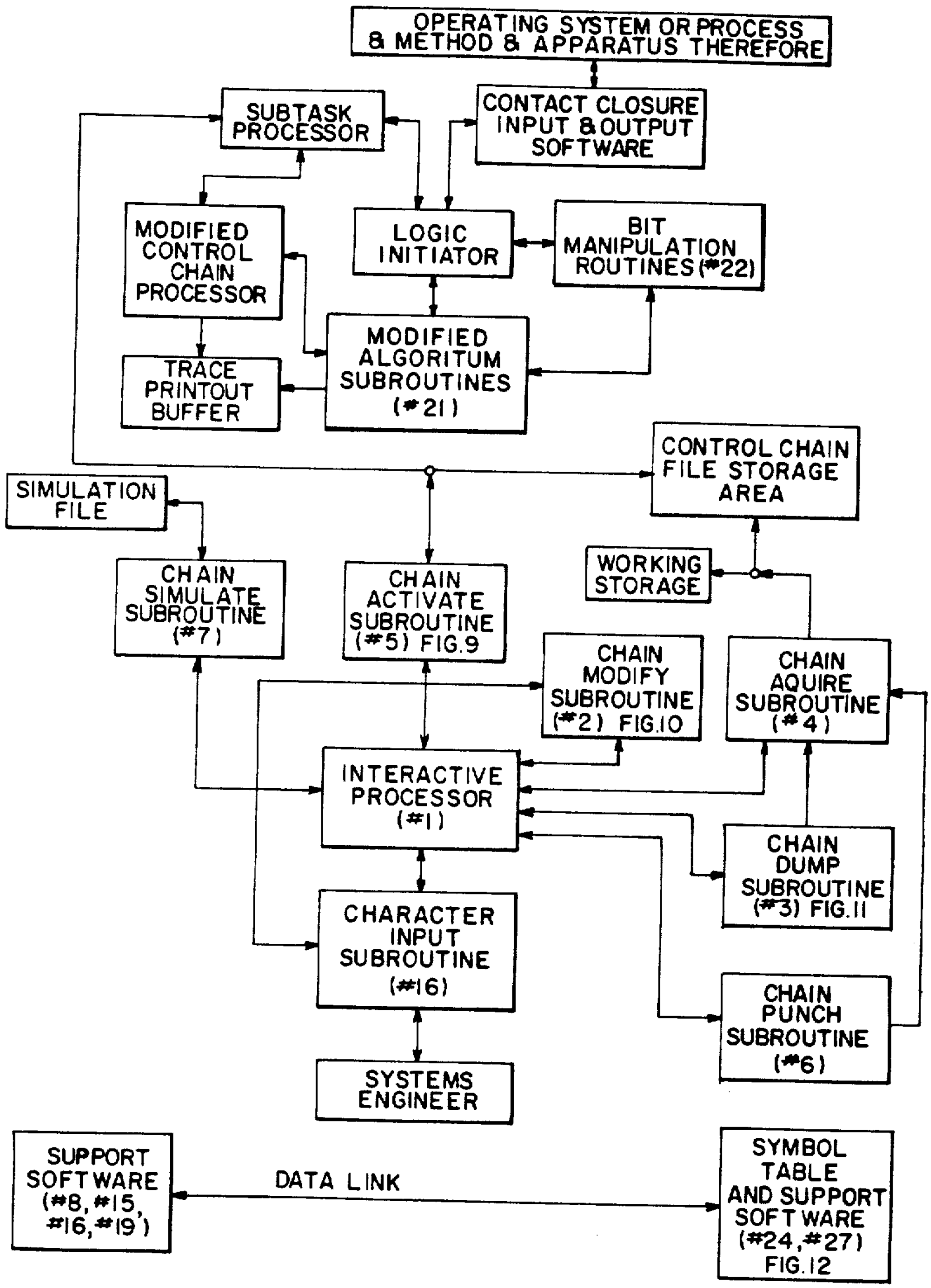
FIG. 8 is an overview block diagram of a computer controlled operating system or process incorporating the present invention and illustrating the interties which exist between the various software entities which are part of the system.
Figure 9:
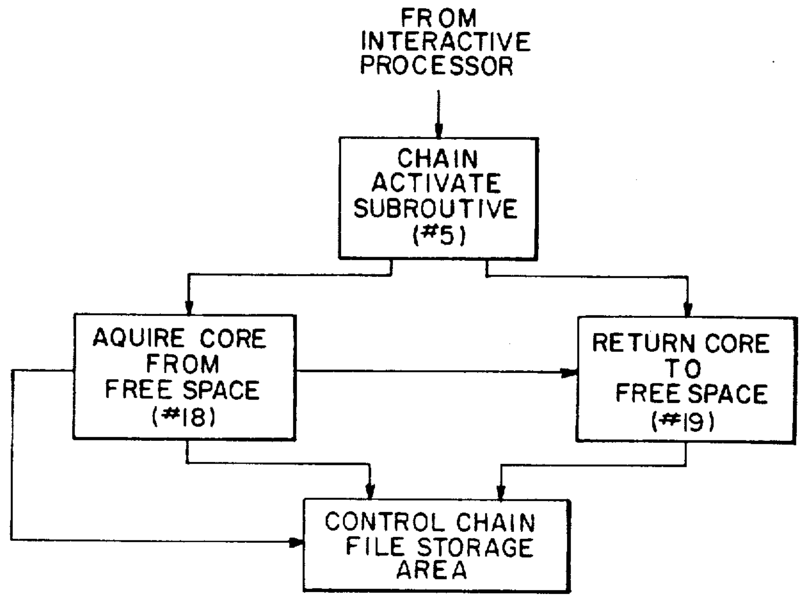
FIG. 9 is a block diagram of the interties which exist between software entities that support the chain activate subroutine shown in FIG. 8.
Figure 10:
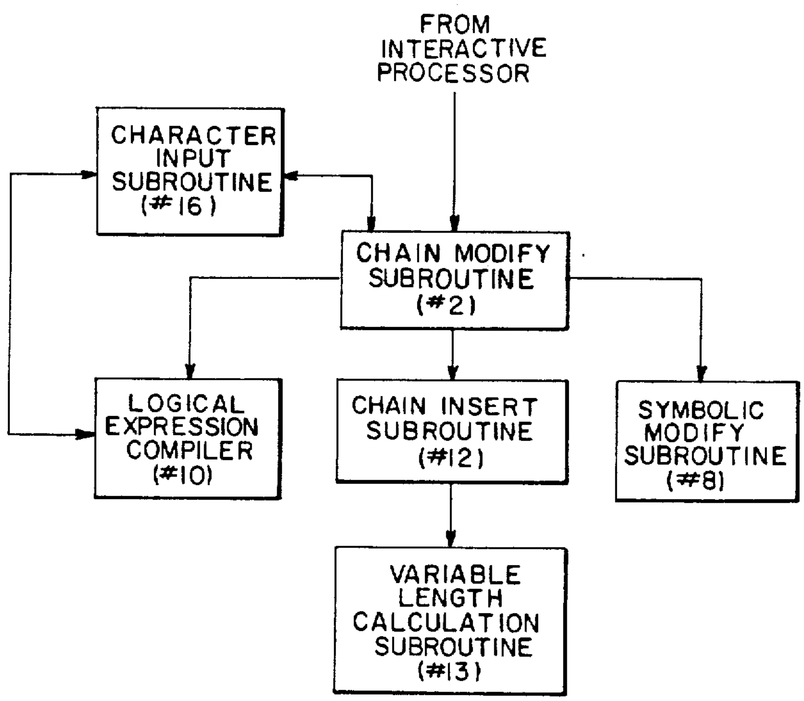
FIG. 10 is a block diagram of the interties which exist between the software entities that support the chain modify subroutine shown in FIG. 8.
Figure 11:
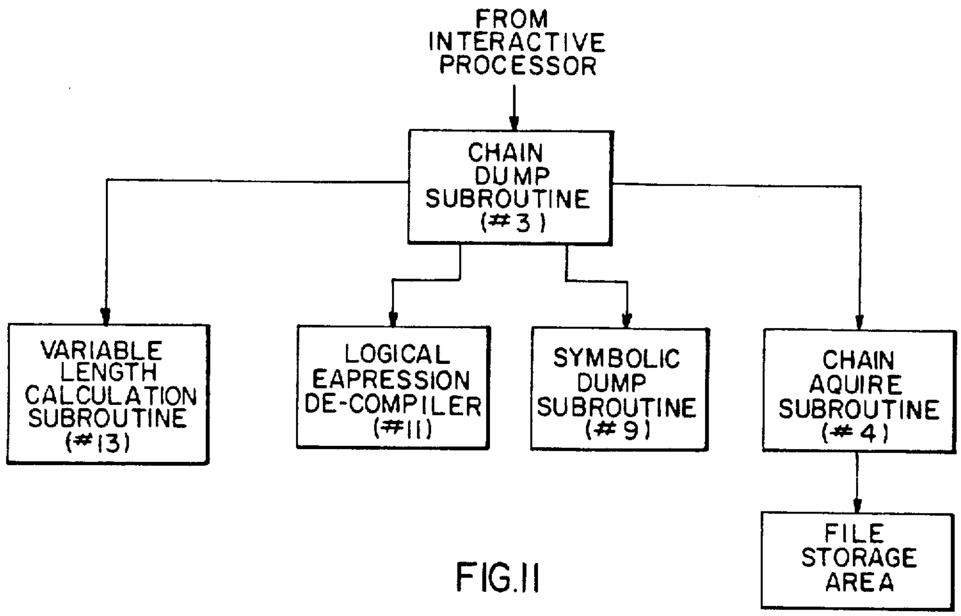
FIG. 11 is a block diagram of the interties which exist between the software entities that support the chain dump subroutine shown in FIG. 8.
Figure 12:
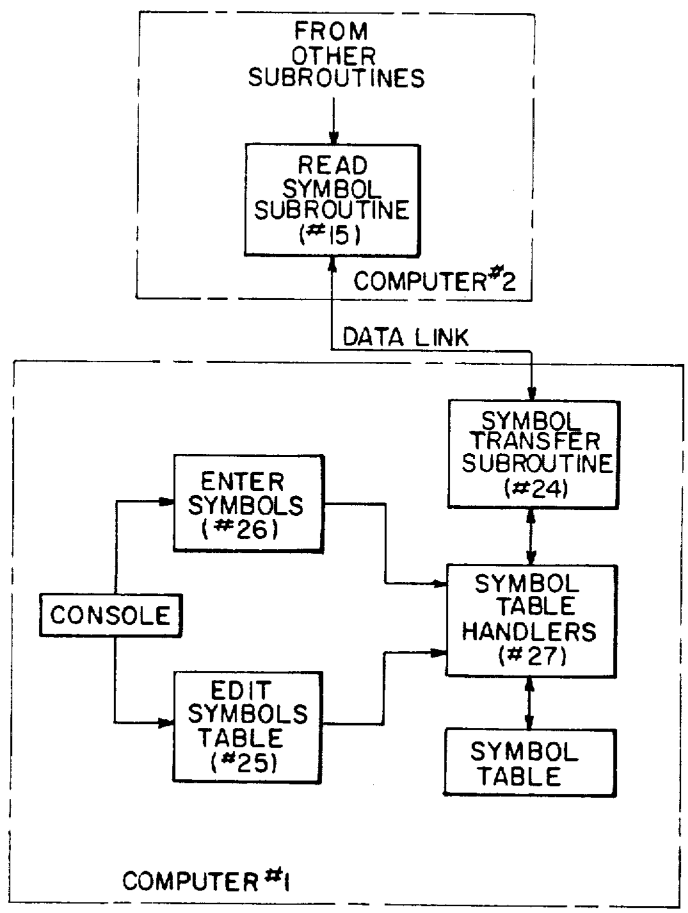
FIG. 12 is a block diagram of the interties which exist between the software entities which maintain the symbol table for use by the system or process.

The Level Three software in the original package consisted only of a hexadecimal modify and dump routine which was called by both the modify and dump functions from Level Two, and allowed the user to communicate with the editing package in hexadecimal notation for either modification or for listing output. Refer to FIG. 2 for a graphic representation of this structure.

Because this basic structure has been retained, and additions have merely been made to it, at this time the functions of the major blocks of the original package will be discussed briefly.

The main processor is the routine that interfaces with the user on the control command level, decomposes the control command that has been entered by the user, and stores the decomposed input information in appropriate internal buffers in common. The user of the package enters a control command with the following format:

!CC,ARG1,ARG2,ARG3,ARG4

CC represents any valid two character control mnemonic. Each argument may be a single symbolic alpha-numeric entity; a hexadecimal number; a decimal number; or a double argument separated by a dash.

Example

!CC,ARG1A-ARG1B

By using both the comma and the dash delimiters to their fullest extent, one may enter up to eight arguments following each control command initiation.

The first task of the main processor is to check for any possible syntax errors in the input string, to determine if the control command that has been input is well formed. Once this determination has been made, the specific two letter mnemonic is interrogated in relation to a mnemonic table; and if the mnemonic is legal a subroutine branch is established for use at a later time, and the arguments are then manipulated. Argument manipulation requires the checking of each argument to determine a. is it a symbolic alpha-numeric argument which will require symbol table access, or b. is it a straight hexadecimal number which will require conversion to binary from the base 16, or c. is it a decimal number which will require conversion to binary from the base 10. This operation is performed by the main processor, and the result of the operation is that an argument storage table in common will be updated with the correct binary value for each of the arguments entered by the user. If no argument has been entered for a particular location in the argument table, the table is set to zero, zero being the default case for any argument entry.

After the arguments have been resolved, the main processor then branches, via subroutine call, to one of the five Level Two processors; determined by the two letter control command that had been entered by the user. The first Level Two function, Chain Acquire, performs as follows. The PROGEN-70 sub-level processor (see the above-cited Gyres, et al. application) is interrogated to determine if the sub-level requested by the user is a legal sub-level in the system, and a sub-level that contains a PROGEN-70 control chain as opposed to some other programming entity. If indeed the sub-level is a valid sub-level, and does contain a PROGEN-70 control chain, said control chain will be moved into a working area directly associated with the editing package. Therefore a local copy of the control chain is created for manipulation by the editing package without affecting on-line control. The chain so acquired still continues to function in the on-line environment as if no acquisition had been made. Once the acquisition is complete the two functions directly related to the internal structure of the chain, the modify function, and/or the dump function, may subsequently be activated by the user of the package. Again a two letter control mnemonic is entered by the main processor. The main processor determines whether this is a modify or a dump, and will place a subroutine call for the correct processor at Level Two.

In the original version the modify function determined the extent of the modification, i.e. the starting block number and the ending block number for the modification of the chain. This information was passed on to the Level Three program which, in the case of modification, requested hexadecimal input information from the user in an interactive way; and in the case of the dump function, produced a hard copy printout of the area of the chain in question in a hexadecimal format.

Once the modification and dump cycle is complete to the satisfaction of the user, he may then decide to a. activate the modified control chain by using a two letter mnemonic for the activate processor at Level Two; and this processor will then move the modified control chain to the active chain working file and perform the necessary linking functions with the sub-level processor so as to bring this chain into the active environment, or b. use a chain punch function which allows the user to produce a paper type copy of the modified control chain possibly for loading at a future time.

That is a brief summary of the functions that were available in the original editing package. A later portion of this description shows how this original structure has been modified to include the functions that embody the precepts of this thesis. A complete summary of functions is included in Appendix B.

2. Interface Procedures

The interface procedures used in connecting the various portions of this editing processor and connecting the editing processor to the outside environment shall be discussed in detail in this section.

The main processor itself may be initiated in one of two ways. One, it may be run on a regular task level and bid by the Initiate Task function of the programmer's console package, or two, it may be run on a sub-level under control of the sub-level processor, and is bid then using the General Program function of the programmer's console. Once the user has entered the main processor, a message, "ENTER CONTROL COMMAND", will be typed back to him at the selectric typewriter. This is verification that the package is indeed working and that he is not required to input control command information in the previously mentioned format. Once the main processor has completed its operation, the interface between the main processor and the Level Two software can be accomplished in one of two ways, depending on the configuration of the machine using the processor.

In an all-core machine, the Level Two software is simply concatenated onto the end of the Level One software in the form of attached subroutines. The main processor places a direct subroutine call to the Level Two processors which are run as standard subroutines, and in fact, the Level Two processors also call the Level Three processors via standard subroutine calls. The code for the Level Three processors is concatenated onto the end of the Level Two processors, making an all-core environment with Level One, Level Two, and Level Three.

A more imaginative approach can be used in control machines which have a disc associated with them directly. This allows the Level One processor to be run on a disc-resident sub-level, and interaction between the main processor and the Level Two software is now of such a nature that the main processor places a sub-level read and transfer bid for the Level Two software. A core buffer is assigned by the sub-level processor and the Level Two software is read from the disc into core on a priority basis. The Level Two software is then entered from the sub-level processor and executed to completion, at which time the buffer is released and other control programs may now run in the same area. The Level Two software, if it needs the support of some Level Three software, will use the same sub-level processor control strategy to execute Level Three editing package processors. Therefore, a type of overlaying structure is allowable here which was not allowable in the all-core machine; which enables the editing package to be used in a more efficient manner, with the majority of the programs being on the disc, and only being called into core when needed for actual execution.

The data management system consists of a block of named common into which the main processor and the Level Two software will place the composed input information, in such a form that the Level Three software can easily use the input information; and return its own output information to the Level Two, and/or Level One programs, via the common area. An enhancement of this has been made in the case of the Chain Simulate function, which is discussed in detail in Section IV., D., but in the original package the single area of common was sufficient for the interchange of all the data variables.

It might be prudent at this time to mention that in the Level One software area, in addition to the main processor, a series of support subroutines have been provided to enhance the repetitive operations required by the main processor and the Level Two and Three processors as well. The reading of a character from the typewriter keyboard, the output of error messages to the user of the package, the insertion of a modified control chain into the actual working environment of the online sub-level processor, and other specialized routines are included in this support subroutine package. The support subroutine package was not materially changed for the implementation of the added functions of this package.

3. Error Recovery Procedures

Each level of the software structure previously mentioned has associated with it various methods of error detection, error notification to the user, and error recovery by the user. Error numbers have been assigned for each type of error which is reportable to the user, and a summary list of these errors is included in Appendix D.

In the main processor itself, two special control characters are provided to the user to allow him to recover from specific error conditions. If an error is created and detected such that the entire control command must be initiated again, the operator merely types the exclamation character and continues by typing the entire control command a second time. The new control command entry will be analyzed by the processor in lieu of the original entry which presumably had some error in it.

Example

!CM,40-25!CQ,AS00014

The star character is used to cancel argument input if an error is detected in the input of a given argument in the control command string. If the user planned to type symbolic argument XYZ, and noted prior to doing a carriage return that he had typed XYP, he would be allowed to hit the star character and again type XYZ; the XYZ symbol would be accepted, and it would be necessary to reconstruct the entire control command line.

Example

!CQ,AS001*AS00014

The slash character is an escape character, which allows one to exit from the editing package at any time. If the input string analyzer in the main processor should detect a slash character, the task level or sub-level on which the main processor is running will exit, and in order to restart, one would have to bid the main processor by the previously mentioned procedures. The slash character is a character which is used in all three levels of software development. If a slash character is encountered in the input string at Level Three, the user is immediately dropped back to Level Two, and requested to input information according to the demands of the Level Two processor. If the slash is encountered in Level Two, the user is then dropped back to the Level One processor and asked to enter another control command as is consistent with the input to the Level One processor. A further slash will terminate the action of the main processor and exit the function. So, at any given point in time, from the typewriter keyboard a maximum number of three slashes would be required to return the user to the exit state and essentially turn off all editing functions.

Example of Escape Character:

```
.
.
.
TRUE=/                    (Level 3 syntax)
```

ENTER BLOCK # AND ALGORITHM NAME (Level 2 syntax)=/

ENTER CONTROL COMMAND (Level 1 syntax)=/

This example takes the user from a symbolic modification at Level 3 to the exit of the debugging package by typing 3 slashes. All other printout is generated by the computer.

The error recovery structure is such that errors are broken down into two categories: recoverable errors and non-recoverable errors. For example, assume a recoverable error has occurred at Level Three. Recoverability means that a certain portion of the interactive package at Level Three will be able to resolve the error difficulties, ask the user for more definitive information, and recover from the error without returning back to Level Two and requiring Level Two information to be input. So a recoverable error is defined as one which is recoverable at the level of occurrence. A non-recoverable error is an error which will require the user to drop back to the last software level of operation, and will automatically drop him back to that level of operation. If a non-recoverable error is detected at Level Three, the user will be automatically dropped back to Level Two, and he will be asked to input information to this program in the Level Two format. A great amount of time has been spent in attempting to resolve most error situations at the level of their occurrence, so that by simply inserting some additional symbols or by reconstructing a small portion of the input information, the user may continue at the same software level at which he was operating. But in certain cases the error is of such magnitude that this is not possible, and therefore, the user is dropped back to the next software level and required to input more information at that reduced level. As the software enhancements to this package are discussed, additional error recovery procedures which will further exemplify the error recovery capabilities included in this package shall be pointed out.

B. Conversion to High Level Syntax

1. Symbolic Modify Function

The basic goal of the Symbolic Modify function added to the editing package is to allow the user to communicate with the editing package in a higher level syntax than hexadecimal notation. The result is that the user is now able to communicate with the package in a language which is very similar to that used in the original generation of the control chain.

Symbolic notation is used throughout the package, and modification steps are highly interactive, in that for each given control chain algorithm there are certain well-defined key words that are associated with each of these algorithms. As soon as the Symbolic Modify function realizes that a specific algorithm is requested to be input, a vocabulary key table of 36 words is interrogated to find the first word associated with that particular control chain algorithm.

For an example, the Set-Reset algorithm has two words associated with it for use by the operator. One word is TRUE, and one word is FALSE. Once the Set-Reset algorithm has been invoked by the operator, the typewriter keyboard will return to the operator:

TRUE=

The operator must therefore input in logical high-level notation the representation of the logical element that he desires to have set true as the result of the execution of this algorithm; and then a carriage return. The package will then interrogate this symbolic entry, access the hash-coded disc table to produce the hexadecimal bit address of the variable, and store this hexadecimal bit address into the data structure he wishes to modify, and the vocabulary key table is then searched to find the input word associated with that particular algorithm. If the input word is not repetitive, i.e. if there is only one entry per word, once the input of that one entry has been completed, the processor will immediately ask for the next word without using the slash delimiter. In the case of repetitive requests, the slash delimiter is used to move the next input word.

Certain PROGEN-70 algorithms do not start immediately with input storage, but rather use the first two or three words of their data structures to store internal variables, counters, and pointers etc.; and the third or fourth word would therefore be used for storage of the first word of input by the user. This would be difficult to handle by this processor if it were not for a special field in the vocabulary key table which is a bias field. The bias field indicates how far down into the algorithm the first word of input should start, allowing us to correctly bypass the starting words in some of the algorithms and therefore reserve these starting words for internal use by the control chain interpreter.

The vocabulary key table, the heart of the Symbolic Modify function, and also the heart of the Symbolic Dump function, is a variable field word, a 16 bit word divided into five fields. The first field is a one bit field indicating repeat or no repeat. The second field is a 4 bit field, indicating the algorithm type from 0 to 15; this is used in an initial search by the processor to determine the first word of a given algorithm. The third field is a 3 bit field used for the storage of a bias number as indicated in the previous discussion. The fourth field is a symbol table access code from 1 to 15, which will be discussed in more detail in the portion of this description devoted to symbol table handling. Basically, this number allows the hash coded disc symbol table to differentiate between the hexadecimal number, which is used to represent a logical bit; and an identical hexadecimal number, which may be used to represent a PROGEN-70 sub-level, or any other two numbers which may be in conflict at the hexadecimal level but not in conflict at the character level. This is discussed in more detail in Section IV., C. Field Five is the actual vocabulary word index number which allows one to access up to 20 special vocabulary words in a 20 word vocabulary table, which is also stored in common. These two tables, therefore, allow the return to the user, upon request for input, the original syntax that is used by the PROGEN-70 compiler; and a syntax that by this time he should be most familiar with, as opposed to the more cumbersome hexadecimal format previously used.

2. Symbolic Dump Function

The Symbolic Dump function allows the user to obtain a hard copy listing output of a chain or a given portion of a chain in a format which is entirely consistent with the original output from the control chain compiler. If the extended dump feature is chosen, the user may get in addition to the syntax indicated by the original compiler an expanded syntax which actually shows the internal representation of the chain in the working environment. Examples of both the abbreviated dump format and the extended dump format are included in Section V.

An interesting addition of the Symbolic Dump function is that a dump-with-value feature has been provided. If the user indicates in the control command input for the dump function that a dump-with-value feature is desired, any time a logical element is encountered by the Symbolic Dump function, the current value or state, i.e. either 0 or 1, or the logical variable will be returned to the user for his examination. So, during the execution of a given chain, one could periodically dump the chain in question and obtain an idea of the status of the variables at the time the chain is dumped. When operating in the simulation mode, discussed in Section IV., D., there is certainly not necessary; but in certain debugging instances where it is not practical to invoke the simulation function, the dump-with-value portion of the Symbolic Dump function allows one to gain some insight into the on-line state of the variables in question.

3. Boolean Expression Compiler

In addition to rather fundamental algorithms, which can be handled by the Symbolic Modify and Dump functions previously mentioned, the PROGEN-70 control system allows the generation of Boolean or logical expressions, and the evaluation at run-time of such expressions. The logical operators allowed are the standard logical operators, the unary negation operator, and the binary operators AND, OR, and EOR (Exclusive Or).

The user of this package merely types in at the console a Boolean expression using the operators previously mentioned; and it is a function of this Boolean Expression Compiler to analyze the input string, parse the input string into an internal representation of both the logical variables and the logical operation, and return these logical operations and variables to the system. The Boolean Expression Compiler processes FORTRAN type logical assignment statements, and translates this input string into an internal code representation similar to three-address-code. Characters are input one at a time through the typewriter keyboard. Complete syntactic elements, i.e. variables, operators etc., are converted to a numeric code and stored in an intermediate buffer. The intermediate buffer is then processed as a series of parenthesized nests—innermost nests processed first. Each nest is processed for logical operators, and legal operators are processed in the following order: NOT, AND, OR, and EOR.

When processing is complete, two output buffers exist. One buffer contains the actual core address for each non-temporary, logical variable processed. Another buffer contains modified three-address-code commands, composed of packed words, 16 bits each, as follows: Bits 0–4, relative address of left hand operand; Bits 5–9, relative address of right hand operand; Bits 10–13; relative address of temporary result; and Bits 14–15, code word for the logical operation in question. The program itself is broken down into six distinct sections:

a. Initialization;

b. Input of character;

c. Check input symbol validity;

d. Check syntax and locate parenthesized nests;

e. Scan and process parenthesized nests;

f. Output error diagnostics.

An extensive number of error diagnostics have been generated in association with this package to allow quite flexible recovery from most of the errors encountered in syntactic input. Again, as was the rule for the overall package, this compiler has error diagnostics broken down into two specific types. The first type is the recoverable error, and the second type is the fatal, or non-recoverable error (see Appendix D). The use of the star (*) and slash (/) characters are as described in Section IV., A.

4. Boolean Expression Decompiler

The function of the decompiler is to take the machine representation of a given logical expression, and manipulate it in such a way so as to return to the user the syntax that was originally input at the higher level to create the algorithm, or to return to the user a syntax which is logically equivalent to the original syntax, although not necessarily in the exact syntactic form input originally.

The logical expression decompiler functions in much the same way as the logical expression compiler, except in a reverse manner. It interrogates from bottom to top the packed three-address-code operand words, and creates internal temporaries which hopefully, by the time the last operand word is interrogated, will have disappeared, so that where possible the original syntax is returned to the user. As the individual operation words are interrogated and processed by the decompiler, an internal input string is recreated in the abbreviated form, identical to that used by the compiler. Once the abbreviated input string has been recreated in its entirety, another section of the decompiler scans through this input string, and reconstructs and outputs the syntax required to closely approximate the original entry of the logic expression. When hexadecimal addresses of logical variables are encountered, a request is placed over the computer-to-computer data link to retrieve the actual character representation of the hexadecimal logical address, so that the symbolic notation originally used in the construction of the program will be returned to the user as an output of this symbolic decompile function. The output from this decompiler is a form compatible with that generated by the Symbolic Dump function mentioned previously, so that in chains consisting of mixed algorithms, the printout will be consistent, and acceptable for use as a one-by-one replacement for the original documentation.

Therefore, as in the Symbolic Dump function, the logical expression decompiler generates completely replaceable, completely self-documenting hard copy. In the case where the logical element in question does not have a character representation in the symbol table, the hexadecimal representation will be returned to the user in lieu of the symbolic representation with the syntax X'HHHH', where HHHH is the hexadecimal number, so that the output is readable even if the symbol is not represented on the disc symbol table.

C. Symbolic Variable Representation

1. Use of Computer-Computer Data Link

In the majority of control applications involving both a small logic computer and a larger supervisory computer, one will find a data link existing between the two entities. Typically this would be a parallel data link operating in full duplex mode of operation. In the configuration that we are using for the example in this thesis, the data link configuration is as follows: a. there is a single data link between the logic computer and the supervisory computer, and b. there is a dual data link between the supervisory computer and the logic computer. This is because the traffic between the supervisory computer and the logic computer, i.e. the output of references etc., is much heavier than the feedback information which is transmitted from the logic computer to the supervisory computer. Each data link is capable of a word transfer rate of about 200–220 words per second—these are 16 bit words.

In designing this package consideration was given to using the computer-to-computer data link for the purpose of rolling in and out the various program segments needed for the execution of the debugging package. This was discounted due to the relatively slow speed of the data link and the relatively large amount of on-line control information that must be transmitted across the data link. The transmission of programs across the data link would materially impair the transmission of the necessary data for the on-line control. The decision was made, therefore, to use the computer-to-computer data link in a minimal fashion, making the editing package that exists in the logic computer essentially a stand-alone package, with one exception. This exception involves the data linking of symbol definitions and symbol table look-up requests between the two machines.

In order to make the use of the data link transparent to the design of the editing package a separate subroutine has been constructed which is linked into the actual editing package itself. A data statement in this subroutine is the determining factor as to whether the subroutine will construct a data link call to the supervisory machine for symbol definition, or in the case that the logic and supervisory functions are combined in one machine, place a call directly to the disc symbol table subroutines which would, of course, be resident in that single machine. So no matter what configuration exists, as far as the host machine is concerned, the symbol table lock-up subroutine call is identical and all of the various levels of software that require symbol definition may place one symbol table subroutine call. By adjusting the parameters within the symbol table look-up subroutine, the decision is made between using the data link and actually calling the symbol table routines in the machine that contains the debugging package.

In the case where the dual computer configuration is utilized, the symbol table look-up subroutine in the logic machine structures a data link called from the logic machine to the supervisory machine, and the symbol table routines in the supervisory machine access the disc to return the hexadecimal address or value associated with that given character representation. The hexadecimal number is then transmitted back across the data link to the logic machine for its subsequent use. The opposite condition exists at certain times where the editing package is in possession of the hexadecimal address for the symbol in question and it also has knowledge as to the symbol table access code which will be discussed later. These two pieces of information, the address and the code, are passed over the data link to the routines in the supervisory machine. At this time a search of the disc symbol table is made to locate the correct character representation of the symbol in question. Once this information is accessed, it is then transmitted across the data link back to the logic machine for its subsequent use.

This minimal use of the computer-to-computer data link is consistent with the original design goals of this package. This package is therefore suitable for operation in a. large control environments where a supervisory computer performs logic functions as well as supervisory functions, therefore the disc symbol table would be in the same machine as the debugging package; or b. medium sized systems where the logic computer data links information to the supervisory machine for processing; or c. very smallest of installations where the logic computer stands alone and does not have access to a disc of any kind. So, since we must operate in that third environment, the minimal use of the disc is desirable in this case.

2. Hash Coded Disc Symbol Table

In order to implement the symbol table look-up procedures mentioned in the previous section, certain symbol table routines have been designed and implemented in the supervisory machine. The following is a discussion of the disc symbol table structure (see FIG. 3).

Assuming for a moment that a certain area of disc has been set aside for the use of the symbol table handlers, the area is partioned in a two-thirds to one-third arrangement. It is important that symbol table access must be rapid in either direction, i.e., from the character to the hexadecimal and from the hexadecimal to the character; so a double-headed symbol table has been designed with the partition as indicated above. The one-third partition is used to store hexadecimal representation in a two word format. Since the disc on the machine in question has a sector size of 256 (16 bit words), one sector in this configuration can store up to 128 hexadecimal numbers.

Word One of the two word entry on this portion of the symbol table contains the hexadecimal address or value of the symbol in question. It is this one word entry in the symbol table that is used by the hash code algorithm to extract the correct sector address for this hexadecimal number. Word Two of the storage pair contains a split field. The first portion of the word, Bits 0–11, contain a sector pointer to a sector in the other portion of the symbol table which will contain the character representation; and Bits 12–15 contain a number which is the code number associated with this symbol table entry. Both of these items require further explanation. In the case of the sector number pointer, a base number is stored away in the machine which represents the starting sector for the entire symbol table, and the character representation of each symbol is stored in the first two-thirds of the symbol table. The sector pointer number therefore points to a relative sector number in the first two-thirds of the symbol table of which sector one will find the character representation of the hexadecimal number contained in Word One of the entry. Since it is possible for two different symbols to map to the same hexadecimal address, a four bit code word is included with each hexadecimal address. Each group of symbols is assigned a specific code number from 1 to 15, and this code number is used to resolve conflicts of the types mentioned above.

As an example, two important entities which are stored on the symbol table are logical bit addresses and sub-level numbers. While by agreement with the users of this package, the character representations will be unique on the symbol table, two different character representations may exist for the same hexadecimal number. The logical bit address 802F, and the sub-level number 802F, are both equally valid; hence the logical bit addresses have been assigned a code number 01, and the sub-level numbers have been assigned a code number 02. Various other entities are assigned separate code numbers as well.

In the first two-thirds of the symbol table, the character representation of the symbol is stored along with the hexadecimal address of that symbol. This is accomplished in a four word format, allowing 64 symbols to be represented on one sector in this area. The first three words of the four word format contain the packed ASCII representation of any eight character symbol. The standard eight bit ASCII with even parity that is used as the character representation by the machine in question is truncated and packed into a modified six bit ASCII format, and the words are shifted so that all eight characters fit within three symbol table words. The fourth word in this section of the symbol table is identical to the first word in the previously mentioned section of the symbol table, i.e. the hexadecimal address or value to be associated with the ASCII stored in the upper three words. Using this configuration and maintaining a 50 percent spare area for symbol table efficiency, it has been calculated that one can effectively store 28.5 symbols per sector. This number can be used in determining the number of sectors needed in the disc storage area as a function of the number of symbols to be stored.

Each of the four subroutines involved in the symbol table storage procedures shall now be discussed. The first subroutine retrieves the hexadecimal number associated with any given ASCII symbol, once the ASCII has been input to the subroutine. As we shall see, this operation can normally take place with one probe of the symbol table. The subroutine first packs the character representation into the three word format compatible with that stored in the table, and then enters a hash code subroutine which takes the three packed ASCII words, adds them together, squares the sum, and then extracts the middle 16 bits from the center of the two word product. This pseudo-random number is then converted modulo the size of this sector area, so that it now represents a relative number from the beginning to the end of the first portion of the symbol table sector area. A disc read is now made and a linear search is made of the 64 entries on the sector in question. If the ASCII equivalent is found on the sector, the hexadecimal number in word position four is returned to the user as the value of that symbol.

In the case where the sector is interrogated and no match-up occurs, the sector number of the sector being examined is entered into the hash code subroutine and a new sector number is created from the old sector number, using the same randomization techniques mentioned earlier. This continues until either the symbol is successfully located in the symbol table area, or all of the sectors have been interrogated and the symbol is not located on the disc. In the latter case it is sufficient only to continue searching through the symbol table until a sector is located which is not completely full. If a sector of this type is discovered, and the symbol has not yet been defined, one can declare that the symbol is not contained on the symbol table.

The next symbol table subroutine uses the hexadecimal number associated with the symbol to search for the actual character representation of the symbol. This operation normally takes two probes of the disc. The hexadecimal value of the symbol is hashed in accordance with the previously mentioned algorithm, and the lower one-third of the symbol table is accessed in an attempt to locate the two word entry mentioned previously. Once the two word entry is located, the sector pointer contained in Word Two will direct the package to the correct sector in the upper two-thirds of the symbol table; hence the two probes. Overflow of the two word symbol table area is handled in a manner analogous to that for the four word symbol table area. These two subroutines represent the major on-line subroutines utilized by the debugging package. However, two other subroutines are provided for symbol table management of the disc.

A symbol table ENTER function is provided which allows one to enter a large number of symbols presumably from some binary input device. Symbol definitions that previously existed on the disc are discarded and the new definitions are put on the disc in place of the old definitions. A symbol table DELETE function is also provided where one wishes to delete a given symbol and no new symbol definition is anticipated.

So a hash coded symbol table with four symbol table handling subroutines is provided: a. fetch ASCII given hex, b. fetch hex given ASCII, c. symbol DELETE, and d. symbol ENTER.

3. Symbol Table Support Routines

Two FORTRAN support routines have been written to aid the user in loading and interrogating the disc symbol table just previously discussed. The first routine is used in conjunction with the symbol table ENTER, and is used to enter symbols from a suitable binary input device. This can be done either by using binary cards or by using binary punched paper tape. The program is interactive in the respect that once it is initiated it asks the user to type into the keyboard the correct information necessary for the activation of the package. One must indicate the binary input device requested; the listing output device requested, if desired; the debug device requested, if desired; and the symbol table access code previously mentioned. Once these numbers are input from the keyboard the package will commence reading from the binary input device.

Two types of hard copy output are provided, as an incidental feature of this package. A symbol table map is output where a listing of each symbol and its definition is provided for the user. In addition to this, a debug symbol table printout is provided indicating the actual sectors onto which the information has been stored for each symbol, and the relative position into each sector where the information can be found. One activates these dump features by selecting a non-zero device for the printing of the listing and the debug information. An indication of zero as a listing or debug device will inhibit either of these printouts.

Another interactive package has been written to provide the user a method of editing the symbol table on a one symbol basis. Again, once the package is initiated, the user merely inputs information that has been requested by the interactive package. The features included are similar to those of the mass input package except that the user may do this on a one symbol basis. He may therefore enter a new symbol, request the ASCII equivalent of the hexadecimal symbol value, or request the hexadecimal value given an ASCII symbol, or he may delete a symbol from the symbol table.

The four basic subroutines discussed in the previous section, plus the two support routines mentioned herein complete the discussion of the disc symbol table and present the user with a very powerful construct in the management of symbols in his system.

D. Simulated Program Execution

1. The Simulate Function

To facilitate the simulated execution of PROGEN-70 chains, a simulate processor has been added to the basic software structure of the debugging package at Level Two. An additional two letter mnemonic, CS, has been added to the system such that any time this mnemonic is encountered by the main processor, control is automatically transferred to Level Two in the chain simulate processor. By examining the input arguments to the Chain Simulate function, one may gain some insight into the operations performed by this simulate processor.

The user is requested to input as Argument One the area of the chain in question over which he wishes to place a Block Trace. The Block Trace is a hard copy printout of the block number being executed, the block algorithm name being executed, and the time of execution in milliseconds. Once this feature is selected and the chain is subsequently placed in execution, the listing output device selected by the user will output a time study of the execution of the chain in question, indicating all blocks falling between the block numbers specified as input parameters that were entered during execution, and the time of entry.

Argument Two is the area of the chain in question over which one desires to have placed the Input-Output Trace. This Input-Output Trace is an enhancement of the Block Trace in that all of the information contained in the Block Trace is presented to the user plus information concerning the state of all of the dynamic variables associated with a given block. In some of the PROGEN-70 algorithms the arguments are all fixed in value, and merely perusing the source listing of the program will determine the value. These items are not included in the I/O Trace. Only those values which may change during the execution of the program are included, such as the state of logical variables in the system, the state of dynamic arguments to the program algorithm etc. are included in this trace. A complete summary of trace formats is included in Appendix E.

Argument Three is a time multiplier which allows one in the simulated mode to expand time to give a more deliberate evaluation of the control chain or group of control chains. An entry of One in the Time Multiplier position will assure the running of the chain in real-time, while a multiplier of Two will expand time by two. A chain normally performing a sequence in one second will now take two seconds. In essence, all software created delays in the execution of the chain will be multiplied by the number indicated in this argument.

Argument Four is a Run Counter. The Run Counter may be set to any arbitrary number and subsequent executions of the control chain will be traced using the Block Trace and I/O Trace to a suitable listing output device and the number will be decremented. When the number reaches zero, the simulation and tracing will be terminated and the control chain will continue to function in a normal manner. This is very beneficial during periods of on-line debugging where the computer operator will not be present during the execution of the chain, i.e. an evening rolling turn in a steel mill. If the operator wishes to observe the next 16 executions of a given chain but he will not physically be present in the computer room, he can select the Run Counter to be 16 and then exit. The next 16 operations or executions of the control chain in question will be logged out on the selected listing device and then the tracing function will be terminated and the control chain will continue to function in the normal manner for the rest of the time.

Thus it can be seen that the Chain Simulate function has the capability of tracing, on a block-by-block basis, events which occur within a chain in two forms: either with an abbreviated trace indicating only the block entry, time, and the block number or block type, or an expanded trace including that information plus the tracing of the change of state of all dynamic input-output variables. Also found is the feature of time multiplication and the ability to set up a predetermined number of simulated runs.

This is not enough information to be input to the Chain Simulate function, but this is all the information that may be entered using the normal syntax associated with the original package. Once the Chain Simulate processor is entered, a request is typed on the selectric typewriter requiring the user to input information pertaining to the dynamic variables that he desires to have simulated during the execution of the chain. Once these variables have been entered, the package asks the user if he desires to have a one time execution of the chain to begin immediately. If the answer is no, the package will be armed and wait until the next actual on-line execution of the chain, at which time the simulation and tracing procedures will occur.

The software required to simulate the various dynamic variables in the system is discussed in general here and then in subsequent sections the interface and the modifications to the interpreter will be discussed in more detail. Assuming, for an example, that a logical variable has been input as a variable designated to be simulated; as a result of this input, the logical address of the variable in question will be placed in one of the locations in the 60 word logical address simulation table for use by the Bit Manipulation routine. Also, the name of the chain will be placed in a five word sub-level number table also for use by the Bit Manipulation routine.

Since all run-time requests to set or reset logical elements pass through the Bit Manipulation routine, assuming the simulate mode has been selected; the Bit Manipulation routines have been modified to check the five word sub-level table and the 60 word bit table before proceeding with normal Bit Manipulation. If a. the chain being currently executed is in the sub-level table, and b. the logical bit address currently in question is found in the 60 word bit table or logical address table, no hardware consequences will occur as a result of any of the Bit Manipulation operations. In lieu of hardware consequences, the request to set and/or reset a given logical element will be simulated by using Bit 13 of the actual bit address which is stored in the logical address table. Therefore, by interrogating Bit 13 of the logical address in the 60 word logical address table, in lieu of interrogating a hardware element, the correct status of the bit in question can be determined readily.

As far as the Trace Printout is concerned, bits will be traced in the normal way with the ASCII symbol being shown and the actual state of the logical variable. However, because the user has selected the simulation mode for this variable, only Bit 13 of the logical address table entry will have changed. Other variables are simulated through changes directly in the control chain interpreter, which shall form a part of a subsequent discussion in this section.

In order to exit the package, by entering a minus number as the first argument of the CS function, a separate branch is taken in the package and the user is interrogated as to his desires in three areas: a. he is asked whether he wishes to terminate the Block Trace, b. he is asked whether he wishes to terminate the Input-Output Trace, and c. he is asked whether he wishes to terminate the simulation of the variables that he has indicated previously. By answering these three questions correctly, one may return the chain to the normal run-time situation, removing all the simulation and tracing features.

This briefly describes the power of the simulate function from the user's point of view. In a subsequent section the interface between the simulate section and the rest of the PROGEN operating system shall be discussed.

2. Interface with Run-Time System

FIG. 4 graphically illustrates the steps involved in simulating the execution of a chain. This figure also shows the various core files which are used to support simulated chain execution. A description of these core files is presented in the paragraphs which follow.

The input information mentioned in the previous section is condensed by the Chain Simulate function and stored in an eight word simulate file. Up to five chains arbitrarily may be simulated at one time, so this results in a forty word simulation file area in common. Word One of the simulation file contains the actual core starting address for the chain in question. Words Two and Three contain the starting block number and the ending block number for the Block Trace. Words Four and Five represent respectively, the starting block and the ending block for the Input-Output Trace. Word Six contains the Time Multiplier integer. Word Seven contains the Run Counter. Word Eight is a flag word which is used by the other various run-time processors to determine the mode of the simulation in question and each bit in the flag word has a particular significance.

It is seen that in a file of eight words one can represent the information needed to be interchanged between the chain simulate processor of the debug package and the actual run-time system, with the one exception of logical variables to be simulated. These logical variables are entered into a 60 word logical variable file which is accessed by the Bit Manipulation routines as necessary. A five word table is also maintained to indicate the sub-level number of the chains currently being simulated. There is another single word utilized to indicate whether any simulation of any type is occurring in the system. So, with a total of 106 words in common, the interface for the simulation package has been completely defined (see FIG. 4.3).

3. Interpreter Modifications

In support of the Chain Simulate function, the PROGEN-70 control chain interpreter or processor has been modified extensively to include the enhancements necessary to perform the simulated execution of chains. The control chain interpreter has been restructured to allow conditional assembly so that one may specify at assembly time whether the enhanced version of the interpreter, or the standard version of the interpreter is desirable. The enhanced version of the interpreter adds about 280 core words to the total length of the run-time interpreter package.

Assuming that the simulation option has been selected and assuming a chain that will be simulated is now ready for execution, the control chain interpreter will interrogate the first word of the eight word simulation file table. If a non-zero entry is found, a comparison is made with the starting location of the chain being executed. If a match is found, this is a chain to be simulated. To facilitate access by the algorithm processors of the interpreter, the eight words of information contained in the simulation file are transferred to the task header of the sub-level task currently executing this particular chain. Once this transfer has been made, control chain interpretation continues in a normal manner until the first algorithm to be interpreted has been encountered, but prior to the time that the interpreter branches to the actual algorithm handler. In the iterative part of the main control chain interpreter which handles the entry of all algorithms, a check is made comparing the block number of the current algorithm being interpreted to the starting and ending block numbers indicated in the simulation file image in the task header. A series of flag words are then used to indicate whether the I/O Trace or the Block Trace or both traces are to be implemented on this particular algorithm. If the Block Trace is to be performed, it is performed in the iterative section of the interpreter, and certain condensed trace storage words are created and placed in a circular queue of size 256. The circular queue is then empted by a low priority FORTRAN task which will call the run-time formater and actually print out the correct trace information in the format desired. This is done so the interpreter will not be slowed up with the task of formating and printing trace messages.

Once this task is completed in the main section of the interpreter, the algorithm branch table is accessed, and a branch is placed to the start of the actual algorithm handler for the particular algorithm in question. It was necessary to imbed in each of the algorithm handlers the code necessary to perform the Input-Output Trace of the variables, and to perform the simulation of the word oriented variables. Therefore, each algorithm handler contains conditional assembly instructions which will be assembled into the interpreter if the simulation mode is chosen. Each algorithm handler checks the Input-Output Trace flag to determine if Input-Output tracing is desired. If such tracing is desired, the correct input-output information is condensed into Input-Output Trace storage control words, and such trace storage control words are stored in the 256 word circular queue for later printout.

Even though the modifications to the interpreter seem extensive in relation to the original interpreting package, the actual run-time consequences of such an extension are minimal. The response of the process in question is not of a nature that is critical, such that high response times are needed. By degrading the speed of the control chain interpreter by a few milliseconds, a very powerful method of tracing and simulation has been incorporated into this package.

4. Modified Handling of Logicals

It was mentioned previously that the Bit Manipulation routines included as part of the PROGEN-70 operating package have been modified slightly to allow the performance of logical bit manipulation in a simulated mode. The three logical operations in question are Logical Set, the assignment of TRUE to the variable in question; Logical Reset, the assignment of FALSE to the logical variable in question; and Logical Check, the interrogation of a logical variable and the return to the user some indication, either true or false, of the state of the logical variable.

In the case of the Logical Check, a normal subroutine call is placed by the user and the results are returned in the accumulator: either zero or minus one depending upon the actual state of the logical, zero being TRUE, and minus one being FALSE. This bit checking subroutine has been modified to place a check in the sub-level table mentioned previously to determine if the sub-level in question is one being simulated, and then to perform a subsequent check of the 60 word logical address table to determine if the logical address currently being input is to be found in the 60 word file. If the logical word is found in the file, the check routine simply interrogates Bit 13 of this word, and if Bit 13 is a zero, the value minus one is returned to the user, representing FALSE. If Bit 13 is a one, the value zero is returned to the user, representing the TRUE condition. As can be seen in this example, no interrogation of the actual hardware bit is accomplished in any way. Only the Bit 13 image is utilized.

In the case of Logical Set and Logical Reset, the same five word sub-level table and 60 word logical address table are interrogated. If in fact the sub-level is the correct sub-level and the logical bit address does appear in the logical address table, Bit 13 of the bit address mentioned in the logical address table will be set to one, or reset to zero depending upon the desire of the user.

So that up to five chains can be simulated simultaneously, there is no distinction made as to which logical element is associated with which given chain, hence one is allowed to simulate logical addresses across chain boundaries, i.e. one is allowed to set a bit in one chain and check its status in a subsequent chain. The above mentioned procedures give a very flexible yet powerful method of handling simulated logic.

5. Modes of Simulation

The basic modes of utilization for the simulation package are discussed in this section. During the course of computer process control project execution, there are three periods of time where the use of this package is extremely helpful.

The first phase, which is the individual checkout phase or individual debug phase, consists of the individual engineer generating, loading, and testing a relatively small number of control chains in a totally artificial environment. This individual checkout might proceed prior to the time that a sophisticated operating system had been installed, so the individual is essentially left to rely upon the power of the simulation and trace features of this particular package. During this individual checkout phase, both internally simulated inputs and internally simulated outputs would be utilized. Internally simulated inputs and outputs are those inputs and outputs which are simulated using the methods described in the paragraphs above. Essentially, therefore, all of the variables in the control chain are selected as simulated variables, be they inputs or outputs. The Block Tracing features and the I/O Tracing features are activated and the control chain or group of control chains in question are initiated. Hence, in this phase, only the integrity of the individual group of chains may be determined without respect to the actual operating system or the actual process involved.

In Phase Two, which is called in-house testing, or system test phase, the power of a larger system simulator is invoked and therefore it is not necessary to simulate inputs and outputs directly. In this Phase Two however, it is quite important to utilize the features of Block Tracing and Input-Output Tracing previously mentioned; also the expansion of time is helpful in this area.

Phase Three is actual on-line testing. This would occur after the computer had been shipped to the control site, and the actual process inputs and outputs had been connected to the computer hardware. In Phase Three, there are two different sub-phases which may be utilized to further test the control software.

In the first sub-phase one may decide to test a group of chains using the actual process input parameters and simulated output parameters. This would work in the following manner. Assume that a certain control chain is functioning moderately well in the actual on-line environment, but the control engineer wishes to make a minor change in the control philosophy, and then test the consequences of this change in a simulated manner prior to activating in the on-line environment. The engineer could simply bring the original chain into the working area of the debugging package, change the sub-level number of the chain to create a second chain, make the minor alternations to this second chain, and then link this second chain back into the operating system, connecting all triggers so that the new, modified chain will run concurrently with the original unmodified control chain. The actual outputs from the modified control chain would be selected to be simulated and both Block and I/O Traces could certainly be selected on both of the chains in question. Now at the time that the process decides that the chain in question is needed, a hard copy printout of the performance of both of the chains will be presented to the control engineer at a suitable listing device. Once the control engineer is satisfied that the new control chain is operating in an optimal way, he may then remove the original chain from the on-line system and activate the modified chain in its place.

The second sub-phase of on-line testing using the features of the simulation package would be to allow the control chain to operate using process inputs and process outputs and just employ the powers of the Block Trace and I/O Trace in checking a suspect chain for proper performance. This can be done at any time, either during computer start-up or any subsequent time when control situations would warrant such a move. In this environment, the utilization of the Run Counter is important since one may wish to monitor various iterations of a given control chain during periods of time when one is not physically present in the computer room of the process. One could, therefore, initiate the Block Trace and I/O Trace with a Run Counter of ten, allowing ten iterations of the operation of this particular control chain to be traced completely to the listing output device before the chain would revert back to the normal mode of operation; for the remainder of the period of time with no further output being logged.

The above phases and sub-phases of control chain checkout certainly do not represent all of the possibilities that could be invoked in the checking of chains in a complex control situation, however, they are most typical of the types of utilization for the package in question.

6. Trace Data Collection and Printout

As mentioned previously, the PROGEN-70 control chain interpreter has been modified extensively to include the Trace and Simulation features indicated in this package. Even though the process timing is quite slow in relation to the interpretive speed of execution of the computer, it would place too much of a burden on the computing system to actually attempt to print trace information using a listing output device on a same task priority level as the actual execution of the control chain. Therefore, an interface has been established between the actual run-time control chain interpreter and a low priority FORTRAN program, which actually does the printing of the trace information.

The heart of the interface is a circular queue containing trace control words. This queue can be of any length, nominally 256 words. The queue is loaded from the control chain interpreter via subroutine call which concentrates the trace control data into packed trace control words and stores these control words circularly in the queue. A periodic program checks the input in the queue, and when the pointer has shifted, a bid is placed for the FORTRAN task; which in turn enters the queue, extracts the trace control words in order, and reformats them into a format suitable for output to the selected logging device.

Actually, there are two levels of message buffering utilized in this system to prevent any trace data overflow. Once the FORTRAN program has reformatted the messages suitable for output to the logging device, the disc message writer is utilized to store the output messages on disc, in the event the logging device is busy typing another message. This message writer disc queue is extremely large, therefore, it is quite unlikely that trace messages will be lost during actual simulation conditions. Examples of the trace printout of each of the algorithms in question are included in Appendix D.

E. Added Algorithms

1. Use of "Simulate Only" Blocks

To facilitate and enhance the use of simulation techniques mentioned previously, a new set of algorithms has been created. These algorithms are identical to the algorithms previously created with the exception that they are labeled Simulate-Only algorithms and their existence in a control chain represents a simulate-only block which is executed only when the control chain interpreter is in a simulate mode of execution on this given control chain.

A specific bit in the block header is utilized to indicate this simulate-only mode, and this bit is subsequently checked upon block entry by the control chain interpreter. The use of the simulate-only block proves to be very helpful during the Phase One of control chain checkout, which is the individual checkout phase. During this phase there is no support software of any magnitude available for the use of the control engineer, so all of the simulation power must be built into the simulation package he is using. Therefore, in the testing of a given control chain using Phase One procedures, the testing is out of context in relation to the other chains. At the entry of the control chain being tested, it may be very desirous to create a simulate-only initialization block which allows certain control parameters to be initialized to have certain specific values. In the normal mode of operation these parameters would have been initialized by previous chains. However, in this single chain checkout mode of operation, this is not possible, so a simulate-only block may be utilized to provide the various initial values for these parameters.

The first of two of the most popular simulate-only blocks would be that of the Set-Reset block which allows the control engineer to establish the state of the logical variables which are inputs to the control chain. The second useful simulate-only block would be Data Initialize, which would allow the control engineer to initialize certain areas of core to have certain starting values.

The simulate-only blocks could actually be left in the chain structure for a fairly long period of time, for instance until the control chain had been checked in the on-line environment and everything was working optimally. At that time, using the Modify function of the debugging package, the simulate-only block could be removed at the convenience of the control engineer.

2. Interpreter Modifications

In order to implement the simulate-only block feature, the PROGEN-70 control chain interpreter was further modified to place a check for the given bit in the block header. If two conditions exist, the simulate-only block will be executed by the interpreter. These conditions are: a. that the flag bit in the header of a given block is set to indicate simulate-only, and b. that the control chain being currently interpreted is a control chain that has been chosen for simulation by the Chain Simulate function of the debugging package. If both of these conditions are met, the block in question will be executed as a normal control algorithm. If either one of the conditions is not met, the block will be skipped over by the control chain interpreter and no execution of the algorithm will take place. Each algorithm handler in the control chain interpreter is modified to add this by-pass feature.

V. QUANTITATIVE RESULTS

A. Modification of Existing Program

This section demonstrates the ease by which an existing PROGEN-70 control chain may be modified, using the modification and dump features of the debugging package. Observe that the chain shown in FIGS. 5A and 5F section is a chain containing seven control algorithms. Two of the control algorithms are trivial in that one is the Chain Header algorithm and the end algorithm is the Exit algorithm. So, there are really five active algorithms in the chain. Notice that the complete listing of the example control chain was created by using the Chain Dump feature of the debugging package. Also notice that by using the extended feature of the Chain Dump function one is able to perform a Chain Acquire and a Chain Dump operation concurrently with only one entry. Following the Chain Dump operation, we shall demonstrate in the following order:

1. Modification by Replacement;
2. Modification by Insertion;
3. Modification by Deletion.

In FIGS. 5A-5F, 6A-6C, and 7A-7E, a typical interactive terminal printout is illustrated. Items entered by the operator are underlined. All other entries represent computer response to operator input.

FIGS. 5A and 5B illustrate modification by replacement. These figures demonstrate the replacement of the original block 20 with a new block 20, still retaining the same number of algorithms as in the original chain, the only difference being that now block 20 is an algorithm different from the original block 20. Modification insertion is illustrated in FIGS. 5C and 5D, where a new control algorithm is created and subsequently inserted in a position between block 20 and block 30. The new block, block 25 extends the length of the control chain so that storage back into the space originally reserved for this chain would be impossible. Therefore, the storage originally reserved for this control chain, once we activate it, is released and new storage is acquired. Modification by deletion is illustrated in FIGS. 5E and 5F. In this example, block 20 is completely deleted from the control chain and in this way the size of the chain is shortened. Again, note the storage allocation procedures utilized by this package.

These three steps represent the normal modes of operation for the modification function. In these figures, one may also see the utilization of the Chain Acquire and the Chain Activate functions and their subsequent allocation of core storage.

B. Creation of New Program

FIGS. 6A, 6B, and 6C illustrate the creation of a new PROGEN-70 control algorithm. The creation of a new control algorithm is initiated by using the Chain Acquire function to acquire a dummy chain, consisting only of a Chain Header Module and a Chain Exit Module. This is the null control chain which performs no meaningful action. Once the dummy chain is acquired and moved into the working area, the Chain Modify function is used interactively to enter the subsequent intervening blocks. Notice block 10 is entered first, then block 2o, then block 30, then block 40, and then block 50. Now there is only one correction necessary to make this a newly operating chain. Using a separate Chain Modify, the Chain Header is modified to insert a new sublevel number, so that the chain will obtain a separate identity from the others. Notice also that as the chain is modified, algorithm by algorithm, the algorithms containing relative addressing are updated to point to the correct target algorithm, even though the referenced algorithm may have moved in relative location with respect to the beginning of the chain. This is an automatic feature of the Chain Insert function, which is part of the Chain Modify processor.

C. Simulated Execution with Trace

In the following simulated execution example (See FIGS. 7A, 7B, 7C, 7D, and 7E), a chain is executed which simply toggles a light on and off at a repetitive rate. Observe that upon activating the Chain Simulate function and immediately requesting a bid for this chain (see example in FIG. 7A), a trace printout is provided (FIG. 7C), which very accurately describes the time of occurrence of each event and the action taken as a result of that event. Also note that this example has been run a number of times. A second example (FIG. 7B at top) is used to demonstrate the operation of the Time Multiplier, which expands time, as seen by the millisecond printout on the trace (FIG. 7D). The last example in this area FIG. 7B, middle demonstrates the use of the Run Counter, at which time the tracing (FIG. 7E) continues for three iterations of the execution of the chain in question, and then terminates, even though the chain continue to function. The last step is, of course, to terminate this operation using the Terminate inputs to the Chain Simulate function (see FIG. 7B at bottom).

VI. EVALUATION AND FUTURE WORK

A. Summary of Accomplishments

The most important features of the invention include: 1. the ability to make modifications in an existing control operation without the use of recompilation procedures which expend time and which effort, and are unnecessary utilizing this package; 2. the fact that the listing output from this package is identical or even somewhat enhanced from the original compile listing output (this aspect of self-documentation is considered among one of the most important benefits); 3. the conventional manner in which the user can communicate with this package, due in part to the interactive nature of the overall design of the package and also due to implementation of the disc symbol table procedures; and 4. the consideration of the ability to simulate a single control chain or a given number of control chains prior to the time that the actual hardware is available for testing. This last feature allows control engineers to meet software shipment schedules even though hardware schedules may slip, and further allows the customer to make rapid changes in his on-line control system with a high degree of assurance that these changes have been tested to a degree that will insure proper operation once brought into the on-line environment.

B. Extension to Other Fields

Just as the final representation of this package is an extension of the works of others in the field of on-line debugging techniques (See "DEBUG—An Extension of Current On-Line Debugging Techniques" by T. G. Evans and D. L. Darby in the May, 1965 issue of *Communications of the ACM*), this can certainly serve as a base for more adventurous debugging schemes, either in process control or in some other environment which lends itself to real-time applications of computing. One can envision an extension into the field of airline ticketing and route selection in which qualified personnel would be able to create new, more suitable, ticketing and routine algorithms, and then test the consequences of the utilization of these algorithms in a simulated environment prior to actual use. The simplicity of the data structure of PROGEN-70 certainly lends itself to this type of debugging approach, but this is not a necessary factor in order to create such a package. Certainly other high level languages, even though they would employ a more sophisticated data structure, could be successfully messaged to accept a debugging package similar to that which has been created for PROGEN-70.

C. Areas Requiring Future Work

The package as it is now constituted is limited in a number of ways to a use of only 16 control algorithms. Much of the table structure existing in Common would have to be modified fairly extensively to allow the insertion of algorithms beyond 16. This would take a relatively short period of time to accomplish, and would be a meaningful addition to the package.

It can also be noted that it would be desirable to expand the capability of Input-Output variable simulation to the extent that variables could be added and deleted singly without requiring the mass deletion as is now required. In other words, a function allowing deletion of simulation variables by name would be a desirable extension, and again an extension which would not require a great deal of effort.

Possibly the most significant extension to this package would be the creation of an interface with a CRT display and keyboard, so that the speed of interaction could be increased over the current IBM selectric. A great deal of thought has been given to this. Actually, current thinking indicates that a graphic picture or symbolic representation of the control chain in question could be displayed on a CRT in such a way that one could address the variables from the keyboard without having a hard copy present for perusal. Since interactive CRT systems are becoming an integral part of process control in the 70's, an extension of the debugging package to include a CRT interface would be a very logical step indeed.

VII. PROGRAM LISTINGS

A. Explanation of Program Listings

What follows are computer programs which may be used to implement the present invention. Some of these program listings are written in a modified version of the language FORTRAN IV, and some of the listings are written in the assembly language of the Westinghouse P2000 computer system.

The modified FORTRAN IV language used in writing some of the listing is substantially in compliance with the FORTRAN IV language standards approved by the United States of America Standards Institute (X3, 9-1966) on Mar. 7, 1966. The following are some of the more important ways in which the modified language differs from the approved language: A BIT declaration statement allows a 16-bit variable to be declared a bit variable. Each bit of such a variable may be addressed through the use of a subscript notation similar to that used in addressing the elements of conventional one or two dimensional arrays. An ORG statement permits the absolute origin of a program segment to be specified. The use of apostrophes as quotation marks in Hollerith data is permitted. Statement functions may reference array elements. Hexadecimal constants (preceded by X and contained in apostrophes) may be used in DATA statements. The colon is included as a special alphabetic character. The compiler contains a table of 32 predefined executive and library subroutine names. The logical operator EOR is added to the standard FORTRAN IV list of logical operators. DATA statements may include references to a full array by using the array name without subscripts. In-line assembly code is permitted if the assembly language statements are preceded by an S. Other variances which do not appear often enough to be worthy of mention are listed on page B-1 of technical publication TP034 of the Hagan/Computer Systems Division of Westinghouse Electric Corporation, Pittsburgh, Pa.

The assembly language program listings are coded in the standard symbolic assembler language which is used in the P2000 computer system. This language is described in the manuals TP045 and TP033, both of which are available from the Hagan/Computer Systems Division of Westinghouse Electric Corporation, Pittsburgh, Pa. The following paragraphs present a brief explanation of this assembly language.

The first (optional) element of each assembly language program statement is a unique decimal number for each statement in a given listing. In many cases, however, this first element is omitted.

The second (optional) element of each assembly language program statement is a name which is to be associated with the instruction or the data value that comprises the remaining portions of the same statement. Some of these names ultimately are associated with numerical addresses within the process control system, while others are temporary data storage locations used only by the assembler program. The latter names have been left in the listings to facilitate their readability and clarity.

The third (required) entry in each assembly language program statement is a three-letter command. The commands are of two types—machine instructions and assembler directives. A brief description of each command follows:

| | |
|---|---|
| | Machine Instructions |
| ADA | Add double length word to accumulator and to extended accumulator |
| ADD | Add to accumulator |
| AND | AND with accumulator (bit-by-bit) |
| CDR | Change designator register as follows: (These are the symbolic names which appear in some listings. Other listings use different names or else use the hexadecimal numbers indicated) |
| | SIL Set internal (service request) lockout ($4000_{16}$) |
| | RIL Release internal (service request) lockout ($0000_{16}$) |
| | SEL Set external interrupt lockout ($8000_{16}$) |
| | REL Release external interrupt lockout ($0000_{16}$) |
| | SAL Set all lockouts ($0000_{16}$) |
| | RAL Release all lockouts ($0000_{16}$) |
| | MOO Do not post index ($0000_{16}$) |
| | MII Post index on register C ($0003_{16}$) |
| CJP | Carry jump (used to cause jump when "1" is shifted out of the accumulator by an SHF instruction) |
| DCR | Decrement location (subtract one from value stored in location) |
| DIV | Divide accumulator |
| EOR | Exclusive OR with accumulator (bit-by-bit) |
| EST | Enter status (load registers) |
| INC | Increment location (add one to value stored in location) |
| IOA | Input to or output from accumulator |
| JMP | Unconditional jump |
| LDA | Load accumulator register A |
| LDB | Load base register B |
| LDC | Load base register C |
| LDE | Load extended accumulator register E |
| LDG | Load shift description register G as follows: (The names shown are used in some listings-other listings use equivalent names or else use the hexadecimal numbers indicated) |
| | SLA + X Single left arithmetic shift ($000X_{16}$) |
| | SLC + X Single left circular shift ($200X_{16}$) |
| | DLA + X Double left arithmetic shift ($800X_{16}$) |
| | DLC + X Double left circular shift ($A00X_{16}$) |
| | SRA + X Single right arithmetic shift ($400X_{16}$) |
| | SRC + X Single right circular shift ($600X_{16}$) |
| | DRA + X Double right arithmetic shift ($C00X_{16}$) |
| | DRC + X Double right circular shift ($E00X_{16}$) |
| | (Shifts of X bit positions are formed by adding the number X to the above symbolic codings) |
| MPY | Multiply accumulator |
| NJP | Negative jump (bit position 15 of last calculated value contains "1") |
| OJP | Overflow jump |
| PJP | Positive or zero jump (bit position 15 of last calculated value contains "0") |
| SDA | Subtract double length word from accumulator and extended accumulator |
| SHF | Shift as commanded by shift description register G |
| SST | Store registers and jump |
| STA | Store accumulator register A |
| STE | Store extended accumulator register E |
| STZ | Store zero in location indicated |
| SUB | Subtract from accumulator |
| ZJP | Zero jump (all bit positions of last calculated value contain "0") |
| | Assembler Directives |
| ABS | Declares that labels on subsequent statements are defined as absolute values and are not relocatable |
| ADL | Generates one word containing the designated expression address |
| DAT | Data values |
| DEF | List of symbols which may be referenced by other (separately assembled) programs |
| DLE | Delete the indicated number of the statements which follow |
| EJE | Print the next line of program listing at the top of the next page of printout |
| END | Last statement in listing |
| EQU | Equates a symbolic name to a specified value |
| FMT | Input/output format specification |
| LOC | Advance the execution location counter to the value specified |
| LPL | Assemble accumulated literals at this location |
| ORG | Advance the execution location counter "$" to the value specified |
| REF | Symbols defined in another (separately assembled) program |
| REL | Relocatable |
| RPT | Repeat the following statement the number of times specified |
| RES | Reserve the specified number of locations and advance the execution location counter accordingly |
| SKP | Stop assembly and resume at statement whose label corresponds to the Nth item in a list, where N is the first item in the list |
| TTL | Print the specified title at the top of each page of the program listing |

The fourth (optional) entry in an assembly language program statement is an argument or an address that goes with the command in the same program statement. If this fourth entry is a number, and if it contains no quotation marks or other special symbols, it is a decimal number. A fourth entry that is surrounded by apostrophes and that is preceded by an X is a hexadecimal number. A name in column 4 designates either an address within the computer system or a predefined value within the assembly program. The fourth entry may be a literal. An equal sign precedes a literal fourth entry. During assembly, the value or address which corresponds to a literal entry is computed and is stored within the direct address range of the command which refers to the literal, and a pointer to this value or address is stored with the common. Indirect addressing in the fourth entry is indicated by an asterisk preceding the entry. For example, "#B" means "the contents of the location whose address is stored in index register B." Commas separate the elements of a fourth entry which jointly participate in multiple level address calculations. For example, "1, B" is a reference to the location whose address is the contents of index register B plus 1.

Hexadecimal constants which are used frequently in assembly language programs are stored in a low core storage area where they may be addressed directly. Usually (not always) such constants are referred to by the names listed below. Each of these names is associated with a low core storage area where the corresponding hexadecimal number is stored.

| Name | Hexadecimal Constant |
|---|---|
| K:XFFFF | FFFF |
| K:HI | FF00 |
| K:LO | 00FF |
| K:1ST | F000 |
| K:2ND | 0F00 |
| K:3RD | 00F0 |
| K:4TH | 000F |
| K:X6008 | 6008 |
| K:X7FFF | 7FFF |
| K:X7F | 007F |
| K:X3F | 003F |
| K:X6 | 0006 |
| K:X3 | 0003 |
| K:X5 | 0005 |
| K:X7 | 0007 |
| K:X9 | 0009 |
| K:X1 | 0001 |
| K:X2 | 0002 |
| K:X4 | 0004 |
| K:X8 | 0008 |
| K:X10 | 0010 |
| K:X20 | 0020 |
| K:X40 | 0040 |
| K:X80 | 0080 |
| K:X100 | 0100 |
| K:X200 | 0200 |
| K:X400 | 0400 |
| K:X800 | 0800 |
| K:X1000 | 1000 |
| K:X2000 | 2000 |
| K:X4000 | 4000 |
| K:X8000 | 8000 |

B. Subroutine Name List

For the convenience of those who wish to learn the details of the invention as revealed by the computer programs which follow, the following alphabetical list of subroutine and program names has been compiled. Number references are references to the numbered subroutines and programs which follow. In the case of conventional subroutines and programs for which no listing is provided, a brief explanation of the subroutine or program is presented.

| | |
|---|---|
| A:WDISC | Subroutine to call in data from disk storage. |
| ABLE | Subroutine in subtask processor of operating system for placing a subtask into active service. |
| ARF: | Argument transfer to write data formatter in Executive. |
| B:CHK | Program #22 |
| B:RES | Program #22 |
| B:RESR | Program #22 |
| B:SEL | Bit select call. Selects first bit set in a row of contiguous bits, and returns number of first bit found. |
| B:SET | Program #22 |

-continued

| | |
|---|---|
| B:SETR | Program #22 |
| B:SJM | |
| C:REL | Release dynamic storage-arguments are first buffer number and total number of buffers. |
| C:RES | Reserve dynamic storage-argument is number of buffers you wish. Return argument is number of first buffer. |
| CHNACQ | Subroutine #4 |
| CHNACT | Subroutine #5 |
| CHNDMP | Subroutine #3 |
| CHNMOD | Subroutine #2 |
| CHNPCH | Subroutine #6 |
| CHNSIM | Subroutine #7 |
| CORACQ | Subroutine #18 |
| CORRET | Subroutine #19 |
| DIRCTR | Point in control chain processor program #21 to which algorithm subroutines transfer program control after they have run to completion. |
| DRCTR | Subroutine #21 |
| DUMMY | Routine which types message "routine currently not available". |
| ERRMSG | Subroutine #17 |
| FCMAIN | Subroutine #1 |
| GOT: | Processes computed "GO TO" statements in Fortran. |
| I:INTD | Subroutine #21 |
| I:INTTD | Subroutine #21 |
| I:START | Subroutine #21 |
| INSERT | Subroutine #12 |
| INTERP | A non-operative subroutine that is not relevant to the invention. |
| LINK | Subroutine in subtask processor of operating system for establishing a subtask in the system. |
| LOADBIT | Routing number 22. |
| LOGDMP | Subroutine #11 |
| LOGMOD | Subroutine #10 |
| M:DLO | Data link call from machine to machine. |
| M:RDISC | Subroutine to transfer data to disk storage. |
| M:SP | Suspend program-argument is unsuspend code. |
| M:TD | Executive task time delay subroutine. Argument is length of time delay. |
| M:UN | Unsuspend program on specified code. |
| M:WI | Monitor write initiate call-establishes buffer. M:WR performs the write. |
| M:WR | Monitor write data call. |
| NDF: | Release write data call buffer in executive. |
| PRINT | Displays information on C.R.T. or data logger. |
| PSLGHT | Mill tracking light updating program-not relevant to the invention. |
| RDCHR | Subroutine #16 |
| RDSYMB | Subroutine #15 |
| READ | Standard FORTRAN IV read data subroutine. |
| RESR | Subroutine in operating system for resetting or clearing a logical variable. |
| SAT: | Subroutine argument fetch without software lockout. |
| SBID | Subroutine in subtask processor of operating system with which bids for subtask execution may be placed. |
| SBIDR | Subroutine in subtask processor of operating system with which bids for subtask execution may be placed. |
| SBT: | Subroutine argument fetch with software lockout. |
| SETR | Subroutine in operating system for setting a logical variable. |
| SLOC | Subroutine in operating system for locating the address of a memory location containing a given subtask. |
| SRDT | Subtask processor routine for reading a subtask into core and for immediately executing the subtask. |
| SRLB | Subtask processor buffer release routine. |

-continued

| | |
|---|---|
| SRMV | Subroutine in subtask processor of operating system for removing a subtask from the system. |
| SUBR | Dummy name for subroutine whose actual address is loaded into the location SUBR dynamically. |
| SYMDMP | Subroutine #9 |
| SYMMOD | Subroutine #8 |
| SYMPAK | Subroutine #14 |
| TGCN | Subroutine in logic initiator for establishing execution triggering linkages between logical variables and subtasks. |
| TGDL | Subroutine in logic initiator for removing linkages between a specified subtask and all logical variables. |
| TGRT | Subroutine #3A |
| TRGRET | Subroutine #3A |
| TRAC | Set trace bit for specified subtask in subtask processor tables. |
| TSA: | Transfer single argument to subroutine in accumulator register. |
| VARLEN | Subroutine #13 |
| WBINRD | Subroutine #20 |
| WRF: | Formatted write data call to executive. |
| WRITE | Standard FORTRAN IV write data subroutine. |

C. MACHINE #2 PROGRAMS 1.FCMAIN-EDITING PACKAGE MAIN PROCESSOR

```
CJOB AØ776.Ø9 D. F. FURGERSON       USINOR 5 STAND COLD MILL
C
C     DATE:  6/12/72                 REVISION LEVEL:  13
C
C                MAIN PROCESSOR FOR 'FIELD CHANGE' COMMANDS
C
C           THIS PROCESSOR WILL INPUT COMMANDS FROM THE PROGRAMMER'S
C     CONSOLE AND IF THEY ARE VALID BRANCH TO THE PROPER HANDLER.
C
C           COMMAND FORMAT IS:
C
C           IXX,ARG1,ARG2,ARG3,ARG4
C
C     WHERE:   XX = 2 ALPHABETIC CHARACTERS DESIGNATING COMMAND TYPE
C                    (SEE USER'S MANUAL FOR TYPES)
C          ARG(N) = EITHER  YYYYYY  OR   YYYYYY-YYYYYY
C
C          YYYYYY =  ANY 6-CHARACTER ALPHANUMERIC SYMBOL THAT IS DEFINED
C                    IN THE MACHINE AT TIME OF USE, OR ANY 4 CHARACTER
C                    HEX NUMBER WITHIN INTERNAL LIMITS, OR ANY 3 DIGIT
C                    DECIMAL NUMBER
C
C      SPECIAL CHARACTERS:
C
C               * = CANCEL ARGUMENT INPUT - START OVER
C               / = CANCEL CURRENT COMMAND FUNCTION - START OVER
C
C       **  ERROR   DIAGNOSTICS  **
C
C 900  ERR  100   INCORRECT COMMAND INITIATION
C 901  ERR  101   COMMAND NOT RECOGNIZED AS VALID
C 902  ERR  102   ARGUMENT NOT RECOGNIZED AS VALID
C 903  ERR  103   INCORRECT USE OF DELIMITER OR TERMINATION
C
C
      SUBROUTINE FCMAIN
C     SUBROUTINES CALLED:  RDCHR,INTERP,ERRMSG,RDSYMB.SUBR
C                          EXIT,WRF:,NDF:,GOT:
C
C
C     *******************************************************************
C
C
      COMMON /BUFKOM/BLKWRK(35),INBUF(8),NUMTRG,TRIGBF(7).CHNWRK(35Ø)
      COMMON /FCKOM/PCIN,PCOUT,LODEV,SIDEV,BODEV,BIDEV,
```

```
      X       PSTART,PLAST,DSTART,DLAST,CSTART,CLAST.
      X        CHNLEN,BLKLEN,BLKNUM,TYPNUM,KEY,ARGPTR,ARG,TEMP,
      X       HEXTBL(16),COMTBL(36),SUBADL(36),SPCTBL(12),
      X       ARGTBL(4,2),ALGTBL(4,16),ALGSUB(16),ALGLEN(16),
      X       VOCTBL(3,20),VOCKEY(36),B''TPTR
C
C
       INTEGER PCIN,PCOUT,LODEV,SIDEV,BODEV,BIDEV,
      X        PSTART,PLAST,DSTART,DLAST,CSTART,CLAST,
      X        CHNLEN,BLKLEN,BLKNUM,TYPNUM,ARGPTR,ARG,TEMP,
      X        HEXTBL,COMTBL,SUBADL,SPCTBL,
      X        ARGTBL,ALGTBL,ALGSUB,ALGLEN,
      X        BLKWRK,CHNWRK,TRIGBF,
      X        VOCTBL,VOCKEY,BYTPTR
C
C
C      ****                 END  COMMON  DECK          ****
C
C      *****************************************************************
C
C
       INTEGER COMAND,KEY
       INTEGER SUBR,STATE,DIAG
       INTEGER SPACE
       INTEGER ECKS
       INTEGER SSTSTA
       INTEGER APOS
C
C
C
       EQUIVALENCE (SPCTBL(11),SPACE)
C
C
       DATA ECKS/$00D8/
       DATA     SSTSTA/$AAFF/
       DATA  APOS/$0027/
       DATA  IFCMP/$2064/
       DATA IFCK../$B008/
C
C
C      INITIALIZE CERTAIN BUFFERS AND LOCATIONS
C
C      IF ROUTINE NOT RUN ON TASK LVL ZERO, TREAT IT AS A SUBLEVEL
S      LDA   192
S      ZJP   $+3
```

```
      CALL SKED (IPCRUN)
C
C     OUTPUT LEADING CARRIAGE RETURN AND SPACE
C
  100 WRITE (PCOUT,101)
  101 FORMAT ('  $IDENTER CONTROL COMMAND$9C'/' = ')
C
C     SET EXPECTED VALUE INDICATOR TO ZERO
C
  110 STATE = 0
      BYTPTR = 0
C
C     INITIALIZE FOR NEW COMMAND
C
  120 DO 130 I=1,4
C
      ARGTBL(I,1) = 0
      ARGTBL(I,2) = 0
  130 CONTINUE
      ARGPTR = 1
C
C     INITIALIZE FOR NEXT ARGUMENT
C
  140 DO 160  I=1,8
      INBUF(I) = SPACE
  160 CONTINUE
      DIAG = 0
      II = 0
C
C
C     REQUEST INPUT FROM PROGRAMMER'S CONSOLE
C
C     READ ONE ALPHANUMERIC CHARACTER
C
  200 CALL RDCHR (INCHR,I)
      CALL INTERP
C
      IF (I)  902,218,215
C
C                  ;   ,   .   =   (   )   *   -   /   + SPACE C.R.
  215 GO TO  (230,240,200,200,200,200,140,400,999,100,200,250), I
C
C     INPUT IS NOT A SPECIAL CHARACTER
C
  218 IF(STATE.EQ.0) GO TO  900
  220 DO 224  J=1,7
C
C     MOVE INBUF ENTRIES UP ONE LOCATION
```

```
C
        INBUF(J) = INBUF(J+1)
  224   CONTINUE
C
C       ADD NEW INBUF ENTRY AT BOTTOM
C
        INBUF(8) = INCHR
C
C       GO READ ANOTHER CHARACTER
C
        GO TO 200
C
C
C       INPUT IS INITATOR  (1)
C
  230   STATE = 1
        GO TO 120
C
C       INPUT IS COMMA DELIMITER
C
C                       ERR,COM,ARG
  240   IF (STATE-1)903,300,400
C
C
C       LAST CHARACTER HAS BEEN INPUT
C
  250   CONTINUE
        BYTPTR = 0
        I = 2
        II = 1
        GO TO 240
C
C
C       DECODE TWO CHARACTER COMMAND
C
  300   COMAND = INBUF(7)*256+INBUF(8)
C
C       SEARCH COMMAND TABLE FOR MATCHUP
C
  305   DO 310 I=1,32
        IF (COMTBL(I)-COMAND)  310,320,310
  310   CONTINUE
        GO TO 901
C
C
C       PICK UP CORRECT SUBROUTINE ADDRESS FROM ADDRESS TABLE
```

```
 320  SUBR = SUBADL(I)
C
      STATE = 2
      IF(II.EQ.1) GO TO 500
      GO TO 140
C
C
C     IF NOT IN STATE 2. ABORT AND ALARM
C
 400  IF (STATE-2) 903,402,903
 402  K=1
C
C     IF INPUT WAS NOT A COMMA. STORE IN FIRST PART OF ARG TABLE
C     IF INPUT WAS A COMMA. STORE IN SECOND PART OF ARG TABLE
C
      IF (I.EQ.2) K=K+1
C
C     INITIALIZE FOR FOLLOWING CHECKS
C
C
      ARG = 0
      IF (INBUF(1).NE.SPACE) GO TO  450
      N = 10
C     CHECK FOR HEX INPUT OF THE FORM:    X'HHHH'     H = HEX NUMBER
      IN3 = INBUF(3)
      IF (IN3.NE.APOS) GO TO 403
      N = 16
      GO TO 405
 403  CONTINUE
      IF (IN3.NE.SPACE)  GO TO 450
C
 405  CONTINUE
      LL = 8-N/16
      DO 438 L=4,LL
C
C     CHECK INPUT CHARACTER FOR A SPACE
C
 410  IF (INBUF(L).EQ.SPACE)  GO TO  438
C
C     NUMERIC DECODE ROUTINE
C
 420  DO 428  M=1,N
C
C     SEE IF CHARACTER IS VALID NUMBERIC INPUT
C
```

```
 425  IF (INBUF(L)-HEXTBL(M)) 428,430,428
 428  CONTINUE
C
C     CHARACTER IS NON-NUMERIC, GO CHECK SYMBOL TABLE
C
      GO TO 450
C
C     NEW INPUT IS VALID - ADD NUMBER JUST FOUND TO ACCUMULATED ARGUMENT
C
 430  ARG = ARG*N+M-1
 438  CONTINUE
C
C     NUMERIC PROCESSING COMPLETE - GO TO ARGUMENT STORE
C
      CALL INTERP
      GO TO 480
C
C     ARGUMENT IS NON-NUMERIC - LEAVE ASCII CODE FOR ARGUMENT IN INBUF
C     FOR LATER PROCESSING BY THE INDIVIDUAL  HANDLERS
C
 450  CONTINUE
      ARG = 0
C
C
C
C     IF ARGUMENT IS FULL, ABORT THIS LOAD AND ALARM
C
 480  IF (ARGPTR.GT.4) GO TO 901
C
C     LOAD NUMERIC ARGUMENT IN PROPER SLOT IN ARGUMENT TABLE
C
 482  ARGTBL(ARGPTR,K) = ARG
C
C     IF DELIMITER WAS A COMMA, INCREMENT ARGUMENT POINTER
C
      IF (I.EQ.2) ARGPTR = ARGPTR+1
C
C     GO TO INPUT A NEW ARGUMENT
C
      IF(II.EQ.1) GO TO 500
      GO TO 140
C
C
C     INPUT IS COMPLETE. BRANCH TO PROPER HANDLER
C
```

```
C    500  IF (STATE.NE.2) GO TO 903
C
          CALL INTERP
C
C         BRANCH TO SUBROUTINE
C
C         IF ROUTINE NOT RUN ON TASK LVL ZERO, TREAT IT AS A SUBLEVEL
S         LDA   192
S         ZJP   )505
          CALL SRDT (SUBR)
          GO TO 999
C
C
C         THIS CODE DYNAMICALLY SETS UP CORRECT CALL TO SUBR'
     505  CONTINUE
S         LDA  $+6
S         AND   SSTSTA
S         INC   5
S         STA   $+2
S         LDA   SUBR
S         STA   SUBR
C                                 NEXT INSTR MUST BE 'SST SUBR'
C
C
     510  CALL SUBR
C
C         GO ACCEPT ANOTHER COMMAND
C
          GO TO 100
C
C
C         PROCESS ERROR DIAGNOSTICS
C
C         ERR 3  -    INCORRECT USE OF DELIMITER OR TERMINATION
     903  DIAG = DIAG+1
C
C         ERR 2  -    ARGUMENT NOT RECOGNIZED AS VALID
     902  DIAG = DIAG+1
C
C         ERR 1  -    COMMAND NOT RECOGNIZED AS VALID
     901  DIAG = DIAG+1
C
C         ERR 0  -    INCORRECT COMMAND INITIALIZATION
     900  CONTINUE
C
```

```
C       GO TO ERROR SUBROUTINE
C
 910    DIAG = DIAG+100
 920    CALL ERRMSG (DIAG)
C
        GO TO 999
C
C       EXIT FROM ROUTINE
C
 999    CONTINUE
S       LDA    192
S       ZJP    )9999
        CALL SRLH (IFCKOM)
        IF (I.EQ.9)  GO TO 9998
        CALL SBID (IFCMP)
 9998   CONTINUE
S       LDB    1,B
S       JMP    *4,B
C
 9999   CONTINUE
        CALL EXIT
        GO TO 100
 9997   CONTINUE
        RETURN
        END
```

2. CHNMOD- CHAIN MODIFY SUBROUTINE

```
CJOB A3776.00 D. F. FURGERSON          USINOR 5 STAND COLD MILL
C
C       DATE:  6/12/72                 REVISION LEVEL:  13
C
C
C       CHAIN MODIFY HANDLER
C
C       ICM,PAR1          PAR1 = BLK# OR 1STBLK-LSTBLK
C
C
C
        SUBROUTINE CHNMOD
C
C       SUBROUTINES CALLED:  RDCHR,INTERP,ERRMSG,INSERT,SUBR,
C                            GOT:,WRF:,NDF:
C
C
C       ************************************************************
C
```

```
      COMMON /BLKKOM/BLKBUF(3)
      COMMON /BUFKOM/BLKWRK(35),INBUF(8),NUMTRG,TRIGBF(7),CHNWRK(350)
      COMMON /FCKOM/PCIN,PCOUT,LODEV,SIDEV,BODEV,BIDEV,
     X        PSTART,PLAST,DSTART,DLAST,CSTART,CLAST,
     X         CHNLEN,BLKLEN,BLKNUM,TYPNUM,KEY,ARGPTR,ARG,TEMP,
     X        HEXTBL(16),COMTBL(36),SUBADL(36),SPCTBL(12),
     X        ARGTBL(4,2),ALGTBL(4,16),ALGSUB(16),ALGLEN(16),
     X        VOCTBL(3,20),VOCKEY(36),BYTPTR
C
      INTEGER PCIN,PCOUT,LODEV,SIDEV,BODEV,BIDEV,
     X         PSTART,PLAST,DSTART,DLAST,CSTART,CLAST,
     X         CHNLEN,BLKLEN,BLKNUM,TYPNUM,ARGPTR,ARG,TEMP,
     X         HEXTBL,COMTBL,SUBADL,SPCTBL,
     X         ARGTBL,ALGTBL,ALGSUB,ALGLEN,
     X         BLKWRK,CHNWRK,TRIGBF,
     X         VOCTBL,VOCKEY,BYTPTR
      INTEGER BLKBUF
      INTEGER SUBIAS
C
C
C     ****                 END  COMMON  DECK          ****
C
C     ******************************************************************
C
C
      DIMENSION ALGOIN(8)
C
      INTEGER COUNT,ALGOIN,SPACES,SPACE
      INTEGER SUBR,STATE,DIAG
      INTEGER SSTSTA
C
      EQUIVALENCE (SPCTBL(11),SPACE)
C
C
      DATA  SPACES/$A0A0/
      DATA      SSTSTA/$AAFF/
      DATA SUBIAS/1/
C
C     INITIALIZATION
C
   20 BLKNUM = 0
      TYPNUM = 0
      SUBR   = 0
      COUNT  = 0
      STATE  = 0
```

```
        DO 22 I=1,3
        BLKBUF(I) = 0
   22   CONTINUE
        I = 1
C
   30   WRITE (PCOUT,31)
     31 FORMAT (' $1DENTER BLOCK # AND ALGORITHM NAME$9C'/' = ')
C
C       READ IN ONE CHARACTER(ASCII CODE)
C
  100   CALL RDCHR(INCHR,I)
        IF (I.EQ.9) GO TO 999
        IF (I.EQ. 11) GO TO  200
        IF(I.NE.0) GO TO 100
C
C
C       INPUT WAS NOT SPECIAL CHR, IS IT A DECIMAL NUMBER ?
C
  120   DO 128 J = 1,10
        IF(INCHR.EQ.HEXTBL(J)) GO TO 130
  128   CONTINUE
        GO TO 200
C
C       CHR IS DECIMAL NUMBER, ADD TO BLOCK NUMBER
C
  130   BLKNUM = BLKNUM*10+J-1
        COUNT = COUNT + 1
C
C       MAX DECIMAL # IS 3 DIGITS (0-999)
C
        IF(COUNT.EQ.3) GO TO 200
        GO TO 100
C
C
C       BLOCK # INPUT IS COMPLETE, INPUT ALGORITHM NAME
C
  200   STATE = 1
C
   10   DO 18 I = 1,4
        ALGOIN(I) = SPACES
   18   CONTINUE
        K = 1
C
C       READ IN EIGHT CHARACTERS OF ALGORITHM NAME
```

```
C
       DO 255 J=1,4
C
C      READ IN ONE CHARACTER OF ALGORITHM NAME
C
  220  CALL RDCHR(INCHR,I)
C
       IF(I.EQ.0) GO TO 224
C
C      CHECK FOR BACKSPACE CHARACTER (*,CODE 7)    (SEE FLD CHG COMMON)
C      CHECK FOR CANCEL CHARACTER  (/,CODE 9)      (SEE FLD CHG COMMON)
C
C
C               1   2   3   4   5   6   7   8   9   10  11  12
C               1   ,   .   =   (   )   *   -   /   + SPACE C.R.
       GO TO  (20,269,269,269,269,269,200,269,999,269,220,260), I
C
C
C      SHIFT AND ENTER NEW ASCII CHARACTER
C
  224  ALGOIN(J) = ALGOIN(J)*256+INCHR
C
C      CHECK INPUT CHR POSITION POINTER(K), 1 = LOBYTE, 2=HIBYTE
C
       IF(K.EQ.2) GO TO 252
       K = 2
       GO TO 220
C
C
C
C
  252  K = 1
C
  255  CONTINUE
C
C
C      8 ALGORITHM CHARACTERS ARE INPUT, SEARCH ALGTBL FOR MATCHUP
C
  260  IF (K.EQ.2) ALGOIN(J) = ALGOIN(J)*256+SPACE
  261  IF (BLKNUM.GT.255)  GO TO  267
C
       DO 268 I=1,16
       DO 264 J=1,4
       IF(ALGTBL(J,I).NE.ALGOIN(J)) GO TO 268
  264  CONTINUE
```

```
         GO TO 270
C
   268   CONTINUE
         DIAG = 201
         GO TO  900
C
   267   DIAG = 200
         GO TO  900
C
C
C        NO ALGORITHM MATCUP, GO TO ERROR ROUTINE
C
   269   DIAG = 202
         GO TO 900
C
C        SUCCESSFUL ALGORITHM MATCHUP, BRANCH TO ALGO SUBROUTINE
C
   270   STATE = 2
C
C
C        BRANCH TO PROPER ALGORITHM SUBROUTINE
   280   TYPNUM = I-1
C        CREATE SIMULATE-ONLY BLOCK IF 2ND ARGUMENT IS NON-ZERO
         IF (ARGTBL(2,2).NE.0)  TYPNUM = TYPNUM+16
C
C        FETCH SUBROUTINE ADDRESS FROM ALGSUM TABLE IN COMMON
C
         SUBR = ALGSUB(I)+SUBIAS
C
C        SET KEY TO 1 FOR ALGORITHM MODIFY
C
         KEY = 1
C
C
         CALL INTERP
C
C        IF ROUTINE NOT RUN ON TASK LVL ZERO, TREAT IT AS A SUBLEVEL
S        LDA    192
S        ZJP    )290
         CALL SRDT (SUBR)
         GO TO 300
C
C        THIS CODE DYNAMICALLY SETS UP CORRECT CALL TO SUBR'
C
   290   CONTINUE
```

```
S      LDA   $+6
S      AND    SSTSTA
S      INC    5
S      STA    $+2
S      LDA    SUBR
S      STA    SUBR
C                                  NEXT INSTR MUST BE 'SST SUBR'
C
C
       CALL SUBR
C
C
C
C      NEW ALGORITHM HAS BEEN CREATED. IS IT VALID ?
C
  300  IF (KEY.EQ.0) GO TO 20
C
C
C
C      VALID ALGORITHM WAS CREATED. ADD IT TO CHAIN IN WORKING AREA
C
       CALL INTERP
  310  CALL INSERT
C
       IF (ARG.NE.0)  GO TO 999
C
C
  350  CONTINUE
       IF (ARGTBL(1,1).EQ.ARGTBL(1,2)) GO TO 20
  330  WRITE (PCOUT,340)
   340 FORMAT ('   MODIFY COMPLETE ')
       GO TO 999
C
C      ERROR DIAGNOSTIC OUTPUT
C
  900  CALL ERRMSG (DIAG)
C
       GO TO 20
C
  999  CONTINUE
C      IF NOT RUN AS TASK LVL ZERO, GO TO SUBLEVEL EXIT
S      LDA    192
S      ZJP    $+3
S      LDB    1,B
S      JMP    *4,B
C
       RETURN
       END
```

3. CHNDMP - CHAIN DUMP SUBROUTINE

```
CJOB A0776.09 D. F. FURGERSON       USINOR 5 STAND COLD MILL
C
C     DATE:  6/12/72                REVISION LEVEL:  13
C
C     CHAIN DUMP HANDLER
C
C
C     ICD,PAR1,PAR2,PAR3      PAR1 = BLOCK # WITHIN CHAIN TO BE DUMPED
C                                    (ENTIRE CHAIN IF OMITTED)
C                                    (IF LOC1-LOC2, DUMP FROM LOC1 TO
C                                     LOC2 INCLUSIVELY)
C                             PAR2 = NAME OF CHAIN OR SUBLEVEL # (HEX)
C                                     (WORKING AREA IF OMITTED)
C                             PAR3 = LISTING OUTPUT DEVICE NUMBER
C                                   (IF CHANGE IS DESIRED)
C
C         THIS PROCESSOR SEARCHES THE CHAIN INDICATED BY PAR2 AND
C     OUTPUTS A HARD COPY OF EACH MODULE ENCOUNTERED BETWEEN THE
C     BLOCK LIMITS SPECIFIED BY PAR1.  PAR3 SELECTS THE LO DEVICE.
C     IF EXTENDED DUMP IS DESIRED, ENTER A LO DEVICE # THAT IS
C     X'10' (16) GREATER THAN THE NORMAL IOCS DEVICE #.
C
C
      SUBROUTINE CHNDMP
C
C     SUBROUTINE CALLED:  CHNACQ,TRGRET,INTERP,ERRMSG,SUBR
C
C     ******************************************************************
C
      COMMON /BUFKOM/BLKWRK(35),INBUF(8),NUMTRG,TRIGBF(7),CHNWRK(350)
      COMMON /FCKOM/PCIN,PCOUT,LODEV,SIDEV,BODEV,BIDEV,
     X       PSTART,PLAST,DSTART,DLAST,CSTART,CLAST,
C
     X        CHNLEN,BLKLEN,BLKNUM,TYPNUM,KEY,ARGPTR,ARG,TEMP,
     X       HEXTBL(16),COMTBL(36),SUBADL(36),SPCTBL(12),
     X       ARGTBL(4,2),ALGTBL(4,16),ALGSUB(16),ALGLEN(16),
     X       VOCTBL(3,20),VOCKEY(36),BYTPTR
C
      INTEGER PCIN,PCOUT,LODEV,SIDEV,BODEV,BIDEV,
     X        PSTART,PLAST,DSTART,DLAST,CSTART,CLAST,
     X        CHNLEN,BLKLEN,BLKNUM,TYPNUM,ARGPTR,ARG,TEMP,
     X        HEXTBL,COMTBL,SUBADL,SPCTBL,
     X        ARGTBL,ALGTBL,ALGSUB,ALGLEN,
     X        BLKWRK,CHNWRK,TRIGBF,
     X        VOCTBL,VOCKEY,BYTPTR
```

```
C
C
C     ****                    END  COMMON  DECK          ****
C
C     ******************************************************************
C
C
      INTEGER BLOK,TYPE,SUBR
      INTEGER SCLD8,SCRS8
      INTEGER BIAS
      INTEGER SSTSTA
C
      DATA SCLD8,SCRS8/$A008,$6008/
      DATA  IFS/1/
      DATA  ICS/3/
      DATA      SSTSTA/$AAFF/
      DATA  ICNAQ/$207E/
      DATA  KX01FF/$01FF/
C
C
C
C     INITIALIZATION OF PARAMETERS
      BLKNUM = 0
      BLKLEN = 0
C
      TYPNUM = 0
      N = 0
      KEY = 2
C
      IF (ARGTBL(3,2).NE.0)  LODEV = ARGTBL(3,2)
      TEMP = 0
      IF (LODEV.LT.16)  GO TO  100
      TEMP = 1
      LODEV = LODEV-16
  100 CONTINUE
C
C
C
C
  110 IF (ARGTBL(2,2).EQ.0)  GO TO 120
C
C     IF CHAIN ADDRESS IS PASSED, CALL SUBR TO FETCH ACTIVE CHAIN
C
      I = ARGTBL(1,2)
```

```
         ARGTBL(1,2) = ARGTBL(2,2)
C        IF ROUTINE NOT RUN ON TASK LVL ZERO, TREAT IT AS A SUBLEVEL
S        LDA    192
S        ZJP    )115
         CALL SRDT (ICNAQ)
         GO TO 118
   115   CONTINUE
         CALL CHNACQ
   118   CONTINUE
         ARGTBL(1,2) = I
         IF (ARG.NE.0)  GO TO 299
C
   120   CONTINUE
         IF (ARGTBL(4,1).NE.0)  WRITE (LODEV,1900)
  1900   FORMAT ('1')
         WRITE (LODEV,1903)
  1903   FORMAT (' ')
C
C
C        COMPUTE EXACT LENGTH OF CHAIN TO BE DUMPED
C
         ICL = CHNWRK(IFS)
S        AND    KX01FF
S        STA    ICL
C
C
C        SEARCH FOR BLOCKS TO BE DUMPED
C
         I = ICS
         IF (ICS.GT.2)  GO TO 200
         BLOK = 0
         TYPE = 0
         GO TO 210
   200   CONTINUE
C
         J = CHNWRK(I)
C
C        SPLIT 8-8 FIELD TO GET BLOCK # AND TYPE #  (BLOK,TYPE)
C
S        STZ    4
S        LDG    SCLD8
S        SHF    4
S        LDG    SCRS8
S        SHF    5
```

```
S      STE   BLOK,B
S      STA   TYPE,B
S      SUB   162
S      ZJP   $+4
S      LDA   TYPE
S      AND   166
S      STA   TYPE
C
  210  K=TYPE+1
C
C      CHECK FOR REGION WE DESIRE TO DUMP  (2ND ARG)
C
       IF (ARGTBL(1,1).EQ.BLOK.OR.ARGTBL(1,2).EQ.0)  N=1
C
C
C
  220  BLKNUM = BLOK
       TYPNUM = TYPE
       IF (TYPE.EQ.255) K = 3
C
C      NORMAL BLOCK LENGTH DETERMINATION
C
       BLKLEN = ALGLEN(K)
C
C      CHECK FOR VARIABLE BLOCK LENGTH ALGORITHM
C
       IF (BLKLEN.GE.0)  GO TO 235
C
C      SPECIAL BLOCK LENGTH COMPUTATION FOR VARIABLE LENGTH BLOCKS
C
  230  CONTINUE
       CALL VARLEN (I,TYPE,BLKLEN)
C
  235  CONTINUE
       CALL INTERP
C
C      SET UP FOR CALL TO DUMP ROUTINE  (N=1)
       IF (BLKLEN.LT.35) GO TO 238
       CALL ERRMSG (300)
       GO TO 299
C
C      TRANSFER BLOCK TO BLOCK WORKING AREA (BLKWRK)
C
  238  CONTINUE
C
```

```
        IF (N.EQ.0)  GO TO  280
C
        DO 239 II=1,35
        JJ = II+I-1
        BLKWRK(II) = CHNWRK(JJ)
        IF (II.GT.BLKLEN)  BLKWRK(II) = 0
  239   CONTINUE
C
        CALL INTERP
C
C       FETCH SUBROUTINE ADDRESS FOR ALGORITHM FROM COMMON
  240   SUBR = ALGSUB(K)
C
C       SET KEY = 2 FOR ALGORITHM DUMP
        KEY = 2
C
C       BRANCH TO SUBROUTINE FOR DESIRED ALGORITHM
C
        ARG = I-ICS
C
C       IF ROUTINE NOT RUN ON TASK LVL ZERO, TREAT IT AS A SUBLEVEL
S       LDA   192
S       ZJP   )245
        CALL SRDT (SUBR)
        GO TO 248
C
C
C       THIS CODE DYNAMICALLY SETS UP CORRECT CALL TO SUBR'
C
  245   CONTINUE
S       LDA  $+6
S       AND   SSTSTA
S       INC   5
S       STA   $+2
S       LDA   SUBR
S       STA   SUBR
C                                 NEXT INSTR MUST BE 'SST SUBR'
C
C
        CALL SUBR
  248   CONTINUE
        CALL INTERP
C
C
C       SET UP FOR NEXT BLOCK TO DUMP (IF NECESSARY)
```

```
C
  250  I = I+BLKLEN
       IF (ARGTBL(1,2).EQ.BLOK.AND.BLOK.NE.0.OR.TYPE.EQ.255)  GO TO 299
C
  290  IF (I.LE.ICL)  GO TO  200
C
  299  CONTINUE
C      IF NOT RUN AS TASK LVL ZERO, GO TO SUBLEVEL EXIT
S      LDA   192
S      ZJP   $+3
S      LDB   1,B
S      JMP   *4,B
C
       RETURN
       END
```

3A. TRGRET OR TGRT-Subroutine to retrieve address of all trigger variables for designated subtrash from logic initiator tables.

```
TRIGGER RETRIEVE
       0033   00 0 33 R    0078  RTVRTN   EQU    $
 0033  0C01   08 4 01 A    0079           LDB    1,B
 0034  71C7   70 1 C7 A    0080           JMP    *MISFX        RETURN
 0035  0000   00 0 00 A    0081  SHFADR   DAT    0
 0036  004A   00 0 4A R    0082           IPL
 0037  0000   00 0 00 A
 0038  0000   00 0 00 A
 0039  6000   60 0 00 A
 003A  1FFF   18 7 FF A
 003B  01FF   00 1 FF A
 003C  0000   00 0 00 A
 003D  0048   00 0 48 R
 003E  F7FF   F0 7 FF A
 003F  0049   00 0 49 R
       0007   00 0 07 A    0083           RPT    7
 0040  0000   00 0 00 A    0084           DAT    0
 0041  0000   00 0 00 A    0084           DAT    0
 0042  0000   00 0 00 A    0084           DAT    0
 0043  0000   00 0 00 A    0084           DAT    0
 0044  0000   00 0 00 A    0084           DAT    0
 0045  0000   00 0 00 A    0084           DAT    0
 0046  0000   00 0 00 A    0084           DAT    0
       0046   00 0 46 R    0085  RTVP881  ECU    $-1
 0047  0000   00 0 00 A    0086           DAT    0             1,R BLn R
 0048  0000   00 0 00 A    0087  SUBLVL   DAT    0             2,R,SUBLEVEL
```

```
0049  0000   00 0 00 A   0088  TRIGBF   DAT   0          3,B ADDRESS OF BUFFER
004A  0000   00 0 00 A   0089  NUMTRG   DAT   0          4,B NUMBER OF TRIGGERS
      0000   00 0 00 A   0090           END
0000  ERRORS

TRIGGER RETRIEVE
0010  1838   18 3 38 A   0040           LDG   *SUBLVL    Q CONTAINS SUBLEVEL
0011  7201   70 2 01 A   0041           JMP   $+2
0012  6223   60 2 23 A   0042  RTV3     INC   SHFADR
0013  1222   10 2 22 A   0043           LDC   SHFADR
0014  2902   28 1 02 A   0044           LDA   *C         PICK UP SUBLEVEL IN TABLE
0015  5A29   58 2 29 A   0045           AND   =X'F7FF'
0016  5003   50 0 03 A   0046           EOR   G          COMPARE WITH DESIRED SUBLEVEL
0017  F214   F0 2 14 A   0047           ZJP   FNDRTV     IF ZERO,FOUND
0018  2902   28 1 02 A   0048           LDA   *C
0019  58BB   58 0 BB A   0049           AND   KIX800     CHECK FOR END OF SUBLEVELS
001A  F20C   F0 2 0C A   0050           ZJP   RTV6       YES,END
001B  72F6   70 2 F6 A   0051           JMP   RTV3       JUMP ON NO
      001C   00 0 1C R   0052  RTV4     EQU   $
001C  2904   28 1 04 A   0053           LDA   *E
001D  5A1E   58 2 1E A   0054           AND   =X'1FF'    UNPACK SUBLEVEL
001E  A802   A8 0 02 A   0055           STA   C
001F  2904   28 1 04 A   0056           LDA   *E
0020  4005   40 0 05 A   0057           ADD   A
0021  4005   40 0 05 A   0058           ADD   A
0022  4005   40 0 05 A   0059           ADD   A          SHIFT LEVEL
0023  58A3   58 0 A3 A   0060           AND   KI1ST
0024  5002   50 0 02 A   0061           EOR   C          INSERT SUBLEVEL
0025  4823   48 3 23 A   0062           SUB   *SUBLVL    COMPARE
0026  F205   F0 2 05 A   0063           ZJP   FNDRTV     JUMP ON FOUND
      0027   00 0 27 R   0064  RTV6     EQU   $
0027  2A11   28 2 11 X   0065           LDA   =LCWORD    CHECK FOR START OF TABLE
0028  4804   48 0 04 A   0066           SUB   E
0029  B209   B0 2 09 A   0067           PJP   RTVRTN     JUMP ON END
002A  6804   68 0 04 A   0068           DCR   E          CHECK NEXT WORD
002B  72DA   70 2 DA A   0069           JMP   RTV1
      002C   00 0 2C R   0070  FNDRTV   EQU   $
002C  2804   28 0 04 A   0071           LDA   E
002D  4A0B   48 2 0B X   0072           SUB   =LCWORD
002E  40B4   40 0 B4 A   0073           ADD   KIX10
002F  AB1A   A8 3 1A A   0074           STA   *TRIGBF    STORE TRIGGER
0030  6219   60 2 19 A   0075           INC   TRIGBF     INCREMENT ADDRESS
0031  6319   60 3 19 A   0076           INC   *NUMTRG    INCREMENT COUNT
0032  72F4   70 2 F4 A   0077           JMP   RTV6
```

TRIGGER RETRIEVE

```
                                   TTL     'TRIGGER RETRIEVE'
                                   REF     TRGRTV
                                   REF     LCWBRD
                                   REF     ENDFIL
                                   REF     TRNBUF
     003D   00 0 3D A      SBT!    EQU     X'3D'
     00A8   00 0 A8 A      K!X7FFF EQU     X'A8'
     00BB   00 0 BB A      K!X800  EQU     X'BB'
     00A3   00 0 A3 A      K!1ST   EQU     X'A3'
     00B4   00 0 B4 A      K!X10   EQU     X'B4'
     00D7   00 0 D7 A      MISFX   EQU     X'D7'
                           *                        THIS RAUTINF RFTRIFVFS ALL THF TRIGGERS
                           *                        FOR A GIVEN SUALFVEL
                           *
                           *                            ENTER     EST TRGRTV,B
                           *                                      DAT X    -  S.IBLEVEL
                           *                                      DAT Y    -  B.IFFER FOR TRIGS
                           *                                      DAT Z    -  # OF TRIGGERS
                           *
0000 0046   00 0 46 R              ACL     RTVP00L
     0001   00 0 01 R      TRGRTV  EQU     $
0001 1800   18 0 00 A              LDG     P
0002 7130   70 1 30 A              JMP     *SBT!
0003 0002   00 0 02 A              DAT     2
0004 3846   38 3 46 A              STZ     *NUMTRG      CLEAR NUMBER OF TRIGGERS
0005 2232   20 2 32 X              LDE     *ENDFIL      START AT END OF LCWBRD
     0006   00 0 06 R      RTV1    EQU     $
0006 2904   28 1 04 A              LDA     *E
0007 58A8   58 0 A8 A              AND     K!X7FFF
0008 F21E   F0 2 1E A              ZJP     RTV6         IF ZERA,NO TRIAGFRS
0009 5A30   58 2 30 A              AND     *X'6000'
000A F201   F0 2 01 A              ZJP     RTV2         IF ZERA,MULTIPLE RIDS
000B 7210   70 2 10 A              JMP     RTV4         OTHERWISE,SINGLE RID
     000C   00 0 0C R      RTV2    EQU     $
000C 2904   28 1 04 A              LDA     *E
000D 5A2D   58 2 2D A              AND     *X'1FFF'     FETCH RISPLACEMENT
000E 422E   40 2 2E X              ADD     *TRNBUF
000F AA26   A8 2 26 A              STA     SHFADR
```

4. CHNACQ Chain Aquire Subroutine

```
CJOB A0776,09 D. F. FURGERSON        USINOR 5 STAND COLD MILL
C
C     DATE: 6/12/72                  REVISION LEVEL: 13
C
C           CHAIN ACQUIRE HANDLER
C
C           THIS ROUTINE WILL MOVE THE DESIRED CHAIN TO THE CHAIN
C     WORKING AREA FOR MODIFICATION AND/OR DUMP.
C
C     ICQ,PAR1
C
C     WHERE:   PAR1 =  SYMBOLIC OR IMPLICIT ADDRESS OF CHAIN
C
C
      SUBROUTINE CHNACQ
C
C     SUBROUTINES CALLED:  SLOC,TGRT,SYMPAK,WRF:,ARF:,NDF:,SAT:
C                          ERRMSG,RDSYMB,INTERP
C
C     ******************************************************************
C
C
      COMMON /BUFKOM/BLKWRK(35),INBUF(8),NUMTRG,TRIGBF(7),CHNWRK(256)
      COMMON /FCKOM/PCIN,PCOUT,LODEV,SIDEV,BODEV,BIDEV,
     X       PSTART,PLAST,DSTART,DLAST,CSTART,CLAST,
     X        CHNLEN,BLKLEN,BLKNUM,TYPNUM,KEY,ARGPTR,ARG,TEMP,
     X       HEXTBL(16),COMTBL(36),SUBADL(36),SPCTBL(12),
     X       ARGTBL(4,2),ALGTBL(4,16),ALGSUB(16),ALGLEN(16),
     X       VOCTBL(3,20),VOCKEY(36),BYTPTR
C
      INTEGER PCIN,PCOUT,LODEV,SIDEV,BODEV,BIDEV,
     X        PSTART,PLAST,DSTART,DLAST,CSTART,CLAST,
     X        CHNLEN,BLKLEN,BLKNUM,TYPNUM,ARGPTR,ARG,TEMP,
     X        HEXTBL,COMTBL,SUBADL,SPCTBL,
     X        ARGTBL,ALGTBL,ALGSUB,ALGLEN,
     X        BLKWRK,CHNWRK,TRIGBF,
     X        VOCTBL,VOCKEY,BYTPTR
C
C     ****               END  COMMON  DECK         ****
C
C     - - - - - - - - - - - - - - - - - - - -
C
C
C
```

```
C        INTEGER BIT
C
         DATA  KX01FF/$01FF/
         DATA BIT/4/
         DATA  MAXSIZ/350/
C
C        HEX CHAIN ADDRESS IS IN ARGTBL(1,2) UPON ENTRY TO THIS HANDLER
C                    (ADDRESS POINTS TO SUBLEVEL NUMBER)
C
C
         ARG = 0
    10   J = ARGTBL(1,2)
C
         IF (J.NE.0)  GO TO 15
C
C        NO HEX SUBTASK # PRESENT  -N TRY TO DECODE ASCII BUFFER (INBUF)
C
         CALL SYMPAK
         IF (ARG.NE.0)  GO TO 17
         CALL RDSYMB (2,J,INBUF,2,K)
         IF (K.EQ.1) GO TO 17
C
    15   CALL SLOC  (J,J,0,K)
    16   IF (K.EQ.1)  GO TO 20
    17   CALL ERRMSG (400)
         ARG = 1
         GO TO 99
C
C
C        DETERMINE LENGTH OF CHAIN FROM FILE HEADER
C
S20      LDA   *J
S        AND   KX01FF
S        STA   K
C
    30   WRITE (PCOUT,31)  J,K
      31 FORMAT (' LOC = ',Z4,',  SIZE = ',Z4)
C
C        CHECK SIZE OF CHAIN
C
C
         IF (K.LE.MAXSIZ)  GO TO  40
         CALL ERRMSG (401)
         ARG = 1
```

```
         GO TO  99
C
C
C        TRANSFER CHAIN TO WORKING AREA
C
 40      DO  50  I=1,K
S        LDA    *J
S        STA    L
         CHNWRK(I) = L
         J = J+1
C
 50      CONTINUE
         M = CHNWRK(BIT)
         CALL INTERP
C
         CHNLEN = K
C
C        FETCH CHAIN TRIGGERS
C
 70      CALL TGRT  (M,TRIGBF,NUMTRG)
         CALL INTERP
C
 80      WRITE (PCOUT,81)
    81   FORMAT ('   ACQUIRE COMPLETE ')
C
 99      CONTINUE
C        IF NOT RUN AS TASK LVL ZERO, GO TO SUBLEVEL EXIT
S        LDA    192
S        ZJP    $+3
S        LDB    1,B
S        JMP    *4,B
C
         RETURN
         END
```

5.CHNACT- Chain activate subroutine

```
CJOB AH776,89 D. F. FURGERSON         USINOR 6 STAND COLD MILL
C
C        DATE:  6/4/72                REVISION LEVEL:  12
C
C
C        CHAIN ACTIVATE HANDLER
C
C        ICV (NO ARG)  .OR.  ICV,PAR1  (PAR1=NONZERO=TRACE CHAIN)
```

```
C
C
C           THIS HANDLER MOVES CHAIN FROM WORKING AREA TO LOCATION
C       DESIGNATED BY SPECIAL CORE ALLOCATION SUBROUTINE. IF A CURRENT
C       CHAIN IS RUNNING ON THE SPECIFIED SUBLEVEL NUMBER. IT WILL BE
C       DISABLED AND ITS CORE SPACE RELEASED PRIOR TO THE ACQUITION OF
C       CORE FOR THE NEW CHAIN.
C
C
C       TO SELECT SUBLEVEL TRACE:      PAR1 = 1
C       TO SELECT BLOCK TRACE:         PAR1 = 2
C       TO SELECT BOTH  TRACES:        PAR1 = 3
C
C
C
        SUBROUTINE CHNACT
C
C       SUBROUTINES CALLED:  CORRET,CORACQ,SLOC,LINK,ABLE,TGCN,TGDL
C                            ERRMSG,WRF:,ARF:,NDF:,SAT:,TRAC,SRMV,INTERP
C
C
C
C       ******************************************************************
C
C
        COMMON /BUFKOM/BLKWRK(35),INBUF(8),NUMTRG,TRIGBF(7),CHNWRK(350)
        COMMON /FCKOM/PCIN,PCOUT,LODEV,SIDEV,BODEV,BIDEV,
     X         PSTART,PLAST,DSTART,DLAST,CSTART,CLAST,
     X          CHNLEN,BLKLEN,BLKNUM,TYPNUM,KEY,ARGPTR,ARG,TEMP,
     X         HEXTBL(16),COMTBL(36),SUBADL(36),SPCTBL(12),
     X         ARGTBL(4,2),ALGTBL(4,16),ALGSUB(16),ALGLEN(16),
     X         VOCTBL(3,20),VOCKEY(36),BYTPTR
C
        INTEGER PCIN,PCOUT,LODEV,SIDEV,BODEV,BIDEV,
     X          PSTART,PLAST,DSTART,DLAST,CSTART,CLAST,
     X          CHNLEN,BLKLEN,BLKNUM,TYPNUM,ARGPTR,ARG,TEMP,
     X          HEXTBL,COMTBL,SUBADL,SPCTBL,
     X          ARGTBL,ALGTBL,ALGSUB,ALGLEN,
     X          BLKWRK,CHNWRK,TRIGBF,
     X          VOCTBL,VOCKEY,BYTPTR
C
C       ****                 END  COMMON  DECK          ****
C
C       ******************************************************************
C
```

```
C
        INTEGER BIT,HI1
C
        DATA BIT/4/
        DATA  HI1/$01FF/
C
C
C
C       FETCH NEW SUBLEVEL NUMBER AND STORE IN M
  5     M = CHNWRK(BIT)
C
C       FIND STARTING ADDRESS OF CHAIN
C
 10     CALL SLOC (M,J,0,K)
C
C       IF CHAN IS NEW, JUMP DIRECTLY TO CORE FETCH
C
 20     IF (K.NE.1) GO TO 80
C
C       DELETE ALL TRIGGERS FOR ACTIVE CHAIN
C
 30     CALL TGDL   (M,K)
C
C
C       CHECK FOR DELETE ERROR  (ERR 504)
        IF (K.EQ.1) GO TO 40
        CALL ERRMSG (504)
        GO TO 999
C
C       REMOVE CHAIN FROM SUBLEVEL PROCESSOR
C
 40     CALL SRMV   (M)
C
C       RETURN CORE TO FREE POOL
C
S50     LDA   *J
S       AND   HI1
S       STA   L
 60     CALL CORRET (J,L)
C
C       PRINT AREA RELEASED TO FREE POOL
C
 70     WRITE (PCOUT,71) L,J
   71   FORMAT ('  ',Z3,' LOCS REL AT ',Z4)
        CALL INTERP
```

```
C
C        ACQUIRE NEW CORE FROM FREE POOL
C
  80     CALL CORACQ (J,CHNLEN,K)
C
C        IF NO CORE AVAILABLE, TYPE  ERROR #  503
C
         IF (K.NE.2)  GO TO  90
         CALL ERRMSG (503)
         GO TO 999
C
C        PRINT AREA ACQUIRED FROM FREE POOL
C
  90     WRITE(PCOUT,91)CHNLEN,J
     91  FORMAT ('  ',Z3,' LOCS ACQ AT ',Z4)
C
C        TRANSFER NEW CHAIN TO CORE AREA JUST ACQUIRED
C
  100    L = J
  102    DO 105 I=1,CHNLEN
         K = CHNWRK(I)
S        STA   *L
         L=L+1
  105    CONTINUE
         CALL INTERP
C
C        LINK TO SUBLEVEL PROCESSOR
C
  110    CALL LINK (M,J,0,K )
C
C        CHECK FOR INVALID LINK
C
  120    IF (K.EQ.1) GO TO 125
         CALL ERRMSG (502)
         GO TO  999
C        ABLE THE NEW CHAIN
  125    CALL ABLE (M)
C        CHECK FOR TRACE CONDITIONS
         N = ARGTBL(1,2)
         IF (N.EQ.0)  GO TO 130
C        TRACE IS SELECTED - IS IT SUBLEVEL TRACE ?
S        LDA   N
S        AND   176
S        ZJP   )128
C        SET TRACE BIT ON NEW CHAIN
```

```
  127  CALL TRAC (M,1)
C      CHECK FOR BLOCK TRACE
  128  CONTINUE
S      LDA   N
S      AND   177
S      ZJP   )130
S      LDA   *J
S      EOR   186
S      STA   *J
C
C      CONNECT NEW TRIGGERS
C
  130  IF (NUMTRG.EQ.0)  GO TO  160
C
C
  140  DO 145 I=1,NUMTRG
       CALL TGCN (M,TRIGBF(I),K)
  145  CONTINUE
C
C      CHECK FOR BAD TRIGGER
C
  150  IF (K.EQ.1)  GO TO 160
       CALL ERRMSG (501)
       GO TO  999
C
C      PRINT ACTIVATE MESSAGE
C
  160  WRITE (PCOUT,161)
  161  FORMAT ('   ACTIVATE COMPLETE ')
C
C
C      RETURN TO MAIN PROCESSOR
C
  999  CONTINUE
       CALL INTERP
C
C      IF NOT RUN AS TASK LVL ZERO, GO TO SUBLEVEL EXIT
S      LDA   192
S      ZJP   $+3
S      LDB   1,B
S      JMP   *4,B
C
       RETURN
       END
```

6. CHNPCH-Chain punch subroutine

```
CJOB A0776.09 D. F. FURGERSON        USINOR 5 STAND COLD MILL
C
C     DATE:  6/12/72                 REVISION LEVEL:  13
C
C          CHAIN PUNCH HANDLER
C
C          THIS ROUTINE WILL PUNCH A BINARY TAPE OF ANY CHAIN RESIDENT
C     IN THE CHAIN WORKING AREA.
C
C     ICP (NO ARGS)  .OR.  ICP,PAR1
C
C     WHERE:  PAR1 = SYMBOLIC CHAIN NAME OR SUBLEVEL NUMBER (HHHH)
C                    OF THE FORM X'HHHH'  OR AN ASCII 'END'.
C
C          IF PAR1 IS EITHER SYMBOLIC ASCII OR X'HHHH', THE CHAIN IN
C     QUESTION WILL BE BROUGHT INTO THE CHAIN WORKING AREA (CHNWRK)
C     BY CALLING 'CHNACQ'.  IF NO PAR1 APPEARS, THE CHAIN CURRENTLY IN
C     'CHNWRK' WILL BE PUNCHED.  IF ICP,END IS ENTERED, AND END RECORD
C     WILL BE PUNCHED TO SIGNAL THE LOADER 'END-OF-LOAD'.
C
C
C
      SUBROUTINE CHNPCH
C
C     SUBROUTINES CALLED: ERRMSG, SYMPAK, WBINRD
C
C     ** ERROR DIAGNOSTICS **
C
C     ERR 600 = INVALID ENTRY FOR CHAIN NAME
C
C
C     *****************************************************************-*
C
C
      COMMON /BUFKOM/BLKWRK(35),INBUF(8),NUMTRG,TRIGBF(7),CHNWRK(350)
      COMMON /FCKOM/PCIN,PCOUT,LODEV,SIDEV,BODEV,BIDEV,
     X       PSTART,PLAST,DSTART,DLAST,CSTART,CLAST.
     X        CHNLEN,BLKLEN,BLKNUM,TYPNUM,KEY,ARGPTR,ARG,TEMP,
     X       HEXTBL(16),COMTBL(36),SUBADL(36),SPCTHL(12),
     X       ARGTBL(4,2),ALGTBL(4,16),ALGSUB(16),ALGLEN(16),
     X       VOCTBL(3,20),VOCKEY(36),BYTPTR
C
      INTEGER PCIN,PCOUT,LODEV,SIDEV,BODEV,BIDEV,
     X        PSTART,PLAST,DSTART,DLAST,CSTART,CLAST,
```

```
     X         CHNLEN,BLKLEN,BLKNUM,TYPNUM,ARGPTR,ARG,TEMP,
     X         HEXTBL,COMTBL,SUBADL,SPCTBL,
     X         ARGTBL,ALGTBL,ALGSUB,ALGLEN,
     X         BLKWRK,CHNWRK,TRIGHF,
     X         VOCTBL,VOCKEY,BYTPTR
C
C     ****                END  COMMON  DECK          ****
C
C     ******************************************************************
C
      DIMENSION TAPBUF(54)
C
      INTEGER FSTRT, CSTRT, TSTRT, CHEND, CLNTH, SKIP1, OUTPCH, ECKS,
     1ATEK, SPACE, DSPCE, CP, FLAG1, CHECKS, CHNLEG, TAPBUF
      INTEGER EN,DS,BIT
      DIMENSION ITRIG(4)
      EQUIVALENCE (TSTRT,ITRIG(1)),(JTRIG,ITRIG(3))
C
      DATA ITRIG(2),ITRIG(4)/0,0/
      DATA ECKS/$00D8/
      DATA FSTRT/$FF96/
      DATA CSTRT/$E807/
      DATA TSTRT/$F003/
      DATA CHEND/$D8C0/
      DATA CLNTH/$0800/
      DATA SKIP1/$0000/
      DATA ATEK/$8000/
      DATA SPACE/$00A0/
      DATA DSPCE/$A0A0/
      DATA CP/$C350/
      DATA MEND/$1002/
      DATA NEG1/$FFFF/
      DATA EN,DS/'EN','D '/
      DATA BIT/4/
      DATA  ICNAQ/$207E/
C
C     RESET ALL VARIABLES TO START VALUES
C
      KK=2
      IJ=11
      III = 2
      FLAG1 = 0
      I = 0
C
```

```
C      SQUEZE OUT SPACES AND BLANKS AND RE-PACK INBUF
C
       CALL SYMPAK
       IF (ARG.NE.0)  GO TO  100
       J = INBUF(1)
       K = INBUF(2)
C      CHECK FOR END OF PUNCH REQUEST
       IF (J.EQ.EN.AND.K.EQ.DS)  GO TO 300
C      CHECK FOR NO PAR1 (PUNCH CHAIN IN 'CHNWRK')
       IF (J.EQ.CP.AND.K.EQ.DSPCE)  GO TO 50
C      CALL CHAIN ACQUIRE TO FETCH DESIRED CHAIN
S      LDA   192
S      ZJP   )45
       CALL SRDT(ICNAQ)
       GO TO 48
  45   CONTINUE
       CALL CHNACQ
  48   CONTINUE
       IF (ARG.NE.0)  GO TO 999
  50   CONTINUE
       IHEX = CHNWRK(BIT)
C      CALL RDSYMB TO MAKE SURE WE HAVE ASCII IN INBUF
       CALL RDSYMB (2,IHEX,INBUF,2,J)
       IF (J.NE.0)  GO TO 100
C      INBUF 1-4 NOW HOLDS THE PACKED ASCII CHAIN NAME
       GO TO 110
C      INVALID ENTRY FOUND - ERROR OUT
C      ERROR 600
 100   CONTINUE
       CALL ERRMSG (600)
C
C      READY TO FILL BUFFER (TAPBUF)
C
 110   CONTINUE
       I = 1
       TAPBUF(1) = FSTRT
       TAPBUF(2) = ATEK+I
       TAPBUF(3) = CSTRT
       TAPBUF(4) = CHNWRK(BIT)
       TAPBUF(5) = INBUF(1)
       TAPBUF(6) = INBUF(2)
       TAPBUF(7) = INBUF(3)
C
C      CHECK TO SEE IF THERE ARE ANY TRIGGERS
```

```
C
      IF(NUMTRG.EQ.0) GO TO 201
C
C     THERE ARE SOME TRIGGERS LOAD MODULE WITH TRIGGER DATA
C
      DO 201 J=1,NUMTRG
      JTRIG = TRIGBF(J)
      DO 202 K=1,4
      L = IJ+K-1
      TAPBUF(L) = ITRIG(K)
  202 CONTINUE
      IJ = IJ+4
 201  CONTINUE
C
C     FINISHED TRIGGER DATA, LOAD CHAIN
C
      FLAG1 = 1
      CHNLEG = CHNLEN - III
      LEFTOV = 53-IJ
      IF(LEFTOV.LT.CHNLEG) GO TO 203
      FLAG1 = 2
      LEFTOV = CHNLEG
 203  CONTINUE
      TAPBUF(IJ) = CLNTH + LEFTOV
      DO 204 II=1,LEFTOV
      IJ = IJ+1
      III = III+1
      TAPBUF(IJ) = CHNWRK(III)
 204  CONTINUE
      IJ=IJ+1
C
C     IF FLAG1 = 1 , CHAIN NOT COMPLETLY LOADED, CHECK SUM AND CONTINUE.
C              = 2 , CHAIN LOADED, TERMINATE, CHECK SUM AND RETURN.
      IF(IJ.EQ.54.AND.FLAG1.EQ.2) GO TO 501
      GO TO (500,205),FLAG1
 205  CONTINUE
      TAPBUF(IJ) = CHEND
      GO TO 500
 501  CONTINUE
      FLAG1 =3
 500  CONTINUE
C
C     CALCULATE THE CHECK SUM
C
```

```
S       LDE =51
S       JMP $+3
        CALL DUMMY(TAPBUF)
S       LDA $-1
S       ADD 1
S       INC 5
S       STA 2
S       STZ 5
S       ADD 0,C
S       CJP $+2
S       DCR 5
S       INC 5
S       INC 2
S       DCR 4
S       PJP $-6
S       EOR NEG1
S       INC   5
S       STA CHECKS
C
        TAPBUF(54) = CHECKS
C
C       TAPBUF NOW COMPLETLY FILLED READY TO WRITE OUT
C
600     CONTINUE
        CALL WBINRD (BODEV,TAPBUF)
        CALL INTERP
        DO 10 L=1,54
        TAPBUF(L)=0
10      CONTINUE
        GO TO (700,999,700)FLAG1
700     CONTINUE
        I = I+1
C       CONTINUE LOADING CHAIN
C
        TAPBUF(1) = FSTRT
        TAPBUF(2) = ATEK+I
        IJ = 3
        IF(FLAG1.EQ.1) GO TO 202
701     CONTINUE
        TAPBUF(IJ) = CHEND
        FLAG1 = 2
        GO TO 500
C       WRITE END MODULE
C
```

```
300  CONTINUE
     TAPBUF(1) = FSTRT
     TAPBUF(2) = ATEK + I
     TAPBUF(3) = MEND
     FLAG1 = 2
     GO TO 500
999  CONTINUE
C    IF NOT RUN AS TASK LVL ZERO, GO TO SUBLEVEL EXIT
S    LDA   192
S    ZJP   $+3
S    LDB   1,B
S    JMP   *4,B
C
     RETURN
     END
```

7. CHNSIM- Chain simulate subroutine

```
CJOB AH776,09 D. F. FURGERSON        USINOR 5 STAND COLD MILL
C
C
C    DATE: 3/21/72                   REVISION LEVEL: 4
C
C         THIS ROUTINE INTERROGATES THE USER AS TO HIS SIMULATION/TRACE
C    DESIRES, THEN CODES UP THESE DESIRES AND STORES THEM IN A 'SIMUL-
C    ATION FILE' FOR PROCESSING BY THE RUN-TIME CHAIN INTERPRETER.
C
C         SYNTAX IS AS FOLLOWS:
C
C    :CS PAR1,PAR2-PAR3,PAR4-PAR5,PAR6-PAR7
C
C    WHERE:
C              PAR1  = ADDRESS OF CHAIN TO SIMULATE
C                 2    FIRST BLOCK OF BLOCK TRACE
C                 3    LAST BLOCK OF BLOCK TRACE
C                 4    FIRST BLOCK OF I/O TRACE
C                 5    LAST BLOCK OF I/O TRACE
C                 6    NUMBER OF SIMULATED RUNS  (0=1)
C                 7    TIME MULTIPLIER  (0=1)
C
C    IF PAR2 = -1 AND PAR3 THRU PAR7 ARE OMITTED, THE CHAIN DEFINED BY
C    PAR1 IS ELIMINATED FROM THE 'SINULATION FILES', CANCELLING THIS
C    SIMULATION RUN.
C
```

```
C
      SUBROUTINE CHNSIM
C
C     SUBROUTINES CALLED:  WRF:,NDF:,SYMPAK,RDSYMB,ERRMSG,
C                          INTERP,SBID,GOT:,RDCHR
C
C
      COMMON /BUFKOM/BLKWRK(35),INBUF(8),NUMTRG,TRIGBF(7),CHNWRK(256)
      COMMON /FCKOM/PCIN,PCOUT,LODEV,SIDEV,BODEV,BIDEV,
     X       PSTART,PLAST,DSTART,DLAST,CSTART,CLAST,
     X        CHNLEN,BLKLEN,BLKNUM,TYPNUM,KEY,ARGPTR,ARG,TEMP,
     X       HEXTBL(16),COMTBL(36),SUBADL(36),SPCTBL(12),
     X       ARGTBL(4,2),ALGTBL(4,16),ALGSUB(16),ALGLEN(16),
     X       VOCTBL(3,20),VOCKEY(36),BYTPTR
C
C
      INTEGER PCIN,PCOUT,LODEV,SIDEV,BODEV,BIDEV,
     X        PSTART,PLAST,DSTART,DLAST,CSTART,CLAST,
     X        CHNLEN,BLKLEN,BLKNUM,TYPNUM,ARGPTR,ARG,TEMP,
     X        HEXTBL,COMTBL,SUBADL,SPCTBL,
     X        ARGTBL,ALGTBL,ALGSUB,ALGLEN,
     X        BLKWRK,CHNWRK,TRIGBF,
     X        VOCTBL,VOCKEY,BYTPTR
C
C
C     ****              END  COMMON  DECK         ****
C
C
      COMMON /SIMK1/SIMWORD,SLVTBL,BITPTR
      COMMON /SIMK2/BITTBL,SIMFILE
C
      INTEGER SYMFIL(8,5),BITTBL(60),BITPTR,ECKS,APOS,COMMA,SPACE,CARRET
      INTEGER SIMWORD,SLVTBL(5)
C
      EQUIVALENCE (SYMFILE,SYMFIL(1))
C
      DATA  ECKS,APOS,COMMA,SPACE,CARRET/$D8,$27,2,$A0,12/
      DATA  KXF7FF/$F7FF/
C
C
      III = 0
      JJJ = 0
      KKK = 0
      II = 1
C     CHECK FOR VALID CHAIN ADDRESS
```

```
10     J = ARGTBL(1,2)
       IF (J.EQ.-1)  GO TO 239
       IF (J.NE.0) GO TO 20
C      CALL RDSYMB TO FETCH CHAIN ADDRESS
       IF (K.NE.1) GO TO 25
15     CALL SYMPAK
       IF (ARG.NE.0) GO TO 22
       CALL RDSYMB (2,J,INBUF,2,K)
       IF (K.EQ.1) GO TO 22
       LVL = J
20     CALL SLOC (J,J,0,K)
       IF (K.EQ.1) GO TO 25
C      ERROR 800 - INVALID CHAIN ADDRESS FOR SIMULATE
22     CALL ERRMSG (800)
       GO TO 990
C      CHAIN ADDRESS OK - CHECK FOR END OF SIMULATION
25     JJ = -ARGTBL(2,2)
       IF (JJ.NE.1) GO TO 200
C      OK TO START SIMULATION - LOOK FOR HOLE IN 'SLVTBL'
       SIMWORD = 1
C      SET BIT IN CHAIN HEADER TO PERMIT SIMULATION
S      LDA   *J
S      EOR   187
S      STA   *J
30     DO 32 I=1,5
       IF (SLVTBL(I).EQ.0) GO TO 35
32     CONTINUE
C      ERROR 801 - NO ROOM TO SIMULATE THIS CHAIN
       CALL ERRMSG (801)
       GO TO 990
C      FOUND SPACE IN 'SIMFIL' - TRANSFER 'EASY' PARAMETERS
35     CONTINUE
       SLVTBL(I) = LVL
       SYMFIL(1,I) = J
       SYMFIL(8,I) = 0
       M = 1
       DO 39 N=2,7
       L = (N+1)/2
       J = ARGTBL(L,M)
C      LEFT JUSTIFY BLOCK #'S FOR EASE OF HANDLING BY THE INTERPRETER
       IF (N.LT.6) J = J*256
       IF (N.GE.6.AND.J.EQ.0) J = 1
       SYMFIL(N,I) = J
       IF (M.EQ.2) GO TO 38
       M = 2
```

```
      GO TO 39
   38 M = 1
   39 CONTINUE
C     INPUT INFO FROM USER AS TO TYPE OF SIMULATION DESIRED
   50 CONTINUE
   51 BYTPTR = 0
C     OUTPUT REQUEST FOR SIMULATED ITEMS:
      WRITE (PCOUT,52)
   52 FORMAT ('  SIMULATE VARIABLES ?  ')
C     USE RDCHR TO INPUT CHARACTERS
C     ZERO OUT INBUF
   58 DO 59 J=1,8
      INBUF(J) =  SPACE
   59 CONTINUE
      K=1
   60 CALL RDCHR (INCHR,J)
      CALL INTERP
      IF (J.EQ.COMMA)  GO TO 70
      IF (J.EQ.CARRET) GO TO 69
      IF (J.NE.0)      GO TO 60
C     ADD NEW CHR TO BOTTOM OF INBUF
   65 DO 68 J=1,7
      INBUF(J) = INBUF(J+1)
   68 CONTINUE
   69 III = 1
      INBUF(8) = INCHR
      GO TO 60
C     COMMA IS FOUND - PROCESS NEW SYMBOL
   70 IF (INBUF(1).NE.SPACE) GO TO 80
      M = 10
      IF (INBUF(2).EQ.ECKS.AND.INBUF(3).EQ.APOS) M = 16
      LL = 8-M/16
      DO 105 L=4,LL
      IF (INBUF(L).EQ.SPACE) GO TO 110
      DO 78 MM=1,M
   78 CONTINUE
      IF (INBUF(L)-HEXTBL(MM)) 78,100,78
C     INPUT IS SYMBOLIC - CHECK SYMBOL TABLE
   80 CALL SYMPAK
      IF (ARG.NE.0) GO TO 82
      CALL RDSYMB (2,J,INBUF,1,KK)
      IF (KK.EQ.0) GO TO 84
C     ERROR 803 - UNDEFINED SYMBOL INPUT
   82 CALL ERRMSG (803)
      GO TO 50
```

```
C     VALID SYMBOL DEF - CHK FOR 'BUZZ WORDS'
 84   IF (JJJ.EQ.1) GO TO 135
C     2=XFRS, 4=BIDS, 8=CALLS, 15=ALL, 16=NO, 32=YES
      IF (J.EQ.16) GO TO 120
      IF (J-32)  90,58,110
 90   CONTINUE
      SYMFIL(8,I) = J
      GO TO  58
C     ACCUMULATE COMPUTED RESULTS
 100  J = J+M+MM-1
 105  CONTINUE
C     STORE RESULTS IN 'BITTBL'
 110  CONTINUE
      IF (BITPTR.LE.60)  GO TO 115
C     ERROR 804 - MORE THAN 60 SIMULATED LOGICALS
      CALL ERRMSG (804)
      GO TO  130
C     GO GET ANOTHER SYMBOL
 115  IF (III.EQ.0)  GO TO  58
 120  CONTINUE
C     ASK ABOUT CHAIN BID
 130  WRITE (PCOUT,131)
  131 FORMAT ('  BID CHAIN NOW ?  ')
      JJJ = 1
      GO TO 58
C     CHECK FOR YES OR NO
 135  IF (J.NE.5)  GO TO  990
      CALL SBID (LVL)
      GO TO 990
C
C     ICS TERMINATE:  -1=RMV CHAIN,-2=RMV ALL,-3=RMV ALL I/O
C
 200  CONTINUE
      GO TO (210,240,280), JJ
 201  GO TO 990
C     REMOVE THIS SINGLE CHAIN FROM 'SLVTBL'
 210  CONTINUE
      DO 220 N=1,5
      IF (LVL.EQ.SLVTBL(N)) GO TO 245
 220  CONTINUE
      GO TO 990
C     REMOVE ALL CHAINS FROM SIMULATION
 239  KKK = 1
 240  CONTINUE
      DO 250 N=1,5
```

```
 245  CONTINUE
      IF (SLVTBL(N).EQ.0) GO TO 250
C     FOUND SUBLEVEL - REMOVE IT
      SLVTBL(N) = 0
      J = SIMFIL(1,N)
      SYMFIL(1,N) = 0
S     LDA   *J
S     AND   KXF7FF
S     STA   *J
      IF (JJ.EQ.1) GO TO 990
 250  CONTINUE
      SIMWORD = 0
      IF (KKK.EQ.1)  GO TO 280
      GO TO 990
C     REMOVE LOGICALS FROM SIMULATION
 280  CONTINUE
      DO 290 N=1,60
      BITTBL(N) = 0
 290  CONTINUE
C
C
C
C     ROUTINE EXIT
C
 990  CONTINUE
S     LDA   192
S     ZJP   )999
S     LDB   1,B
S     JMP   *4,B
 999  CONTINUE
      RETURN
      END
```

8. SYMMOD - Symbolic modify subroutine

```
CJOB H0776,09 D. F. FURGERSON       USINOR 5 STAND COLD MILL
C
C     DATE:  6/12/72                REVICION LEVEL:  13
C
      SUBROUTINE  SYMMOD
C
C          THIS SUBROUTINE HANDLES ALL ALGORITHMS REQUIRING SIMPLIFIED
C     I/O OF THE FORM:
C                            NN    AAAAAA
C                             W 0
```

```
C                              X =
C                              Y =
C                              Z =
C         WHERE:
C                   N = NUMERIC DIGIT WHICH FORMS PART OF BLOCK NUMBER
C                   A = ALPHANUMERIC CHR FORMING PART OF ALGORITHM NAME
C                   W = WORD FROM VOCABULARY TABLE FOR ARGUMENT 1
C                   X = WORD FROM VOCABULARY TABLE FOR ARGUMENT 2
C                   Y = WORD FROM VOCABULARY TABLE FOR ARGUMENT 3
C                   Z = WORD FROM VOCABULARY TABLE FOR ARGUMENT 4
C
C
C
C     SUBROUTINES CALLED:  SAT:,WRF:,ARF:,NDF:
C
C     ******************************************************************
C
C
      COMMON /BLKKOM/BLKBUF(3)
      COMMON /BUFKOM/BLKWRK(35),INBUF(8),NUMTRG,TRIGBF(7),CHNWRK(358)
      COMMON /FCKOM/PCIN,PCOUT,LODEV,SIDEV,BODEV,BIDEV,
     X       PSTART,PLAST,DSTART,DLAST,CSTART,CLAST,
     X         CHNLEN,BLKLEN,BLKNUM,TYPNUM,KEY,ARGPTR,ARG,TEMP,
     X       HEXTBL(16),COMTBL(36),SUBADL(36),SPCTBL(12),
     X       ARGTBL(4,2),ALGTBL(4,16),ALGSUB(16),ALGLEN(16),
     X       VOCTBL(3,20),VOCKEY(36),BYTPTR
C
      INTEGER PCIN,PCOUT,LODEV,SIDEV,BODEV,BIDEV,
     X         PSTART,PLAST,DSTART,DLAST,CSTART,CLAST,
     X         CHNLEN,BLKLEN,BLKNUM,TYPNUM,ARGPTR,ARG,TEMP,
     X         HEXTBL,COMTBL,SUBADL,SPCTBL,
     X         ARGTBL,ALGTBL,ALGSUB,ALGLEN,
     X         BLKWRK,CHNWRK,TRIGBF,
     X         VOCTBL,VOCKEY,BYTPTR
      INTEGER BLKBUF
C
C
C     ****                 END  COMMON  DECK          ****
C
C     ******************************************************************
C
C
      INTEGER RPTFLG,TYPE,BIAS,CODE,VOCNUM,ECKS,APOS,SPACE,SLASH
      INTEGER DLC1,DLC3,DLC4,DLC5,CODWRD(3)
      INTEGER CARET
```

```
      DIMENSION IO(3),IREAL(2),IOBUF(4)
      EQUIVALENCE (INBUF(1),IO(1),IOBUF(1))
      EQUIVALENCE (REAL,IREAL(1)),(SPCTBL(11),SPACE)
      DATA    DLC1,DLC3,DLC4,DLC5/$A001,$A003,$A004,$A005/
      DATA ITRIG,ISEC,IARGR,IARGI/18,8,12,11/
      DATA IBLK/7/
      DATA IEXIT/255/
      DATA  IDELAY/5/
      DATA  ECKS,APOS/$00D8,$0027/
      DATA  CODWRD/'CO','DE','  '/
      DATA  SLASH/$00AF/
      DATA ICS/3/
      DATA  CARET/$8D/
C
C
C
C
      BYTPTR = 0
      BLKLEN = 0
      IBL = 0
      ITYPE = -1
      IVOCNM = -1
C
C     CHAIN MODIFY PORTION  -  ZERO OUT 'BLKWRK' PRIOR TO MODIFY
C
 2    DO 3 I=1,35
      BLKWRK(I) = 0
 3    CONTINUE
      K=1
      IF (ICS.LE.2.AND.TYPNUM.EQ.0)  GO TO 22
C
C     CREATE FIRST WORD OF BLOCK FROM PRIOR INFORMATION
C
 20   BLKWRK(1) = BLKNUM*256+TYPNUM
      BLKLEN = 1
C
C     DECODE VOCABULARY KEY WORD TO DETERMINE WHICH WORD TO TYPE
C
      K = 2
 22   CONTINUE
 12   CONTINUE
      IF (TYPNUM.EQ.IEXIT) GO TO 190
      DO 19  II=1,36
 14   JJ =VOCKEY(II)
C     UNPACK THE 1,4,3,3,5 GEN WORD FOUND IN 'VOCKEY' TBL IN 'FCKOM'
```

```
S      STZ    5
S      LDE    JJ
S      LDG    DLC1
S      SHF    4
S      STA    RPTFLG
S      STZ    5
S      LDG    DLC4
S      SHF    4
S      STA    TYPE
S      STZ    5
S      LDG    DLC3
S      SHF    4
S      STA    BIAS
S      STZ    5
S      SHF    4
S      STA    CODE
S      STZ    5
S      LDG    DLC5
S      SHF    4
S      STA    VOCNUM
C      CHECK FOR TYPE MATCHUP
       IF (TYPE.EQ.TYPNUM)  GO TO 190
  19   CONTINUE
       GO TO  9999
 190   CONTINUE
       II = II+1
C      OUTPUT PROPER INTERROGATION WORD FROM VOCABULARY
       IF (TYPNUM.EQ.IEXIT)  GO TO 9999
  24   J = VOCNUM
       IF (VOCNUM.EQ.0)  GO TO 9999
       IF (VOCNUM.EQ.ITRIG)  NUMTRG = 0
       IF (IVOCNM.EQ.VOCNUM)  GO TO 240
       K = K+BIAS
       IF (RPTFLG.EQ.0) GO TO 240
       IF (VOCNUM.EQ.ITRIG) GO TO 240
C      SAVE POINTER TO NUM ARG SLOT FOR LATER STORE (KK)
       IVOCNM = VOCNUM
       KKK = K
       K = K+1
       BLKLEN = BLKLEN+1
 240   CONTINUE
       DO 25 I=1,3
       IO(I) = VOCTBL(I,VOCNUM)
  25   CONTINUE
```

```
        WRITE  (PCOUT,26)  IO
     26 FORMAT ('+ ',3A2,' = ')
C
C       INPUT 8 CHARACTERS
C
        REAL = 0.0
        IF (VOCNUM.EQ.IARGR.OR.VOCNUM.EQ.ISEC)  GO TO 30
  28    READ (PCIN,29) INBUF
  29    FORMAT (8R1)
        ARG = 0
        IF (INBUF(1).EQ.SLASH)  GO TO 85
        GO TO 40
C
C       ARGR AND SEC BOTH USE REAL ARGUMENTS
C
  30    READ (PCIN,31) REAL
     31 FORMAT (E10.3)
        IF (REAL.EQ.69.6969)  GO TO  85
        IF (J.NE.ISEC)  GO TO 32
        ARG = REAL*10.0
        GO TO 60
  32    CONTINUE
        BLKWRK(K) = IREAL(1)
        K = K+1
        BLKWRK(K) = IREAL(2)
        GO TO 63
C
C       ARGUMENT HAS BEEN READ IN - CHECK FOR INTEGER, HEX, OR SYMBOLIC
  40    CONTINUE
        IF (INBUF(1).EQ.SPACE)  GO TO 51
        IF (INBUF(2).EQ.APOS)  GO TO 42
        MM = 1
        NN = 10
        GO TO 45
  42    MM = 3
        NN = 16
  45    DO 59  M=MM,6
        MMM = INBUF(M)
        IF (MMM.EQ.SPACE) GO TO 59
        IF (MMM.EQ.CARET) GO TO 60
        DO 50  N=1,NN
        IF (MMM.EQ.HEXTBL(N)) GO TO 54
  50    CONTINUE
C
C       SYMBOL IS ALPHANUMERIC - GO CHECK SYMBOL TABLE
```

```
      CALL SYMPAK
      CALL RDSYMB (1,ARG,INBUF,CODE,KK)
      IF (KK.EQ.0)  GO TO 60
 51   CALL ERRMSG (700)
      GO TO 63
 54   ARG = ARG+NN+N-1
 59   CONTINUE
 60   IF (J.EQ.ITRIG)  GO TO 65
      IF (CODE.NE.6)  GO TO 62
      IBL = IBL+1
      BLKBUF(IBL) = ARG
 62   CONTINUE
      BLKWRK(K) = ARG
 63   CONTINUE
      K=K+1
      GO TO 80
C     ENTER CHAIN TRIGGERS IN TRIGGER BUFFER
 65   NUMTRG = NUMTRG+1
      JJ = NUMTRG
      TRIGBF(JJ) = ARG
      GO TO 80
C     END OF VARIABLE LENGTH ARG INPUT (/)
 85   CONTINUE
      IF (RPTFLG.EQ.0)  GO TO 63
      IF (VOCNUM.EQ.ITRIG)  GO TO 88
      KKKK = K-KKK-1
      BLKLEN = BLKLEN+KKKK
      IF (VOCNUM.EQ.IARGR) KKKK = KKKK/2
      BLKWRK(KKK) = KKKK
      GO TO 14
 88   CONTINUE
      IF (ICS.LE.2)  GO TO 14
      BLKWRK(K) = NUMTRG
      K = K+1
      GO TO 14
 80   CONTINUE
      IF (RPTFLG.NE.0) GO TO 240
      BLKLEN = BLKLEN+1
      JJJ = ALGLEN(TYPE+1)
      IF (JJJ.GT.0)  BLKLEN = JJJ
      GO TO 14
C
 9999 CONTINUE
S     LDA   192
S     ZJP   $+3
```

```
S      LDB    1,B
S      JMP    *4,B
       RETURN
       END
```

9. SYMDMP - Symbolic dump subroutine

```
CJOB H0776,09 D. F. FURGERSON       USINOR 5 STAND COLD MILL
C
C     DATE:  6/15/72                REVISION LEVEL: 14
C
      SUBROUTINE  SYMDMP
C
C           THIS SUBROUTINE HANDLES ALL ALGORITHMS REQUIRING SIMPLIFIED
C     I/O OF THE FORM:
C                             NN     AAAAAA
C                              W =
C                              X =
C                              Y =
C                              Z =
C           WHERE:
C                 N = NUMERIC DIGIT WHICH FORMS PART OF BLOCK NUMBER
C                 A = ALPHANUMERIC CHR FORMING PART OF ALGORITHM NAME
C                 W = WORD FROM VOCABULARY TABLE FOR ARGUMENT 1
C                 X = WORD FROM VOCABULARY TABLE FOR ARGUMENT 2
C                 Y = WORD FROM VOCABULARY TABLE FOR ARGUMENT 3
C                 Z = WORD FROM VOCABULARY TABLE FOR ARGUMENT 4
C
C
C
C     SUBROUTINES CALLED:  SAT:,WRF:,ARF:,NDF:
C
C     *****************************************************************
C
C
      COMMON /BLKKOM/BLKBUF(3)
      COMMON /BUFKOM/BLKWRK(35),INBUF(8),NUMTRG,TRIGBF(7),CHNWRK(350)
      COMMON /FCKOM/PCIN,PCOUT,LODEV,SIDEV,BODEV,BIDEV,
     X        PSTART,PLAST,DSTART,DLAST,CSTART,CLAST,
     X         CHNLEN,BLKLEN,BLKNUM,TYPNUM,KEY,ARGPTR,ARG,TEMP,
     X        HEXTBL(16),COMTBL(36),SUBADL(36),SPCTBL(12),
     X        ARGTBL(4,2),ALGTBL(4,16),ALGSUB(16),ALGLEN(16),
     X        VOCTBL(3,20),VOCKEY(36),BYTPTR
C
      INTEGER PCIN,PCOUT,LODEV,SIDEV,BODEV,BIDEV,
```

```
      X         PSTART,PLAST,DSTART,DLAST,CSTART,CLAST,
      X         CHNLEN,BLKLEN,BLKNUM,TYPNUM,ARGPTR,ARG,TEMP,
      X         HEXTBL,COMTBL,SUBADL,SPCTBL,
      X         ARGTBL,ALGTBL,ALGSUB,ALGLEN,
      X         BLKWRK,CHNWRK,TRIGBF,
      X         VOCTBL,VOCKEY,BYTPTR
      INTEGER BLKBUF
C
C
C     ****                 END  COMMON  DECK          ****
C
C     ****************************************************************
C
C
      INTEGER RPTFLG,TYPE,BIAS,CODE,VOCNUM,ECKS,APOS,SPACE,SLASH
      INTEGER DLC1,DLC3,DLC4,DLC5,CODWRD(3)
      DIMENSION IO(3),IREAL(2),IOBUF(4)
      EQUIVALENCE (INBUF(1),IO(1),IOBUF(1))
      EQUIVALENCE (REAL,IREAL(1)),(SPCTBL(11),SPACE)
C     KMASK=0 FOR 780   KMASK=X'4000' FOR 798
      DATA  KMASK/$4000/
      DATA    DLC1,DLC3,DLC4,DLC5/$A001,$A003,$A004,$A005/
      DATA ITRIG,ISEC,IARGR,IARGI/18,8,12,11/
      DATA IBLK/7/
      DATA IEXIT/255/
      DATA  IDELAY/5/
      DATA  ECKS,APOS/$00D8,$0027/
      DATA  CODWRD/'CO','DE','  '/
      DATA  SLASH/$00AF/
      DATA ICS/3/
C
C
C
C
      BYTPTR = 0
      IBL = 0
      ITYPE = -1
      IVOCNM = -1
C
   12 CONTINUE
      IF (TYPNUM.EQ.IEXIT) GO TO 190
      DO 19  II=1,36
   14 JJ =VOCKEY(II)
C     UNPACK THE 1,4,3,3,5 GEN WORD FOUND IN 'VOCKEY' TBL IN 'FCKOM'
S     STZ   5
```

```
S      LDE    JJ
S      LDG    DLC1
S      SHF    4
S      STA    RPTFLG
S      STZ    5
S      LDG    DLC4
S      SHF    4
S      STA    TYPE
S      STZ    5
S      LDG    DLC3
S      SHF    4
S      STA    BIAS
S      STZ    5
S      SHF    4
S      STA    CODE
S      STZ    5
S      LDG    DLC5
S      SHF    4
S      STA    VOCNUM
C      CHECK FOR TYPE MATCHUP
       IF (TYPE.EQ.TYPNUM)  GO TO 190
   19  CONTINUE
       GO TO  9999
  190  CONTINUE
       II = II+1
C
C      CHAIN DUMP PORTION -
C
C
 1000  CONTINUE
       ITRG = 0
       ITX = 8
       K = TYPE+1
       IF (TYPNUM.EQ.IEXIT)  K = 3
       KKK = 0
C      CHECK FOR D'DUMP WITH VALUE' OPTION  (0=NO,1=YES)
       IDVFLG = ARGTBL(4,2)
C      CHECK FOR 1ST PASS ON THIS ALGORITHM
       IF (ITYPE.EQ.TYPE)  GO TO 1050
       ITYPE = TYPE
       I - ARG
       J=1
C      CHECK FOR EXTENDED DUMP
       IF (TEMP.EQ.1) WRITE (LODEV,1901)  I,BLKWRK(J)
C      PRINT SOURCE CODE FOR BLK # AND ALGO NAME
```

```
      WRITE (LODEV,1902) BLKNUM,ALGTBL(1,K),ALGTBL(2,K),ALGTBL(3,K),
     X                          ALGTBL(4,K)
      IF (ICS.LE.2.AND.TYPNUM.EQ.0)  GO TO 1050
      J = J+1
      I = I+1
C     SET UP TO PRINT INDIVIDUAL ARGUMENT SYNTAY (SUBSEQUENT PASSES)
 1050 CONTINUE
      JJJ = BLKWRK(J)
      J = J+BIAS
      I=I+BIAS
C     CHECK FOR MULTIPLE USE OF SAME ARGUMENT SYNTAX
      IF (RPTFLG.NE.1.OR.VOCNUM.EQ.IVOCNM)  GO TO 1070
      IF (ICS.LE.2.AND.TYPNUM.EQ.0)  GO TO 1070
C     WE HAVE MULTIPLE USEAGE - FETCH NBR OF VARIABLE ARGS
      IF (TEMP.EQ.0) GO TO 1060
      WRITE (LODEV,1901)  I,JJJ
      WRITE (LODEV,1903)
 1060 CONTINUE
      KKK = JJJ
      J = J+1
      I = I+1
      IF (KKK.EQ.0.AND.VOCNUM.NE.ITRIG) GO TO 14
      IVOCNM = VOCNUM
      BIAS = 0
      GO TO 1050
C     MULT ARG CONTINUATION OR SGL ARG PATH
 1070 CONTINUE
      JJJ = BLKWRK(J)
      IF (TYPNUM.EQ.IEXIT)  GO TO 9999
      IF (VOCNUM.NE.ITRIG)  GO TO 1075
C     PRINT CHAIN TRIGGERS
      IF (NUMTRG.EQ.0)  GO TO 3010
      DO 3010 ITX=1,NUMTRG
      JJ = TRIGBF(ITX)
      IF (TEMP.EQ.0)  GO TO 1072
      WRITE (LODEV,1901) ITX,JJ
 1072 CONTINUE
      ITRG = 1
      GO TO 1078
 1075 CONTINUE
      IF (TEMP.EQ.1) WRITE (LODEV,1901)  I,JJJ
C     PRINT ARGUMENT SYNTAX
 1078 CONTINUE
      DO 1080   L=1,3
      IO(L) = VOCTBL(L,VOCNUM)
```

```
 1080 CONTINUE
      WRITE (LODEV,1904) IO
C
C     CHECK FOR SPECIAL CASES
C
 1081 CONTINUE
      IF (CODE.NE.6)  GO TO 1085
C     SEARCH FOR BLOCK # TO PRINT
 1082 CONTINUE
      CODE = 0
      JJ = JJJ+ICS
      JJ = CHNWRK(JJ)/256
S     AND   162
S     STA   JJ
      WRITE (LODEV,1908)  JJ
      GO TO 3000
 1085 CONTINUE
      IF (VOCNUM.NE.ISEC) GO TO 1090
C     SECONDS ARE STORED AS INTEGER TENTHS OF SECONDS.BUT PRINT AS REAL
      REAL = JJJ
      REAL = REAL/10.0
      WRITE (LODEV,1905)  REAL
      IF (TYPE.NE.IDELAY)  GO TO 3000
      I = I+3
      J = J+3
      GO TO 3000
 1090 CONTINUE
      IF (VOCNUM.NE.IARGR) GO TO  1095
C     ARGR'S ARE TO BE PRINTED IN REAL FORMAT ALSO
      IREAL(1) = JJJ
      J = J+1
      IREAL(2) = BLKWRK(J)
      WRITE (LODEV,1906)  REAL
      GO TO  3000
 1095 CONTINUE
      IF (ITRG.EQ.1) GO TO 2001
C
C
 1901 FORMAT ('+  ',Z3,'   ',Z4)
 1902 FORMAT ('+ ',I3,'  ',4A2/' ')
 1903 FORMAT (' ')
 1904 FORMAT ('+          ',3A2,' = ')
 1905 FORMAT ('+ ',F6.1)
 1906 FORMAT ('+ ',G14.4)
 1907 FORMAT ('+ ',4A2)
```

```
 1908 FORMAT ('+ ',I5)
 1909 FORMAT ('+ (',I1,')')
C      GO TO SYMBOL TABLE FOR ASCII REP OF ARG
 2000 CONTINUE
       IF (CODE.NE.0)  GO TO 2005
       WRITE (LODEV,1908)  JJJ
       GO TO 3030
 2005 CONTINUE
       JJ = BLKWRK(J)
 2001 CALL RDSYMB (2,JJ,IOBUF,CODE,KK)
       WRITE (LODEV,1907)  IOBUF
C      CHECK IF LOGICAL VALUE DESIRED
       IF (CODE.NE.01.OR.IDVFLG.EQ.0)  GO TO 3000
C      PRINT CURRENT LOGICAL VALUE OF BIT
       KK = BLKWRK(J)
C      CHECK ONLY BITS IN THIS MACHINE
S      LDA    KMASK
S      ZJP    )2100
S      AND    KK
S      ZJP    )3000
S      LDA    KK
S      EOR    KMASK
S      STA    KK
 2100 CONTINUE
       KK = CHKLOG(KK)
       IF (KK.EQ.0)  GO TO 2300
C      SET RETURN FROM B:CHK
       KK = 1
C      PRINT BIT VALUE (0) OR (1)
 2300 CONTINUE
       WRITE (LODEV,1909) KK
C      CHECK IF LOOP REQUIRED
 3000 CONTINUE
       WRITE (LODEV,1903)
 3010 CONTINUE
       IF (VOCNUM.EQ.ITRIG) GO TO 14
       J = J+1
       I = I+1
       IF (RPTFLG.EQ.0) GO TO 14
       KKK = KKK-1
       IF (KKK.NE.0)  GO TO  1070
       GO TO 14
C
 9999 CONTINUE
S      LDA    192
S      ZJP    $+3
```

```
S      LDB   1,B
S      JMP   *4,B
       RETURN
       END
```

10. LOGMOD - Logic expression compiler

```
CJOB AW776,05 D. F. FURGERSON       USINOR 6 STAND COLD MILL
C
C      DATE:  2/1/72     REVISION LEVEL  9
C
C     BOOLEAN (LOGICAL) EXPRESSION MINI-COMPILER
C
C
C           THIS PROGRAM PROCESSES FORTRAN LOGICAL ASSIGNMENT STATEMENTS
C     AND TRANSLATES THIS INPUT STRING TO AN INTERNAL CODE REPRESENTATION
C     SIMILAR TO '3-ADDRESS' CODE.
C
C           INPUT IS THROUGH THE PROGRAMMER'S CONSOLE KEYBOARD. THE
C     INPUT CHARACTERS ARE INPUT ONE AT A TIME, AND COMPLETE SYNTACTIC
C     ELEMENTS (VARIABLES,OPERATORS,ETC.) ARE CONVERTED TO A NUMERIC
C     CODE AND STORED IN AN INTERMEDIATE BUFFER.
C
C           THE INTERMEDIATE BUFFER IS THEN PROCESSED AS A SERIES OF
C     PARENTHESIZED NESTS, INNERMOST NESTS ARE PROCESSED FIRST.
C
C           EACH NEST IS PROCESSED FOR LOGICAL OPERATORS, LEGAL OPERATORS
C     ARE PROCESSED IN THE FOLLOWING ORDER: .NOT. .AND. .OR. .EOR.
C
C           WHEN PROCESSING IS COMPLETE, TWO OUTPUT BUFFERS EXITS.
C     ONE BUFFER (ADBUF) CONTAINS THE ACTUAL CORE ADDRESS OF EACH
C     NON-TEMPORARY LOGICAL VARIABLE PROCESSED. ANOTHER BUFFER(OPBUF)
C     CONTAINS MODIFIED '3-ADDRESS CODE' COMMANDS COMPOSED OF PACKED
C     WORDS (16 BITS) AS FOLLOWS:  (ASSUME INPUT FORM: R = A OP B)
C
C           BITS  0-4   RELATIVE ADDRESS OF LEFT  HAND OPERAND  A
C           BITS  5-9   RELATIVE ADDRESS OF RIGHT HAND OPERAND  B
C           BITS 10-13  RELATIVE ADDRESS OF TEMPORARY RESULT    R
C           BITS 14-15  CODE NUMBER FOR LOGICAL OPERATION       OP
C
C
C
C           THE PROGRAM IS BROKEN DOWN INTO SIX DISTINCT SECTIONS:
C
C      STATEMENT #    100-199    *   INITIALIZATION
```

```
C      STATEMENT #    200-299    =   READ IN INPUT CHARACTERS
C      STATEMENT #    300-399    =   CHECK INPUT SYMBOL VALIDITY
C      STATEMENT #    400-499    =   CHECK SYNTAX AND LOCATE PAREN NESTS
C      STATEMENT #    500-599    =   SCAN AND PROCESS PAREN NESTS
C      STATEMENT #    900-999    =   OUTPUT ERROR DIAGNOSTICS
C
C
C            ERROR DIAGNOSTICS
C
C                        RECOVERABLE ERRORS
C      ERR   5     SYMBOLIC INPUT GREATER THAN 8 CHARACTERS
C      ERR   6     LOGICAL OPERATOR PRIOR TO ASSIGNMENT STATEMENT
C      ERR   7     INCORRECT USE OF UNARY OPERATOR .NOT.
C      ERR   8     INCORRECT USE OF BINARY OPERATOR .AND. .OR. .EOR.
C      ERR   9     INCORRECT USE OF SYMBOLIC LOGICAL VARIABLE
C      ERR  10     UNDEFINABLE IMPLICIT LOGICAL VARIABLE
C      ERR  11     LOGICAL VARIABLE NOT IN SYMBOL TABLE
C      ERR  12     TOO MANY RIGHT PARENTHESES
C      ERR  13     MORE THAN 16 LOGICAL VARIABLES INPUT
C      ERR  14     IMPROPER TERMINATION OF INPUT STRING
C      ERR  15     INCORRECT USE OF LEFT PARENTHESIS
C                        FATAL ERRORS
C      ERR  17     INTERMEDIATE BUFFER LENGTH EXCEEDED
C      ERR  18     INTERNAL BRANCHING ERROR
C      ERR  19     MORE THAN 8 PARENTHESIZED NESTS
C      ERR  20     MORE THAN 16 INTERNAL TEMPORARIES NEEDED
C      ERR  21     LEFT-HAND OPERAND NOT LOCATED
C      ERR  22     RIGHT-HAND OPERAND NOT LOCATED
C      ERR  23     MORE THAN 32 PACKED COMMANDS PROCESSED
C
C
C
       SUBROUTINE LOGMOD
C
C
C
C
C
       COMMON /BUFKOM/BLKWRK(35),INBUFF(8),NUMTRG,TRIGBF(7),CHNWRK(256)
       COMMON /FCKOM/PCIN,PCOUT,LODEV,SIDEV,BODEV,BIDEV,
     X        PSTART,PLAST,DSTART,DLAST,CSTART,CLAST,
     X         CHNLEN,BLKLEN,BLKNUM,TYPNUM,KEY,ARGPTR,ARG,TEMP,
     X        HEXTBL(16),COMTBL(36),SUBADL(36),SPCTBL(12),
     X        ARGTBL(4,2),ALGTBL(4,16),ALGSUB(16),ALGLEN(16),
     X        VOCTBL(3,20),VOCKEY(36),BYTPTR
```

```
C
C
      INTEGER PCIN,PCOUT,LODEV,SIDEV,BODEV,BIDEV,
     X        PSTART,PLAST,DSTART,DLAST,CSTART,CLAST,
     X        CHNLEN,BLKLEN,BLKNUM,TYPNUM,ARGPTR,ARG,TEMP,
     X        HEXTBL,COMTBL,SUBADL,SPCTBL,
     X        ARGTBL,ALGTBL,ALGSUB,ALGLEN,
     X        BLKWRK,CHNWRK,TRIGBF,
     X        VOCTBL,VOCKEY,BYTPTR
C
C
C     ****                  END  COMMON  DECK          ****
C
C
      INTEGER ADNUM,ADBUF(16),OPNUM,OPBUF(16)
      EQUIVALENCE (BLKWRK(02),ADNUM),(BLKWRK(03),ADBUF(1))
      EQUIVALENCE (BLKWRK(19),OPNUM),(BLKWRK(20),OPBUF(1))
C
C
C
C
C
C
      DIMENSION SYMBUF(8),INBUF(128),NSTLVL(8)
      DIMENSION NSTPTR(8),ONEBUF(4),TWOBUF(4),THREBUF(4)
C
C
C
      INTEGER SYMBUF,INBUF,NSTLVL,TWOBUF,THREBUF,SYMPTR,NSTCTR
      INTEGER EQPT,STPT,TMPBZY,ECKS,DIAGNUM,LEFT,RITE,RESULT
      INTEGER ONEBUF,OP,OPVAL,OPCOMP
      INTEGER SUBR,STATE,DIAG
      INTEGER SCLD8,SCRS8
C
      EQUIVALENCE (DIAGNUM,DIAG)
C
C
C
C     DATA ONEBUF / N , A , O , E /
C     DATA TWOBUF / O , N , R , O /
C     DATA THREBUF/ T , D ,   , R /
      DATA ONEBUF / 78,65,207,197/
      DATA TWOBUF /207, 78,210,207/
      DATA THREBUF/212, 68, 00,210/
      DATA  SCLD8,SCRS8/$A008,$6008/
```

```
      DATA ECKS   /216/
C
C
C
C     HOLLERITH     TO   ASCII   TO    INTERNAL  CODE
C
C                        HEX  DEC        HEX   DEC
C      SPACE              AD  160         20    32
C        .                2E   46         --    --
C        (                28   40         25    37
C        )                A9  169         26    38
C        =                BD  189         27    39
C        !                21   33         28    40
C        /                AF  175         --    --
C       NOT               --   --         21    33
C      AND                --   --         22    34
C      OR                 --   --         23    35
C      EOR                --   --         24    36
C       X                 D8  216         --    --
C
C       -- =  NOT REPRESENTED IN THIS FORM
C
C
C
C
C
C
C
C     REQUEST INPUT OF LOGICAL EXPRESSION
C
 20   WRITE (PCOUT,21)
   21 FORMAT ('  EXP =  ')
C
C     INITIALIZE INTERNAL BUFFERS AND LOCATIONS
C
C
C
 100  DO 140  I=1,128
      INBUF(I) = 0
 110  IF (I.GT.32) GO TO 140
      OPBUF(I) = 0
 120  IF (I.GT.16) GO TO 140
      ADBUF(I) = 0
      TMPBZY = 16
 130  IF (I.GT.8) GO TO 140
```

```
        SYMBUF(I) =0
        NSTLVL(I) = 0
        NSTPTR(I) =0
  140   CONTINUE
C
C
 150    CONTINUE
        SYMPTR = 1
        ADNUM  = 1
        NSTCTR = 1
        NSTIND = 1
        INUM   = 1
        OPNUM  = 1
C
 160    CONTINUE
        LEFT   = 0
        RITE   = 0
        OP     = 0
        RESULT = 0
        INVAL  = 0
        OPVAL  = 0
        NLPAR  = 0
        NRPAR  = 0
C
C
C
C       READ IN ONE CHARACTER AND PROCESS IT
C
  200   CONTINUE
C
C       READ IN ONE CHARCTER
C
  205   CALL RDCHR (INCHR,I)
        CALL INTERP
C
C       CHECK TYPE OF CHARACTER JUST INPUT
C
        IF (I)  220,225,220
C
C                 ;   ,   .   =   (   )   *   -   /   + SPACE C.R.
  220   GO TO  (250,205,240,300,250,250,230,205,997,205,205,205), I
C
C       INPUT IS SYMBOLIC CHARACTER
C
  225   SYMBUF(SYMPTR) = INCHR
```

```
         SYMPTR = SYMPTR+1
         IF (SYMPTR.LE.8) GO TO 205
         DIAGNUM = 5
         GO TO 900
C
C        INPUT IS BACKSPACE
C
   230   SYMPTR = SYMPTR-1
         GO TO 205
C
C        CHARACTER IS A PERIOD - IS IT LEADING OR TRAILING ?
C
   240   IF (SYMPTR)  205,205,300
C
C        PROCESS SYMBOLIC INPUT IF IT EXISTS
C
   250   IF (SYMPTR)  400,400,300
C
C
C
C        OMPLETE SYMBOL HAS BEEN INPUT - PROCESS IT
C
C        IS INPUT A SYMBOLIC OPERATOR
C
   300   DO 320  J=1,4
   310   IF (SYMBUF(1).EQ.ONEBUF(J).AND.SYMBUF(2).EQ.TWOBUF(J).AND.
        1    SYMBUF(3).EQ.THREBUF(J).AND.SYMPTR.LE.4)  GO TO 330
         CALL INTERP
   320   CONTINUE
         GO TO  345
C
C        OUTPUT IS AN OPERATOR  (.NOT. .AND. .OR. .EOR.)
C
   330   IF (STATE) 332,332,335
   332   DIAGNUM = 6
         GO TO 900
C
C        IN STATE 2 ONLY .AND.OR..EOR. ARE LEGAL
C
   335   IF (STATE.NE.2.AND.J.NE.1) GO TO 340
         DIAGNUM = 7
         GO TO 900
C
C        IN STATE 1 ONLY .NOT. IS A LEGAL OP
```

```
C
 340  IF (STATE.NE.1.AND.J.EQ.1) GO TO 350
      DIAGNUM = 8
      GO TO 900
C
C     OUTPUT IS NOT AN OPERATOR - IF IN STATE 2 THIS IS AN ERROR
C
 345  IF (STATE.NE.2) GO TO 355
      DIAGNUM = 9
      GO TO 900
C
 350  OPVAL = J+32
      GO TO 400
C
C     OUTPUT IS LOGICAL SYMBOL - PROCESS IT
C
 355  IF (SYMBUF(1).EQ.ECKS.AND.SYMPTR.EQ.6)  GO TO 365
C
C     SYMBOL IS NOT IMPLICITY DEFINED - SEARCH SYMBOL TABLE
C
C
      CALL SYMTBL (SYMBUF,INVAL)
C
      IF (INVAL.EQ.-1)  GO TO 398
C
      GO TO 370
C
C     INPUT IS IMPLICITY DEFINED - DECODE IT
C
 365  DO  369  K=2,5
      DO  368  L=1,16
C
C     DO TABLE LOOK UP FOR CONVERSION
C
 366  IF(SYMBUF(K).NE.HEXTBL(L)) GO TO 368
      INVAL = INVAL*16+L
      GO TO 369
 368  CONTINUE
      DIAGNUM = 10
      GO TO 900
C
 369  CONTINUE
C
C     SEE IF THIS SYMBOL HAS BEEN USED PREVIOUSLY
C
 370  DO 380  M=1,ADNUM
```

```
375  IF (INVAL.EQ.ADBUF(M))  GO TO 385
380  CONTINUE
     INVAL = ADNUM
     ADNUM = ADNUM + 1
     IF (ADNUM.LE.16)  GO TO 390
     DIAGNUM = 13
     GO TO 900
C
C    SYMBOL WAS USED BEFORE
C
385  INVAL = M
C
390  INBUF(INUM) = INVAL
     INUM = INUM+1
     IF (INUM.LE.128) GO TO 375
     DIAGNUM = 17
     GO TO 900
395  GO TO 400
398  DIAGNUM = 11
     GO TO 900
C
C
C
C
C                 ;    ,    .    =    (    )    *    -    /    +  SPACE C.R.
400  GO TO  (460,410,430,420,440,450),I
C
410  DIAGNUM = 18
     GO TO 900
C
C    INPUT CHARACTER WAS ASSIGNMENT OPERATOR
C
420  STATE = 1
422  EQPT = INUM
     INVAL = 39
     GO TO 470
C
C    INPUT CHARACTER IS A TRAILING PERIOD
C
430  IF (STATE.EQ.1.AND.OPVAL.NE.33) GO TO 432
     STATE = 3-STATE
432  IF (OPVAL)  490,490,434
C
434  INVAL = OPVAL
```

```
      OPVAL = 0
      GO TO 470
C
C     INPUT IS LEFT PARENTHESIS
C
 440  IF (STATE.EQ.1) GO TO 444
      DIAGNUM = 15
      GO TO 900
 444  IF (NSTIND.LE.8) GO TO 445
      DIAGNUM = 19
      GO TO 900
C
 445  NSTCTR = NSTCTR+1
      NSTLVL(NSTIND) = NSTCTR
      NSTPTR(NSTIND) = INUM
 447  NLPAR = NLPAR+1
      INVAL = 37
      GO TO 470
C
C     INPUT IS RIGHT PARENTHESIS
C
 450  NRPAR = NRPAR+1
      IF (NRPAR.LE.NLPAR) GO TO 452
      DIAGNUM = 12
      GO TO 900
C
C     TERMINATE THIS NEST
C
 452  NSTCTR = NSTCTR-1
      INVAL = 38
      STATE = 2
      GO TO 470
C
C     INPUT IS TERMINATOR
C
 460  INVAL = 40
      IF (STATE.EQ.2.AND.NLPAR.EQ.NRPAR)  GO TO 470
 465  DIAGNUM = 14
      GO TO 900
C
 470  INBUF(INUM) = INVAL
      INUM = INUM + 1
      IF (INUM.LE.128) GO TO 490
      DIAGNUM = 17
```

```
      GO TO 900
C
 490  DO 492  I=1,8
 491  SYMBUF(I) = 0
 492  CONTINUE
 494  SYMPTR = 1
      INVAL = 0
      OPVAL = 0
C
      IF (INBUF(INUM-1).EQ.40) GO TO 500
      GO TO 205
C
C
C
C     INPUT IS COMPLETE - START PROCESSING INTERVAL BUFFER
C
C     FIND DEEPEST PARENTHESIZED NEST
C
 500  DO 508  M=1,8
      CALL INTERP
      J = 9-M
 505  DO 508  I=1,8
      IF (NSTLVL(I).EQ.J) GO TO 520
 508  CONTINUE
C
C     ALL NESTS HAVE BEEN PROCESSED OR THER WERE NO NESTS
C
 510  STPT = EQPT + 1
      GO TO 528
C
C     FOUND VALID NEST LEVEL - PROCESS IT
C
 520  NSTLVL(I) = 0
      STPT = NSTPTR(I) + 1
C     START SEARCH AT LEFT OR NEST AND LOWEST OP
 525  OPCOMP = 33
 528  I = STPT
C
C     SEARCH FOR SPECIAL CHARACTERS
C
 530  INVAL = INBUF(I)
 532  IF (INVAL.GT.36) GO TO 540
 534  IF (INVAL.LT.33)  GO TO 538
 536  IF (INVAL.EQ.OPCOMP) GO TO 550
```

```
538  I = I+1
     GO TO 530
C
C    HAVE ALL POSSIBLE OPERATORS BEEN PROCESSED
C
540  OPCOMP = OPCOMP+1
     IF (OPCOMP.LT.37) GO TO 528
     IF (INVAL.EQ.40) GO TO 600
C
C    REMOVE PARENTHESES FROM NEST JUST PROCESSED
C
     INBUF(I) = 32
     INBUF(STPT-1) = 32
     GO TO 505
C
C
C    FOUND A VALID OPERATOR  -  PROCESS IT
C
550  CONTINUE
     IF(TMPBZY.LE.32) GO TO 556
     DIAGNUM=20
     GO TO 900
C
C    FOUND A TEMPORARY NOT BUSY
C
556  INBUF(I) = TMPBZY
     RESULT = TMPBZY-16
     TMPBZY = TMPBZY+1
C
558  OP = INVAL - 33
     IF (INVAL .EQ.33) GO TO 570
C
C    LEFT SEARCH FOR OPERAND
C
560  N = I+1
     DO 562  M=STPT,N
     K=I-M
     INVAL = INBUF(K)
     IF(INVAL.LT.32) GO TO 565
562  CONTINUE
     DIAGNUM = 21
     GO TO 900
C
C    FOUND VALID LEFT OPERAND
```

```
C
  565 LEFT = INVAL
      INBUF(K) = 32
C
C     RIGHT SEARCH FOR OPERAND
C
  570 K = I+1
  571 INVAL = INBUF(K)
      IF (INVAL.LT.32) GO TO 575
  572 IF (INVAL.GT.32) GO TO 573
      K=K+1
      GO TO 571
  573 DIAGNUM = 22
      GO TO 900
C
C     FOUND VALID RIGHT OPERAND
C
  575 RITE = INVAL
      INBUF(K) = 32
C
C     BOTH OPERANDS FOUND - PACK THEM IN COMMAND WORD
C
  580 OPBUF(OPNUM) = LEFT*2048+RITE*64+RESULT*4+OP
      CALL INTERP
      OPNUM = OPNUM+1
      IF (OPNUM.LE.32) GO TO 530
      DIAGNUM = 23
      GO TO 900
C
C
C     PASK ADDRESSES AND OPERATIONS
C
  600 J = 16-ADNUM
      IF (J.EQ.0) GO TO 999
      K = ADNUM+1
      ADBUF(K)=OPNUM
  650 DO  680  I=1,J
      L=ADNUM+I+1
      ADBUF(L)=OPBUF(I)
  680 CONTINUE
      GO TO 999
C
C
C
```

```
C      OUTPUT ERROR DIAGNOSTIC
C
C
 900   CALL ERRMSG (DIAGNUM)
C
       IF (DIAGNUM.LE.16) GO TO 490
       GO TO 20
C
C
C
997    OPNUM = -1
       ADNUM = -1
       KEY = 0
C
C      EXIT FROM ROUTINE
C
 999   CONTINUE
       RETURN
       END
```

11. LOGDMP - Logic expression de-compiler

```
CJOB A0776,09 D. F. FURGERSON       USINOR 5 STAND COLD MILL
C
C      DATE: 6/1/72                 REVISION LEVEL: 1
C
C                LOGICAL  EXPRESSION  DECOMPILER
C
C                DONALD F. FURGERSON
C
       SUBROUTINE LOGDMP
C
C      ****************************************************************
C
C
       COMMON /BUFKOM/BLKWRK(35),INBUF(8),NUMTRG,TRIGBF(7),CHNWRK(256)
       COMMON /FCKOM/PCIN,PCOUT,LODEV,SIDEV,BODEV,BIDEV,
      X        PSTART,PLAST,DSTART,DLAST,CSTART,CLAST,
      X         CHNLEN,BLKLEN,BLKNUM,TYPNUM,KEY,ARGPTR,ARG,TEMP,
      X        HEXTBL(16),COMTBL(36),SUBADL(36),SPCTBL(12),
      X        ARGTBL(4,2),ALGTBL(4,16),ALGSUB(16),ALGLEN(16),
      X        VOCTBL(3,20),VOCKLY(36),BYTPTR
C
```

```
      INTEGER PCIN,PCOUT,LODEV,SIDEV,BODEV,BIDEV,
     X        PSTART,PLAST,DSTART,DLAST,CSTART,CLAST,
     X        CHNLEN,BLKLEN,BLKNUM,TYPNUM,ARGPTR,ARG,TEMP,
     X        HEXTBL,COMTBL,SUBADL,SPCTBL,
     X        ARGTBL,ALGTBL,ALGSUB,ALGLEN,
     X        BLKWRK,CHNWRK,TRIGBF,
     X        VOCTBL,VOCKEY,BYTPTR
C
C     ******************************************************************
C
      INTEGER TBUF(16,3),A,B,DLC5,DLC4,DLC2,T,OP,AOB(3),OUTBUF(64)
      INTEGER SPEQ,SPSP, OPDEF(3,4),CHRBUF(4),SAVE,SAVBUF(16,2),DV,CR
C
      EQUIVALENCE (AOB(1),A),(AOB(2),OP),(AOB(3),B)
C
      DATA  OPDEF/'.N','OT','. ','.A','ND','. ','.O','R.','  ',
     X            '.E','OR','. '/
      DATA  CR/$8D/
      DATA  DLC5,DLC4,DLC2/$A005,$A004,$A002/
      DATA  ISET,IRESET/'/1','/0'/
      DATA SPEQ,SPSP/' =',' '/
C
C
C
C     LOAD OUTPUT BUFFER WITH CARRIAGE RETURNS
      DO 5  I=8,64
      OUTBUF(I) = CR
    5 CONTINUE
C     FIND FIRST OPERATION
      SAVE = 1
      OUTBUF(5) = SPSP
      OUTBUF(6) = SPEQ
      OUTBUF(7) = SPSP
   20 NADR = BLKWRK(2)
      J = NADR+3
      NOPS = BLKWRK(J)
   30 DO 39  I=1,NOPS
C     DECODE OPERATION WORD
      K = J+I
      L = BLKWRK(K)
S     STA   4
S     LDG   DLC5
S     SHF   4
S     STE   A
S     STZ   4
```

```
S       SHF   4
S       STE   B
S       LDG   DLC4
S       STZ   4
S       SHF   4
S       STE   T
S       LDG   DLC2
S       STZ   4
S       SHF   4
S       STE   OP
C       STORE IN TEMPORARY BUFFER
        DO 35 I=1,3
        TBUF(T+1,I) = AOB(I)
   35   CONTINUE
   39   CONTINUE
C       BUILD UP OUTPUT STRING WITH PROPER ASCII CHARACTERS
   40   CONTINUE
        N=8
        K = T+1
   41   DO 45 II=1,3
  410   L = TBUF(K,II)
        IF (II.NE.2) GO TO 43
C       TRANSFER OF OPERATIONS  .NOT. .AND. .OR. .EOR.
        DO 42 III=1,3
        NN = N+III-1
        OUTBUF(N) = OPDEF(III,L+1)
   42   CONTINUE
        N=N+3
        GO TO 45
C       TRANSFER OF ADDRESS OR TEMPORARIES
   43   CONTINUE
        IF (L.GE.16) GO TO 46
C       ADDRESS IS NOT A TEMPORARY - GET ASCII FROM SYMBOL TABLE
        LL = BLKWRK(L+3)
        CALL RDSYMB (2,LL,CHRBUF,KK)
C       CHECK LOGICAL STATUS IF REQUESTED
        IF (DV.EQ.0)  GO TO 45
        LL = CHKLOG(LL)
        IF (LL.EQ.0)  GO TO 440
        LL = ISET
        GO TO 441
  440   LL = IRESET
  441   OUTBUF(5) = LL
        N = N+1
C
```

```
        DO 44 III=1,4
        NN = N+III-1
        OUTBUF(NN) = CHRBUF(III)
   44   CONTINUE
        N = N+4
   45   CONTINUE
        GO TO 48
C       ADDRESS IS A TEMPORY - FETCH PROPER ITEM FROM TBUF AND DECODE IT
   46   CONTINUE
S       LDA   L
S       AND   166
S       STA   L
C       SAVE CURRENT TBUF POINTERS IN A SAVE STACK   (K AND II)
        SAVBUF(SAVE,1) = K
        SAVBUF(SAVE,2) = II
        SAVE = SAVE+1
        K = L
        GO TO 41
C
C       ENDO F A TEMPORARY - CHECK SAVE STACK
   48   CONTINUE
        IF (SAVE.EQ.1) GO TO 49
C       POP SAVE STACK TO GO BACK TO LAST TEMPORARY
        SAVE = SAVE-1
        K = SAVBUF(SAVE,1)
        II= SAVBUF(SAVE,2)
        GO TO 410
   49   CONTINUE
C       EVERYTHING COMPLETE TO RIGHT OF EQUAL SIGN - SET UP LEFT SIDE
   50   CONTINUE
        LL = BLKWRK(3)
        CALL RDSYMB (2,LL,CHRBUF,KK)
        DO 55 I=1,4
        NN = N+I-1
        OUTBUF(NN) = CHRBUF(I)
   55   CONTINUE
C       CHECK FOR 'DUMP VALUE' OPTION
        IF (DV.EQ.0) GO TO 60
        LL = CHKLOG(LL)
        IF (LL.EQ.0) GO TO 56
        LL = ISET
        GO TO 58
   56   LL = IRESET
   58   OUTBUF(5) = LL
C       PRINT RESULTS
```

```
  60   WRITE (LODEV,100) OUTBUF
   100 FORMAT ('+        ',64A2)
C
C      IF NOT RUN AS TASK LVL ZERO, GO TO SUBLEVEL EXIT
S      LDA   192
S      ZJP   $+3
S      LDB   1,B
S      JMP   *4,B
       RETURN
       END
```

12. INSERT - Chain insert subroutine

```
CJOB H0776.09 D. F. FURGERSON         USINOR 5 STAND COLD MILL
C
C      DATE:  6/4/72                  REVISION LEVEL:  12
C
C      CHAIN INSERT SUBROUTINE
C
C
C         THIS SUBROUTINE INSERTS THE NEW BLOCK RESIDING IN THE WORKING
C      BLOCK AREA (BLKWRK) INTO THE CHAIN CURRENTLY RESIDING IN THE
C      WORKING CHAIN AREA (CHNWRK), BETWEEN THE BLOCK NUMBERS DESIGNATED
C      AS FSTBLK AND LSTBLK RESPECTIVELY
C
C
C      ERROR DIAGNOSTICS
C
C      ERR  210    CANNOT LOCATE BLOCK # IN CURRENT CHAIN
C      ERR  211    MODIFIED CHAIN EXCEEDS MAXIMUM LENGTH
C
C
       SUBROUTINE INSERT
C
C      SUBROUTINES CALLED:  INTERP,SAT:,REF:,ARF:,NDF:
C
C
C      *****************************************************************
C
C
       COMMON /BLKKOM/BLKBUF(3)
       COMMON /BUFKOM/BLKWRK(35),INBUF(8),NUMTRG,TRIGBF(7),CHNWRK(350)
       COMMON /FCKOM/PCIN,PCOUT,LODEV,SIDEV,BODEV,BIDEV,
     X        PSTART,PLAST,DSTART,DLAST,CSTART,CLAST,
     X         CHNLEN,BLKLEN,BLKNUM,TYPNUM,KEY,ARGPTR,ARG,TEMP,
```

```
     X       HEXTBL(16),COMTBL(36),SUBADL(36),SPCTBL(12),
     X       ARGTBL(4,2),ALGTBL(4,16),ALGSUB(16),ALGLEN(16),
     X       VOCTBL(3,20),VOCKEY(36),BYTPTR
C
      INTEGER PCIN,PCOUT,LODEV,SIDEV,BODEV,BIDEV,
     X        PSTART,PLAST,DSTART,DLAST,CSTART,CLAST,
     X        CHNLEN,BLKLEN,BLKNUM,TYPNUM,ARGPTR,ARG,TEMP,
     X        HEXTBL,COMTBL,SUBADL,SPCTBL,
     X        ARGTBL,ALGTBL,ALGSUB,ALGLEN,
     X        BLKWRK,CHNWRK,TRIGBF,
     X       VOCTBL,VOCKEY,BYTPTR
      INTEGER BLKBUF
C
C     ****                 END  COMMON  DECK          ****
C
C     ******************************************************************
C
      INTEGER FSTBLK,LSTBLK,START,END,TYPE,BLOK,ERROR
      INTEGER SCLD8,SCRS8
      INTEGER HI1
C
      DATA ITSTBR,IGOTO,IPERM/8,12,13/
      DATA  SCLD8,SCRS8/$A008,36008/
      DATA  IFS/1/
      DATA  ICS/3/
      DATA  HI1/$FE00/
      DATA  MAXSIZ/350/
      DATA  KX01FF/$01FF/
C
C
C     INITIALIZE
C
  100 START = 0
      END = 0
      ARG = 0
      M = 0
      II = 0
      FSTBLK = ARGTBL(1,1)
      LSTBLK = ARGTBL(1,2)
C
      ICL = CHNWRK(IFS)
S     AND   KX01FF
S     STA   ICL
C
C
C     SEARCH FOR AREA WHERE NEW BLOCK WILL BE INSERTED
```

```
C
 200  CONTINUE
      J = ICS
C
C     CHECK FOR END OF CHAIN AREA   (ERROR 2)
C
 205  I = CHNLEN+M
      IF (J.LE.I) GO TO 208
C
C     CANNOT LOCATE BLOCK  #
C
 206  CALL ERRMSG (210)
      ARG = 1
      GO TO 999
C
 208  BLOK = CHNWRK(J)
C
C     DIVIDE MODULE HEADER INTO BLOK# AND MODULE TYPE#  (8-8)
C
S     STZ   4
S     LDG   SCLD8
S     SHF   4
S     LDG   SCRS8
S     SHF   5
S     STA   TYPE
S     SUB   162
S     ZJP   $+4
S     LDA   TYPE
S     AND   166
S     STA   TYPE
S     STE   BLOK
C
C
C
      CALL INTERP
 210  K = TYPE+1
      IF (TYPE.EQ.255) K=3
      IF (II.NE.0)  GO TO  510
C
C     CHECK FOR START OF INSERTION AREA
C
C
C     FSTBLK IS STARTING BLOCK TO BE REPLACED
C
C
```

```
       IF (FSTBLK.EQ.BLOK)  START = J
C
       IF (LSTBLK.EQ.BLOK)  END = J
C
C      GET LENGTH OF THIS BLOCK AND ADD TO INDEX J
C
  220  CONTINUE
       DO 221 I=1,3
       IF (BLKBUF(I).EQ.BLOK)  BLKBUF(I) = J-ICS
  221  CONTINUE
       IF (ALGLEN(K).GE.0)  GO TO 230
C
C      VARIABLE LENGTH ALGORITHM CALCULATION
C
       CALL VARLEN (J,TYPE,L)
       J = J+L
       GO TO 240
C
  230  J = J + ALGLEN(K)
C
C
  240  CONTINUE
C
       CALL INTERP
       IF (TYPE.NE.255)  GO TO 205
C
C
C      MOVE TAIL END OF CHAIN 'M' LOCATIONS
C
  300  IF (END.EQ.0.OR.START.EQ.0)  GO TO 206
       M = START+BLKLEN-END
  302  N = CHNLEN-END+1
       CALL INTERP
C
C
       DO 350 I=1,N
C
       J = END+I-1
C
       IF (M)  320,400,310
C
  310  K = CHNLEN + M
       IF (K.LT.MAXSIZ)  GO TO  315
C      ERR 211- CHAIN SIZE EXCEEDS MAX ALLOWABLE
       CALL ERRMSG (211)
```

```
      ARG = 1
      GO TO  999
C
 315  J = CHNLEN-I+1
 320  K = J+M
C
      CHNWRK(K) = CHNWRK(J)
C
 350  CONTINUE
C
C     MOVE NEW BLOCK INTO CHAIN WORKING AREA
C
 400  J = START
      IF (BLKLEN.EQ.0)  GO TO  500
      DO 450   I=1,BLKLEN
      CHNWRK(J) = BLKWRK(I)
      J = J+1
 450  CONTINUE
C
C
C     SEARCH ENTIRE CHAIN AND FIX UP THE RELATIVE REFERENCES IN
C     'TSTBRL' 'GOTO' 'PERM' ALL HAVE RELATIVE ARGS WHICH
C     MUST BE ADJUSTED ACCORDING TO THE CHANGE IN POSITION
C     IN THE CHAIN, IF THEIR REFERENCED POSITION DID IN FACT CHANGE.
C
 500  CONTINUE
      START = START-ICS
      IF (FSTBLK.EQ.LSTBLK)  START = START-1
      IF (ARGTBL(2,2).NE.0)  GO TO  570
      II = 1
      GO TO  200
C
C
C     ADD DISPLACEMENT (M) TO ALL REFERENCES GREATER THAN INDEX J
C
 510  IF (TYPE.NE.ITSTBR) GO TO 520
      JJ = J+2
      KK = JJ+1
      GO TO  530
C
 520  IF (TYPE.NE.IGOTO)  GO TO  525
      JJ = J+1
      KK = JJ
      GO TO 530
```

```
  525  IF (TYPE.NE.IPERM)  GO TO 550
       CALL VARLEN (J,IPERM,JJ)
       JJ = J+JJ-1
       KK = JJ
C
 530   CONTINUE
       DO 540 II=JJ,KK
       LL = II-JJ+1
       IF (BLOK.EQ.BLKNUM)  CHNWRK(II) = BLKBUF(LL)
       IF (CHNWRK(II).GT.START)  CHNWRK(II) = CHNWRK(II) + M
       CALL INTERP
  540  CONTINUE
C
  550  IF (TYPE.NE.255)  GO TO  220
C
  570  CONTINUE
       J = CHNLEN
       CHNLEN = CHNLEN+M
C
       I = CHNWRK(IFS)
S      AND   HI1
S      ADD   CHNLEN,C
S      STA   I,B
       CHNWRK(IFS) = I
C
   997 I = CHNLEN+M
       WRITE (PCOUT,998) J,CHNLEN
   998 FORMAT ('   INSERT COMPLETE      OLD SIZE = ',I3,
     X         '    NEW SIZE = ',I3)
C
C
  999  CONTINUE
       CALL INTERP
       RETURN
       END
```

13. VARLEN - Variable length subruotine

```
CJCH H3776.09 D. F. FURGERSON       USINOR 5 STAND COLD MILL
C
C       DATE: 12/29/71          REVISION LEVEL:  7
C
C
        SUBROUTINE VARLEN (START,TYPE,LENGTH)
C
```

```
C      THIS SUBROUTINE SOLVES FOR THE LENGTH OF VARIABLE LENGTH
C      ALGORITHMS, GIVEN THE SUBSCRIPT TO FIND THE START OF THE
C      ALGORITHM IN THE CHAIN WORKING AREA (CHNWRK) (START), AND
C      AND THE ALGORITHM TYPE FROM ZERO TO FIFTEEN (TYPE).
C      THE CURRENT LENGTH IS RETURNED TO THE CALLER IN ARG 'LENGTH'.
C
C      ****************************************************************
C
       COMMON /BUFKOM/BLKWRK(35),INBUF(8),NUMTRG,TRIGBF(7),CHNWRK(256)
       COMMON /FCKOM/PCIN,PCOUT,LODEV,SIDEV,BODEV,BIDEV,
      X        PSTART,PLAST,DSTART,DLAST,CSTART,CLAST,
      X         CHNLEN,BLKLEN,BLKNUM,TYPNUM,KEY,ARGPTR,ARG,TEMP,
      X        HEXTBL(16),COMTBL(36),SUBADL(36),SPCTBL(12),
      X        ARGTBL(4,2),ALGTBL(4,16),ALGSUB(16),ALGLEN(16),
      X        VOCTBL(3,20),VOCKEY(36),BYTPTR
C
       INTEGER PCIN,PCOUT,LODEV,SIDEV,BODEV,BIDEV,
      X         PSTART,PLAST,DSTART,DLAST,CSTART,CLAST,
      X         CHNLEN,BLKLEN,BLKNUM,TYPNUM,ARGPTR,ARG,TEMP,
      X         HEXTBL,COMTBL,SUBADL,SPCTBL,
      X         ARGTBL,ALGTBL,ALGSUB,ALGLEN,
      X         BLKWRK,CHNWRK,TRIGBF,
      X         VOCTBL,VOCKEY,BYTPTR
C
C
C      ****                END  COMMON  DECK          ****
C
C      ****************************************************************
C
       INTEGER START,TYPE
       INTEGER DRC4,SRC12,IVAR(4)
       EQUIVALENCE (IRBS,IVAR(1)),(IFBS,IVAR(2)),(INVS,IVAR(3))
       EQUIVALENCE (IREAL,IVAR(4))
       DATA DRC4,SRC12/$E004,$600C/
C
C
C      DECODE VARIABLE ARGUMENT CONTROL WORD (GEN,1,3,4,4,4)
C
       I = START
       J = TYPE+1
       JJ = ALGLEN(J)
S      LDE   JJ
       DO 233 II=1,4
S      LDG   DRC4
S      STZ   6
```

```
S        SHF    4
S        LDG    SRC12
S        SHF    5
S        STA    KK
         IVAR(II) = KK
   233   CONTINUE
C
S        LDA    IREAL
S        EOR    179
S        STA    IREAL
C
C
C        SOLVE FOR TOTAL LENGTH OF VARIABLE ARGUMENT
C
         JJ = IFBS+I+1
         DO 234 II=1,INVS
         KK = CHN*RK(JJ)
         IF (II.EQ.IREAL) KK=KK+2
         JJ = JJ+KK+1
   234   CONTINUE
C
         JJ = JJ-1+IRBS
         LENGTH = JJ
         CALL INTERP
C
         RETURN
         END
```

14. SYMPAK - Pack ASCII symbol subroutine

```
CJOB H0776,09 D. F. FURGERSON       USINOR 5 STAND COLD MILL
C
C        DATE:  12/22/71                  REVISION LEVEL:  6
C
C        SUBROUTINE TO PACK ASCII BUFFER
C
C        CALLING SEQUENCE:      CALL SYMPAK      (NO ARGUMENTS)
C
C             THIS SUBROUTINE OPERATES ON THE 8 WORD ASCII BUFFER IN
C        COMMON (INBUF).. IT SHIFTS AND PACKS THE CHARACTERS INTO THE
C        UPPER 4 WORDS OF INBUF, AND ATTACHES TRAILING SPACES AS NEEDED.
C
C             IF THE INPUT CONDITION OF INBUF WAS ALL SPACES. THIS
C        CONDITION WILL BE CONVEYED TO THE USER BY SETTING LOCATION
```

```
C      ARG IN COMMON TO NON-ZERO. OTHERWISE ARG WILL BE ZERO. INDICATING
C      NORMAL PACKING OF VALID ASCII CHARACTERS.
C
C
       SUBROUTINE SYMPAK
C
C      ****************************************************************
C
C
       COMMON /BUFKOM/BLKWRK(35),INBUF(8),NUMTRG,TRIGBF(7),CHNWRK(256)
       COMMON /FCKOM/PCIN,PCOUT,LODEV,SIDEV,BODEV,BIDEV,
      X       PSTART,PLAST,DSTART,DLAST,CSTART,CLAST,
      X        CHNLEN,BLKLEN,BLKNUM,TYPNUM,KEY,ARGPTR,ARG,TEMP,
      X       HEXTBL(16),COMTBL(36),SUBADL(36),SPCTBL(12),
      X       ARGTBL(4,2),ALGTBL(4,16),ALGSUB(16),ALGLEN(16),
      X       VOCTBL(3,20),VOCKEY(36),BYTPTR
C
       INTEGER PCIN,PCOUT,LODEV,SIDEV,BODEV,BIDEV,
      X        PSTART,PLAST,DSTART,DLAST,CSTART,CLAST,
      X        CHNLEN,BLKLEN,BLKNUM,TYPNUM,ARGPTR,ARG,TEMP.
      X        HEXTBL,COMTBL,SUBADL,SPCTBL,
      X        ARGTBL,ALGTBL,ALGSUB,ALGLEN,
      X        BLKWRK,CHNWRK,TRIGBF,
      X        VOCTBL,VOCKEY,BYTPTR
C
C      ****                 END  COMMON  DECK          ****
C
C      ****************************************************************
C
       INTEGER SPACE
       DATA SPACE/$00A0/
       ARG =0
       DO 100 I=1,8
       IF(INBUF(1).NE.SPACE) GO TO 102
       INSAV= INBUF(1)
       DO 101 J=1,7
       INBUF(J)=INBUF(J+1)
  101  CONTINUE
       INBUF(8) = INSAV
  100  CONTINUE
C
C      CHARACTERS NOW LEFT JUSTIFIED - REPACK
C
  102  DO 103 K=1,4
       L =(K*2)-1
```

```
          INBUF(K)=(INBUF(L)*256)+INBUF(L+1)
  103     CONTINUE
          IF (I.EQ.9) ARG = 1
          RETURN
          END
```

15. RDSYMB - Read symbol via data link subroutine

```
CJOB H0776,09 D. F. FURGERSON       USINOR 5 STAND COLD MILL
C
C         DATE:  12/22/71                 REVISION LEVEL:  6
C
C
C         THIS ROUTINE CALLS EITHER SYMASC (TYPE=2) OR SYMHEX (TYPE=1) IN
C         THE DISC MACHINE, THEN WAITS UP TO TEN SECONDS FOR A RESPONSE.
C
          SUBROUTINE RDSYMB (TYPE,HEXADR,ASCBUF,CODE,ERRORS)
C
          INTEGER TYPE,HEXADR,ASCBUF,CODE,ERRORS,BUFFER(7),COUNT,SYMTRF
          INTEGER BUFADR
          DIMENSION ASCBUF(4),IASC(4)
          EQUIVALENCE (BUFFER(1),IHEX),(BUFFER(2),IASC(1)),(BUFFER(6),ICODE)
          EQUIVALENCE (BUFFER(7),BUFADR)
          DATA KEY,SYMTRF,COUNT/$5554,$1F98,10/
          DATA ISYMB/1/
C
C
C
          IHEX = HEXADR
          IF (TYPE.EQ.1) IHEX = 0
          DO 10 I=1,4
          IASC(I) = ASCBUF(I)
          IF (TYPE.EQ.2) IASC(I) = 0
  10      CONTINUE
          ICODE = CODE
C
C         CHECK IF SYMBOL TABLE IS IN THIS MACHINE  (0=YES,1=NO)
          IF (ISYMB)  999,20,30
  20      CONTINUE
          IF (TYPE.EQ.1)  CALL SYMHEX (IHEX,IASC,ICODE)
          IF (TYPE.EQ.2)  CALL SYMASC (IHEX,IASC,ICODE)
          GO TO 40
  30      CONTINUE
S         JMP   $+3
          CALL DUMMY(BUFFER)
```

```
S      LDA    $-1
S      ADD    1
S      STA    BUFADR
C
C
       ERRORS = 0
       CALL M:DLO (2,SYMTRF,KEY,BUFADR)
C
C      CHECK FOR RETURN OF RESULTS
C
       DO 100 I=1,10
       CALL M:TD(COUNT)
       IF (TYPE.EQ.1.AND.IHEX.NE.0) GO TO 900
       IF (TYPE.EQ.2.AND.IASC(1).NE.0) GO TO 900
 100   CONTINUE
       ERRORS = 1
C
 40    CONTINUE
C
C      RETURN VALUES TO CALLER
 900   CONTINUE
       HEXADR = IHEX
       DO 910 I=1,4
       ASCBUF(I) = IASC(I)
 910   CONTINUE
C
C
 999   CONTINUE
       RETURN
       END
```

16. RDCHR - Character input from programmer's console

```
CJOB A0776,09 D. F. FURGERSON       USINOR 5 STAND COLD MILL
C
C      DATE:  12/22/71              REVISION LEVEL:  6
C
C            CHARACTER INPUT SUBROUTINE
C
C            CALLING SEQUENCE:
C
C                  CALL RDCHR (ARG1,ARG2)
C
C      THIS SUBROUTINE READS ONE CHARACTER AND CHECKS TO SEE IF IT IS
```

```
C      A SPECIAL CHARACTER (I.E. IN SPECIAL CHARACTER TABLE).
C
C            IF CHARACTER IS A SPECIAL CHARACTER, THE SECOND ARGUMENT
C         WILL RECEIVE THE INDEX VALUE OF THE SPECIAL CHARACTER IN THE
C         SPECIAL CHARACTER TABLE.
C
C            IF CHARACTER IS NOT A SPECIAL CHARACTER. THE ASCII CODE
C         FOR THE CHARACTER WILL BE RETURNED TO THE CALLER AS ARGUMENT 1.
C
C
       SUBROUTINE RDCHR (INPUT,I)
C
C      SUBROUTINES CALLED:  INTERP,SAT:,REU:,ARU:,NDU:
C
C      *****************************************************************
C
C
       COMMON /BUFKOM/BLKWRK(35),INBUF(8),NUMTRG,TRIGBF(7),CHNWRK(256)
       COMMON /FCKOM/PCIN,PCOUT,LODEV,SIDEV,BODLV,BIDEV,
     X        PSTART,PLAST,DSTART,DLAST,CSTART,CLAST.
     X         CHNLEN,BLKLEN,BLKNUM,TYPNUM,KEY,ARGPTR,ARG,TEMP,
     X        HEXTBL(16),COMTBL(36),SUBADL(36),SPCTBL(12),
     X        ARGTBL(4,2),ALGTBL(4,16),ALGSUB(16),ALGLEN(16),
     X        VOCTBL(3,20),VOCKEY(36),BYTPTR
C
       INTEGER PCIN,PCOUT,LODEV,SIDEV,BODEV,BIDEV,
     X         PSTART,PLAST,DSTART,DLAST,CSTART,CLAST,
     X         CHNLEN,BLKLEN,BLKNUM,TYPNUM,ARGPTR,ARG,TEMP.
     X         HEXTBL,COMTBL,SUBADL,SPCTBL.
     X         ARGTBL,ALGTBL,ALGSUB,ALGLEN,
     X         BLKWRK,CHNWRK,TRIGBF,
     X         VOCTBL,VOCKEY,BYTPTR
C
C      ****                END  COMMON  DECK         ****
C
C      *****************************************************************
C
       INTEGER CHRBUF(40),OUTPTR,CARRET,DOLLAR,HIBYTE,LOBYTE
       INTEGER SCLD8,SCRS8
C
       DATA SCLD8,SCRS8/$A008,$6008/
       DATA CARRET,DOLLAR/$008D,$0024/
C
C
C
```

```
1     IF (BYTPTR-1) 2,10,15
C
2     OUTPTR = 1
      BYTPTR = 1
      M = 0
C
C     ZERO OUT CHARACTER BUFFER
C
3     DO 4  K=1,40
      CHRBUF(K) = 0
4     CONTINUE
C
C
5     READ (PCIN,6)  CHRBUF
    6 FORMAT  (40A2)
C
C
C
C     DECODE A2 FORMAT INTO 2 ASCII CHARACTERS
C
10    K = CHRBUF(OUTPTR)
C
S     STZ   4
S     LDG   SCLD8
S     SHF   4
S     LDG   SCRS8
S     SHF   5
S     STE   HIBYTE,B
S     STA   LOBYTE,B
C
      OUTPTR = OUTPTR+1
C
      INPUT = HIBYTE
      BYTPTR = 2
      GO TO 18
C
C
15    INPUT = LOBYTE
      BYTPTR = 1
C
C
18    IF (INPUT.NE.DOLLAR)  GO TO 19
      M = 1
      GO TO  1
C
```

```
 19     IF (INPUT.NE.CARRET)  GO TO 20
        IF (M.EQ.1)  GO TO  2
        BYTPTR = 0
C
C       CHECK FOR SPECIAL CHARACTER
C
 20     DO 30    I=1,12
        IF (SPCTBL(I).EQ.INPUT)    GO TO 50
 30     CONTINUE
C
C       INPUT WAS NOT A SPECIAL CHARACTER
C
        I = 0
 50     CONTINUE
        IF (I.EQ.9)  BYTPTR = 0
        CALL INTERP
        RETURN
C
        END
```

17.ERRMSG - Error message subroutine

```
CJOB A0776,09 D. F. FURGERSON       USINOR 5 STAND COLD MILL
C
C       DATE:  6/4/72                REVISION LEVEL:  12
C
C       ERROR PROCESSING-SUBROUTINE
C
C
        SUBROUTINE ERRMSG (DIAGNUM)
C
C       SUBROUTINES CALLED:  INTERP,SAT:,WRF:,ARF:,WDF:
C
C
C
C       *****************************************************************
C
C
        COMMON /BUFKOM/BLKWRK(35),INBUF(8),NUMTRG,TRIGBF(7),CHNWRK(350)
        COMMON /FCKOM/PCIN,PCOUT,LODEV,SIDEV,BODEV,BIDEV,
      X        PSTART,PLAST,DSTART,DLAST,CSTART,CLAST,
      X         CHNLEN,BLKLEN,BLKNUM,TYPNUM,KEY,ARGPTR,ARG,TEMP,
      X        HEXTBL(16),COMTBL(36),SUBADL(36),SPCTBL(12),
      X        ARGTBL(4,2),ALGTBL(4,16),ALGSUB(16),ALGLEN(16),
      X        VOCTBL(3,20),VOCKEY(36),BYTPTR
```

```
C
      INTEGER PCIN,PCOUT,LODEV,SIDEV,BODEV,BIDEV,
     X        PSTART,PLAST,DSTART,DLAST,CSTART,CLAST,
     X        CHNLEN,BLKLEN,BLKNUM,TYPNUM,ARGPTR,ARG,TEMP,
     X        HEXTBL,COMTBL,SUBADL,SPCTBL,
     X        ARGTBL,ALGTBL,ALGSUB,ALGLEN,
     X        BLKWRK,CHNWRK,TRIGBF,
     X       VOCTBL,VOCKEY,BYTPTR
C
C     ****                END  COMMON  DECK          ****
C
C     *****************************************************************
C
C
      INTEGER DIAGNUM
C
C
C
C
900   WRITE(PCOUT,901) DIAGNUM
      CALL INTERP
C
  901 FORMAT ('   ERROR ',I4)
C
      RETURN
C
      END
```

18. CORACQ - Core Aquire from freespace

```
                         0001             TTL      'CORE ACQUIRE'
                         0002             DEF      CORACQ
                         0003             REF      CORRET
      0068   00 0 68 A   0004   C:LINK    EQU      X'68'
      0030   00 0 30 A   0005   SBT:      EQU      X'30'
      00D7   00 0 D7 A   0006   M:SFX     EQU      X'D7'
0000  0028   00 0 28 R   0007             ADL      POOL2
      0001   00 0 01 R   0008   CORACQ    EQU      $
0001  1800   18 0 00 A   0009             LDG      P
0002  7130   70 1 30 A   0010             JMP      *SBT:
0003  0002   00 0 02 A   0011             DAT      2
0004  3328   33 3 28 A   0012             STZ      *ERROR1
0005  6327   60 3 27 A   0013             INC      *ERROR1
0006  222A   20 2 2A A   0014             LDE      *C:LINK
0007  1068   10 0 68 A   0015             LDC      C:LINK
```

```
0008  F212  F0 2 12 A   0016  LOOP2     ZJP   ERROR2
0009  2822  28 3 22 A   0017            LDA   *SIZE
000A  4902  48 1 02 A   0018            SUB   *C
000B  F201  F0 2 01 A   0019            ZJP   $+2
000C  B210  B0 2 10 A   0020            PJP   SERCH2
000D  2E01  28 6 01 A   0021            LDA   1,C
000E  A904  A8 1 04 A   0022            STA   *E
000F  2902  28 1 02 A   0023            LDA   *C
0010  4B1B  48 3 1B A   0024            SUB   *SIZE
0011  AA1D  A8 2 1D A   0025            STA   SIZE1
0012  2802  28 0 02 A   0026            LDA   C
0013  AB17  A8 3 17 A   0027            STA   *LOCATE
0014  4317  40 3 17 A   0028            ADD   *SIZE
0015  AA18  A8 2 18 A   0029            STA   LOCAT1
0016  EF19  E8 7 19 A   0030            SST   *CORRETX,B
0017  0005  00 0 05 A   0031            ADL   5                    LOCATION
0018  0006  00 0 06 A   0032            ADL   6                    SIZE
0019  0C01  08 4 01 A   0033  C:EXIT2   LDB   1,B
001A  71D7  70 1 D7 A   0034            JMP   *MISFX
001B  6311  60 3 11 A   0035  ERROR2    INC   *ERROR1
001C  72FC  70 2 FC A   0036            JMP   C:EXIT2
001D  2002  20 0 02 A   0037  SERCH2    LDE   C
001E  6004  60 0 04 A   0038            INC   E
001F  1104  10 1 04 A   0039            LDC   *E
0020  72E7  70 2 E7 A   0040            JMP   LOOP2
0021                    0041            RES   7
0028  0000  00 0 00 A   0042            DAT   0
      0028  00 0 28 R   0043  POOL2     EQU   $-1
0029  0000  00 0 00 A   0044  BSAV2     DAT   0
002A  0000  00 0 00 A   0045  LOCATE    DAT   0
002B  0000  00 0 00 A   0046  SIZE      DAT   0
002C  0000  00 0 00 A   0047  ERROR1    DAT
002D  0000  00 0 00 A   0048  LOCAT1    DAT   0
002E  0000  00 0 00 A   0049  SIZE1     DAT   0
002F  0000  00 0 00 X   0050  CORRETX   DAT   CORRET
0030  006B  00 0 6B A
      0000  00 0 00 A   0051            END
0000  ERRORS
```

19. CORRET - Core return to freespace

```
                        0001            TTL   'CORE RETURN'
                        0002            DEF   CORRET
      006B  00 0 6B A   0003  C:LINK    EQU   X'6B'
      003D  00 0 3D A   0004  SBT!      EQU   X'3D'
```

```
      0007  00 0 D7 A   0005  MISFX   EQU   X'D7'
      00B1  00 0 B1 A   0006  KIX2    EQU   X'B1'
0000  001A  00 0 1A R   0007          ADL   POOL1
      0001  00 0 01 R   0008  CORRET  EQU   $
0001  1800  18 0 00 A   0009          LDG   P
0002  7130  70 1 30 A   0010          JMP   *SBT1
0003  0001  00 0 01 A   0011          DAT   1
0004  2319  28 3 19 A   0012          LDA   *SIZE
0005  48B1  48 0 B1 A   0013          SUB   KIX2
0006  8A0E  88 2 0E A   0014          NJP   RETURN
0007  1A17  18 2 17 A   0015          LDG   *CILINK
0008  106B  10 0 6B A   0016          LDC   CILINK
0009  F204  F0 2 04 A   0017  LOOP1   ZJP   STOR1
000A  2313  28 3 13 A   0018          LDA   *SIZE
000B  4902  48 1 02 A   0019          SUB   *C
000C  F201  F0 2 01 A   0020          ZJP   $+2
000D  B209  B0 2 09 A   0021          PJP   SERCH1
000E  230F  28 3 0F A   0022  STOR1   LDA   *SIZE
000F  2300  20 3 00 A   0023          LDE   *LOCATE
0010  A904  A8 1 04 A   0024          STA   *E
0011  A103  A0 1 03 A   0025          STE   *G
0012  6004  60 0 04 A   0026          INC   E
0013  2802  28 0 02 A   0027          LDA   C
0014  A904  A8 1 04 A   0028          STA   *E
0015  0C01  08 4 01 A   0029  RETURN  LDB   1,B
0016  71D7  70 1 D7 A   0030          JMP   *MISFX
0017  1802  18 0 02 A   0031  SERCH1  LDG   C
0018  6003  60 0 03 A   0032          INC   G
0019  1103  10 1 03 A   0033          LDC   *G
001A  72EE  70 2 EE A   0034          JMP   LOOP1
      001A  00 0 1A R   0035  POOL1   EQU   $-1
001B  0001  00 0 01 A   0036  BSAVE1  DAT   1
001C  0000  00 0 00 A   0037  LOCATE  DAT   0
001D  0000  00 0 00 A   0038  SIZE    DAT   0
001E  006B  00 0 6B A
      0000  00 0 00 A   0039          END
0000  ERRORS
```

20. WBINRD - Write binary record subroutine

```
0001          DEF   WBINRD
0002          REF   SAT1
0003  *
0004  *              OUTPUT A BINARY RECORD 54 WORDS [9N3
0005  *              CALLING REQUENCE : CALL WBINRD(DEVICE NO.,BUFFER)
```

```
                              0006  *
0000  0000    00 0 00 X       0007            ADL     SAT1
0001  0013    00 0 13 R       0008            ADL     DP
0002  1800    18 0 00 A       0009  WBINRD    LDG     P
0003  73FD    70 3 FD A       0010            JMP     *$-3
0004  0001    00 0 01 A       0011            DAT     1
0005  1810    18 3 10 A       0012            LDG     *IDEV
0006  E9E2    E8 1 E2 A       0013            SST     *MIWI
0007  A210    A0 2 10 A       0014            STE     DEVBUF
0008  1210    10 2 10 A       0015            LDC     *53
0009  3007    30 0 07 A       0016            CDR     7
000A  2D03    28 5 03 A       0017  WBIN1     LDA     *IRECD-DP,B
000B  AD04    A8 5 04 A       0018            STA     *DEVBUF-DP,B
000C  6802    68 0 02 A       0019            DCR     C
000D  B2FC    B0 2 FC A       0020            PJP     WBIN1
000E  3004    30 0 04 A       0021            CDR     4
000F  1B05    18 3 05 A       0022            LDG     *IDEV
0010  E9E3    E8 1 E3 A       0023            SST     *MIWR
0011  0C01    08 4 01 A       0024            LDB     1,B
0012  E401    E0 4 01 A       0025            EST     1,B
0013  0000    00 0 00 A       0026  DP        DAT     0,0
0014  0000    00 0 00 A
0015  0000    00 0 00 A       0027  IDEV      DAT     0
0016  0000    00 0 00 A       0028  IRECD     DAT     0
0017  0000    00 0 00 A       0029  DEVBUF    DAT     0
0018  0035    00 0 35 A
      0000    00 0 00 A       0030            END
0000  ERRORS
```

21. Control chain interpreter

```
                           0001            TTL     'USINOR 5-STAND CONTROL CHAIN INTERPRETER'
                           0002            ABS
                           0003  *
                           0004  *         DATE:   5/11/72           REVISION LEVEL:  5
                           0005  *
0001    00 0 01 A          0006  SIM       EQU     1                 0=SIMULATE,1=NO SIMULATE OPTION
0001    00 0 01 A          0007  TRC       EQU     1                 0=BLK TRC,1=NO BLOCK TRACE OPTION
4D80    48 5 80 A          0008  INTORG    EQU     X'4D80'           INTERPRETER CORE ORIGIN
0028    00 0 28 A          0009  HEADSIZE  EQU     40                SIZE OF TASK HEADER
004C    00 0 4C A          0010  ZTBASE    EQU     X'4C'             ZERO TABLE BASE
00B0    00 0 B0 A          0011  KIX1      EQU     X'B0'             X'0001'
00B1    00 0 B1 A          0012  KIX2      EQU     X'B1'             X'0002'
00AC    00 0 AC A          0013  KIX3      EQU     X'AC'             X'0003'
00B2    00 0 B2 A          0014  KIX4      EQU     X'B2'             X'0004'
```

```
00AD   00 0 AD A   0015  K:X5       EQU    X'AD'           X'0005'
00AB   00 0 AB A   0016  K:X6       EQU    X'AB'
00AE   00 0 AE A   0017  K:X7       EQU    X'AE'           X'0007'
00B3   00 0 B3 A   0018  K:X8       EQU    X'B3'           X'0008'
00B4   00 0 B4 A   0019  K:X10      EQU    X'B4'       X'0010'
00B5   00 0 B5 A   0020  K:X20      EQU    X'B5'       X'0020'
00B6   00 0 B6 A   0021  K:X40      EQU    X'B6'
00B8   00 0 B8 A   0022  K:X100     EQU    X'B8'
00BA   00 0 BA A   0023  K:X400     EQU    X'BA'
00BB   00 0 BB A   0024  K:X800     EQU    X'BB'
00BC   00 0 BC A   0025  K:X1000    EQU    X'BC'           X'1000'
00BD   00 0 BD A   0026  K:X2000    EQU    X'BD'
00A2   00 0 A2 A   0027  K:XFF      EQU    X'A2'           X'00FF'
00BF   00 0 BF A   0028  K:X8000    EQU    X'BF'           X'8000'
00A0   00 0 A0 A   0029  K:XFFFF    EQU    X'A0'
00A6   00 0 A6 A   0030  K:4TH      EQU    X'A6'       X'000F'
00F0   00 0 F0 A   0031  SIL        EQU    X'F0'
00F0   00 0 F0 A   0032  SAL        EQU    X'00F0'         SET ALL L/S
00A0   00 0 A0 A   0033  RAL        EQU    X'00A0'         RELEASE ALL L/S
0004   00 0 04 A   0034  MOD        EQU    4
00C0   00 0 C0 A   0035  Z:CPR      EQU    X'C0'
6000   60 0 00 A   0036  SRC        EQU    X'6000'
                   0037             SKP,SIM+1  SIMWORD,SBIOR
0015   00 0 15 A   0044  SBIOR      EQU    X'15'
001C   00 0 1C A   0045  DLYR       EQU    X'1C'
0089   00 0 89 A   0046  ZICSR      EQU    X'89'
                   0047             SKP,TRC+1  SITRAC,KIHI
00A1   00 0 A1 A   0050  KIHI       EQU    X'A1'
00A2   00 0 A2 A   0051  KILO       EQU    X'A2'
0030   00 0 30 A   0052  SBTI       EQU    X'30'
00D7   00 0 D7 A   0053  MISFX      EQU    X'D7'
007C   00 0 7C A   0054  MSGPRT     EQU    X'7C'
007E   00 0 7E A   0055  PRINT      EQU    X'7E'
0026   00 0 26 A   0056  SLOC       EQU    X'26'           SUBLEVEL PROG. LOCATE ROUTINE
1F4F   18 / 4F A   0057  LORES      EQU    X'1F4F'
1F4E   18 / 4E A   0058  RESHI      EQU    X'1F4E'
1F4C   18 / 4C A   0059  HILINK     EQU    X'1F4C'
1F4D   18 / 4D A   0060  LOLINK     EQU    X'1F4D'
C960   C8 1 60 A   0061  TIMFLAG    EQU    X'C960'         BIT ADR OF 20 CONTIGUOUS SEQ BITS
21D1   20 1 D1 A   0062  PNTTAB     EQU    X'21D1'
331A   30 3 1A A   0063  TRACINDC   EQU    X'331A'         (2 WORDS - 1 BIT PER SEQ)
331C   30 3 1C A   0064  SEQPBINT   EQU    X'331C'         (20 WORDS - 1 PER SEQ)
3330   30 3 30 A   0065  PROGTBL    EQU    X'3330'         (32)  (TO 334F)
004E   00 0 4E A   0066  DRCTR      EQU    X'4E'           RETURN TO CHAIN INTERPRETER
004F   00 0 4F A   0067  LOGBAS     EQU    X'4F'       LOGICAL BASE
0051   00 0 51 A   0068  FILIDX     EQU    X'51'       WORD LOGICAL BASE
```

```
      0055  00 0 55 A  0069 B:SETH    EQU     X'55'
      005C  00 0 5C A  0070 B:RESH    EQU     X'5C'
      005D  00 0 5D A  0071 LOADBIT   EQU     X'5D'
                       0072           EJE
                       0073 *
                       0074 *                                  POOL RELATIVE EQU'S
                       0075 *         FILE AREA AT END OF TASK HEADER POOL
                       0076 *
      0001  00 0 01 A  0077 CHAINSTR  EQU     1
      0002  00 0 02 A  0078 OPERATE   EQU     2
                       0079           SKP,SIM+1  TBLEND,TYPE
      0025  00 0 25 A  0093 TYPE      EQU     HEADSIZE-3       TYPE NUMBER
      0026  00 0 26 A  0094 BLOCK     EQU     HEADSIZE-2       BLOCK NUMBER.
      0027  00 0 27 A  0095 BLKTRACE  EQU     HEADSIZE-1       BLOCK TRACE FLAG
                       0096           EJE
4D80                   0097           ORG     INTORG
                       0098 *
                       0099 ****      PROGEN CONTROL CHAIN INTERPRETER
                       0100 *
                       0101 *
                       0102 *         CONTROL CHAIN DIRECTOR - ENTRY FROM SUBLEVEL PROCESSOR
                       0103 *
                       0104 *                 B=TASK HEADER+8
                       0105 *                 E=STARTING ADDRESS OF CHAIN
                       0106 *                 M=00
                       0107 *
                       0108 *
                       0109 *                                  ENTRY FROM SUBLVL PROC 'CHKBID'
                       0110 *
                       0111           SKP,SIM+1  TIME1000,I:START
      4D80  48 D 80 A  0113 I:START   EQU     $
4D80  2804  28 0 04 A  0114           LDA     E
4D81  AC01  A8 4 01 A  0115           STA     CHAINSTR,B       STORE CHAIN START ADDR IN POOL
4D82  3803  38 0 03 A  0116           STZ     G                G = 0 IMPLIES NORMAL ENTRY
                       0117 *                                  LOAD FIRST WORD OF FILE HEADER
      4D83  48 D 83 A  0118 I:STARTD  EQU     $                ENTRY AFTER DELAY, (FROM I:INTTD)
                       0119           SKP,SIM+1 STARTD,CHKBLK
      4D83  48 D 83 A  0171 CHKBLK    EQU     $
                       0172           SKP,TRC+1  CKBLK1,I:SKIP
      4D83  48 D 83 A  0180 I:SKIP    EQU     $
4D83  1803  18 0 03 A  0181           LDG     G                IF G FLAG IS NON-ZERO, OPERATE (2,B)
4D84  F201  F0 2 01 A  0182           ZJP     $+2              WAS SET UP IN DELAY ROUTINE, SO
4D85  7203  70 2 03 A  0183           JMP     I:INTD           BYPASS 2,B SETUP HERE.
4D86  6004  60 0 04 A  0184           INC     E
4D87  6004  60 0 04 A  0185           INC     E
4D88  A402  A0 4 02 A  0186           STE     OPERATE,B
```

```
                            0187            EJE
                            0188   *
                            0189   *
       4089   48 0 89 A     0190   I:INTD   EQU     $
4089   30A4   30 0 A4 A     0191            CDH     RAL+MOD
                            0192   *                                FETCH FIRST WORD OF NEXT BLOCK
408A   2002   28 0 02 A     0193            LDA     *OPERATE,B
408B   58A2   58 0 A2 A     0194            AND     KILO
408C   AC25   A8 4 25 A     0195            STA     TYPE,B
                            0196            SKP,TRC+1  INTD,BLKSIM
       408D   48 0 8D A     0223   BLKSIM   EQU     $                   FOR  CS BLOCK TRACE
                            0224            SKP,SIM+1  BLKSIM1,CKTYPE
       408D   48 0 8D A     0276   CKTYPE   EQU     $
408D   2C25   28 4 25 A     0277            LDA     TYPE,B
                            0278            SKP,SIM+1  CKT1,CKT2
       408E   48 0 8E A     0281   CKT2     EQU     $
408E   4233   40 2 33 A     0282            ADD     SRTADR        STARTING TABLE ADDRESS - 1
408F   1905   18 1 05 A     0283            LDG     *A            TRANSFER ADDRESS OF ALGORITHM
4090   F205   F0 2 05 A     0284            ZJP     ENDMOD        INVALID TRANSFER ADDRESS
4091   4A31   48 2 31 A     0285            SUB     TERADR        END TABLE ADDRESS + 1
4092   B203   B0 2 03 A     0286            PJP     ENDMOD        INVALID TRANSFER ADDRESS
                            0287   *                                ALGORITHM LEGAL - GO TO HANDLER
4093   1402   10 4 02 A     0288            LDC     OPERATE,B
4094   6803   68 0 03 A     0289            DCR     G
4095   7103   70 1 03 A     0290            JMP     *G            TRANSFER TO ALGORITHM
                            0291   *                                RETURN TO SUBLVL PROC
       4095   48 0 95 A     0292   ENDMOD   EQU     $
                            0293            SKP,SIM+1  END1,END2
       4096   48 0 96 A     0298   END2     EQU     $
4096   2801   28 0 01 A     0299            LDA     B
4097   48B3   48 0 B3 A     0300            SUB     KIX8                REMOVE BIAS
4098   2905   28 1 05 A     0301            LDA     *A            STARING ADDRESS OF TASK
4099   7105   70 1 05 A     0302            JMP     *A            RETURN TO TASK ORIGIN
                            0303   *
                            0304            SKP,TRC+1 KICODE,COUNT
409A   0000   00 0 00 A     0307   COUNT    DAT     0                   CHAINS BEING CURRENTLY SIMULATED
409B   4DC1   48 0 C1 A     0308            LPL
409C   4DC2   48 0 C2 A

                            0309            EJE
                            0310   *        ENTRY TO CONTROL CHAIN DIRECTOR AFTER EXPIRATION OF CHAIN
                            0311   *        TIME DELAY
                            0312   *
                            0313   *        ENTER WITH A=SUBLEVEL NO. OF CHAIN
                            0314   *                   E=STARTING CHAIN ADDRESS AFTER TIME DELAY
                            0315   *
```

```
4D9D  1805  18 0 05 A  IIINTTD LDG  A         SAVE SUBLEVEL NO,
4D9E  A402  A0 4 02 A          STE  2,B       STORE TIME DELAY ADDRESS
4D9F  2803  28 0 03 A          LDA  G
4DA0  5A0F  58 2 0F A          AND  =X'FFF'
4DA1  A804  A8 0 04 A          STA  E         STORE SUBLEVEL NO.
4DA2  28C0  28 0 C0 A          LDA  ZICPR     CURRENT TASK NO.
4DA3  4300  40 3 00 A          ADD  PNTTAB    SUBLEVEL ADDRESS POINTER TABLE
4DA4  2905  28 1 05 A          LDA  *A        ADDRESS OF SUBLEVEL 0 ON CURRENT TASK
4DA5  4004  40 0 04 A          ADD  E         ADD SUBLEVEL NO.
4DA6  2905  28 1 05 A          LDA  *A        STARTING ADDRESS OF CURRENT SUBTASK
4DA7  40B1  40 0 B1 A          ADD  K1X2      SPACE OVER CHAIN FILE HEADER
4DA8  AC01  A8 4 01 A          STA  1,B       STARTING ADDRESS OF CURRENT CHAIN
4DA9  2C02  28 4 02 A          LDA  2,B       POINT CURRENT CHAIN ADDRESS TO
4DAA  40AB  40 0 AB A          ADD  K1X6      NEXT MODULE
4DAB  AC02  A8 4 02 A          STA  2,B
4DAC  3803  38 0 03 A          STZ  G                SET UP G FLAG TO SIGNAL DELAY ENTRY
4DAD  6003  60 0 03 A          INC  G
4DAE  7204  70 2 04 A          JMP  IISTARTD         1=ENTRY FROM DELAY, 0=NORM ENTRY
                       *
4DAF  0FFF  08 7 FF A          LPL
4DB0  21D1  20 1 D1 A
                               EJE
                       *
                       *
                       *
      4DB1  48 5 B1 A  MODULE  EQU  *                BEGIN ALGORITHM ADDRESS TABLE
4DB1  4DC3  48 5 C3 A          ADL  HEADER           TYPE=0   CHAIN HEADER
4DB2  4DC7  48 5 C7 A          ADL  LOGIC            TYPE=1   LOGIC EXPRESSION
4DB3  0000  00 0 00 A          ADL  0                TYPE=2   ** SPARE **
4DB4  4E31  48 6 31 A          ADL  LOGTOF           TYPE =3  LOGICAL TO, FALSE
4DB5  4E2F  48 6 2F A          ADL  LOGTOT           TYPE=4   LOGICAL TO, TRUE
4DB6  4E63  48 6 63 A          ADL  DELAY            TYPE=5   SUBLVL DELAY
4DB7  4E6C  48 6 6C A          ADL  BID              TYPE=6   SUBLVL BID
4DB8  4E71  48 6 71 A          ADL  PROGRAM          TYPE=7   PROGRAM
4DB9  4EF3  48 6 F3 A          ADL  TSTBRL           TYPE=8   TEST BRANCH LOGICAL
4DBA  4F01  48 7 01 A          ADL  SET              TYPE=9   LOGICAL SET
4DBB  4F07  48 7 07 A          ADL  RESET            TYPE=10  LOGICAL RESET
4DBC  4F0D  48 7 0D A          ADL  SETRST           TYPE=11  SET/RESET
4DBD  4F21  48 7 21 A          ADL  GOTO             TYPE=12  GO TO
4DBE  4F25  48 7 25 A          ADL  PERM             TYPE=13  PERMISSIVE
4DBF  4F54  48 7 54 A          ADL  DATRNS           TYPE=14  DATA TRANSFER/INITIALIZE
4DC0  4F6D  48 7 6D A          ADL  DIAG             TYPE=15  DIAGNOSTIC
      4DC1  48 5 C1 A  TERMOD  EQU  *                END OF ALGORITHM ADDRESS TABLE
4DC1  4DB1  48 5 B1 A  SRTADR  DAT  MODULE
4DC2  4DC1  48 5 C1 A  TERADR  DAT  TERMOD
```

```
                            0360             SKP,SIM+1  CHKTRACE,LITPOOL2
       4DC3     48 D C3 A   0402  LITPOOL2 EQU       $
                            0403             LPL
                            0404             TTL       'CHAIN HEADER MODULE'
                            0405  *
                            0406  *                    WORD 1  =  BLOCK # (8-15) + AL39 TYPE (0-7) = 0000
                            0407  *                    WORD 2  =  SUBLEVEL # OF CURRENT CHAIN
                            0408  *                    WORD 3  =  TRIGGER DATA
                            0409  *
       4DC3     48 D C3 A   0410  HEADER   EQU       $
4DC3   6402     60 4 02 A   0411           INC       OPERATE,R
4DC4   6402     60 4 02 A   0412           INC       OPERATE,R
4DC5   6402     60 4 02 A   0413           INC       OPERATE,R
4DC6   714E     70 1 4E A   0414           JMP       *ORCTR
                            0415           TTL       'LOGIC ALGORITHM  (01)'
                            0416  *
                            0417  * LOGICAL ALGORITHM
                            0418  *
                            0419  *        WORD 0          BLOCK # / ALGORITHM NAME
                            0420  *        WORD 1          NUMBER OF ADDRESSES (N)
                            0421  *        WORD 2          FIRST ADDRESS
                            0422  *        WORD N+2        N TH ADDRESS
                            0423  *        WORD N+3        NUMBER OF OPERATIONS (M)
                            0424  *        WORD N+4        FIRST OP
                            0425  *        WORD N+M+3      M TH OP
                            0426  *
       4DC7     48 D C7 A   0427  LOGIC    EQU       $
                            0428           SKP,SIM+1  S1A,S1
       4DC7     48 D C7 A   0435  S1       EQU       $
4DC7   2802     28 0 02 A   0436           LDA C
4DC8   4601     40 6 01 A   0437           ADD 1,C
4DC9   4031     40 0 B1 A   0438           ADD KIX2
4DCA   AC04     A8 4 04 A   0439           STA 4,B           ADDRESS OF LAST LOGICAL ADDRESS + 1
4DCB   AC05     A8 4 05 A   0440           STA 5,B
4DCC   6405     60 4 05 A   0441           INC 5,B
4DCD   2905     28 1 05 A   0442           LDA *A
4DCE   AC06     A8 4 06 A   0443           STA 6,B           NO OF LOGICAL OPERATORS
4DCF   6C06     68 4 06 A   0444           DCR 6,B
4DD0   4405     40 4 05 A   0445           ADD 5,B
4DD1   AC02     A8 4 02 A   0446           STA 2,B
4DD2   2E01     28 6 01 A   0447           LDA 1,C
4DD3   AC07     A8 4 07 A   0448           STA 7,B           NO. OF LOGICAL ADDRESSES
4DD4   6C07     68 4 07 A   0449           DCR 7,B
4DD5   2884     28 0 B4 A   0450           LDA KIX10
4DD6   4001     40 0 01 A   0451           ADD B
```

```
4DD7  AC08  A8 4 08 A  0452          STA 8,B
4DD8  4601  40 6 01 A  0453          ADD 1,C
4DD9  A802  A8 0 02 A  0454          STA C
4DDA  1A4F  18 2 4F A  0455          LDG SRA4
      4DDB  48 5 DB A  0456  MORARG  EQU $
4DDB  6C04  68 4 04 A  0457          DCR 4,B
4DDC  6802  68 0 02 A  0458          DCR C
4DDD  2D04  28 5 04 A  0459          LDA *4,B
4DDE  AC09  A8 4 09 A  0460          STA 9,B          LAST VALUE STORED IS REC ADDR OF RESULT
                       0461          SKP,SIM+1  TRCSKP,SKPTRC
      4DDF  48 5 DF A  0473  SKPTRC  EQU    $
4DDF  B200  B0 2 00 A  0474          PJP LOGEX5       JUMP IF NOT PACKED
4DE0  50BF  50 0 BF A  0475          EOR KIX8000      CLEAR SIGN BIT AND UNPACK LOGICAL
4DE1  A804  A8 0 04 A  0476          STA E
4DE2  58A6  58 0 A6 A  0477          AND KI4TH
4DE3  9804  98 0 04 A  0478          SHF E
4DE4  C04F  C0 0 4F A  0479          ADA LOGBAS       BIT LOGICAL BASE
4DE5  2905  28 1 05 A  0480          LDA *A
4DE6  5904  58 1 04 A  0481          AND *E
4DE7  F201  F0 2 01 A  0482          ZJP $+2          JUMP IF NOT SET
      4DE8  48 5 E8 A  0483  LOGEX4  EQU $
4DE8  28B0  28 0 B0 A  0484          LDA KIX1         LOAD ONE IF SET
4DE9  A902  A8 1 02 A  0485          STA *C           STORE ZERO OR ONE IN TEMP TABLE
4DEA  6C07  68 4 07 A  0486          DCR 7,B
4DEB  B2EF  B0 2 EF A  0487          PJP MORARG       REPEAT IF MORE ARGUMENTS
4DEC  7205  70 2 05 A  0488          JMP LOGEX6
      4DED  48 5 ED A  0489  LOGEX5  EQU $
4DED  4051  40 0 51 A  0490          ADD FILIDX       WORD LOGICAL BASE
4DEE  2905  28 1 05 A  0491          LDA *A
4DEF  BAF8  B8 2 F8 A  0492          NJP LOGEX4       JUMP IF SET
4DF0  3805  38 0 05 A  0493          STZ A
4DF1  72F7  70 2 F7 A  0494          JMP LOGEX4+1
      4DF2  48 5 F2 A  0495  LOGEX6  EQU $
4DF2  2C06  28 4 06 A  0496          LDA 6,B
4DF3  BA31  B8 2 31 A  0497          NJP LOGEX1       JUMP IF NO OPS.
4DF4  2D05  28 5 05 A  0498  MOROP   LDA *5,B
4DF5  58AC  58 0 AC A  0499          AND KIX3
4DF6  1830  18 0 B0 A  0500          LDG KIX1
4DF7  9805  98 0 05 A  0501          SHF A
4DF8  4236  40 2 36 A  0502          ADD DUNDXX
4DF9  AC0B  A8 4 0B A  0503          STA 11,B         SET UP TO EXECUTE SPECIFIED OPERATION
4DFA  1A2E  18 2 2E A  0504          LDG SRA2
4DFB  2D05  28 5 05 A  0505          LDA *5,B
4DFC  9805  98 0 05 A  0506          SHF A            SHIFT RIGHT 2
4DFD  58A6  58 0 A6 A  0507          AND KI4TH
```

```
4DFE  4085  40 0 B5 A  0508          ADD KIX20
4DFF  4001  40 0 01 A  0509          ADD B
4E00  A804  A8 0 04 A  0510          STA E          ADDRESS IN TEMPORARY FOR STORAGE OF RESUL
4E01  1A2A  18 2 2A A  0511          LDG SRA11
4E02  2005  28 0 05 A  0512          LDA *5,B
4E03  9805  98 0 05 A  0513          SHF A          SHIFT RIGHT 11.
4E04  5A28  58 2 28 A  0514          AND HX1F
4E05  4408  40 4 08 A  0515          ADD 8,B
4E06  A802  A8 0 02 A  0516          STA C          ADDRESS OF A1
4E07  1A23  18 2 23 A  0517          LDG SRA6
4E08  2005  28 0 05 A  0518          LDA *5,B
4E09  9805  98 0 05 A  0519          SHF A          SHIFT RIGHT 6
4E0A  5A22  58 2 22 A  0520          AND HX1F
4E0B  4408  40 4 08 A  0521          ADD 8,B        ADDRESS OF A2
4E0C  2905  28 1 05 A  0522          LDA *A
4E0D  750B  70 5 0B A  0523          JMP *11,B
4E0E  A904  A8 1 04 A  0524  EXCLOG  STA *E
4E0F  6405  60 4 05 A  0525          INC 5,B
4E10  6C06  68 4 06 A  0526          DCR 6,B
4E11  B2E2  B0 2 E2 A  0527          PJP MOROP      JUMP IF MORE OPS.
      4E12  48 6 12 A  0528  LOGEX2  EQU *          SET RESULT
4E12  2C09  28 4 09 A  0529          LDA 9,B
4E13  2420  20 4 20 A  0530          LDE 32,B
4E14  F202  F0 2 02 A  0531          ZJP LOGEX3     IF ZERO RESET LOGICAL
4E15  ED5B  E8 5 5B A  0532          SST     *BISETR,R
4E16  714E  70 1 4E A  0533          JMP *DRCTR
      4E17  48 6 17 A  0534  LOGEX3  EQU *
4E17  ED5C  E8 5 5C A  0535          SST     *BIRESR,R
4E18  714E  70 1 4E A  0536          JMP *DRCTR
4E19  5080  50 0 B0 A  0537  FUNEXC  EOR KIX1
4E1A  72F3  70 2 F3 A  0538          JMP EXCLOG
4E1B  5902  58 1 02 A  0539          AND *C
4E1C  72F1  70 2 F1 A  0540          JMP EXCLOG
4E1D  7203  70 2 03 A  0541          JMP OREXC
4E1E  0000  00 0 00 A  0542          DAT 0
4E1F  5102  50 1 02 A  0543          EOR *C
4E20  72ED  70 2 ED A  0544          JMP EXCLOG
4E21  4102  40 1 02 A  0545  OREXC   ADD *C
4E22  F201  F0 2 01 A  0546          ZJP *+2
4E23  2880  28 0 B0 A  0547          LDA KIX1
4E24  72E9  70 2 E9 A  0548          JMP EXCLOG
4E25  2C11  28 4 11 A  0549  LOGEX1  LDA 17,B
4E26  AC20  A8 4 20 A  0550          STA 32,B
4E27  72EA  70 2 EA A  0551          JMP LOGEX2
4E28  4002  40 0 02 A  0552  SRA2    DAT X'4002'
```

```
4E29  4004   40 0 04 A   0553  SRA4    DAT X'4004'
4E2A  4006   40 0 06 A   0554  SRA6    DAT X'4006'
4E2B  400B   40 0 0B A   0555  SRA11   DAT X'400B'
4E2C  001F   00 0 1F A   0556  HX1F    DAT X'1F'
4E2D  0FFF   08 7 FF A   0557  HXFFF   DAT X'FFF'
4E2E  4E18   48 6 18 A   0558  DUNDXX  DAT FUNEXC-1
                         0559          LPL
                         0560          TTL      'LOGICAL TIME DELAY ALGORITHMS  (03,04)'
                         0561  *
                         0562  *
                         0563  *                WORD 0  TYPE AND BLOCK NO.
                         0564  *                WORD 1  ZERO-RESET COUNT
                         0565  *                WORD 2  ZERO-LINKAGE POINTER
                         0566  *                WORD 3  COUNT 0.1 SECS
                         0567  *                WORD 4  INPUT LOGICAL ADDRESS
                         0568  *                WORD 5  OUTPUT LOGICAL ADDRESS
                         0569  *
                         0570  *
                         0571  *                LOGICAL TIME DELAY - SET OUTPUT TRUE
                         0572  *
      4E2F   48 6 2F A   0573  LOGTDT  EQU      *
4E2F  3C07   38 4 07 A   0574          STZ      7,B               SET UP FOR LOGTDT
4E30  7202   70 2 02 A   0575          JMP      LOGCOM
                         0576  *
                         0577  *                LOGICAL TIME DELAY - SET OUTPUT FALSE
                         0578  *
      4E31   48 6 31 A   0579  LOGTDF  EQU      *
4E31  3C07   38 4 07 A   0580          STZ      7,B
4E32  6C07   68 4 07 A   0581          DCR      7,B
                         0582  *
      4E33   48 6 33 A   0583  LOGCOM  EQU      *                 COMMON CODE FOR LOGTDT AND LOGTDF
4E33  2503   20 6 03 A   0584          LDE      3,C           COUNT 0.1 SECS
4E34  A404   A0 4 04 A   0585          STE      4,B           LENGTH OF TIME DELAY
4E35  2802   28 0 02 A   0586          LDA      C
4E36  AC05   A8 4 05 A   0587          STA      5,B
4E37  40AB   40 0 AB A   0588          ADD      KIX6          POINT TO NEXT DATA BLOCK
4E38  AC02   A8 4 02 A   0589          STA      OPERATE,R
4E39  2E04   28 6 04 A   0590          LDA      4,C           INPUT LOGICAL ADDRESS
                         0591          SKP,SIM+1  S2A,S2
      4E3A   48 6 3A A   0595  S2      EQU      *
4E3A  1000   10 0 00 A   0596          LDC      P
4E3B  715D   70 1 5D A   0597          JMP      *LOADBIT
4E3C  BA08   B8 2 08 A   0598          NJP      LOGDLY1
4E3D  1405   10 4 05 A   0599          LDC      5,B
4E3E  2E05   28 6 05 A   0600          LDA      5,C           OUTPUT LOGICAL ADDRESS
4E3F  1C07   18 4 07 A   0601          LDG      7,B
```

```
4E40  F202  F0 2 02 A  0602          ZJP   $+3
4E41  ED5B  E8 5 5B A  0603          SST   *RISETR,R
4E42  714E  70 1 4E A  0604          JMP   *DRCTR
4E43  ED5C  E8 5 5C A  0605          SST   *BIRESR,R
4E44  714E  70 1 4E A  0606          JMP   *DRCTR        RETURN TO DIRECTOR
                       0607  *
      4E45  48 6 45 A  0608  LOGDLY1 EQU   *                   INPUT IS FALSE
4E45  1405  10 4 05 A  0609          LDC   5,B
4E46  2E01  28 6 01 A  0610          LDA   1,C           CURRENT COUNTDOWN
4E47  F201  F0 2 01 A  0611          ZJP   $+2
4E48  714E  70 1 4E A  0612          JMP   *DRCTR        MODULE IN TIME DELAY-RETURN
4E49  2C04  28 4 04 A  0613          LDA   4,B           LENGTH OF TIME DELAY
4E4A  30F0  30 0 F0 A  0614          COR   X'F0'         SET HARDWARE LOCKOUT
4E4B  4914  48 3 14 A  0615          SUB   RESHI         HIGH RESOLUTION LIMIT
4E4C  B206  B0 2 06 A  0616          PJP   LOGDLY2
4E4D  4312  40 3 12 A  0617          ADD   RESHI
4E4E  5407  50 4 07 A  0618          EOR   7,B
4E4F  6005  60 0 05 A  0619          INC   A
4E50  AE01  A8 6 01 A  0620          STA   1,C           STORE IN COUNTDOWN WORD
4E51  1310  18 3 10 A  0621          LDG   HILINK        HIGH RESOLUTION LINKAGE POINTER
4E52  7207  70 2 07 A  0622          JMP   LOGDLY3
                       0623  *
      4E53  48 6 53 A  0624  LOGDLY2 EQU   *
4E53  430C  40 3 0C A  0625          ADD   RESHI
4E54  3804  38 0 04 A  0626          STZ   E
4E55  D309  D8 3 09 A  0627          DIV   LORES         LOW RESOLUTION
4E56  5407  50 4 07 A  0628          EOR   7,B
4E57  6005  60 0 05 A  0629          INC   A             COMPLEMENT FOR FALSE
4E58  AE01  A8 6 01 A  0630          STA   1,C           STORE IN COUNTDOWN WORD
4E59  1309  18 3 09 A  0631          LDG   LOLINK        LOW RESOLUTION LINKAGE POINTER
                       0632  *
      4E5A  48 6 5A A  0633  LOGDLY3 EQU   *
4E5A  2903  28 1 03 A  0634          LDA   *G
4E5B  AE02  A8 6 02 A  0635          STA   2,C           STORE IN LINK WORD
4E5C  2802  28 0 02 A  0636          LDA   C             ADDRESS OF TIME DELAY MODULE
4E5D  A903  A8 1 03 A  0637          STA   *G            PLACE IN LOW RESOLUTION LINKAGE
4E5E  714E  70 1 4E A  0638          JMP   *DRCTR        RETURN TO DIRECTOR
                       0639          SKP,SIM+1  S3A,S3
      4E5F  45 6 5F A  0565  S3      EQU   *
4E5F  1F4E  18 7 4E A  0566          LPL
4E60  1F4F  18 7 4F A
4E61  1F4C  18 7 4C A
4E62  1F4D  18 7 4D A
                       0667          TTL      'DELAY  ALGORITHM (05)'
                       0668  *
                       0669  *                            DELAY ALGORITHM
```

```
                                0670  *
                                0671  *             WORD 0          BLOCK # / MODULE TYPE         0,C    2,B
                                0672  *             WORD 1          DELAY IN TENTHS OF SECONDS    1,C    3,B
                                0673  *             WORD 2          DELAY LINK      (INIT ZERO)   2,C    4,B
                                0674  *             WORD 3          SUBTASK  #WORD (INIT ZERO)    3,C    5,B
                                0675  *             WORD 4          COUNTDOWN WORD (INIT ZERO)    4,C    6,B
                                0676  *
                                0677  *
       4E63     48 6 63 A       0678  DELAY       EQU       $
4E63   2802     28 0 02 A       0679              LDA       C
4E64   40AD     40 0 AD A       0680              ADD       KIX5
4E65   AC02     A8 4 02 A       0681              STA       OPERATE,A
                                0682  *
4E66   2E01     28 6 01 A       0683              LDA       1,C
4E67   B94E     B8 1 4E A       0684              NJP       *DRCTR               EXIT IF DELAY IN PROGRESS
                                0685  *
                                0686              SKP,SIM+1  DLYTRC,SETUPB
       4E68     48 6 68 A       0704  SETUPB      EQU       $                    SET B = C-2
4E68   0802     08 0 02 A       0705              LDB       C
4E69   6801     68 0 01 A       0706              DCR       B
4E6A   6801     68 0 01 A       0707              DCR       B
                                0708  *                                        CALL SUBLVL DELAY (RESOLVED)
4E6B   711C     70 1 1C A       0709              JMP       *DLYR
                                0710  *
                                0711  *                     RETURNS TO IIINTTD AFTER DELAY EXPIRES
                                0712              TTL       'BID     ALGORITHM (06)'
                                0713  *
                                0714  *                                        BID ALGORITHM
                                0715  *
                                0716  *           WORD 0          BLOCK # / MODULE TYPE
                                0717  *           WORD 1
                                0718  *
                                0719  *
       4E6C     48 6 6C A       0720  BID         EQU       $
4E6C   6402     60 4 02 A       0721              INC       OPERATE,A
4E6D   6402     60 4 02 A       0722              INC       OPERATE,A
                                0723              SKP,SIM+1  BIDTRC,GOBID
       4E6E     48 6 6E A       0736  GOBID       EQU       $
4E6E   2E01     28 6 01 A       0737              LDA       1,C
                                0738              SKP,SIM+1  S4A,S4
       4E6F     48 6 6F A       0743  S4          EQU       $
4E6F   ED15     E8 5 15 A       0744              SST       *SBIOR,B
4E70   714E     70 1 4E A       0745              JMP       *DRCTR               RETURN TO DIRECTOR
                                0746              LPL
                                0747              TTL       'PROGRAM ALGORITM (07)'
                                0748  *
```

```
                             0749  * TRANSFER TO FORTRAN PROGRAM ALGORITHM
                             0750  *
                             0751  *               WORD 0            BLOCK # / ALGORITHM NAME
                             0752  *               WORD 1            SUBR ADDR (REL TO 'PRGTBL')
                             0753  *               WORD 2            # OF INTEGER ARGS            (I)
                             0754  *               WORD 3            1 ST INT ARG
                             0755  *               WORD I+2          I TH INT ARG
                             0756  *               WORD I+3          # OF REAL ARGS               (R)
                             0757  *               WORD I+4          1 ST REAL ARG
                             0758  *               WORD I+R+3        R TH REAL ARG
                             0759  *               WORD I+R+4        # OF SYMBOLIC DATA ARGS      (D)
                             0760  *               WORD I+R+5        1 ST SYMBOLIC DATA ARG
                             0761  *               WORD I+R+D+4      D TH SYMBOLIC DATA ARG
                             0762  *               WORD I+R+D+5      # OF SYMBOLIC INDIRECT ARGS  (S)
                             0763  *               WORD I+R+D+6      1 ST SYMBOLIC INDIRECT ARG
                             0764  *               WORD I+R+D+S+5    S TH SYMBOLIC INDIRECT ARG
                             0765  *
      4E71   48 6 71 A       0766  PROGRAM  EQU      *
                             0767           SKP,SIM+1  S5A,S5
      4E71   48 6 71 A       0774  S5       EQU      *
4E71  2802   28 0 02 A       0775           LDA      C
4E72  4081   40 0 81 A       0776           ADD      K1X2
4E73  2105   20 1 05 A       0777           LDE      *A
4E74  A404   A0 4 04 A       0778           STE      4,B                 NUMBER OF INTEGER ARGUMENTS
4E75  6005   60 0 05 A       0779           INC      A
4E76  AC08   A8 4 08 A       0780           STA      8,B                 LOC OF INTEGER ARGUMENTS
4E77  4404   40 4 04 A       0781           ADD      4,B
4E78  2105   20 1 05 A       0782           LDE      *A
4E79  A405   A0 4 05 A       0783           STE      5,B                 NUMBER OF REAL ARGUMENTS
4E7A  6005   60 0 05 A       0784           INC      A
4E7B  AC09   A8 4 09 A       0785           STA      9,B                 LOC OF REAL ARGUMENTS
4E7C  4405   40 4 05 A       0786           ADD      5,B
4E7D  4405   40 4 05 A       0787           ADD      5,B
4E7E  2105   20 1 05 A       0788           LDE      *A
4E7F  A406   A0 4 06 A       0789           STE      6,B                 NUMBER OF SYMBOLIC DATA
                             0790           SKP,SIM+1 PGMTRC1,SYMB1
      4E80   48 6 80 A       0799  SYMB1    EQU      *
4E80  6005   60 0 05 A       0800           INC      A
4E81  AC0A   A8 4 0A A       0801           STA      10,B                LOC OF SYMBOLIC DATA
4E82  4406   40 4 06 A       0802           ADD      6,B
4E83  2105   20 1 05 A       0803           LDE      *A
4E84  A407   A0 4 07 A       0804           STE      7,B                 NUMBER OF SYMBOLIC ARGUMENTS
4E85  6005   60 0 05 A       0805           INC      A
4E86  AC0B   A8 4 0B A       0806           STA      11,B                ADDRESS OF SYMBOLIC ARGUMENTS
4E87  4407   40 4 07 A       0807           ADD      7,B
4E88  AC02   A8 4 02 A       0808           STA      2,B                 ADDRESS OF NEXT BLOCK
```

```
                                0809  *
*E89  2801   28 0 01 A   0810           LDA    B
*E8A  *266   40 2 66 A   0811           ADD    =12
*E8B  A804   A8 0 04 A   0812           STA    E             E=ADDRESS IN TASKHEADER FOR ARGUMENT
                         0813  *
*E8C  1C04   18 * 04 A   0814  MOVINT   LDG    4,B           INTEGER COUNT
*E8D  6803   68 0 03 A   0815           DCR    G
*E8E  BA05   B8 2 05 A   0816           NJP    MOVREAL       INTEGERS DONE
*E8F  2008   28 5 08 A   0817           LDA    *8,B
*E90  A904   A8 1 04 A   0818           STA    *E            STORE ARGUMENT IN TASK HEADER
*E91  6408   60 * 08 A   0819           INC    8,B
*E92  6004   60 0 04 A   0820           INC    E
*E93  72F9   70 2 F9 A   0821           JMP    MOVINT+1
                         0822  *
*E94  1C05   18 * 05 A   0823  MOVREAL  LDG    5,B           REAL COUNT
*E95  6803   68 0 03 A   0824           DCR    G
*E96  BA09   B8 2 09 A   0825           NJP    MOVDATA       REAL DONE
*E97  2009   28 5 09 A   0826           LDA    *9,B
*E98  A904   A8 1 04 A   0827           STA    *E            STORE FIRST WORD OF REAL IN HEADER
*E99  6409   60 * 09 A   0828           INC    9,B
*E9A  6004   60 0 04 A   0829           INC    E
*E9B  2009   28 5 09 A   0830           LDA    *9,B
*E9C  A904   A8 1 04 A   0831           STA    *E            STORE SECOND WORD OF REAL
*E9D  6409   60 * 09 A   0832           INC    9,B
*E9E  6004   60 0 04 A   0833           INC    E
*E9F  72F5   70 2 F5 A   0834           JMP    MOVREAL+1
                         0835  *
*EA0  1C06   18 * 06 A   0836  MOVDATA  LDG    6,B           DATA COUNT
*EA1  6803   68 0 03 A   0837           DCR    G
*EA2  BA05   B8 2 05 A   0838           NJP    MOVSYMB       DATA DONE
*EA3  200A   28 5 0A A   0839           LDA    *10,B
*EA4  A904   A8 1 04 A   0840           STA    *E            STORE ARGUMENT IN TASK HEADER
*EA5  640A   60 * 0A A   0841           INC    10,B
*EA6  6004   60 0 04 A   0842           INC    E
*EA7  72F9   70 2 F9 A   0843           JMP    MOVDATA+1
                         0844  *
*EA8  1C07   18 * 07 A   0845  MOVSYMB  LDG    7,B           SYMBOLIC COUNT
*EA9  6803   68 0 03 A   0846           DCR    G
*EAA  BA05   B8 2 05 A   0847           NJP    ALLDONE       SYMBOLIC DONE
*EAB  200B   28 5 0B A   0848           LDA    *11,B
*EAC  A904   A8 1 04 A   0849           STA    *E            STORE ARGUMENT ADR IN HEADER
                         0850           SKP,SIM+1  PGMTRC2,SYMB2
      *EAD   48 6 AD A   0857  SYMB2    EQU    $
*EAD  640B   60 * 0B A   0858           INC    11,B
*EAE  6004   60 0 04 A   0859           INC    E
*EAF  72F9   70 2 F9 A   0860           JMP    MOVSYMB+1
```

```
                          0861  *
4E30  30F0   30 0 F0 A    0862  ALLDONE   CDR    SAL            SET ALL L/O
4E31  2A40   28 2 40 A    0863            LDA    *PROGTBL
4E32  4601   40 6 01 A    0864            ADD    1,C
4E33  2905   28 1 05 A    0865            LDA    *A
4E34  AA1E   A8 2 1E A    0866            STA    PROGADR        ADDRESS OF SUBROUTINE
4E35  F14E   F0 1 4E A    0867            ZJP    *DRCTR         NO SUB IN SLOT
                          0868  *
4E36  2A3A   28 2 3A A    0869            LDA    *12
4E37  223B   20 2 3B A    0870            LDE    *RELARG
4E38  6C04   68 4 04 A    0871  INTREL    DCR    4,B
4E39  BA04   B8 2 04 A    0872            NJP    REALREL        DONE
4E3A  A904   A8 1 04 A    0873            STA    *E             STORE INT RELATIVE ADDRESS
4E3B  6005   60 0 05 A    0874            INC    A
4E3C  6004   60 0 04 A    0875            INC    E
4E3D  72FA   70 2 FA A    0876            JMP    INTREL
                          0877  *
4E3E  6C05   68 4 05 A    0878  REALREL   DCR    5,B
4E3F  BA05   B8 2 05 A    0879            NJP    DATAREL        DONE
4EC0  A904   A8 1 04 A    0880            STA    *E             STORE REAL RELATIVE ADDRESS
4EC1  6005   60 0 05 A    0881            INC    A
4EC2  6005   60 0 05 A    0882            INC    A
4EC3  6004   60 0 04 A    0883            INC    E
4EC4  72F9   70 2 F9 A    0884            JMP    REALREL
                          0885  *
4EC5  6C06   68 4 06 A    0886  DATAREL   DCR    6,B
4EC6  BA04   B8 2 04 A    0887            NJP    SYMBREL        DONE
4EC7  A904   A8 1 04 A    0888            STA    *E             STORE DATA RELATIVE ADDRESS
4EC8  6005   60 0 05 A    0889            INC    A
4EC9  6004   60 0 04 A    0890            INC    E
4ECA  72FA   70 2 FA A    0891            JMP    DATAREL
                          0892  *
4ECB  50BF   50 0 BF A    0893  SYMBREL   LOR    KIX8000        SET REL ADR FOR INDIRECT MODE
4ECC  6C07   68 4 07 A    0894            DCR    7,B
4ECD  BA05   B8 2 05 A    0895            NJP    CALLSUB        DONE
4ECE  A904   A8 1 04 A    0896            STA    *E
4ECF  6005   60 0 05 A    0897            INC    A
4ED0  6004   60 0 04 A    0898            INC    E
4ED1  72FA   70 2 FA A    0899            JMP    SYMBREL+1
                          0900  *
4ED2  0000   00 0 00 A    0901  PROGADR   DAT    0
4ED3  2A1C   28 2 1C A    0902  CALLSUB   LDA    PROGRTN
4ED4  A904   A8 1 04 A    0903            STA    *E             SET JUMP FOR RETURN
4ED5  30A0   30 0 A0 A    0904            CDR    RAL
                          0905            SKP,SIM+1  S6A,S6
      4ED6   48 6 D6 A    0911  S6        EQU    *
```

```
*ED6  EFFC  E8 / FC A   0912          SST    *PROGADR,B          CALL ROUTINE
      0018  00 0 18 A   0913  RELARG  RPT    24
*ED7  7200  70 2 00 A   0914          DAT    X'7200'
*ED8  7200  70 2 00 A   0914          DAT    X'7200'
*ED9  7200  70 2 00 A   0914          DAT    X'7200'
*EDA  7200  70 2 00 A   0914          DAT    X'7200'
*EDB  7200  70 2 00 A   0914          DAT    X'7200'
*EDC  7200  70 2 00 A   0914          DAT    X'7200'
*EDD  7200  70 2 00 A   0914          DAT    X'7200'
*EDE  7200  70 2 00 A   0914          DAT    X'7200'
*EDF  7200  70 2 00 A   0914          DAT    X'7200'
*EE0  7200  70 2 00 A   0914          DAT    X'7200'
*EE1  7200  70 2 00 A   0914          DAT    X'7200'
*EE2  7200  70 2 00 A   0914          DAT    X'7200'
*EE3  7200  70 2 00 A   0914          DAT    X'7200'
*EE4  7200  70 2 00 A   0914          DAT    X'7200'
*EE5  7200  70 2 00 A   0914          DAT    X'7200'
*EE6  7200  70 2 00 A   0914          DAT    X'7200'
*EE7  7200  70 2 00 A   0914          DAT    X'7200'
*EE8  7200  70 2 00 A   0914          DAT    X'7200'
*EE9  7200  70 2 00 A   0914          DAT    X'7200'
*EEA  7200  70 2 00 A   0914          DAT    X'7200'
*EEB  7200  70 2 00 A   0914          DAT    X'7200'
*EEC  7200  70 2 00 A   0914          DAT    X'7200'
*EED  7200  70 2 00 A   0914          DAT    X'7200'
*EEE  7200  70 2 00 A   0914          DAT    X'7200'
*EEF  714E  70 1 4E A   0915  PROGRTN JMP    *DRCTR
*EF0  000C  00 0 0C A   0916          LPL
*EF1  3330  30 3 30 A
*EF2  4ED7  48 6 D7 A
                        0917          TTL    'TSTBRL ALGORITHM (08)'
                        0918  *
                        0919  *                          TEST BRANCH LOGICAL ALGORITHM
                        0920  *
                        0921  *       WORD 0      BLOCK # / MODULE TYPE
                        0922  *       WORD 1      INPUT BIT ADDRESS
                        0923  *       WORD 2      *TRUE* LOCATION
                        0924  *       WORD 3      *FALSE* LOCATION
                        0925  *
                        0926  *
      4EF3  48 6 F3 A   0927  TSTBRL  EQU    $
*EF3  2802  28 0 02 A   0928          LDA    C
*EF4  AC04  A8 4 04 A   0929          STA    4,B
*EF5  2E01  28 6 01 A   0930          LDA    1,C
*EF6  1000  10 0 00 A   0931          LDC    P
```

```
4EF7  715D  70 1 5D A  0932          JMP    *LOADBIT          CHECK STATE OF INPUT BIT
4EF8  AC03  A8 4 03 A  0933          STA    3,B
                       0934          SKP,SIM+1  TRCBRL,EXTBRL
      4EF9  48 6 F9 A  0944  EXTBRL  EQU    $
4EF9  2C03  28 4 03 A  0945          LDA    3,B
4EFA  BA01  B8 2 01 A  0946          NJP    $+2
4EFB  6402  60 4 02 A  0947          INC    OPERATE,R
4EFC  6402  60 4 02 A  0948          INC    OPERATE,R
4EFD  2D02  28 5 02 A  0949          LDA    *OPERATE,B
4EFE  4401  40 4 01 A  0950          ADD    CHAINSTR,R
4EFF  AC02  A8 4 02 A  0951          STA    OPERATE,R
4F00  714E  70 1 4E A  0952          JMP    *DRCTR
                       0953          LPL
                       0954          TTL    'SET    ALGORITHM (09)'
                       0955  *
                       0956  * SET LOGICAL TRUE ALGORITHM
                       0957  *
                       0958  *       WORD 0          BLOCK # / ALGORITHM NAME
                       0959  *       WORD 1          LOGICAL BIT ADDRESS
                       0960  *
      4F01  48 7 01 A  0961  SET     EQU    $
4F01  2802  28 0 02 A  0962          LDA    C
4F02  40B1  40 0 B1 A  0963          ADD    K1X2
4F03  AC02  A8 4 02 A  0964          STA    2,B               NEXT BLOCK ADDRESS
                       0965  *                                 CHECK FOR TRACE
                       0966          SKP,SIM+1  S7A,S7
      4F04  48 7 04 A  0972  S7      EQU    $
4F04  2E01  28 6 01 A  0973          LDA    1,C               BIT ADDRESS
4F05  ED5B  E8 5 5B A  0974          SST    *BISETR,R
4F06  714E  70 1 4E A  0975          JMP    *DRCTR
                       0976  *
                       0977          TTL    'RESET  ALGORITHM (10)'
                       0978  * SET LOGICAL FALSE ALGORITHM
                       0979  *
                       0980  *       WORD 0          BLOCK # / ALGORITHM NAME
                       0981  *       WORD 1          LOGICAL BIT ADDRESS
                       0982  *
      4F07  48 7 07 A  0983  RESET   EQU    $
4F07  2802  28 0 02 A  0984          LDA    C
4F08  40B1  40 0 B1 A  0985          ADD    K1X2
4F09  AC02  A8 4 02 A  0986          STA    2,B               NEXT BLOCK ADDRESS
                       0987  *                                 CHECK FOR TRACE
                       0988          SKP,SIM+1  S8A,S8
      4F0A  48 7 0A A  0994  S8      EQU    $
4F0A  2E01  28 6 01 A  0995          LDA    1,C               BIT ADDRESS
4F0B  ED5C  E8 5 5C A  0996          SST    *BIRESR,R
```

```
*F0C  714E   70 1 4E A   0997           JMP      *DRCTR
                         0998           LPL
                         0999           TTL      'SETRST ALGORITHM (11)'
                         1000  *
                         1001  *                                SET/RESET ALGORITHM
                         1002  *
                         1003  *        WORD 0         BLOCK # / ALGORITHM TYPE
                         1004  *        WORD 1         # OF BITS TO SET  (N)
                         1005  *        WORD 3IN+1     BIT ADDRESSES TO SET
                         1006  *        WORD N+2       # OF BITS TO RESET (M)
                         1007  *        WORD N+3IM+N+2 BIT ADDRESSES TO RESET'
                         1008  *
                         1009  *
      *F0D   48 7 0D A   1010  SETRST   EQU      *
*F0D  6402   60 4 02 A   1011           INC      OPERATE,A
*F0E  2E01   28 6 01 A   1012           LDA      1,C
*F0F  AC03   A8 4 03 A   1013           STA      3,B
*F10  F205   F0 2 05 A   1014  SETLOOP  ZJP      RES
*F11  6402   60 4 02 A   1015           INC      OPERATE,A
                         1016           SKP,SIM+1  S9A,S9
      *F12   48 7 12 A   1028  S9       EQU      *
*F12  2002   28 5 02 A   1029           LDA      *OPERATE,B
*F13  ED59   E8 5 59 A   1030           SST      *BISETR,A
*F14  6C03   68 4 03 A   1031           DCR      3,B
*F15  72FA   70 2 FA A   1032           JMP      SETLOOP
                         1033  *
      *F16   48 7 16 A   1034  RES      EQU      *
*F16  6402   60 4 02 A   1035           INC      OPERATE,A
*F17  2002   28 5 02 A   1036           LDA      *OPERATE,B
*F18  AC03   A8 4 03 A   1037           STA      3,B
*F19  F205   F0 2 05 A   1038  RESLOOP  ZJP      EXTR
*F1A  6402   60 4 02 A   1039           INC      OPERATE,A
                         1040           SKP,SIM+1  S10A,S10
      *F1B   48 7 1B A   1052  S10      EQU      *
*F1B  2002   28 5 02 A   1053           LDA      *OPERATE,B
*F1C  ED5C   E8 5 5C A   1054           SST      *BIRESR,A
*F1D  6C03   68 4 03 A   1055           DCR      3,B
*F1E  72FA   70 2 FA A   1056           JMP      RESLOOP
                         1057  *
      *F1F   48 7 1F A   1058  EXTR     EQU      *
*F1F  6402   60 4 02 A   1059           INC      OPERATE,A
                         1060           SKP,SIM+1  S11A,S11
      *F20   48 7 20 A   1067  S11      EQU      *
*F20  714E   70 1 4E A   1068           JMP      *DRCTR
                         1069           LPL
```

```
                                    TTL     'GOTO   ALGORITHM (12)'
                              *
                              *                                 GO TO ALGORITHM
        4F21    48 7 21 A     GOTO  EQU     *
                              *
                              *     WORD 0          BLOCK # / MODULE TYPE
                              *     WORD 1          TRANSFER LOC (RELATIVE)
                              *
                              *
4F21    2E01    28 6 01 A           LDA     1,C
4F22    4401    40 4 01 A           ADD     CHAINSTR,B
4F23    AC02    A8 4 02 A           STA     OPERATE,A
4F24    714E    70 1 4E A           JMP     *DRCTR
                                    LPL
                                    TTL     'PERMISSIVE ALGO  (13)'
                              *
                              * PERMISSIVE ALGORITHM
                              *
                              *     WORD 0          BLOCK # / ALGORITHM NAME
                              *     WORD 1          # OF TRUE LOGICALS (T)
                              *     WORD 2          1 ST TRUE LOGICAL
                              *     WORD T+2        T TH TRUE LOGICAL
                              *     WORD T+3        # OF FALSE LOGICALS (F)
                              *     WORD T+4        1 ST FALSE LOGICAL
                              *     WORD T+F+3      F TH FALSE LOGICAL
                              *     WORD T+F+4      TRF BLOCK REL LOC FOR FAIL
                              *
        4F25    48 7 25 A     PERM  EQU     *
4F25    2802    28 0 02 A           LDA     C
4F26    4080    40 0 80 A           ADD     KIX1
4F27    2105    20 1 05 A           LDE     *A
4F28    A404    A0 4 04 A           STE     4,B             NUMBER OF TRUE ENTRIES
4F29    6005    60 0 05 A           INC     A
4F2A    AC06    A8 4 06 A           STA     6,B             ADDRESS OF FIRST TRUE ENTRY
4F2B    4404    40 4 04 A           ADD     4,B
4F2C    2105    20 1 05 A           LDE     *A
4F2D    A405    A0 4 05 A           STE     5,B             NUMBER OF FALSE ENTRIES
4F2E    6005    60 0 05 A           INC     A
4F2F    AC07    A8 4 07 A           STA     7,B             ADDRESS OF FIRST FALSE ENTRY
4F30    4405    40 4 05 A           ADD     5,B
4F31    2105    20 1 05 A           LDE     *A              ADDRESS OF BLOCK
4F32    A408    A0 4 08 A           STE     8,B             BLOCK TRANSFER INDEX
4F33    6005    60 0 05 A           INC     A
4F34    AC02    A8 4 02 A           STA     2,B             ADDRESS FOR ALL CORRECT RETURN
                              *
```

```
4F35  6C04  68 4 04 A  1115  CKTRUE   DCR   4,B
4F36  BA0B  B8 2 0B A  1116           NJP   CKFALSE           TRUE DONE
4F37  2005  28 5 05 A  1117           LDA   *6,B
4F38  5B3C  58 0 BC A  1118           AND   K:X1000           CHECK FOR JUMPER BIT
4F39  F201  F0 2 01 A  1119           ZJP   $+2
4F3A  7205  70 2 05 A  1120           JMP   NEXTRUE           JUMPER BIT SET
4F3B  2006  28 5 05 A  1121           LDA   *6,B
4F3C  AC09  A8 4 09 A  1122           STA   9,B
4F3D  1000  10 0 00 A  1123           LDC   P
4F3E  715D  70 1 5D A  1124           JMP   *LOADBIT
4F3F  B20F  B0 2 0F A  1125           PJP   ERRFOUND          LOGICAL NOT TRUE
4F40  6405  60 4 05 A  1126  NEXTRUE  INC   6,B
4F41  72F3  70 2 F3 A  1127           JMP   CKTRUE
                       1128  *
4F42  6C05  68 4 05 A  1129  CKFALSE  DCR   5,B
4F43  BA0F  B8 2 0F A  1130           NJP   ALLOK
4F44  2007  28 5 07 A  1131           LDA   *7,B
4F45  5B3C  58 0 BC A  1132           AND   K:X1000           CHECK FOR JUMPER BIT
4F46  F201  F0 2 01 A  1133           ZJP   $+2
4F47  7205  70 2 05 A  1134           JMP   NXTFALSE          JUMPER BIT SET
4F48  2007  28 5 07 A  1135           LDA   *7,B
4F49  AC09  A8 4 09 A  1136           STA   9,B
4F4A  1000  10 0 00 A  1137           LDC   P
4F4B  715D  70 1 5D A  1138           JMP   *LOADBIT
4F4C  BA02  B8 2 02 A  1139           NJP   ERRFOUND          LOGICAL NOT FALSE
4F4D  6407  60 4 07 A  1140  NXTFALSE INC   7,B
4F4E  72F3  70 2 F3 A  1141           JMP   CKFALSE
                       1142  *
4F4F  2C01  28 4 01 A  1143  ERRFOUND LDA   1,B               CALCULATE BLOCK TRANSFER ADDRESS
4F50  4408  40 4 08 A  1144           ADD   8,B
4F51  AC02  A8 4 02 A  1145           STA   2,B
      4F52  48 / 52 A  1146  CHPRMTRC EQU   $                 CHECK PERMISSIVE TRACE
                       1147           SKP,SIM+1  S12A,S12
      4F52  48 / 52 A  1154  S12      EQU   $
                       1155  *                                OR IF ALL OK - STORE *1*
      4F52  48 / 52 A  1156  GODRCTR  EQU   $
4F52  714E  70 1 4E A  1157           JMP   *DRCTR
      4F53  48 / 53 A  1158  ALLOK    EQU   $
                       1159           SKP,SIM+1  S13A,S13
      4F53  48 / 53 A  1163  S13      EQU   $
4F53  72FE  70 2 FE A  1164           JMP   CHPRMTRC
                       1165           LPL
                       1166           TTL   'DATA TRANSFER ALGORITHM  (14)'
                       1167  *
                       1168  * DATA TRANSFER ALGORITHM
                       1169  *
```

```
                          1170  *          WORD 0        BLOCK # / ALGORITHM NAME
                          1171  *          WORD 1        TRANSFER COUNT (+=TRF,-=INIT)  1,C
                          1172  *          WORD 2        FROM (TRF) OR VALUE (INIT)     2,C
                          1173  *          WORD 3        TO                             3,C
                          1174  *
      4F54   48 / 54 A    1175  DATRNS   EQU       $
                          1176           SKP,SIM+1  S14A,S14
      4F54   48 / 54 A    1181  S14      EQU       $
4F54  2802   28 0 02 A    1182           LDA       C
4F55  40B2   40 0 B2 A    1183           ADD       KIX4
4F56  AC02   A8 4 02 A    1184           STA       2,B              NEXT BLOCK ADDRESS
4F57  2E03   28 6 03 A    1185           LDA       3,C
4F58  AC06   A8 4 06 A    1186           STA       6,B              TARGET LOCATION
4F59  2E01   28 6 01 A    1187           LDA       1,C
4F5A  F14E   F0 1 4E A    1188           ZJP       *DRCTR           COUNT=0,EXIT
4F5B  AC04   A8 4 04 A    1189           STA       4,B              COUNTER
                          1190           SKP,SIM+1  S15A,S15
      4F5C   48 / 5C A    1196  S15      EQU       $
4F5C  2C04   28 4 04 A    1197           LDA       4,B
4F5D  BA09   B8 2 09 A    1198           NJP       NEGCNT           VALUE TO LOCATION REQUEST
                          1199  *
4F5E  2E02   28 6 02 A    1200           LDA       2,C              TRANSFER DATA REQUEST
4F5F  AC05   A8 4 05 A    1201           STA       5,B              INITIAL LOCATION
4F60  2D05   28 5 05 A    1202  MOVDAT   LDA       *5,B             PICK UP DATA
                          1203           SKP,SIM+1  S20A,S20
      4F61   48 / 61 A    1208  S20      EQU       $
4F61  AD06   A8 5 06 A    1209           STA       *6,B             STORE IN TARGET LOC
                          1210           SKP,SIM+1  S16A,S16
      4F62   48 / 62 A    1216  S16      EQU       $
4F62  6C04   58 4 04 A    1217           DCR       4,B              DECREMENT COUNT
4F63  F14E   F0 1 4E A    1218           ZJP       *DRCTR           DONE
4F64  6405   60 4 05 A    1219           INC       5,B              SET POINTERS TO NEXT LOCATION
4F65  6406   60 4 06 A    1220           INC       6,B
4F66  72F9   70 2 F9 A    1221           JMP       MOVDAT
                          1222  *
4F67  2E02   28 6 02 A    1223  NEGCNT   LDA       2,C              VALUE
      4F68   48 / 68 A    1224  MOVAL    EQU       $
                          1225           SKP,SIM+1  S19A,S19
      4F68   48 / 68 A    1234  S19      EQU       $
4F68  AD06   A8 5 06 A    1235           STA       *6,B
                          1236           SKP,SIM+1  S17A,S17
      4F69   48 / 69 A    1242  S17      EQU       $
4F69  6404   60 4 04 A    1243           INC       4,B              INCREMENT COUNTER
4F6A  F14E   F0 1 4E A    1244           ZJP       *DRCTR           DONE
4F6B  6406   60 4 06 A    1245           INC       6,B              SET POINTER TO NEXT LOCATION
```

```
4F6C  72F3   70 2 F8 A   1246         JMP      MOVAL
                         1247         LPL
                         1248         TTL      'DIAGNOSTIC ALGORITHM     (15)'
                         1249  *
                         1250  * DIAGNOSTIC ALGORITHM
                         1251  *
                         1252  *      WORD 0          BLOCK # / ALGORITHM NAME
                         1253  *      WORD 1          LINK WORD       1,C
                         1254  *      WORD 2          COUNTER WORD    2,C
                         1255  *      WORD 3          TIME COUNT      3,C
                         1256  *      WORD 4          ACTION NUMBER   4,C
                         1257  *      WORD 5          NEXT SLVL #     5,C
                         1258  *      WORD 6          INPUT LOGICAL   6,C
                         1259  *      WORD 7          OUTPUT LOGICAL  7,C
                         1260  *
      4F6D   48 7 6D A   1261  DIAG   EQU      *
4F6D  2E03   28 6 03 A   1262         LDA      3,C
                         1263         SKP,SIM+1  S18A,S18
      4F6E   48 7 6E A   1268  S18    EQU      *
4F6E  AC04   A8 4 04 A   1269         STA      4,B              COUNT
                         1270         SKP,SIM+1  DIAGTRC,TESTIN
      4F6F   48 7 6F A   1280  TESTIN EQU      *
4F6F  2E06   28 6 06 A   1281         LDA      6,C              INPUT
4F70  1000   10 0 00 A   1282         LDC      P
4F71  715D   70 1 5D A   1283         JMP      *LOADBIT
4F72  BAC2   38 2 02 A   1284         NJP      INTRUE
4F73  28AD   28 0 AD A   1285         LDA      KIX5
4F74  AC04   A8 4 04 A   1286         STA      4,B              SET TIME FOR 1/2 SECOND
4F75  1402   10 4 02 A   1287  INTRUE LDC      2,B              RESET C
4F76  2C04   28 4 04 A   1288         LDA      4,B
4F77  AE02   A8 6 02 A   1289         STA      2,C              SET COUNTER
                         1290  *
4F78  2E04   28 6 04 A   1291         LDA      4,C              ACTION NUMBER
4F79  3804   38 0 04 A   1292         STZ      E
4F7A  DA1A   D8 2 1A A   1293         DIV      D1000
4F7B  AC04   A8 4 04 A   1294         STA      4,B              SEQUENCE NUMBER
4F7C  A405   A0 4 05 A   1295         STE      5,B              ACTION BLOCK NUMBER
4F7D  4218   40 2 18 A   1296         ADD      *SEQPOINT
4F7E  AC06   A8 4 06 A   1297         STA      6,B              ADDRESS FOR SEQ IN POINTER TABLE
                         1298  *
4F7F  2905   28 1 05 A   1299         LDA      *A
4F80  AE01   A8 6 01 A   1300         STA      1,C              ENTER DIAG INTO LINK
4F81  2802   28 0 02 A   1301         LDA      C
4F82  6005   60 0 05 A   1302         INC      A
4F83  AD06   A8 5 06 A   1303         STA      *6,B
                         1304  *
```

```
4F84  3C07  38 4 07 A            STZ   7,B        CLEAR FLAG
4F85  2E04  28 6 04 A            LDA   4,C
4F86  AC09  A8 4 09 A            STA   9,B        ACTION NUMBER
4F87  2C05  28 4 05 A            LDA   5,B        DETERMINE WHICH DIAGS TO R MOVE
4F88  3804  38 0 04 A            STZ   E
4F89  DA0A  D8 2 0A A            DIV   D10
4F8A  6805  68 0 05 A            DCR   A
4F8B  F20C  F0 2 0C A            ZJP   REMOVAL    CHECK FOR ACTION = 10
4F8C  2004  20 0 04 A            LDE   E
4F8D  F241  F0 2 41 A            ZJP   SEARCH     ACTION=MULTIPLE OF 10
4F8E  6C07  68 4 07 A  REMVILS   DCR   7,B        SET FLAG TO REMOVE DIAG =    LESS
4F8F  6C09  68 4 09 A            DCR   9,B        SET ACTION = TO 1 LESS
4F90  723E  70 2 3E A            JMP   SEARCH
4F91  CFFF  C8 7 FF A  K:XCFFF   DAT   X'CFFF'    IGNORE AND FLAG BITS MASK
4F92  000D  00 0 0D A  PERMTYPE  DAT   X'D'       TYPE=13
4F93  000A  00 0 0A A  D10       DAT   10         10 DIVISOR
4F94  03E8  00 3 E8 A  D1000     DAT   1000       1000 DIVISOR
4F95  331C  30 3 1C A            LPL
4F96  4F97  48 7 97 A
4F97  4FCE  48 7 CE A
                       *
4F98  2004  20 0 04 A  REMOVAL   LDE   E
4F99  F201  F0 2 01 A            ZJP   *+2        ACTION = 10
4F9A  72F3  70 2 F3 A            JMP   REMVILS
4F9B  3E01  38 6 01 A            STZ   1,C        CANCEL ALL PREVIOUS DIAGS
                       *
      4F9C  48 7 9C A  CONTINUE  EQU   *
4F9C  1402  10 4 02 A            LDC   2,B
4F9D  2E05  28 6 05 A            LDA   5,C        LEVEL
4F9E  F22C  F0 2 2C A            ZJP   DIAGEXIT   LEVEL=0,EXIT
4F9F  AC0B  A8 4 0B A            STA   11,B
4FA0  ED25  E8 5 25 A            SST   *SLOC,B    LOCATE SUBLEVEL
4FA1  000B  00 0 0B A            DAT   11
4FA2  000C  00 0 0C A            DAT   12
4FA3  000D  00 0 0D A            DAT   13
4FA4  000E  00 0 0E A            DAT   14
4FA5  6C0E  68 4 0E A            DCR   14,B
4FA6  F201  F0 2 01 A            ZJP   *+2        ERROR RETURN CORRECT
4FA7  7223  70 2 23 A            JMP   DIAGEXIT   INVALID SUBLEVEL,EXIT
                       *
4FA8  2C0C  28 4 0C A            LDA   12,B       START OF CHAIN
4FA9  40AD  40 0 AD A            ADD   K:X5
4FAA  AC0F  A8 4 0F A            STA   15,B       ADDRESS OF FIRST BLOCK
4FAB  2905  28 1 05 A            LDA   *A
4FAC  58A2  58 0 A2 A            AND   K:XFF
```

```
*FAD  4AE5  48 2 E5 A                SUB   PERMTYPE
*FAE  F201  F0 2 01 A                ZJP   $+2          PERM IS FIRST MODULE
*FAF  7219  70 2 19 A                JMP   BIDLEVL
*F30  2C0F  28 4 0F A                LDA   15,B
*F31  6005  60 0 05 A                INC   A
*F32  2105  20 1 05 A                LDE   *A
*F33  A410  A0 4 10 A                STE   16,B         NUMBER OF TRUE ENTRIES
*F34  6005  60 0 05 A                INC   A
*F35  AC11  A8 4 11 A                STA   17,B         ADDRESS OF FIRST TRUE ENTR E
*F36  4410  40 4 10 A                ADD   16,B
*F37  2105  20 1 05 A                LDE   *A
*F38  A412  A0 4 12 A                STE   18,B         NUMBER OF FALSE ENTRIES
*F39  6005  60 0 05 A                INC   A
*F3A  AC13  A8 4 13 A                STA   19,B         ADDRESS OF FIRST FALSE ENT IE
*F3B  6C10  68 4 10 A      RSTTRUE   DCR   16,B
*F3C  BA05  B8 2 05 A                NJP   RSTFALS      TRUE ENTRIES DONE
*F3D  2D11  28 5 11 A                LDA   *17,B
*F3E  5AD3  58 2 D3 A                AND   K:XCFFF      AND OFF BITS
*F3F  AD11  A8 5 11 A                STA   *17,B
*FC0  6411  60 4 11 A                INC   17,B
*FC1  72F9  70 2 F9 A                JMP   RSTTRUE
*FC2  6C12  68 4 12 A      RSTFALS   DCR   18,B
*FC3  BA05  B8 2 05 A                NJP   BIDLEVL      FALSE DONE
*FC4  2D13  28 5 13 A                LDA   *19,B
*FC5  5ACC  58 2 CC A                AND   K:XCFFF      AND OFF BITS
*FC6  AD13  A8 5 13 A                STA   *19,B
*FC7  6413  60 4 13 A                INC   19,B
*FC8  72F9  70 2 F9 A                JMP   RSTFALS
                           *
*FC9  2C0B  28 4 0B A      BIDLEVL   LDA   11,B
*FCA  ED15  E8 5 15 A                SST   *SBIDR,B
*FCB  2802  28 0 02 A      DIAGEXIT  LDA   C
*FCC  40B3  40 0 B3 A                ADD   K:X8
*FCD  AC02  A8 4 02 A                STA   2,B          NEXT BLOCK ADDRESS
*FCE  714E  70 1 4E A                JMP   *DRCTR
                           *
*FCF  1D06  18 5 06 A      SEARCH    LDG   *6,B         MOVE SEARCH PAST ENTRY
*FD0  1103  10 1 03 A                LDC   *G
*FD1  F2CA  F0 2 CA A                ZJP   CONTINUE     NO DIAGS IN LINK
*FD2  2E03  28 6 03 A      LOOP      LDA   3,C          ACTION
*FD3  4C09  48 4 09 A                SUB   9,B
*FD4  F205  F0 2 05 A                ZJP   REMOVE1      REMOVE NEXT LOWEST DIAG
*FD5  BA10  B8 2 10 A                NJP   REMOVLS      REMOVE LOWER DIAG
*FD6  1802  18 0 02 A      DONEXT    LDG   C
*FD7  1102  10 1 02 A                LDC   *C
```

```
4FD8  F2C3  F0 2 C3 A             ZJP  CONTINUE       END OF LIN<
4FD9  72F8  70 2 F8 A             JMP  LOOP
4FDA  2902  28 1 02 A  REMOVE1    LDA  *C             REMOVE DIA3 * T9 1 LESS
4FDB  A903  A8 1 03 A             STA  *G
4FDC  2802  28 0 02 A             LDA  C
4FDD  6005  60 0 05 A             INC  A
4FDE  2105  20 1 05 A             LDE  *A             SEC COUNTER
4FDF  BA08  B8 2 08 A             NJP  RST1CNT        COUNT HAS EXPIRED
4FE0  6005  60 0 05 A             INC  A
4FE1  2905  28 1 05 A             LDA  *A
4FE2  4804  48 0 04 A             SUB  E
4FE3  AC0A  A8 4 0A A  RST1RTN    STA  10,B           EXPIRED COUNT
4FE4  EF30  E8 7 30 A             SST  **ACTRAC,B     CALL ACTION BLOCK TRACE
4FE5  0009  00 0 09 A             DAT  9
4FE6  000A  00 0 0A A             DAT  10
4FE7  72B4  70 2 B4 A             JMP  CONTINUE
                       *
4FE8  A804  A8 0 04 A  RST1CNT    STA  E              SAVE A
4FE9  2A2A  28 2 2A A             LDA  *TIMFLAG
4FEA  4404  40 4 04 A             ADD  4,B
4FEB  ED5C  E8 5 5C A             SST  *BIRESR,A
4FEC  3C0A  38 4 0A A             STZ  10,B
4FED  EF25  E8 7 25 A             SST  **PSLGHT,B     TURN OFF FLASHING LIGHT
4FEE  0004  00 0 04 A             DAT  4
4FEF  000A  00 0 0A A             DAT  10
4FF0  6004  60 0 04 A             INC  E
4FF1  2904  28 1 04 A             LDA  *E             COUNT FOR TRACE
4FF2  72F0  70 2 F0 A             JMP  RST1RTN
                       *
4FF3  2C07  28 4 07 A  REMOVLS    LDA  7,B            CHECK FLAG
4FF4  BAE1  B8 2 E1 A             NJP  DBNEXT         FLAG SET
4FF5  2902  28 1 02 A             LDA  *C
4FF6  A903  A8 1 03 A             STA  *3             REMOVE DIA3
4FF7  2802  28 0 02 A             LDA  C
4FF8  40AC  40 0 AC A             ADD  KIX3
4FF9  2105  20 1 05 A             LDE  *A
4FFA  A409  A0 4 09 A             STE  9,B            ACTION NUMBER
4FFB  48B1  48 0 B1 A             SUB  KIX2
4FFC  2105  20 1 05 A             LDE  *A             SEC COUNTER
4FFD  BA0A  B8 2 0A A             NJP  RSTLSCNT       COUNT HAS EXPIRED
4FFE  6005  60 0 05 A             INC  A
4FFF  2905  28 1 05 A             LDA  *A
5000  4804  48 0 04 A             SUB  E
5001  AC0A  A8 4 0A A  RSTLSRTN   STA  10,B           EXPIRED COUNT
5002  EF12  E8 7 12 A             SST  **ACTRAC,A     CALL ACTION BLOCK TRACE
```

```
5003  0009  00 0 09 A                 DAT   9
5004  000A  00 0 0A A                 DAT   10
5005  1102  10 1 02 A                 LDC   *C
5006  F295  F0 2 95 A                 ZJP   CONTINUE       NO DIAGS LEFT
5007  72CA  70 2 CA A                 JMP   LOOP
                            *
5008  A804  A8 0 04 A       RSTLSCNT  STA   E              SAVE A
5009  2A0A  28 2 0A A                 LDA   *TIMFLAG
500A  4404  40 4 04 A                 ADD   4,B
500B  ED5C  E8 5 5C A                 SST   *BIRESR,A
500C  3C0A  38 4 0A A                 STZ   10,B
500D  EF08  E8 7 08 A                 SBT   **PSLGHT,8     TURN OFF FLASHING LIGHT
500E  0004  00 0 04 A                 DAT   4
500F  000A  00 0 0A A                 DAT   10
5010  6004  60 0 04 A                 INC   E
5011  2904  28 1 04 A                 LDA   *E             COUNT FOR TRACE
5012  72EE  70 2 EE A                 JMP   RSTLSRTN
5013  C960  C8 1 60 A                 LPL
5014  5016  50 0 16 A
5015  5051  50 0 51 A
                                      TTL   'SPECIAL DIAG SUBROUTINES'
                            *
                            *               THE ACTRAC SUBROUTINE IS CALLED FROM THE DIAG
                            *               MODULE TO OUTPUT A TIME TRACE OF THE DIRECTOR.
                            *               TWO WORDS IN COMMON (TRACING AND TRACINDC+1) ARE
                            *               USED AS INDICATORS FOR EACH AUTO SEQ FOR TRACING
                            *               STATUS
                            *
5016  507A  50 0 7A A                 ADL   POOL
      5017  50 0 17 A       ACTRAC    EQU   $
5017  1800  18 0 00 A                 LDB   P
5018  7130  70 1 30 A                 JMP   *SBT1
5019  0001  00 0 01 A                 DAT   1
                            *
501A  0AFC  08 2 FC A                 LDB   *POOL
501B  2A22  28 3 22 A                 LDA   *ACTION        CALCULATE SEQUENCE
501C  AA2B  A8 2 2B A                 STA   BUF+2          STORE ACTION IN BUFFER
501D  3804  38 0 04 A                 STZ   E
501E  DA2D  D8 3 2D A                 DIV   D1000
501F  3804  38 0 04 A                 STZ   E
5020  DA2C  D8 2 2C A                 DIV   *16            CALCULATE WHICH WORD IS INDICATOR
5021  422C  40 2 2C A                 ADD   *TRACINDC
5022  AA1D  A8 2 1D A                 STA   TRACADR        ADDRESS OF INDICATOR WORD
5023  2804  28 0 04 A                 LDA   E
5024  422A  40 2 2A A                 ADD   *KIX1          BIT MASK
```

```
5025  2905  28 1 05 A  1481           LDA  *A
5026  5319  58 3 19 A  1482           AND  *TRACADR
5027  F20B  F0 2 0B A  1483           ZJP  EXITPRG              EXIT,NO TRACE NEEDED
5028  2A16  28 2 16 A  1484           LDA  TIME                 CALCULATE TIME IN SECONDS
5029  3804  38 0 04 A  1485           STZ  E                    AND 1/10 SECONDS
502A  DA26  D8 2 26 A  1486           DIV  *10
502B  AA1D  A8 2 1D A  1487           STA  BUF+3
502C  A21D  A0 2 1D A  1488           STE  BUF+4
                       1489  *
502D  EC7D  E8 4 7D A  1490           SST  PRINT,B              CALL PRINT
502E  FFC6  F8 7 C6 A  1491           DAT  DEVICE-POOL
502F  FFC7  F8 7 C7 A  1492           DAT  MESNUM-POOL
5030  FFC8  F8 7 C8 A  1493           DAT  LENGTH-POOL
5031  7FC9  78 7 C9 A  1494           DAT  BUFFER-POOL+X'8000'
5032  FFCA  F8 7 CA A  1495           DAT  ERR-POOL
                       1496  *
5033  0A48  08 2 48 A  1497  EXITPRG  LDB  BSAVE
5034  7107  70 1 07 A  1498           JMP  *MISFX
      0006  00 0 06 A  1499           RPT  6
5035  0000  00 0 00 A  1500           DAT  0
5036  0000  00 0 00 A  1500           DAT  0
5037  0000  00 0 00 A  1500           DAT  0
5038  0000  00 0 00 A  1500           DAT  0
5039  0000  00 0 00 A  1500           DAT  0
503A  0000  00 0 00 A  1500           DAT  0
503B  0000  00 0 00 A  1501  POOL1    DAT  0
503C  0000  00 0 00 A  1502  BSAVE1   DAT  0
503D  0000  00 0 00 A  1503  ACTION   DAT  0
503E  0000  00 0 00 A  1504  TIME     DAT  0
503F  0000  00 0 00 A  1505  TRACADR  DAT  0
5040  0004  00 0 04 A  1506  DEVICE   DAT  4
5041  0018  00 0 18 A  1507  MESNUM   DAT  24
5042  0006  00 0 06 A  1508  LENGTH   DAT  6
5043  5045  50 0 45 A  1509  BUFFER   DAT  BUF
5044  0000  00 0 00 A  1510  ERR      DAT  0
5045  A0A0  A0 0 A0 A  1511  BUF      DAT  X'A0A0'              BLANKS FOR CUSOR PLACEMENT
5046  A0A0  A0 0 A0 A  1512           DAT  X'A0A0'
5047  0000  00 0 00 A  1513           DAT  0                    ACTION NUMBER
5048  0000  00 0 00 A  1514           DAT  0                    TIME IN SECONDS
5049  0000  00 0 00 A  1515           DAT  0                    TIME IN 1/10 SECONDS
504A  A0A0  A0 0 A0 A  1516           DAT  X'A0A0'
504B  4F94  48 7 94 A  1517           LPL
504C  0010  00 0 10 A
504D  331A  30 3 1A A
504E  00B0  00 0 B0 A
504F  507B  50 0 7B A
```

```
5050  000A   00 0 0A A                   EJE
                                 *
                                 *                 THE PSLIGHT SUBROUTINE IS CALLED TO TURN OFF
                                 *                 OR ON THE PUSHLIGHT ASSOCIATED WITH EACH
                                 *                 AUTO SEQUENCE
                                 *
5051  507A   50 0 7A A                   ADL       POOL
      5052   50 0 52 A           PSLGHT  EQU       *
5052  1800   18 0 00 A                   LDG       P
5053  7130   70 1 30 A                   JMP       *SBTI
5054  0001   00 0 01 A                   DAT       1
5055  0AC1   08 2 C1 A                   LDB       *POOL
5056  2A25   28 2 25 A                   LDA       *SEQ
5057  AA25   A8 2 25 A                   STA       SEQ              SEQUENCE NUMBER
5058  4A2A   48 2 2A A                   SUB       *13              CHECK FOR VALID NUMBER
5059  F216   F0 2 16 A                   ZJP       USELAST          SEQ=13,USE LAST BIT ADDRESS
505A  B20E   B0 2 0E A                   PJP       EXITPROG         SEQ INVALID
505B  2A21   28 2 21 A                   LDA       SEQ
505C  4224   40 2 24 A                   ADD       FIRSTCO
505D  AA22   A8 2 22 A                   STA       SEQCCO           BIT ADDRESS FOR CCO
505E  2A1E   28 2 1E A                   LDA       SEQ
505F  4A24   48 2 24 A                   SUB       *7
5060  F211   F0 2 11 A                   ZJP       SEQSEVEN         SEQ=7
5061  BA01   B8 2 01 A                   NJP       OUTCCO           SEQ.LT.7
5062  621D   60 2 1D A                   INC       SEQCCO
5063  2A1C   28 2 1C A           OUTCCO  LDA       SEQCCO
5064  2319   20 3 19 A                   LDE       *STATUS
5065  F206   F0 2 06 A                   ZJP       TURNOFF          TURN OFF LIGHT
5066  E053   E8 0 53 A                   SST       *BISETR,R
5067  6217   60 2 17 A           CHECKSEV INC      SEVFLAG
5068  F205   F0 2 05 A                   ZJP       OUTTWO           SEQ=7,OUTPUT SECOND CCO
5069  3A15   38 2 15 A           EXITPROG STZ      SEVFLAG
506A  0A11   08 2 11 A                   LDB       BSAVE
506B  710D   70 1 0D A                   JMP       *MISFX
                                 *
      506C   50 0 6C A           TURNOFF EQU       *
506C  E05C   E8 0 5C A                   SST       *BIRESR,R
506D  72F9   70 2 F9 A                   JMP       CHECKSEV
                                 *
506E  6005   60 0 05 A           OUTTWO  INC       A                INC SEQ CCO FOR SECOND OUTPUT
506F  72F4   70 2 F4 A                   JMP       OUTCCO+1
                                 *
5070  2A11   28 2 11 A           USELAST LDA       LASTCO           OUTPUT SEQ 13 CCO
5071  72F2   70 2 F2 A                   JMP       OUTCCO+1
                                 *
```

```
5072  6A0C   68 2 0C A   1563  SEQSEVEN DCR    SEVFLAG           SET FLAG
5073  72EF   70 2 EF A   1564           JMP    OUTCC0
      0006   00 0 06 A   1565           RPT    6
5074  0000   00 0 00 A   1566           DAT    0
5075  0000   00 0 00 A   1566           DAT    0
5076  0000   00 0 00 A   1566           DAT    0
5077  0000   00 0 00 A   1566           DAT    0
5078  0000   00 0 00 A   1566           DAT    0
5079  0000   00 0 00 A   1566           DAT    0
507A  0000   00 0 00 A   1567  POOL     DAT    0
507B  0000   00 0 00 A   1568  BSAVE    DAT    0
507C  0000   00 0 00 A   1569  SEQ      DAT    0
507D  0000   00 0 00 A   1570  STATUS   DAT    0
507E  0000   00 0 00 A   1571  SEVFLAG  DAT    0
507F  0000   00 0 00 A   1572  SEQCC0   DAT    0
5080  8400   80 4 00 A   1573  FIRSTC0  DAT    X'8400'           CC0 WORD/BIT
5081  8410   80 4 10 A   1574  LASTC0   DAT    X'8410'           CC0 WORD/BIT
5082  0000   00 0 00 A   1575           LPL
5083  0007   00 0 07 A
                         1576           TTL    'ZERO TABLE INITIALIZATION'
                         1577  *
                         1578  *                                 ZERO TABLE INITIALIZATION
                         1579  *
004C                     1580           ORG    ZTBASE
004C  4D9C   48 5 9C A   1581           ADL    I:INTTD-1
004D  4D7F   48 5 7F A   1582           ADL    I:START-1
004E  4D88   48 5 88 A   1583           ADL    I:INTD-1
      0000   00 0 00 A   1584           END
0000  ERRORS
```

22. Bit manipulation routines

```
                         0001           TTL    'BIT MANIPULATION ROUTINES   P2000-2'
                         0002           ABS
1860                     0003           ORG    X'1860'
      0000   00 0 00 A   0004  SLA      EQU    0
      0001   00 0 01 A   0005  STATE    EQU    1
      0004   00 0 04 A   0006  MOD      EQU    X'0004'
      003B   00 0 3B A   0007  TSA:     EQU    X'3B'
      003D   00 0 3D A   0008  SAT:     EQU    X'3D'
      005F   00 0 5F A   0009  S:TRAC   EQU    X'5F'
      007C   00 0 7C A   0010  MSGPRT   EQU    X'7C'
      007D   00 0 7D A   0011  P:CCBR   EQU    X'7D'
      007F   00 0 7F A   0012  MIDLB    EQU    X'7F'
      0089   00 0 89 A   0013  Z:CSR    EQU    X'89'
      008A   00 0 8A A   0014  TASKMSK  EQU    X'8A'
```

```
00B8   00 0 B8 A   TRAECHK   EQU   X'B8'
00A0   00 0 A0 A   RAL       EQU   X'A0'
00A0   00 0 A0 A   KIXFFFF   EQU   X'A0'
00A2   00 0 A2 A   KIX00FF   EQU   X'A2'            KILO
00A6   00 0 A6 A   KI4TH     EQU   X'A6'
00A8   00 0 A8 A   KIX7FFF   EQU   X'A8'
00AC   00 0 AC A   KIX3      EQU   X'AC'
00B0   00 0 B0 A   KIX1      EQU   X'B0'
00B1   00 0 B1 A   KIX2      EQU   X'B1'
00B2   00 0 B2 A   KIX4      EQU   X'B2'
00BD   00 0 BD A   KIX2000   EQU   X'BD'
00BE   00 0 BE A   KIX4000   EQU   X'BE'
00C0   00 0 C0 A   7:CPR     EQU   X'C0'
00C4   00 0 C4 A   7:SFL     EQU   X'C4'
00C5   00 0 C5 A   7:IER     EQU   X'C5'
00C7   00 0 C7 A   LBADDRX   EQU   X'C7'
00D7   00 0 D7 A   MISFX     EQU   X'D7'
00D9   00 0 D9 A   MIUN      EQU   X'D9'
00D8   00 0 D8 A   MISP      EQU   X'D8'
00F0   00 0 F0 A   SAL       EQU   X'F0'
02F0   00 2 F0 A   LIM3      EQU   X'2F0'           LAST SI OR MPXCCI BIT ADDRESS + 1
1F52   18 7 52 A   BITLOAD   EQU   X'1F52'
1F52   18 7 52 A   SET1R     EQU   X'1F52'
1F53   18 7 53 A   SETOR     EQU   X'1F53'
1F78   18 7 78 A   SETI1R    EQU   X'1F78'
1F79   18 7 79 A   SETIOR    EQU   X'1F79'
1F91   18 7 91 A   OBISET    EQU   X'1F91'
1F92   18 7 92 A   OBIRES    EQU   X'1F92'
3271   30 2 71 A   SIMWORD   EQU   X'3271'
3272   30 2 72 A   SLVTBL    EQU   X'3272'
3398   30 3 98 A   COTRACA   EQU   X'3398'
4000   40 0 00 A   SRA       EQU   X'4000'
4133   40 1 33 A   BITTBL    EQU   X'4133'
416F   40 1 6F A   SIMFILE   EQU   X'416F'
2000   20 0 00 A   SLC       EQU   X'2000'
33C0   30 3 C0 A   ENGFRCH   EQU   X'33C0'
00B8   00 0 B8 A   SIMFLAGX  EQU   X'B8'            ADR FOR SIMULATOR STATUS FLAG
2D05   28 5 05 A   SCANTBL   EQU   X'2D05'          ADR FOR START OF SCAN REMOVE TABLE
1FA2   18 7 A2 A   INVMCI    EQU   X'1FA2'          ADR FOR INVERSION TABLE
0037   00 0 37 A   NCIREG    EQU   55               NUMBER OF MCCI REGISTERS + 1
0028   00 0 28 A   DREGNUM   EQU   40               DUMMY PASSIVE LOGICAL REGISTER NUMBER
CC70   C8 4 70 A   COSTRTX   EQU   X'CC70'          FIRST MATRIX CO REG BIT ADDRESS
                   *         P+2000+1   LCWORD  2384-2413
                   *         P+2000+1   LINSER  2739-27AC
                   *         P+2000+2   LCWORD  2344-2603
                   *         P+2000+2   LINSER  2C3F-2D04
```

```
      009F   00 0 9F A   0061 LIM11E   EQU    X'009F'   P-2000-1  LAST ACTIVE BIT ADDRESS
      439F   40 3 9F A   0062 LIM12E   EQU    X'439F'   P-2000-2  LAST ACTIVE BIT ADDRESS
      045F   00 4 5F A   0063 LIM21E   EQU    X'045F'   P-2000-1  LAST LEGAL BIT ADDRESS
      4C6F   48 4 6F A   0064 LIM22E   EQU    X'4C6F'         -2  LAST LEGAL BIT ADDRESS
                         0065 *
                         0066          TTL    'ADRCHK ROUTINE  P-2000-2'
                         0067 *
                         0068 *                             SST *=ADRCHK,R
                         0069 *                             DAT PBBLADR(BITADDR)
                         0070 *                             DAT PBBLADR(KEY)
                         0071 *
      1B60   18 3 60 A   0072 ADRCHK   EQU    *
1B60  3004   30 0 04 A   0073          CDR    M00
1B61  1800   18 0 00 A   0074          LDG    P
1B62  732A   70 3 2A A   0075          JMP    TSAIII
1B63  2905   28 1 05 A   0076          LDA    *A
                         0077 *
      1B64   18 3 64 A   0078 ADRCHKR  EQU    *
1B64  A803   A8 0 03 A   0079          STA    G         SAVE BIT ADDRESS
1B65  58BE   58 0 BE A   0080          AND    KIX4000
1B66  F202   F0 2 02 A   0081          ZJP    SAME2
1B67  10B1   10 0 B1 A   0082          LDC    KIX2
1B68  7201   70 2 01 A   0083          JMP    CHKLIM
                         0084 *
      1B69   18 3 69 A   0085 SAME2    EQU    *
1B69  10B0   10 0 B0 A   0086          LDC    KIX1
                         0087 *
      1B6A   18 3 6A A   0088 CHKLIM   EQU    *
1B6A  2803   28 0 03 A   0089          LDA    G         TO SET DESIGNATOR
1B6B  BA09   B8 2 09 A   0090          NJP    PASSIVE
                         0091 *
      1B6C   18 3 6C A   0092 ACTIVE   EQU    *
1B6C  2A25   28 2 25 A   0093          LDA    ALIM11
1B6D  4002   40 0 02 A   0094          ADD    C
1B6E  2905   28 1 05 A   0095          LDA    *A                  LIM(I)-
1B6F  4803   48 0 03 A   0096          SUB    G                   BITADDRESS
1B70  BA02   B8 2 02 A   0097          NJP    KEY1
                         0098 *
      1B71   18 3 71 A   0099 KEY0     EQU    *         LEGAL ACTIVE
1B71  3804   38 0 04 A   0100          STZ    E
1B72  7215   70 2 15 A   0101          JMP    RETURN
                         0102 *
      1B73   18 3 73 A   0103 KEY1     EQU    *         PASSIVE IN ACTIVE
1B73  20B0   20 0 B0 A   0104          LDE    KIX1
1B74  7213   70 2 13 A   0105          JMP    RETURN
                         0106 *
```

```
      1B75  18 3 75 A   PASSIVE  EQU   *
1B75  2803  28 0 03 A            LDA   G
1B76  58A8  58 0 A8 A            AND   K1X7FFF
1B77  A803  A8 0 03 A            STA   G
1B78  2A19  28 2 19 A            LDA   ALIM11
1B79  4002  40 0 02 A            ADD   C
1B7A  2905  28 1 05 A            LDA   *A             LIM(I)*
1B7B  4803  48 0 03 A            SUB   G              BIT ADDRESS
1B7C  B208  B0 2 08 A            PJP   KEY2
1B7D  2A17  28 2 17 A            LDA   ALIM21
1B7E  4002  40 0 02 A            ADD   C
1B7F  2905  28 1 05 A            LDA   *A
1B80  4803  48 0 03 A            SUB   G
1B81  BA05  B8 2 05 A            NJP   KEY3
                        *
      1B82  18 3 82 A   KEYM1    EQU   *          LEGAL PASSIVE
1B82  3304  38 0 04 A            STZ   E
1B83  6804  68 0 04 A            DCR   E
1B84  7203  70 2 03 A            JMP   RETURN
                        *
      1B85  18 3 85 A   KEY2     EQU   *          ACTIVE IN PASSIVE
1B85  20B1  20 0 B1 A            LDE   K1X2       ACTIVE IN PASSIVE
1B86  7201  70 2 01 A            JMP   RETURN
                        *
      1B87  18 3 87 A   KEY3     EQU   *          ILLEGAL BIT ADDRESS
1B87  20AC  20 0 AC A            LDE   K1X3
                        *
      1B88  18 3 88 A   RETURN   EQU   *
1B88  1800  18 0 00 A            LDG   P
1B89  713B  70 1 3B A            JMP   *TSA1
1B8A  A105  A0 1 05 A            STE   5A
1B8B  E401  E0 4 01 A            EST   1,B
                        *
1B8C  1E98  18 6 98 A            LPL
1B8D  1B91  18 3 91 A
1B8E  1B94  18 3 94 A
                        *
1B8F  009F  00 0 9F A   LIM11    DAT   LIM11E
1B90  439F  40 3 9F A   LIM12    DAT   LIM12E
1B91  1B8E  18 3 8E A   ALIM11   ADL   LIM11-1
1B92  045F  00 4 5F A   LIM21    DAT   LIM21E
1B93  4C6F  48 4 6F A   LIM22    DAT   LIM22E
1B94  1B91  18 3 91 A   ALIM21   ADL   LIM21-1
                        *
                                 TTL   'BISEL ROUTINE  P.2000-2'
                        *                         SST  .BISEL,S
```

```
                                *                                       DAT  (N)  NUMBER OF BITS TO CHECK
                                *                                       DAT  (BITADR)  STARTING BIT ADDRESS
                                *                                       DAT  (BITNUM)  RETURNED BIT NUMBER (0=N)
                                *                                       DAT  (I)  RETURN ADDR+1 IF NO BITS SET
                                *
                                *
      1B95   18 3 95 A          RISEL     EQU   $
1B95  3004   30 0 04 A                    CDR   M00
1B96  1800   18 0 00 A                    LDG   P
1B97  713B   70 1 3B A                    JMP   *TSA:
1B98  2105   20 1 05 A                    LDE   *A            N OF BITS
1B99  A405   A0 4 05 A                    STE   5,B
1B9A  1800   18 0 00 A                    LDG   P
1B9B  73F1   70 3 F1 A                    JMP   TSA:I
1B9C  2905   28 1 05 A                    LDA   *A
1B9D  5A24   58 2 24 A                    AND   K:XBFFF
1B9E  60C4   60 0 C4 A                    INC   Z:SFT
                                *
      1B9F   18 3 9F A          LP:SEL1   EQU   $
1B9F  AA20   A8 2 20 A                    STA   TEMP:G
1BA0  A220   A0 2 20 A                    STE   TEMP:E
1BA1  1000   10 0 00 A                    LDC   P
1BA2  731C   70 3 1C A                    JMP   BITLBAD
1BA3  BA0E   B8 2 0E A                    NJP   RTN:SEL1      =1 SET NORMAL
1BA4  521B   50 2 1B A                    INC   TEMP:G
1BA5  2A1A   28 2 1A A                    LDA   TEMP:G
1BA6  221A   20 2 1A A                    LDE   TEMP:E
1BA7  6804   68 0 04 A                    DCR   E
1BA8  F201   F0 2 01 A                    ZJP   RTN:SEL0
1BA9  72F5   70 2 F5 A                    JMP   LP:SEL1
                                *
      1BAA   18 3 AA A          RTN:SEL0  EQU   $
1BAA  1800   18 0 00 A                    LDG   P
1BAB  713B   70 1 3B A                    JMP   *TSA:
1BAC  3905   38 1 05 A                    STZ   *A            BITNUM=0
                                *
1BAD  1800   18 0 00 A          RIB:US0   LDG   P
1BAE  713B   70 1 3B A                    JMP   *TSA:
1BAF  2905   28 1 05 A                    LDA   *A
1BB0  AC01   A8 4 01 A                    STA   1,B
1BB1  7208   70 2 08 A                    JMP   RTNEND
                                *
      1BB2   18 3 B2 A          RTN:SEL1  EQU   $
1BB2  1800   18 0 00 A                    LDG   P
1BB3  713B   70 1 3B A                    JMP   *TSA:
```

```
1B34  1005   10 0 05 A   0196             LDC    A
1B35  2C05   28 4 05 A   0197             LDA    5,B
1B36  6005   60 0 05 A   0198             INC    A
1B37  4A09   48 2 09 A   0199             SUB    TEMPIE
1B38  A902   A8 1 02 A   0200             STA    *C
                         0201   *
1B39  6401   60 4 01 A   0202   RIBIUS1   INC    1,B
1B3A  71D7   70 1 D7 A   0203   RTNFND    JMP    *MISFX
1B3B  1BC1   18 3 C1 A   0204             LPL
1B3C  1BBF   18 3 BF A
1B3D  1BC0   18 3 C0 A
1B3E  1F51   18 7 51 A
1B3F  0000   00 0 00 A   0205   TEMPIG    DAT    0
1BC0  0000   00 0 00 A   0206   TEMPIE    DAT    0
1BC1  BFFF   88 7 FF A   0207   KIXBFFF   DAT    X'BFFF'
                         0208   *
                         0209             TTL    ' BICHK ROUTINE P-2000-2'
                         0210   *
1BC2  3004   30 0 04 A   0211   BICHK     CDR    MOO
1BC3  1800   18 0 00 A   0212             LDG    P
1BC4  73C8   70 3 C8 A   0213             JMP    TSAII
1BC5  2905   28 1 05 A   0214             LDA    *A
1BC6  A804   A8 0 04 A   0215             STA    E
1BC7  58BE   58 0 BE A   0216             AND    KIX4000
1BC8  F20C   F0 2 0C A   0217             ZJP    ICSTOP
1BC9  2804   28 0 04 A   0218             LDA    E
1BCA  50BE   50 0 BE A   0219             EOR    KIX4000
1BCB  1000   10 0 00 A   0220             LDC    P
1BCC  73F2   70 3 F2 A   0221             JMP    BITLOAD
1BCD  B202   B0 2 02 A   0222             PJP    IRETRN
1BCE  6401   60 4 01 A   0223             INC    1,B
1BCF  E401   E0 4 01 A   0224             EST    1,B
                         0225   *
1BD0  1800   18 0 00 A   0226   IRETRN    LDG    P
1BD1  7133   70 1 33 A   0227             JMP    *TSAI
1BD2  2905   28 1 05 A   0228             LDA    *A
1BD3  AC01   A8 4 01 A   0229             STA    1,B
1BD4  E401   E0 4 01 A   0230             EST    1,B
                         0231   *
                         0232   *                                 REQUEST TO CHECK BIT IN OTHER MACH
                         0233   *                                 SO STOP WITH BAD BIT ADDR ON LITES.
1BD5  0104   00 1 04 A   0234   ICSTOP    STP    *E
                         0235   *
                         0236             TTL    ' INTERPRETER BIT CHECK ENTRY'
                         0237   *
                         0238   *                LDA    BITADDRESS
```

```
                              *                        LDC  P
                              *                        JMP  *LOADBIT
                              *
      1AD6   18 3 D6 A        LOADBIT   EQU            *
                              *
                              *                                          INTERPRETER BIT CHECK ENTRY
                              *
1AD6  A804   A8 0 04 A                  STA            E
1AD7  58AE   58 0 AE A                  AND            KIX4000
1AD8  F2FC   F0 2 FC A                  ZJP            ICSTAP
1AD9  2804   28 0 04 A                  LDA            E
1ADA  1800   18 0 00 A                  LDG            P
1ADB  720C   70 2 0C A                  JMP            BISIM             CHECK IF THIS BIT IS BEING SIMULATED
1ADC  F209   F0 2 09 A                  ZJP            NOSIMC
                              *
                              *                                          YES, SIMULATE THIS BIT CHECK BY
                              *                                          USING BIT 13 OF WORD WHOSE ADDRESS
                              *                                          IS STORED IN THE E REGISTER.
      1ADD   18 3 DD A        SIMCHK    EQU            *
1ADD  2904   28 1 04 A                  LDA            *E                FETCH BIT ADDRESS
1ADE  58A0   58 0 A0 A                  AND            KIX2000           SAVE BIT 13
1ADF  F202   F0 2 02 A                  ZJP            CISRES
      1AE0   18 3 E0 A        CISSET    EQU            *                 BIT IS SET
1AE0  20A0   20 0 A0 A                  LDE            KIXFFFF
1AE1  7201   70 2 01 A                  JMP            BITRTN
                              *
      1AE2   18 3 E2 A        CISRES    EQU            *                 BIT IS RESET
1AE2  3804   38 0 04 A                  STZ            E
                              *
      1AE3   18 3 E3 A        BITRTN    EQU            *
1AE3  6002   60 0 02 A                  INC            C
1AE4  2804   28 0 04 A                  LDA            E
1AE5  7102   70 1 02 A                  JMP            *C
                              *
      1AE6   18 3 E6 A        NOSIMC    EQU            *                 NOT IN SIM MODE . GO ON TO BITLOAD
1AE6  50AE   50 0 AE A                  EOR            KIX4000
1AE7  73D7   70 3 D7 A                  JMP            BITLAAD
                                        TTL            'BISIM . CHECK FOR THE SIMULATION MODE'
                              *
                              *
      1AE8   18 3 E8 A        BISIM     EQU            *
1AE8  6003   60 0 03 A                  INC            G
1AE9  2237   20 2 37 A                  LDE            *SIMWORD
1AEA  F103   F0 1 03 A                  ZJP            *G
                              *                                          WE ARE INDEED IN THE SIM MODE
      1AEB   18 3 EB A        YESSIM    EQU            *
```

```
1AEB  60C4   60 0 C4 A   0285           INC    ZISFT
1AEC  AA30   A8 2 30 A   0286           STA    ASAVE1
1AED  2802   28 0 02 A   0287           LDA    C
1AEE  AA2F   A8 2 2F A   0288           STA    CSAVE1
1AEF  2803   28 0 03 A   0289           LDA    G
1AF0  AA2E   A8 2 2E A   0290           STA    GSAVE1
                         0291  *                            SEARCH 3 WORD LEVEL TBL FOR MATCH
1AF1  28C0   28 0 C0 A   0292           LDA    ZICPR
1AF2  4089   40 0 89 A   0293           ADD    ZICSR
1AF3  2905   28 1 05 A   0294           LDA    *A
1AF4  6005   60 0 05 A   0295           INC    A
1AF5  F21F   F0 2 1F A   0296           ZJP    NOFIND
1AF6  6805   68 0 05 A   0297           DCR    A
1AF7  58A2   58 0 A2 A   0298           AND    KIXOFF
1AF8  A804   A8 0 04 A   0299           STA    E
1AF9  28C0   28 0 C0 A   0300           LDA    ZICPR
1AFA  1A27   18 2 27 A   0301           LDG    =12
1AFB  9805   98 0 05 A   0302           SHF    A
1AFC  4004   40 0 04 A   0303           ADD    E
1AFD  A804   A8 0 04 A   0304           STA    E
1AFE  10A2   10 0 A2 A   0305           LDC    KIX4
1AFF  2A23   28 2 23 A   0306           LDA    =SLVTBL
1B00  AA1F   A8 2 1F A   0307           STA    TBLADR
1B01  2A1E   28 3 1E A   0308  SIMLOOP  LDA    *TBLADR
1B02  4804   48 0 04 A   0309           SUB    E
1B03  F204   F0 2 04 A   0310           ZJP    FOUNDLVL
1B04  621A   60 2 1A A   0311           INC    TBLADR
1B05  6802   68 0 02 A   0312           DCR    C
1B06  BA0E   B8 2 0E A   0313           NJP    NOFIND
1B07  72F9   70 2 F9 A   0314           JMP    SIMLOOP
                         0315  *                            FOUND A SUBLEVEL MATCHUP
      1C08   18 4 08 A   0316  FOUNDLVL EQU    $
1B08  2A1B   28 2 1B A   0317           LDA    =BITTBL
1B09  AA15   A8 2 15 A   0318           STA    TBLADR
1B0A  121A   10 2 1A A   0319           LDC    =60
                         0320  *                            SEARCH FOR BIT ADDRESS MATCHUP
      1C0B   18 4 0B A   0321  BACHEK   EQU    $
1B0B  2A14   28 3 14 A   0322           LDA    *TBLADR
1B0C  4A10   48 2 10 A   0323           SUB    ASAVE1
1B0D  F204   F0 2 04 A   0324           ZJP    FOUNDBIT
1B0E  6211   60 2 11 A   0325           INC    TBLADR
1B0F  6802   68 0 02 A   0326           DCR    C
1B10  F204   F0 2 04 A   0327           ZJP    NOFIND
1B11  72F9   70 2 F9 A   0328           JMP    BACHEK
                         0329  *                            FOUND A BIT ADDRESS TO SIMULATE
```

```
                          0330   *                                    RETURN THE ADDRESS OF THE BIT
                          0331   *                                    ADDRESS TO THE CALLER IN 'E' REG
      1C12   18 4 12 A    0332   FOUNDBIT EQU   *
1C12  2A00   28 2 00 A    0333            LDA   TBLADR
1C13  A804   A8 C 04 A    0334            STA   E
1C14  7201   70 2 01 A    0335            JMP   SIMRTN
                          0336   *                                    DID NOT FIND SI# OR BIT ADDRESS
      1C15   18 4 15 A    0337   NOFIND   EQU   *
1C15  3804   38 0 04 A    0338            STZ   E
                          0339   *
1C16  2A05   28 2 05 A    0340   SIMRTN   LDA   ASAVE:
1C17  1205   10 2 05 A    0341            LDC   CSAVE:
1C18  1A06   18 2 06 A    0342            LDG   GSAVE:
1C19  E5D7   E8 5 D7 A    0343            SST   *MISFX,R
1C1A  2004   20 0 04 A    0344            LDE   E
1C1B  7103   70 1 03 A    0345            JMP   *G
                          0346   *
1C1C  0000   00 0 00 A    0347   ASAVE:   DAT   0
1C1D  0000   00 0 00 A    0348   CSAVE:   DAT   0
1C1E  0000   00 0 00 A    0349   GSAVE:   DAT   0
1C1F  0000   00 0 00 A    0350   TBLADR   DAT   0
1C20  3271   30 2 71 A    0351            LPL
1C21  000C   00 0 0C A
1C22  3272   30 2 72 A
1C23  4133   40 1 33 A
1C24  003C   00 0 3C A
                          0352            TTL   'BISET/BIRES ROUTINE  P-2000-2'
                          0353   *
      1C25   18 4 25 A    0354   BISET    EQU   *
1C25  60C4   60 0 C4 A    0355            INC   Z:SFI
1C26  3A42   38 3 42 A    0356            STZ   RESENT
1C27  1210   10 2 10 A    0357            LDC   POL1
1C28  7210   70 2 10 A    0358            JMP   BIAFFTCH
                          0359   *
      1C29   18 4 29 A    0360   BIRES    EQU   *
1C29  60C4   60 0 C4 A    0361            INC   Z:SFI
1C2A  3A3E   38 3 3E A    0362            STZ   RESENT
1C2B  1200   10 2 00 A    0363            LDC   POL2
1C2C  720C   70 2 0C A    0364            JMP   BIAFETCH
                          0365   *
      1C2D   18 4 2D A    0366   BISETR   EQU   *
1C2D  60C4   60 0 C4 A    0367            INC   Z:SFI
1C2E  1209   10 2 09 A    0368            LDC   POL1
1C2F  3A39   38 3 39 A    0369            STZ   RESENT
1C30  6A38   68 3 38 A    0370            DCR   RESENT
1C31  7203   70 2 03 A    0371            JMP   BIRESOLV
```

```
                                   *
       1C32   18 4 32 A     BIRESR      EQU   *
1C32   60C4   60 0 C4 A                 INC   ZISFI
1C33   1205   10 2 05 A                 LDC   POL2
1C34   3834   38 3 34 A                 STZ   RESENT
1C35   6833   68 3 33 A                 DCR   RESENT
1C36   7206   70 2 06 A                 JMP   BIRESOLV
1C37   103E   18 5 3E A     POL1        DAT   POOL
1C38   1040   18 5 40 A     POL2        DAT   POOL+2
                            *
       1C39   18 4 39 A     BIAFETCH    EQU   *
1C39   3004   30 0 04 A                 CDR   M00
1C3A   1800   18 0 00 A                 LDG   P
1C3B   732E   70 3 2E A                 JMP   TSA:I
1C3C   2905   28 1 05 A                 LDA   *A
                            *
       1C3D   18 4 3D A     BIRESOLV    EQU   *
1C3D   2001   20 0 01 A                 LDE   B
1C3E   0AF9   08 2 F9 A                 LDB   POL1
1C3F   A401   A0 4 01 A                 STE   1,B
1C40   AC09   A8 4 09 A                 STA   9,B               BIT ADDRESS
                            *
                            *                                        CHECK FOR SIMULATE MODE
1C41   1800   18 0 00 A                 LDG   P
1C42   72A5   70 2 A5 A                 JMP   BISIM
1C43   F20A   F0 2 0A A                 ZJP   CKSTATE
                            *                                        SIMULATE REQUIRES SET/RESET BIT 13
                            *                                        OF WORD FOUND AT ADDR STORED IN 'E'
1C44   2801   28 0 01 A     SIMSR       LDA   B
1C45   4802   48 0 02 A                 SUB   C
1C46   F204   F0 2 04 A                 ZJP   RESSIM
                            *                                        SET THE SIMULATED BIT
       1C47   18 4 47 A     SETSIM      EQU   *
1C47   2904   28 1 04 A                 LDA   *E
1C48   5A24   58 2 24 A                 AND   *X'DFFF'
1C49   50BD   50 0 BD A                 EOR   K:X2000
1C4A   721B   70 2 1B A                 JMP   RTNBI:
                            *                                        RESET THE SIMULATED BIT
       1C4B   18 4 4B A     RESSIM      EQU   *
1C4B   2904   28 1 04 A                 LDA   *E
1C4C   5A20   58 2 20 A                 AND   *X'DFFF'
1C4D   7218   70 2 18 A                 JMP   RTNBI:
                            *
       1C4E   18 4 4E A     CKSTATE     EQU   *
1C4E   58BE   58 0 BE A                 AND   K:X4000
1C4F   526E   50 2 6E A                 EOR   STATEX
```

```
1C50  F227  F0 2 27 A  0418           ZJP   SAME
1C51  2A6A  28 2 6A A  0419           LDA   BUSYFLG
1C52  F201  F0 2 01 A  0420           ZJP   CONT1       TO CONTINUE
1C53  721E  70 2 1E A  0421           JMP   SUSPCAL     TO SUSPEND CALLER
1C54  6A67  68 2 67 A  0422  CONT1    DCR   BUSYFLG     TO SET BUSY
1C55  2C01  28 4 01 A  0423           LDA   1,B
1C56  2318  20 3 18 A  0424           LDE   BITADDR
1C57  0A19  08 2 19 A  0425           LDB   *P00I 2
1C58  A402  A0 4 02 A  0426           STE   2,B
1C59  AC01  A8 4 01 A  0427           STA   1,B
1C5A  2E02  28 6 02 A  0428           LDA   2,C         FETCH SET OR RESET AND
1C5B  ED07  E8 5 D7 A  0429           SST   *MISFX,B
1C5C  AC04  A8 4 04 A  0430           STA   4,B
1C5D  ED7F  E8 5 7F A  0431           SST   *MIDIO,B
1C5E  0003  00 0 03 A  0432           DAT   3           SUBR. CALL
1C5F  0004  00 0 04 A  0433           DAT   4           ADDRESS
1C60  0005  00 0 05 A  0434           DAT   5           ARGUMENT KEY
1C61  0002  00 0 02 A  0435           DAT   2           BIT ADDRESS
1C62  3A59  38 2 59 A  0436           STZ   BUSYFLG
1C63  2A56  28 2 56 A  0437           LDA   SUSPROD
1C64  1800  18 0 00 A  0438           LDG   P
1C65  71D9  70 1 D9 A  0439           JMP   *MIUN
      1C66  18 4 66 A  0440  RTNB!!   EQU   $
1C66  0C01  08 4 01 A  0441           LDB   1,B
1C67  E401  E0 4 01 A  0442           EST   1,B
1C68  1CA8  18 4 A8 A  0443           LPL
1C69  1E98  18 6 98 A
1C6A  1CAD  18 4 AD A
1C6B  1C77  18 4 77 A
1C6C  DFFF  D8 7 FF A
1C6D  1CAB  18 4 AB A
1C6E  1D47  18 5 47 A
1C6F  1C71  18 4 71 A
1C70  1D54  18 5 54 A
1C71  1CA9  18 4 A9 A
                       0444  *
      1C72  18 4 72 A  0445  SUSPCAL  EQU   $           SUSPEND CALLER
1C72  0C01  08 4 01 A  0446           LDB   1,B
1C73  2A45  28 2 45 A  0447           LDA   RESENT
1C74  BA01  B8 2 01 A  0448           NJP   $+2
1C75  6C01  68 4 01 A  0449           DCR   1,B
1C76  1A43  18 2 43 A  0450           LDG   SUSPROD
1C77  71D8  70 1 D8 A  0451           JMP   *MISP
                       0452  *
      1C78  18 4 78 A  0453  SAME     EQU   $
```

```
1C78  2C09  28 4 09 A   0454           LDA    9,B
1C79  58A8  58 0 A8 A   0455           AND    KIX7FFF
1C7A  4838  48 3 38 A   0456           SUB    LIM22
1C7B  B247  B0 2 47 A   0457           PJP    MXCCA
1C7C  EF38  E8 7 38 A   0458           SST    ADRCHK,B
1C7D  0009  00 0 09 A   0459           DAT    9
1C7E  0003  00 0 03 A   0460           DAT    3
1C7F  2C03  28 4 03 A   0461           LDA    3,B
1C80  BA04  B8 2 04 A   0462           NJP    LEGPAS
1C81  F20E  F0 2 0E A   0463           ZJP    LEGACT
                        0464  *                          ERROR IF 1,2,3
1C82  13EC  10 3 EC A   0465           LDC    BITADDR
1C83  00BA  00 0 BA A   0466           STP    X'BA'      ILLEGAL BIT ADDRESS, A HOLDS CODE
                        0467  *                          C HOLDS BIT ADDRESS
1C84  7210  70 2 10 A   0468           JMP    RTN
                        0469  *
      1C85  18 4 85 A   0470  LEGPAS   EQU    *
1C85  2983  28 1 83 A   0471           LDA    *SIMFLAGY
1C86  B216  B0 2 16 A   0472           PJP    ERMSA
1C87  EF30  E8 7 30 A   0473           SST    SCANRMV,B
1C88  0009  00 0 09 A   0474           DAT    9
1C89  1605  10 6 05 A   0475           LDC    5,C        SET/RES
                        0476  *
1C8A  2BE4  28 3 E4 A   0477  BIRTNJMP LDA    BITADDR
1C8B  5232  50 2 32 A   0478           EOR    STATEX
1C8C  2401  20 4 01 A   0479           LDE    1,B
1C8D  ED07  E8 5 07 A   0480           SST    *MISCX,B
1C8E  0804  08 0 04 A   0481           LDB    E
1C8F  7600  70 6 00 A   0482           JMP    0,C              RTN TO BIXXX(X) CALLER IS FROM RTN
                        0483  *                                JUMPED TO
      1C90  18 4 90 A   0484  LEGACT   EQU    *
1C90  2BDE  28 3 DE A   0485           LDA    BITADDR
1C91  4A2B  48 2 2B A   0486           SUB    ALIM3      BITADDR - ALIM3
1C92  BA04  B8 2 04 A   0487           NJP    BAGTLIM
1C93  2BD8  28 3 D8 A   0488           LDA    BITADDR
1C94  72F0  70 2 F0 A   0489           JMP    LEGPAS
                        0490  *
      1C95  18 4 95 A   0491  RTN      EQU    *
1C95  0C01  08 4 01 A   0492           LDB    1,B
1C96  7107  70 1 07 A   0493           JMP    *MISCX
                        0494  *
      1C97  18 4 97 A   0495  BAGTLIM  EQU    *
1C97  2983  28 1 83 A   0496           LDA    *SIMFLAGY
1C98  B204  B0 2 04 A   0497           PJP    ERMSA
1C99  EF1E  E8 7 1E A   0498           SST    SCANRMV,B
```

```
1C9A  0009  00 0 09 A   0499            DAT      9
1C9B  1606  10 6 06 A   0500            LDC      6,C            SETI/RESI
1C9C  72ED  70 2 ED A   0501            JMP      BIRTNJMP
                        0502   *
      1C9D  18 4 9D A   0503   ERMSG    EQU      $
1C9D  28C5  28 0 C5 A   0504            LDA      ZIIER
1C9E  F202  F0 2 02 A   0505            ZJP      $+3
1C9F  3805  38 0 05 A   0506            STZ      A
1CA0  72C8  70 2 08 A   0507            JMP      ERR2
1CA1  20C0  20 0 C0 A   0508            LDE      ZICPR
1CA2  2889  28 0 89 A   0509            LDA      ZICSR
1CA3  4004  40 0 04 A   0510            ADD      E
1CA4  2905  28 1 05 A   0511            LDA      *A
1CA5  58A8  58 0 A8 A   0512            AND      KIX7FFF
1CA6  1A10  18 2 10 A   0513            LDG      =SLC+12
1CA7  9804  98 0 04 A   0514            SHF      E
1CA8  5004  50 0 04 A   0515            EOR      E
      1CA9  18 4 A9 A   0516   ERR2     EQU      $
1CA9  AC0A  A8 4 0A A   0517            STA      10,B
1CAA  ED7C  E8 5 7C A   0518            SST      *MSGPRT,B
1CAB  000C  00 0 0C A   0519            DAT      12
1CAC  000D  00 0 0D A   0520            DAT      13
1CAD  000E  00 0 0E A   0521            DAT      14
1CAE  000B  00 0 0B A   0522            DAT      11
1CAF  800E  80 0 0E A   0523            DAT      X'800E'
1CB0  0C01  08 4 01 A   0524            LDB      1,B
1CB1  E401  E0 4 01 A   0525            EST      1,B
1CB2  1B93  18 3 93 A   0526            LPL
1CB3  1CC2  18 4 C2 A
1CB4  1B5F  18 3 5F A
1CB5  1CBC  18 4 BC A
1CB6  200C  20 0 0C A
1CB7  1E6A  18 6 6A A
                        0527   *
1CB8  0000  00 0 00 A   0528   RESENT   DAT      0
1CB9  000F  00 0 0F A   0529   SUSPCBD  DAT      15             D/C CALL SUSPEND CODE
1CBA  0009  00 0 09 A   0530   SUSCBD1  DAT      9              MATRIX CB SUSPEND CODE
1CBB  0000  00 0 00 A   0531   BUSYFLG  DAT      0
1CBC  02F0  00 2 F0 A   0532   ALIM3    DAT      LIM3
1CBD  4000  40 0 00 A   0533   STATEX   GEN,2,14 STATE,0
1CBE  0000  00 0 00 A   0534   BSYFLG2  DAT      0
1CBF  3FFF  38 7 FF A   0535   KIX3FFF  DAT      X'3FFF'
1CC0  CC70  C8 4 70 A   0536   CBSTRT   DAT      CBSTRTX
1CC1  3398  30 3 98 A   0537   CBTRAC   DAT      CBTRACA
1CC2  00C7  00 0 C7 A   0538   LBADDR   DAT      LBADDRX
                        0539   *
```

```
      1CC3  18 4 C3 A  0540 MXCC0  EQU  $
1CC3  2AFB  28 2 FB A  0541        LDA  BSYFIG2
1CC4  F201  F0 2 01 A  0542        ZJP  CONT2
1CC5  7263  70 2 63 A  0543        JMP  SUSPCL2
1CC6  6AF5  68 2 F5 A  0544 CONT2  DCR  BSYFIG2
1CC7  2883  28 0 83 A  0545        LDA  TRAECHK    ARE LOGICALS BEING TRACED
1CC8  58A1  58 0 A1 A  0546        AND  KIX2
1CC9  F227  F0 2 27 A  0547        ZJP  NOTRAC     JUMP IF NO
1CCA  1A5C  18 2 5C A  0548        LDG  *SRA+4    PERMISSIVE CHECK
1CCB  2C09  28 4 09 A  0549        LDA  9,B
1CCC  5AF3  58 2 F3 A  0550        AND  KIX3FFF
1CCD  9805  98 0 05 A  0551        SHF  A
1CCE  4AF4  48 2 F4 A  0552        SUB  LBADDR
1CCF  42F2  40 2 F2 A  0553        ADD  COTRAC
1CD0  2105  20 1 05 A  0554        LDE  *A
1CD1  2C09  28 4 09 A  0555        LDA  9,B
1CD2  58A6  58 0 A6 A  0556        AND  KI4TH
1CD3  4050  40 0 50 A  0557        ADD  X'50'
1CD4  2905  28 1 05 A  0558        LDA  *A
1CD5  5804  58 0 04 A  0559        AND  E
1CD6  F21A  F0 2 1A A  0560        ZJP  NOTRAC     FAILED PERMISSIVE CHECK
1CD7  2C09  28 4 09 A  0561        LDA  9,B
1CD8  AA16  A8 2 16 A  0562        STA  ARG2       STORE BIT ADDRESS
1CD9  28C0  28 0 C0 A  0563        LDA  ZICPR
1CDA  4050  40 0 50 A  0564        ADD  X'50'
1CDB  2905  28 1 05 A  0565        LDA  *A
1CDC  588A  58 0 8A A  0566        AND  TASKMSK
1CDD  F20A  F0 2 0A A  0567        ZJP  TASK       JMP IF NO SUBLEVELS ON THIS TASK
1CDE  28C0  28 0 C0 A  0568        LDA  ZICPR
1CDF  1A4A  18 2 4A A  0569        LDG  *SLA+12
1CE0  2005  20 0 05 A  0570        LDE  A
1CE1  9804  98 0 04 A  0571        SHF  E
1CE2  4089  40 0 89 A  0572        ADD  ZICSR
1CE3  2905  28 1 05 A  0573        LDA  *A
1CE4  58A8  58 0 A8 A  0574        AND  KIX7FFF
1CE5  5004  50 0 04 A  0575        EOR  E
1CE6  AA0A  A8 2 0A A  0576        STA  ARG4
1CE7  7202  70 2 02 A  0577        JMP  TRC
1CE8  28C0  28 0 C0 A  0578 TASK   LDA  ZICPR
1CE9  AA07  A8 2 07 A  0579        STA  ARG4
1CEA  1800  18 0 00 A  0580 TRC    LDG  P
1CEB  E95F  E8 1 5F A  0581        SST  *SITRAC
1CEC  0004  00 0 04 A  0582        DAT  4
1CED  2000  20 0 00 A  0583        DAT  X'2000'
1CEE  0000  00 0 00 A  0584 ARG2   DAT  0          BIT ADDRESS
1CEF  0000  00 0 00 A  0585        DAT  0
```

```
1CF0   0000   00 0 00 A   ARG4     DAT   0            CALLING TASK OR SUBLEVEL
       1CF1   18 4 F1 A   NOTRAC   EQU   *
1CF1   2C09   28 4 09 A            LDA   9,B
1CF2   2401   20 4 01 A            LDE   1,B
1CF3   0A68   08 2 68 A            LDB   BREG
1CF4   A401   A0 4 01 A            STE   1,B
1CF5   ED07   E8 5 D7 A            SST   *MISCX,B
1CF6   5AC9   58 2 C9 A            AND   KIX3FFF
1CF7   4AC9   48 2 C9 A            SUB   COSTRT       FIRST MATRIX CD REG BIT ADDRESS
1CF8   3804   38 0 04 A            STZ   E
1CF9   DA2E   D8 2 2E A            DIV   =150         A = 0-3, E = 0-149
1CFA   422E   40 2 2E A            ADD   =TBL1
1CFB   2905   28 1 05 A            LDA   *A
1CFC   AC02   A8 4 02 A            STA   2,B
1CFD   AC03   A8 4 03 A            STA   3,B
1CFE   AC04   A8 4 04 A            STA   4,B
1CFF   2804   28 0 04 A            LDA   E
1D00   3804   38 0 04 A            STZ   E
1D01   DA29   D8 2 29 A            DIV   =25          A = 0-5, E = 0-24
1D02   4229   40 2 29 A            ADD   =TBL2
1D03   2905   28 1 05 A            LDA   *A
1D04   A803   A8 0 03 A            STA   G
1D05   2804   28 0 04 A            LDA   E
1D06   3804   38 0 04 A            STZ   E
1D07   DA25   D8 2 25 A            DIV   =5           A = 0-4, E = 0-4
1D08   4225   40 2 25 A            ADD   =TBL3
1D09   2905   28 1 05 A            LDA   *A
1D0A   4003   40 0 03 A            ADD   G
1D0B   A803   A8 0 03 A            STA   G
1D0C   2804   28 0 04 A            LDA   E
1D0D   4221   40 2 21 A            ADD   =TBL4
1D0E   2905   28 1 05 A            LDA   *A
1D0F   4003   40 0 03 A            ADD   G
1D10   AC06   A8 4 06 A            STA   6,B          IN PAT1
1D11   50BD   50 0 BD A            EOR   KIX2000
1D12   AC07   A8 4 07 A            STA   7,B          IN PAT2
1D13   0A1C   08 2 1C A            LDB   =BREGRTN
1D14   1403   10 4 03 A            LDC   3,B          ADDR N
1D15   1C04   18 4 04 A            LDG   4,B          ADDR REG1
1D16   2405   20 4 05 A            LDE   5,B          ADDR PAT1
1D17   30FD   30 0 FD A            CDR   SAL
1D18   0A17   08 2 17 A            LDB   =BREGRTN
1D19   2A17   28 2 17 A            LDA   =RTNRCB
1D1A   AC01   A8 4 01 A            STA   1,B
1D1B   2C06   28 4 06 A            LDA   6,B
```

```
101C  7170  70 1 70 A  0631  RTNCC0   JMP  *PICC0R
101D  30A0  30 0 A0 A  0632           CDR  RAL
101E  3AA0  38 2 A0 A  0633           STZ  BSYFI32
101F  2A9B  28 2 9B A  0634           LDA  SUSCAD1
1020  1800  18 0 00 A  0635           LDG  P
1021  7109  70 1 09 A  0636           JMP  *MIUN
1022  0C01  08 4 01 A  0637           LDB  1,B
1023  E401  E0 4 01 A  0638           EST  1,B
1024  1D5B  18 5 5B A  0639           LPL
1025  1D30  18 5 30 A
1026  4004  40 0 04 A
1027  0096  00 0 96 A
1028  1D73  18 5 73 A
1029  000C  00 0 0C A
102A  0019  00 0 19 A
102B  1D77  18 5 77 A
102C  0005  00 0 05 A
102D  1D7D  18 5 7D A
102E  1D82  18 5 82 A
102F  1D59  18 5 59 A
1030  1D1C  18 5 1C A
      1D31  18 5 31 A  0640  SUSPCL2  EQU  *
1031  0C01  08 4 01 A  0641           LDB  1,B
1032  2A86  28 2 86 A  0642           LDA  RESENT
1033  BA01  B8 2 01 A  0643           NJP  *+2
1034  6C01  68 4 01 A  0644           DCR  1,B
1035  3A83  38 2 83 A  0645           STZ  RESENT
1036  1A84  18 2 84 A  0646           LDG  SUSCAD1
1037  7108  70 1 08 A  0647           JMP  *MISP
                       0648  *
      0006  00 0 06 A  0649           RPT  6
1038  0000  00 0 00 A  0650           DAT  0
1039  0000  00 0 00 A  0650           DAT  0
103A  0000  00 0 00 A  0650           DAT  0
103B  0000  00 0 00 A  0650           DAT  0
103C  0000  00 0 00 A  0650           DAT  0
103D  0000  00 0 00 A  0650           DAT  0
103E  0000  00 0 00 A  0651  P00L     DAT  0         0
103F  0000  00 0 00 A  0652           DAT  0         1  0LD B
1040  1F91  18 7 91 A  0653  A0B:SET  DAT  0B:SET    2  0THER MACHINE B:SET
1041  0000  00 0 00 A  0654  KEY      DAT  0         3
1042  1F92  18 7 92 A  0655  A0B:RES  DAT  0B:RES    4  0THER MACHINE B:RES
1043  1F52  18 7 52 A  0656           ADL  SET1R     5
1044  1F78  18 7 78 A  0657           ADL  SETI1R    6
1045  1F53  18 7 53 A  0658           ADL  SET0R     7
```

```
1045  1F79   18 7 79 A   0659            ADL    SETIOR      8
1047  0000   00 0 00 A   0660  BITADDR   DAT    0           9
1048  0000   00 0 00 A   0661            DAT    0           10 TASK/SUBELVEL
1049  1049   18 5 49 A   0662            DAT    *+2         11 ADL VARIABLE BUFFER
104A  0001   00 0 01 A   0663            DAT    1           12 DEVICE
104B  000B   00 0 0B A   0664            DAT    11          13 MESSAGE NUMBER
104C  0002   00 0 02 A   0665            DAT    2           14 NUMBER AND TYPE OF VARIABLES
104D  33C0   30 3 C0 A   0666            DAT    ENGFRCH     15 ENGLISH/FRENCH DESIGNATOR
                         0667  *
      0006   00 0 06 A   0668            RPT    6
104E  0000   00 0 00 A   0669            DAT    0
104F  0000   00 0 00 A   0669            DAT    0
1050  0000   00 0 00 A   0669            DAT    0
1051  0000   00 0 00 A   0669            DAT    0
1052  0000   00 0 00 A   0669            DAT    0
1053  0000   00 0 00 A   0669            DAT    0
1054  0000   00 0 00 A   0670  P8BL2     DAT    0
1055  0000   00 0 00 A   0671            DAT    0           OLD B
1056  0000   00 0 00 A   0672            DAT    0           BITADDR
1057  0002   00 0 02 A   0673            DAT    2
1058  0000   00 0 00 A   0674            DAT    0           ADDRESS OTHER MACHINE
1059  4000   40 0 00 A   0675            DAT    X'4000'     ARGUMENT KEY
                         0676  *
      1059   18 5 59 A   0677  BREGRTN   EQU    *-1
105A  101C   18 5 1C A   0678  PREG      DAT    RTNCCB      P 1
105B  1067   18 5 67 A   0679  BREG      DAT    P8BL4       B 2
105C  1087   18 5 87 A   0680  CREG      DAT    NWD         C 3
105D  1069   18 5 69 A   0681  GREG      DAT    REG1        G 4
105E  1060   18 5 60 A   0682  EREG      DAT    PAT1        E 5
105F  1070   18 5 70 A   0683  AREG      DAT    MSK1        A 6
1060  C000   C0 0 00 A   0684            DAT    X'C000'     D 7
      0006   00 0 06 A   0685            RPT    6
1061  0000   00 0 00 A   0686            DAT    0
1062  0000   00 0 00 A   0686            DAT    0
1063  0000   00 0 00 A   0686            DAT    0
1064  0000   00 0 00 A   0686            DAT    0
1065  0000   00 0 00 A   0686            DAT    0
1066  0000   00 0 00 A   0686            DAT    0
1067  0000   00 0 00 A   0687  P8BL4     DAT    0           0
1068  0000   00 0 00 A   0688            DAT    0           1 OLD B
1069  0000   00 0 00 A   0689  REG1      DAT    0           2 REG1
106A  0000   00 0 00 A   0690            DAT    0           3 REG2
106B  0000   00 0 00 A   0691            DAT    0           4 REG3
106C  0000   00 0 00 A   0692            DAT    0           5 TEMP
106D  0000   00 0 00 A   0693  PAT1      DAT    0           6 PAT1
106E  0000   00 0 00 A   0694            DAT    0           7 PAT2
```

```
106F  0000  00 0 00 A  0693          DAT   0              8 PAT3
1070  3FFF  38 7 FF A  0696  MSK1    DAT   X'3FFF'        9 MSK1
1071  3FFF  38 7 FF A  0697          DAT   X'3FFF'        A MSK2
1072  3FFF  38 7 FF A  0698          DAT   X'3FFF'        B MSK3
1073  0009  00 0 09 A  0699  TBL1    DAT   9              C
1074  000A  00 0 0A A  0700          DAT   10             D
1075  000B  00 0 0B A  0701          DAT   11             E
1076  000C  00 0 0C A  0702          DAT   12             F
1077  0010  00 0 10 A  0703  TBL2    DAT   X'10'          10
1078  0008  00 0 08 A  0704          DAT   8              11
1079  0004  00 0 04 A  0705          DAT   4              12
107A  0002  00 0 02 A  0706          DAT   2              13
107B  0001  00 0 01 A  0707          DAT   1              14
107C  0000  00 0 00 A  0708          DAT   0              15
107D  0100  00 1 00 A  0709  TBL3    DAT   X'100'         16
107E  0080  00 0 80 A  0710          DAT   X'80'          17
107F  0040  00 0 40 A  0711          DAT   X'40'          18
1080  0020  00 0 20 A  0712          DAT   X'20'          19
1081  0000  00 0 00 A  0713          DAT   0              1A
1082  1000  10 0 00 A  0714  TBL4    DAT   X'1000'        1B
1083  0800  08 0 00 A  0715          DAT   X'800'         1C
1084  0400  00 4 00 A  0716          DAT   X'400'         1D
1085  0200  00 2 00 A  0717          DAT   X'200'         1E
1086  0000  00 0 00 A  0718          DAT   0              1F
1087  0003  00 0 03 A  0719  NWD     DAT   3              20
                       0720          TTL   'BISETI ROUTINE  P*2000*2'
                       0721  *
1088  10BD  18 5 BD A  0722          DAT   POOL1
1089  1800  18 0 00 A  0723  BISETI  LDG   P
108A  7130  70 1 30 A  0724          JMP   *SBT!          TRANSFER FIRST THREE ASSIGNMENTS
108B  0002  00 0 02 A  0725          DAT   2
108C  2502  20 5 02 A  0726          LDE   *2,B           BITNUM
108D  F21F  F0 2 1F A  0727          ZJP   ERRTN          BITNUM CAN NOT BE 0
108E  2003  28 5 03 A  0728          LDA   *3,B           N
108F  F203  F0 2 03 A  0729          ZJP   NZERO          N=0
1090  4804  48 0 04 A  0730          SUB   E              N-BITNUM
1091  B20A  B0 2 0A A  0731          PJP   NOTZER         N NOT ZERO
1092  721A  70 2 1A A  0732          JMP   ERRTN
                       0733  *
      1093  18 5 93 A  0734  NZERO   EQU   $
1093  1001  10 0 01 A  0735          LDC   B
1094  0C01  08 4 01 A  0736          LDB   1,B
1095  1800  18 0 00 A  0737          LDG   P
1096  7320  70 3 20 A  0738          JMP   TSA!!          FETCH SINGLE BIT ADDRESS
1097  2905  28 1 05 A  0739          LDA   *A
1098  4702  40 7 02 A  0740          ADD   *2,C
```

```
1D99  6805  68 0 05 A  0741          DCR   A           A HOLDS BIT ADDRESS TO SET
1D9A  0802  08 0 02 A  0742          LDB   C
1D9B  7216  70 2 16 A  0743          JMP   SETRTN
                       0744  *
      1D9C  18 5 9C A  0745  NOTZER  EQU   *
1D9C  1401  10 4 01 A  0746          LDC   1,B         C = OLD B
1D9D  2E01  28 6 01 A  0747          LDA   1,C         A = CALLER'S P
1D9E  4503  40 5 03 A  0748          ADD   *3,B        N
1D9F  AC05  A8 4 05 A  0749          STA   5,B         SAVE RETURN P
1DA0  2E01  28 6 01 A  0750          LDA   1,C
1DA1  4502  40 5 02 A  0751          ADD   *2,B        BITNUM
1DA2  6805  68 0 05 A  0752          DCR   A
1DA3  AE01  A8 6 01 A  0753          STA   1,C
1DA4  2001  20 0 01 A  0754          LDE   B
1DA5  0C01  08 4 01 A  0755          LDB   1,B
1DA6  1800  18 0 00 A  0756          LDG   P
1DA7  730F  70 3 0F A  0757          JMP   TSAIU
1DA8  0804  08 0 04 A  0758          LDB   E
1DA9  2405  20 4 05 A  0759          LDE   5,B
1DAA  A601  A0 6 01 A  0760          STE   1,C         SET UP P IN USER'S PAST
1DAB  2905  28 1 05 A  0761          LDA   *A          BIT ADDRESS TO SET
1DAC  7205  70 2 05 A  0762          JMP   SETRTN
                       0763  *
      1DAD  18 5 AD A  0764  ERRTN   EQU   *
1DAD  1401  10 4 01 A  0765          LDC   1,B         C = OLD B
1DAE  2D04  28 5 04 A  0766          LDA   *4,B        ERROR RETURN-1
1DAF  AE01  A8 6 01 A  0767          STA   1,C         CALLER'S P
1DB0  0802  08 0 02 A  0768          LDB   C
1DB1  71D7  70 1 D7 A  0769          JMP   *MISFX      EXIT
                       0770  *
      1DB2  18 5 B2 A  0771  SETRTN  EQU   *
1DB2  2401  20 4 01 A  0772          LDE   1,B         OLD B
1DB3  ED07  E8 5 D7 A  0773          SST   *MISFX,B
1DB4  0804  08 0 04 A  0774          LDB   E
1DB5  715B  70 1 5B A  0775          JMP   *X'5B'      BISETR
                       0776  *
1DB6  1E98  18 6 98 A  0777          LPL
      0006  00 0 06 A  0778          RPT   6
1DB7  0000  00 0 00 A  0779          DAT   0
1DB8  0000  00 0 00 A  0779          DAT   0
1DB9  0000  00 0 00 A  0779          DAT   0
1DBA  0000  00 0 00 A  0779          DAT   0
1DBB  0000  00 0 00 A  0779          DAT   0
1DBC  0000  00 0 00 A  0779          DAT   0
1DBD  0000  00 0 00 A  0780  POOL1   DAT   0           0
1DBE  0000  00 0 00 A  0781          DAT   0           1  OLD B
```

```
1DBF  0000  00 0 00 A  0782          DAT   0         2  BITNUM
1DC0  0000  00 0 00 A  0783          DAT   0         3  N
1DC1  0000  00 0 00 A  0784          DAT   0         4  I
1DC2  0000  00 0 00 A  0785          DAT   0         5  RTNP
                       0786          TTL   'BIRESI ROUTINE  P=2000+2'
                       0787 *
1DC3  1DF7  18 5 F7 A  0788          DAT   P0OLX
1DC4  1800  18 0 00 A  0789 BIRESI   LDG   P
1DC5  713D  70 1 3D A  0790          JMP   *SBT1       TRANSFER FIRST THREE ARGUMENTS
1DC6  0002  00 0 02 A  0791          DAT   2
1DC7  2502  20 5 02 A  0792          LDE   *2,B        BITNUM
1DC8  F21F  F0 2 1F A  0793          ZJP   ERRTN1
1DC9  2D03  28 5 03 A  0794          LDA   *3,B        N
1DCA  F203  F0 2 03 A  0795          ZJP   NZER01
1DCB  4804  48 0 04 A  0796          SUB   E           N-BITNUM
1DCC  B20A  B0 2 0A A  0797          PJP   NOTZER1
1DCD  721A  70 2 1A A  0798          JMP   ERRTN1
                       0799 *
      1DCE  18 5 CE A  0800 NZER01   EQU   *
1DCE  1001  10 0 01 A  0801          LDC   B
1DCF  0C01  08 4 01 A  0802          LDB   1,B
1DD0  1800  18 0 00 A  0803          LDG   P
1DD1  73E5  70 3 E5 A  0804          JMP   TSAIII      FETCH SINGLE BIT ADDRESS
1DD2  2905  28 1 05 A  0805          LDA   *A
1DD3  4702  40 7 02 A  0806          ADD   *2,C
1DD4  6805  68 0 05 A  0807          DCR   A           A HOLDS BIT ADDRESS TO SET
1DD5  0802  08 0 02 A  0808          LDB   C
1DD6  7216  70 2 16 A  0809          JMP   SETRTN1
                       0810 *
      1DD7  18 5 D7 A  0811 NOTZER1  EQU   *
1DD7  1401  10 4 01 A  0812          LDC   1,B         C = OLD B
1DD8  2E01  28 6 01 A  0813          LDA   1,C         A = CALLER'S P
1DD9  4503  40 5 03 A  0814          ADD   *3,B        N
1DDA  AC05  A8 4 05 A  0815          STA   5,B         SAVE RETURN P
1DDB  2E01  28 6 01 A  0816          LDA   1,C
1DDC  4502  40 5 02 A  0817          ADD   *2,B        BITNUM
1DDD  6805  68 0 05 A  0818          DCR   A
1DDE  AE01  A8 6 01 A  0819          STA   1,C
1DDF  2001  20 0 01 A  0820          LDE   B
1DE0  0C01  08 4 01 A  0821          LDB   1,B
1DE1  1800  18 0 00 A  0822          LDG   P
1DE2  73D4  70 3 D4 A  0823          JMP   TSAIII
1DE3  0804  08 0 04 A  0824          LDB   E
1DE4  2405  20 4 05 A  0825          LDE   5,B
1DE5  A601  A0 6 01 A  0826          STE   1,C         SET UP P IN USER'S REG'
```

```
1DE6  2905  28 1 05 A   0827           LDA   *A          BIT ADDRESS TO SET
1DE7  7205  70 2 05 A   0828           JMP   SETRTN1
                        0829  *
      1DE8  18 5 E8 A   0830  ERRTN1   EQU   $
1DE8  1401  10 4 01 A   0831           LDC   1,B         C = OLD B
1DE9  2004  28 5 04 A   0832           LDA   *4,B        ERROR RETURN-1
1DEA  AE01  A8 6 01 A   0833           STA   1,C         CALLER'S P
1DEB  0802  08 0 02 A   0834           LDB   C
1DEC  71D7  70 1 D7 A   0835           JMP   *MISFX      EXIT
                        0836  *
      1DED  18 5 ED A   0837  SETRTN1  EQU   $
1DED  2401  20 4 01 A   0838           LDE   1,B         OLD B
1DEE  ED07  E8 5 D7 A   0839           SST   *MISFX,B
1DEF  0804  08 0 04 A   0840           LDB   E
1DF0  715C  70 1 5C A   0841           JMP   *X'5C'      BIRESR
                        0842  *
                        0843           LPL
      0006  00 0 06 A   0844           RPT   6
1DF1  0000  00 0 00 A   0845           DAT   0
1DF2  0000  00 0 00 A   0845           DAT   0
1DF3  0000  00 0 00 A   0845           DAT   0
1DF4  0000  00 0 00 A   0845           DAT   0
1DF5  0000  00 0 00 A   0845           DAT   0
1DF6  0000  00 0 00 A   0845           DAT   0
1DF7  0000  00 0 00 A   0846  POOLX    DAT   0           0
1DF8  0000  00 0 00 A   0847           DAT   0           1  OLD B
1DF9  0000  00 0 00 A   0848           DAT   0           2  BITNUM
1DFA  0000  00 0 00 A   0849           DAT   0           3  N
1DFB  0000  00 0 00 A   0850           DAT   0           4  I
1DFC  0000  00 0 00 A   0851           DAT   0           5  RTNP
                        0852           TTL   'BICHKI  ROUTINE  P-2000-2'
                        0853  *
1DFD  1E61  18 6 61 A   0854           DAT   POOL3
1DFE  1800  18 0 00 A   0855  BICHKI   LDB   P
1DFF  7130  70 1 30 A   0856           JMP   *SBTI       TRANSFER FIRST THREE ARGUMENTS
1E00  0002  00 0 02 A   0857           DAT   2
1E01  2003  28 5 03 A   0858           LDA   *3,B        N
1E02  F217  F0 2 17 A   0859           ZJP   NIS7ER      N=0
1E03  2502  20 5 02 A   0860           LDE   *2,B        BITNUM
1E04  F222  F0 2 22 A   0861           ZJP   LOGAND      BITNUM=0
                        0862  *
      1E05  18 6 05 A   0863  NTHBA    EQU   $
1E05  4804  48 0 04 A   0864           SUB   E           N-BITNUM
1E06  BA3E  38 2 3E A   0865           NJP   IRTN        ERROR BITNUM .GT. N AND N NOT ZERO
1E07  1401  10 4 01 A   0866           LDC   1,B         C=OLD B
1E08  2E01  28 6 01 A   0867           LDA   1,C         A=CALLER'S P
```

```
1E09  4503  40 5 03 A           ADD   *3,B     N
1E0A  AC05  A8 4 05 A           STA   5,B      SAVE NORMAL RETURN
1E0B  2E01  28 6 01 A           LDA   1,C
1E0C  4502  40 5 02 A           ADD   *2,B     BITNUM
1E0D  6805  68 0 05 A           DCR   A
1E0E  AE01  A8 6 01 A           STA   1,C
1E0F  2001  20 0 01 A           LDE   B
1E10  0C01  08 4 01 A           LDB   1,B      OLD B
1E11  1800  18 0 00 A           LDG   P
1E12  73A4  70 3 A4 A           JMP   TSAIII
1E13  0804  08 0 04 A           LDB   E
1E14  2905  28 1 05 A           LDA   *A       BIT ADDRESS TO CHECK
1E15  1800  18 0 00 A   CHKCOM  LDG   P
1E16  7238  70 2 38 A           JMP   CHKBA
1E17  2805  28 0 05 A           LDA   A
1E18  BA2C  B8 2 2C A           NJP   IRTN     TAKE I RETURN
1E19  7230  70 2 30 A           JMP   NRTN     TAKE NORMAL RETURN
                        *
      1E1A  18 6 1A A   NISZER  EQU   *        N=0
1E1A  2502  20 5 02 A           LDE   *2,B     BITNUM
1E1B  F229  F0 2 29 A           ZJP   IRTN     N=BITNUM=0 IS ERROR
1E1C  1001  10 0 01 A           LDC   B
1E1D  0C01  08 4 01 A           LDB   1,B      OLD B
1E1E  1800  18 0 00 A           LDG   P
1E1F  7279  70 2 79 A           JMP   TSAIII
1E20  2905  28 1 05 A           LDA   *A       BIT ADDRESS
1E21  4004  40 0 04 A           ADD   E        BITNUM
1E22  6805  68 0 05 A           DCR   A        BIT ADDRESS TO CHECK
1E23  2401  20 4 01 A           LDE   1,B      RETURN P
1E24  0802  08 0 02 A           LDB   C        RESTORE B
1E25  A405  A0 4 05 A           STE   5,B
1E26  72EE  70 2 EE A           JMP   CHKCOM   COMMON CODE TO CHECK B.A. AND RETURN
                        *
      1E27  18 6 27 A   LOGAND  EQU   *        BITNUM=0, N .NE. 0
1E27  AC08  A8 4 08 A           STA   8,B      N
1E28  1001  10 0 01 A           LDC   B
1E29  0C01  08 4 01 A           LDB   1,B      OLD
1E2A  1800  18 0 00 A           LDG   P
1E2B  7260  70 2 60 A           JMP   TSAIII
1E2C  2905  28 1 05 A           LDA   *A
1E2D  0802  08 0 02 A           LDB   C        RESTORE B
1E2E  1800  18 0 00 A           LDG   P
1E2F  721F  70 2 1F A           JMP   CHKBA
1E30  AC09  A8 4 09 A           STA   9,B
1E31  6C08  68 4 08 A           DCR   8,B
1E32  F20C  F0 2 0C A           ZJP   OUTLOOP
```

```
1E33  0C01   08 4 01 A   0914  LOOP     LDB   1,B        OLD B
1E34  1800   18 0 00 A   0915           LDG   P
1E35  7263   70 2 63 A   0916           JMP   TSA!!!
1E36  2905   28 1 05 A   0917           LDA   *A         BIT ADDRESS
1E37  0802   08 0 02 A   0918           LDB   C          RESTORE B
1E38  1800   18 0 00 A   0919           LDG   P
1E39  7215   70 2 15 A   0920           JMP   CHKBA
1E3A  5C09   58 4 09 A   0921           AND   9,B
1E3B  AC09   A8 4 09 A   0922           STA   9,B
1E3C  6C08   68 4 08 A   0923           DCR   8,B
1E3D  F201   F0 2 01 A   0924           ZJP   OUTLOOP    IF DONE
1E3E  72F4   70 2 F4 A   0925           JMP   LOOP
1E3F  1401   10 4 01 A   0926  OUTLOOP  LDC   1,B        OLD B
1E40  2E01   28 6 01 A   0927           LDA   1,C        RETURN P
1E41  AC05   A8 4 05 A   0928           STA   5,B
1E42  2C09   28 4 09 A   0929           LDA   9,B
1E43  BA01   B8 2 01 A   0930           NJP   IRTN       LOGICAL AND WAS FFFF
1E44  7205   70 2 05 A   0931           JMP   NRTN       LOGICAL AND WAS 0
                         0932  *
      1E45   18 6 45 A   0933  IRTN     EQU   $
1E45  1401   10 4 01 A   0934           LDC   1,B        OLD B
1E46  2D04   28 5 04 A   0935           LDA   *4,B
1E47  AE01   A8 6 01 A   0936           STA   1,C
1E48  0802   08 0 02 A   0937           LDB   C
1E48  7107   70 1 07 A   0938           JMP   *MISFX
                         0939  *
      1E4A   18 6 4A A   0940  NRTN     EQU   $
1E4A  1401   10 4 01 A   0941           LDC   1,B
1E4B  2C05   28 4 05 A   0942           LDA   5,B
1E4C  AE01   A8 6 01 A   0943           STA   1,C
1E4D  0802   08 0 02 A   0944           LDB   C
1E4E  7107   70 1 07 A   0945           JMP   *MISFX
                         0946  *
      1E4F   18 6 4F A   0947  CHKBA    EQU   $
1E4F  6003   60 0 03 A   0948           INC   G
1E50  AC06   A8 4 06 A   0949           STA   6,B
1E51  EF09   E8 7 09 A   0950           SST   BICHK,B
1E52  0006   00 0 06 A   0951           DAT   6
1E53  0007   00 0 07 A   0952           DAT   7
1E54  7201   70 2 01 A   0953           JMP   SET
1E55  7202   70 2 02 A   0954  XRTRN    JMP   RESET
                         0955  *
      1E56   18 6 5[illegible] A   0956  SET      EQU   $
1E56  28A0   28 0 A0 A   0957           LDA   K1XFFFF
1E57  7103   70 1 03 A   0958           JMP   *G
                         0959  *
```

```
     1E53   18 6 53 A   RESET    EQU   *
1E58 3805   38 0 05 A            STZ   A
1E59 7103   70 1 03 A            JMP   *B
                        *
1E5A 18C1   18 3 C1 A            LPL
     0005   00 0 05 A            RPT   6
1E5B 0000   00 0 00 A            DAT   0
1E5C 0000   00 0 00 A            DAT   0
1E5D 0000   00 0 00 A            DAT   0
1E5E 0000   00 0 00 A            DAT   0
1E5F 0000   00 0 00 A            DAT   0
1E60 0000   00 0 00 A            DAT   0
1E61 0000   00 0 00 A   POOL3    DAT   0                0
1E62 0000   00 0 00 A            DAT   0                1  OLD B
1E63 0000   00 0 00 A            DAT   0                2  BITNUM
1E64 0000   00 0 00 A            DAT   0                3  N
1E65 0000   00 0 00 A            DAT   0                4  I
1E66 0000   00 0 00 A            DAT   0                5  NORMAL RETURN
1E67 0000   00 0 00 A            DAT   0                6  BIT ADDRESS
1E68 1E54   18 6 54 A            DAT   XRTRN-1          7  RETURN FOR CHECK TYPICAL
1E69 0000   00 0 00 A            DAT   0                8  N TEMPORARY
1E6A 0000   00 0 00 A            DAT   0                9  AND TEMPORARY
                        *
                                 TTL   ' SCAN REMOVE SUBROUTINE P=2000-9'
                        *
                        *               SST   SCANRMV,B
                        *               DAT   BIT ADDRESS
                        *
     1E6B   18 6 6B A   SCANRMV  EQU   *
1E6B 1800   18 0 00 A            LDB   P
1E6C 713B   70 1 3B A            JMP   *TSA1
1E6D 2905   28 1 05 A            LDA   *A               FETCH BIT ADDRESS
1E6E BACF   B8 2 CF A            NJP   PASSBA.          JMP IF PASSIVE
     1E6F   18 6 6F A   ACTBA    EQU   *                ACTIVE BIT ADDRESS
1E6F 5225   50 2 25 A            EOR   STATEY           TAKE OFF MACHINE BIT
1E70 1A20   18 2 20 A            LDB   *X'4004'         SBA+4
1E71 A804   A8 0 04 A            STA   E                SAVE BIT ADDRESS
1E72 58A6   58 0 A6 A           .AND   K14TH
1E73 4050   40 0 50 A            ADD   X'50'            X'B0'
1E74 1105   10 1 05 A            LDC   *A               PICK UP BIT MASK
1E75 9804   98 0 04 A            SHF   E
1E76 2A1F   28 2 1F A            LDA   SCANTBLX         ADJ FOR START OF SCAN REMOVE TABLE
1E77 4004   40 0 04 A            ADD   E
1E78 A804   A8 0 04 A            STA   E                ADJ FOR SCAN TABLE ENTRY
1E79 28A0   28 0 A0 A            LDA   K1XFFFF
1E7A 5002   50 0 02 A            EOR   C
```

```
1E7B  5904  58 1 04 A            AND   *E
1E7C  A904  A8 1 04 A            STA   *E
1E7D  720F  70 2 0F A            JMP   SCANFND
      1E7E  18 6 7E A   PASSBA   EQU   $            PASSIVE BIT ADDRESS
1E7E  5216  50 2 15 A            EOR   STATEY       TAKE OFF MACHINE BIT
1E7F  5AA8  58 0 A8 A            AND   K1X7FFF      CLEAR SIGN BIT
1E80  1A10  18 2 10 A            LDG   =X'4004'     SRA+4
1E81  9805  98 0 05 A            SHF   A
1E82  A803  A8 0 03 A            STA   G            SAVE REGISTER NUMBER
1E83  2213  20 2 13 A            LDE   INVMCIX      ADR FOR CCI INVERSION TABLE
1E84  1213  10 2 13 A            LDC   NCCIREG      NUMBER OF MCCI REGISTERS - 1
      1E85  18 6 85 A   LOOP1    EQU   $
1E85  2904  28 1 04 A            LDA   *E
1E86  4803  48 0 03 A            SUB   G
1E87  F203  F0 2 03 A            ZJP   SREMV
1E88  6802  68 0 02 A            DCR   C
1E89  F203  F0 2 03 A            ZJP   SCANEND
1E8A  72FA  70 2 FA A            JMP   LOOP1
      1E8B  18 6 8B A   SREMV    EQU   $
1E8B  2A0D  28 2 0D A            LDA   LREGNUM      DUMMY PASSIVE LOGICAL REGISTER NUMBER
1E8C  A904  A8 1 04 A            STA   *E
      1E8D  18 6 8D A   SCANEND  EQU   $
1E8D  E401  E0 4 01 A            EST   1,B
1E8E  1E96  18 6 96 A            LPL
1E8F  1E94  18 6 94 A
1E90  4004  40 0 04 A
1E91  1E95  18 6 95 A
1E92  1E97  18 6 97 A
1E93  1E98  18 6 98 A
1E94  4000  40 0 00 A   STATEY   GEN,2,14 STATE,0
1E95  2005  28 5 05 A   SCANTBLX DAT   SCANTBL
1E96  1FA2  18 7 A2 A   INVMCIX  DAT   INVMCI
1E97  0037  00 0 37 A   NCCIREG  DAT   NCIREG
1E98  0028  00 0 28 A   LREGNUM  DAT   DREGNUM
                                 TTL   'TSAIU ROUTINE P-2000-2'
                        *                     THIS ROUTINE IS USED LIKE TSAI
                        *                     EXCEPT THAT THE INDIRECT BIT IN THE
                        *                     CALLING SEQUENCE MEANS THAT A
                        *                     FORTRAN PROGRAM HAS CALLED A B:BIT
                        *                     ROUTINE WITH THE BIT ADDRESSES
                        *                     DECLARED EXTERNAL
1E99  6003  60 0 03 A   TSAIU    INC   G
1E9A  3004  30 0 04 A            CDR   MOO
1E9B  6401  60 4 01 A            INC   1,B
1E9C  2001  28 5 01 A            LDA   *1,B
```

```
                                *
1E9D  5RAR   58 0 AB A                  AND     KIX7FFF        IGNORE INDIRECT BIT
                                *
1E9E  4402   40 4 02 A                  ADD     2,B            ADD BASE TO BASE (P59C) RELATIVE
1E9F  7103   70 1 03 A                  JMP     *G             RESULT AND RETURN TO B:BIT ROUTINE
                                        EJE
                                *
      1EAD   18 6 AD A          TEMPORG EQU     *
005A                                    ORG     X'5B'
005A  1C2C   18 4 2C A                  DAT     B:SETR-1
005C  1C31   18 4 31 A                  DAT     B:RESR-1
005D  1AD5   18 3 D5 A                  DAT     LOADBIT-1
0071                                    ORG     X'71'
0071  1A5F   18 3 5F A                  DAT     ADRCHK-1
0092                                    ORG     X'92'
0092  1C24   18 4 24 A                  DAT     B:SET-1
0093  1C28   18 4 28 A                  DAT     B:RES-1
0094  1AC1   18 3 C1 A                  DAT     B:CHK-1
0095  1A94   18 3 94 A                  DAT     B:SEI-1
0096  1D85   18 5 85 A                  DAT     B:SETI-1
0097  1DC3   18 5 C3 A                  DAT     B:RESI-1
0098  1DFD   18 5 FD A                  DAT     B:CHKI-1
1EAD                                    ORG     TEMPORG
      0000   00 0 00 A                  END
```

23. Trace printout routine

```
CJOB A8776,89 D. F. FURGERSON       USINOR 5 STAND COLD MILL
C
C      DATE:  3/29/72          REVISION LEVEL:  3
C
C
C
C      TRACE PRINTOUT TASK FOR ICS FUNCTION
C
       COMMON/TRCKOM/TRCBUF(256)
       COMMON  /FCKOM1/LODEV
       COMMON  /FCKOM2/ALGTBL(4,16)
       INTEGER  TIME,CHNBUF(4),BLOCK,TYPE,ASCBUF(4),ALGTBL,TRCBUF,END(4)
       INTEGER  ENDFLG,TDLY,WORD,JUMP,JUMP1,STATE
       INTEGER SIMFLG
       DATA     K1000/1000/,END/'EN','D ',' ','  '/,TDLY/5/
       DATA     KCFFFF/$CFFF/
       DATA NULL/$8000/
C
C      PROGRAM ENTRY - START AT TOP OF BUFFER
```

```
          I = 256
          WRITE  (LODEV.2002)
C         LOOK FOR WORD ZERO  (TIME COUNT)
    5     ASSIGN 10 TO JUMP
          INTFLG = 0
          GO TO  1000
C         WORD ZERO IS IN  PROCESS IT
    10    TIME = WORD
C         LOOK FOR WORD ONE  (CHAIN SLVL NUMBER)
          ASSIGN 20 TO JUMP
          GO TO  1000
C         WORD ONE IS IN, PROCESS IT
    20    CALL RDSYMB (2,WORD,CHNBUF,2,J)
C         LOOK FOR WORD TWO (BLOCK # / ALGO NAME)
          ASSIGN 30 TO JUMP
          GO TO  1000
C         WORD 2 IS IN  PROCESS IT
    30    J = WORD
C         SPLIT INTO 8-8 FIELDS
S         AND   162
S         STA   TYPE
C         CHECK FOR 'SIMULATE ONLY' BLOCK
S         LDA   J
S         AND   180
S         STA   SIMFLG
C         CHECK FOR I/O TRACE  (BIT 6 OF 'TYPE')
S         LDA   J
S         AND   182
S         STA   IOFLAG
S         LDA   J
S         AND   161
S         STA   BLOCK
S         STZ   4
          BLOCK = BLOCK/256
C         CONVERT TIME TO REAL (0 TO 65536 MICROSECONDS)
          RTIME = TIME
    40    IF (TIME.LT.0)  RTIME = 65536.0-RTIME
          RTIME = RTIME/1000.0
C         CHECK FOR END MODULE
          ENDFLG = 0
          IF (TYPE.LT.80) GO TO 45
          ENDFLG = 1
          IOFLAG = 0
          GO TO 46
C         MAKE TYPE MODULO 16
S45       LDA   TYPE
```

```
S        AND    166
S        STA    TYPE
C        FETCH THE ASCII ALGO NAME FROM THE 4 BY 16 WORD 'ALGTBL'
 46      DO 49 J=1,4
C        CHECK FOR 'END' MODULE
         IF (ENDFLG.EQ.0) GO TO 48
         ASCBUF(J) = END(J)
         GO TO 49
 48      ASCBUF(J) = ALGTBL(J,TYPE+1)
 49      CONTINUE
C
C        PRINT BLOCK TRACE INFORMATION
         WRITE (LODEV,2000)  RTIME,CHNBUF,BLOCK
         IF (SIMFLG.NE.0) GO TO 490
         WRITE (LODEV,2007)  ASCBUF
         GO TO 491
 490     CONTINUE
         WRITE (LODEV,2008)  ASCBUF
 491     CONTINUE
C        CHECK FOR I/O TRACE
         IF (IOFLAG.EQ.0) GO TO 5
C        YES I/O TRACE, BRANCH TO HANDLER
         J = TYPE+1
            GO TO (5,50,5,60,60,60,65,70,64,80,80,50,65,60,75,60) J
C
C        LOGICAL BIT TRACE
 50      CONTINUE
         ASSIGN 51 TO JUMP
         GO TO 1000
 51      J = WORD
 52      ASSIGN 55 TO JUMP
         DO 58 K=1,J
         GO TO 1000
 55      IF (INTFLG.EQ.0) GO TO 56
         WRITE  (LODEV,2006) WORD
         GO TO 58
 56      IF (WORD.EQ.-1)  GO TO 59
         ASSIGN 58 TO JUMP1
         GO TO 1020
 58      CONTINUE
         WRITE (LODEV,2001)  ASCBUF,STATE
 59      WRITE (LODEV,2002)
         GO TO 5
C
C        LOGTDF, LOGTDT, DIAG
 60      ASSIGN 62 TO JUMP
```

```
        GO TO 1000
 62     TIMER = WORD
        TIMER = TIMER/10.0
        WRITE  (LODEV,2003) TIMER
        IF (TYPE.EQ.5)  GO TO 5
C       TSTBRL
 64     J = 2
        GO TO 52
C
C       BIDS
 65     CONTINUE
        ASSIGN 67 TO JUMP
        GO TO 1000
 67     CALL RDSYMB (2,WORD,ASCBUF,2,L)
        WRITE  (LODEV,2004)  ASCBUF
        GO TO 5
C
C       PROGRAM
 70     CONTINUE
        ASSIGN 72 TO JUMP
        GO TO 1000
 72     CALL RDSYMB (2,WORD,ASCBUF,5,L)
        WRITE  (LODEV,2005)  ASCBUF
        ASSIGN 75 TO JUMP
        GO TO 1000
C       DATRNS
 75     IF (WORD.EQ.0)  GO TO 5
        INTFLG = 1
        GO TO 50
C
C       SET-RESET-PERM
 80     J = 1
        GO TO 52
C
C       CHECK FOR NEXT VARIABLE IN 'TRCBUF'
 1000   CONTINUE
        TRCBUF(I) = NULL
        I = I+1
        IF (I.GT.256)  I = 1
 1010   WORD = TRCBUF(I)
        IF (WORD.NE.NULL)  GO TO JUMP
        CALL M:TD (TDLY)
        GO TO 1010
C
C       FETCH STAT OF LOGICAL BIT AND ASCII NAME (IF ANY)
 1020   CONTINUE
```

```
S       LDA    WORD
S       AND    189
S       STA    STATE
        IF (STATE.NE.0)  STATE = 1
S       LDA    WORD
S       AND    KCFFF
S       STA    WORD
        CALL RDSYMB (2,WORD,ASCBUF,1,L)
        GO TO JUMP1
C
C
C                        TIME   CHAIN  BLK#  NAME
  2000 FORMAT(' ',F7.3,2X,4A2,2X,I3,2X)
  2001 FORMAT ('+',4A2,'=',I1,2X)
  2002 FORMAT (' ')
  2003 FORMAT ('+SEC=',F4.1,2X)
  2004 FORMAT ('+SLVL=',4A2,2X)
  2005 FORMAT ('+CALL ',4A8,2X)
  2006 FORMAT ('+',I5,1X)
  2007 FORMAT ('+',4A2,4X)
  2008 FORMAT ('+ ',4A2,' ',4X)
       END
```

D. MACHINE #1 Programs

24. Subroutine SYMTRC - Symbol transfer via data link

```
CJOB A0776,02 D. F. FURGERSON       USINOR 5 STAND COLD MILL
C
C       DATE:  2/8/72          REVISION LEVEL:  2
C
C       SYMTRF CALLS EITHER SYMHEX OR SYMASC AND RETURNS RESULTS OVER THE
C       DATA LINK TO P2000-2 VIA THE 'TRANSFER' SUBROUTINE.
C
        SUBROUTINE SYMTRF (HEXADR,ASCII1,ASCII2,ASCII3,ASCII4,CODE,BFR)
C
        INTEGER HEXADR,ASCII1,ASCII2,ASCII3,ASCII4,CODE,BFR,BUFFER(6)
        DIMENSION IASC(4)
        EQUIVALENCE (BUFFER(1),IHEX),(BUFFER(2),IASC(1)),(BUFFER(6),ICODE)
C
C
C       BRING ARGUMENTS INTO POOL OF THIS SUBROUTINE
C
        IHEX = HEXADR
```

```
              IASC(1) = ASCII1
              IASC(2) = ASCII2
              IASC(3) = ASCII3
              IASC(4) = ASCII4
              ICODE = CODE
              IBFR = BFR
      C
      C       CALL APPROPRIATE SYM TBL HANDLER SUBROUTINE
              IF (IHEX.EQ.0) GO TO  80
      C       CALL SYMASC TO FETCH ASCII SYMBOL
              CALL SYMASC (IHEX,IASC,ICODE)
              GO TO 100
      C       CALL SYMHEX TO FETCH HEX ADDRESS
        80    CALL SYMHEX (IHEX,IASC,ICODE)
      C
      C       SEND RESULTS BACK TO P2000-2
      C
       100    CONTINUE
              CALL TRANSFER (BUFFER,IBFR,5)
      C       FIX UP 'IBFR' ARG TO TRANSFER TO GO INDIRECT FOR 798 LOC
              RETURN
              END
```

25. SYMFIND - Edit symbol table from programmer's console

```
      CJOB H0776,09 D. F. FURGERSON        USINOR 5 STAND COLD MILL
      C
      C          DATE: 12/01/71         REVISION LEVEL:  03
      C
      C          SUBLVL: X'5011'   SECTOR: X'204'   CORE: X'8700'  (512)
      C
      C
      C       THIS PROGRAM IS USED TO CHECK FOR THE PRESENCE OF A SYMBOL IN THE
      C       HASH-CODED DISC SYMBOL TABLE STORAGE AREA.  THE PROGRAM WILL ASK
      C       FOR YOUR 'ENTRY TYPE' TO DETERMINE WHETHER YOU WISH A SEARCH BY
      C       HEX OR ASCII.  ENTRY TYPE # 1 IS HEX AND ENTRY TYPE # 2 IS ASCII.
      C
      C       AFTER INPUTTING 'ENTRY TYPE', PROGRAM WILL ASK FOR SYMBOL TABLE
      C       CODE #, AS DESCRIBED ELSEWHERE. IF OUR KONW THE CODE, ENTER IT IN
      C       I2 FORMAT WHEN ASKED.  IF CODE IS NOT KNOWN, ENTER CODE ZERO (00)
      C       AND PROGRAM WILL RETURN FIRST SYMBOL IT FINDS THAT MATCHES YOUR
      C       REQUEST, REGARDLESS OF STORED CODE.  YOU TAKE A CHANCE OF GETTING
      C       THE WRONG INFO ON CODE 00 SO TRY TO ADD A CORRECT CODE  (01-15)
      C
      C       IF SYMBOL IS FOUND, PROGRAM WILL RETURN WITH:
      C
```

```
C            SYMBOL  =  HEXADR     CODE = XX
C
C      OTHERWISE YOU WILL GET:
C
C          ** NONE FOUND **
C
C      AN ENTRY TYPE OF '3' ALLOWS YOU TO ENTER A NEW SYMBOL ONTO THE
C      DISC, AND AN ENTRY TYPE OF '4' DELETES THE ENTERED SYMBOL.
C
C      ENTRY TYPE 0 TERMINATES PGM, ELSE IT WILL CONTINUE TO ASK FOR MORE
C
       SUBROUTINE SYMFIND
C
       COMMON /SYMPOOL/OLDB,ADRHEX,BUFASC,KODE,PAKBUF(3).SECTOR,NUMWRD.
     X                 CORBUF,DORG,DNST1,DNST2,PROBE.SCLD4.ASCTBL,TEMP.
     X                 PASS,SCLD8,PREFIX,TAG,SCLS12,LOLIM,HILIM,HEXASC,
     X                 TSECT,TVALUE,ERRORS,NUMBER,BFRNUM.BFRORG,BRFSIZ.
     X                 ST1ST2,BIAS,NBR,INCR,SPARE,DLEFLG.THEX,TASCII.
     X                 TCODE,SCRS12,ASCWRD
C
       INTEGER         OLDB,ADRHEX,BUFASC,KODE,PAKBUF    .SECTOR,NUMWRD.
     X                 CORBUF,DORG,DNST1,DNST2,PROBE.SCLD4.ASCTBL,TEMP.
     X                 PASS,SCLD8,PREFIX,TAG,SCLS12,LOLIM,HILIM,HEXASC.
     X                 TSECT,TVALUE,ERRORS,NUMBER,BFRNUM.BFRORG,BRFSIZ,
     X                 ST1ST2,BIAS,NBR,INCR,SPARE,DLEFLG.THEX,TASCII,
     X                 TCODE,SCRS12,ASCWRD
       INTEGER HEXADR,ASCBUF(4),CODE,ENTYPE
C
       DATA NOASCI/$D827/
C
C
C
       IPASS = 1
C      ASK FOR ENTRY TYPE
 10    WRITE  (1,101)
       IF (IPASS.EQ.1) WRITE (1,102)
       WRITE  (1,103)
       READ   (1,104)  ENTYPE
       IPASS = IPASS+1
       IF (ENTYPE.EQ.0)  GO TO 900
 20    IF (ENTYPE.NE.1.AND.ENTYPE.NE.3)  GO TO 30
C      ASK FOR HEX ENTRY   (1 AND 3)
       WRITE  (1,106)
       WRITE  (1,103)
       READ (1,108)  HEXADR
```

```
C      ASK FOR ASCII ENTRY     (2,3,4)
  30   IF (ENTYPE.LE.1)  GO TO 40
       WRITE  (1,107)
       WRITE  (1,103)
       READ   (1,109)  ASCBUF
C      ASK FOR CODE
  40   CONTINUE
       CODE = 0
       IF (ENTYPE.EQ.2)  GO TO  70
       WRITE  (1,110)
       WRITE  (1,103)
       READ (1,105)  CODE
       IF (CODE.GE.16) GO TO 40
C
  70   GO TO (100,200,300,400),ENTYPE
  71   GO TO   900
C
   101 FORMAT ('  ENTRY TYPE PLEASE')
   102 FORMAT ('+ (0=DONE,1=HEX,2=ASCII,3=ENTER,4=DELETE)')
   103 FORMAT (//' = ')
   104 FORMAT (I1)
   105 FORMAT (I2)
   106 FORMAT (' ENTER HEX NUMBER (Z4)')
   107 FORMAT (' ENTER ASCII SYMBOL (A8)')
   108 FORMAT (Z4)
   109 FORMAT (4A2)
   110 FORMAT (' ENTER CODE (I2)')
   111 FORMAT (//'   ',4A2,' = ',Z4,' CODE = ',I2,6X,2(Z3,':',Z2,';'),I3)
   112 FORMAT (' ** ERROR ',I2,' **'/)
   113 FORMAT (' ** NOT FOUND **'/)
C
C      CALL SYMASC TO FETCH ASCII
  100  CONTINUE
       CALL SYMASC(HEXADR,ASCBUF,CODE)
       GO TO 800
C      CALL SYMHEX TO FETCH HEX
  200  CONTINUE
       CALL SYMHEX(HEXADR,ASCBUF,CODE)
       GO TO 800
C      CALL SYMENT TO ENTER NEW SYMBOL
  300  CONTINUE
       CALL SYMENT(HEXADR,ASCBUF,CODE)
       GO TO 800
C      CALL SYMDLE TO DELTEE A SYMBOL
  400  CONTINUE
       CALL SYMDLE (ASCBUF,CODE)
```

```
C     HEXADR = 0
C
C     PRINT RESULTS
  800 CONTINUE
      PROBE=PROBE+1000
      WRITE  (1,111)  ASCBUF,HEXADR,CODE,TSECT,TASCII,SECTOR,TEMP,PROBE
      IF (HEXADR.EQ.-1.OR.ASCBUF(1).EQ.NOASCI)  WRITE (1,113)
      IF (ERRORS.EQ.0)  GO TO 10
      WRITE (1,112)  ERRORS
      GO TO 10
C
C
  900 CONTINUE
S     LDA   192
S     EOR   166
S     ZJP   )990
S     LDB   1,B
S     JMP   *4,B
  990 CONTINUE
      RETURN
```

26. ENTSYM - Enter symbol table from programmer's console

```
CJOB H0776.05 D. F. FURGERSON       USINOR 5 STAND COLD MILL
C
C
C       DATE: 12/01/71        REVISION LEVEL:  09
C
C       SUBLVL: X'500F'  SECTOR: X'210'  CORE: X'8300'  (1024)
C
C
C      THIS PROGRAM RUNS ON A LOW PRIORITY SUBLEVEL, READS BINARY SYMBOL
C      TABLE RECORDS FROM EITHER TAPE OR CARDS, AND ENTERS EACH SYMBOL
C      INTO THE HASH-CODED SYMBOL TABLE STORAGE AREA ON DISC.  THE ENTIRE
C      54 WORD BINARY RECORD IS READ INTO CORE, CHECKSUMED, AND THEN
C      EACH SYMBOL IS TRANSFERRED TO DISC VIA THE SUBROUTINE 'SYMENT'.
C      NO SEQUENCE CHECKS ARE MADE, SO 2 DECKS OF THE SAME TYPE MAY BE
C      COMBINED FOR LOADING WITHOUT ERROR.
C
C      WHEN LOADING, DECKS (OR TAPE) MUST BE DIVIDED ACCORDING TO SYMBOL
C      TYPE,AS DESCRIBED BELOW:
C
C         TYPE    1      LOGICAL BIT ADDRESSES        (DIGITAL SCAN)
C         TYPE    2      SUBLEVEL NUMBERS             (SUBLEVEL PROC)
C         TYPE    3      CORE ADDRESSES               (MAIN MACHINE)
C         TYPE    4      CORE ADDRESSES               (SATELLITE MACH)
```

```
C         TYPE     5      SUBROUTINE NAMES             (LINK LOADER,ETC)
C         TYPE     6      TASK LEVELS IN P2000-1       (SIMULATOR-TRACE)
C         TYPE     7      TASK LEVELS IN P2000-2       (SIMULATOR-TRACE)
C         TYPE     8      ANALOG OUTPUTS               (SIMULATOR-TRACE)
C         TYPE     9      ANALOG INPUTS                (SIMULATOR-TRACE)
C         TYPE    10      DIGITAL INPUTS               (SIMULATOR-TRACE)
C         TYPE    11      DEVICE OUTPUTS               (SIMULATOR-TRACE)
C         TYPES  12-15    SPARE TYPES - TO BE USED AS NEEDED
C
C      WHEN THIS PROGRAM IS BID, USER WILL BE INTERROGATED AS TO TYPE OF
C      SYMBOL TABLE BEING LOADED, AS SHOWN BELOW:
C
C                SYM TBL CODE =
C
C      WHEN THIS MESSAGE APPEARS, USER TYPES IN AT PROG CONS A 2 DIGIT
C      NUMBER IN THE RANGE  1 TO 15, FOLLOWED BY A CARRIAGE RETURN.
C      THE DECK OR TAPE WILL THEN BE INPUT, EACH SYMBOL THEREIN ASSIGNED
C      THE CODE JUST ENTERED, AND EACH SYMBOL ENTERED ON DISC. WHEN THIS
C      PROGRAM ENCOUNTERS AN 'END' CARD (OR 'END' RECORD ON TAPE), WHICH
C      CONSISTS OF A CHECKSUMED BLANK RECORD, BINARY INPUT WILL CEASE,
C      AND THE REQUEST FOR A NEW CODE WILL BE PUT UP ON THE PROG CONS.
C
C      NOTE THAT ONLY 2 DIGIT NUMBERS ARE VALID, HENCE TYPE 1 IS ENTERED
C      AS  01, AND AN ENTRY OF TYPE  00  WILL CAUSE THE PROGRAM  TO EXIT.
C
C      LISTING OUTPUT OF EACH SYMBOL LOADED WILL BE PROVIDED ON A LIST-
C      ING OUTPUT DEVICE SELECTED BY INPUTTING A 2-DIGIT LO DEVICE NBR
C      WHEN THE MESSAGE  'LO DEV NBR =  ' APPEARS AT THE PORG CONS.
C      AN ENTRY OF  00  SUPPRESSES LISTING OUTPUT.
C
C      PROVIDE CORRECT IOCS BINARY INPUT DEVICE NUMBER FOR YOUR TABLE
C      WHEN PROGRAM ASKS YOU 'SYM TBL INPUT ='  (I2 FORMAT ONLY PLEASE)
C
C      DEBUGGING STATISTICS MAY BE OUTPUT ON A DEBUG DEVICE BY LOADING
C      THE CORRECT 'DEBUG' DEVICE NBR WHEN ASKED BY PROGRAM FOR THIS
C      NUMBER.  LOADING 'DEBUG' WITH ZERO SUPPRESSES THESE STATISTICS.
C      STATISTICS ARE AS FOLLOWS:     I:SSS1,LL1,SSS2,LL2,PPP,EE
C
C           WHERE:  SSS =  HEX SECTOR NBR WHERE SYMBOL WAS STORED
C                    LL =  HEX RELATIVE LOCATION ON SECTOR FOR SYMBOL
C                   PPP =  INTEGER NUMBER OF PROBES NEEDED TO STORE
C                    EE =  ERROR NUMBER OF ANY ACCUMULATED ERRORS
C                     I =  RELATIVE SYMBOL NUMBER IN 8 SYMBOL RECORD
C                     1 =  SYMBOL TABLE 1 (ASCII)
C                     2 =  SYMBOL TABLE 2 (HEX)
C
```

```
C
C     THIS ROUTINE IS WRITTEN TO FUNCTION AS A NORMAL SUBLEVEL OR BE
C     CALLED AS A SUBROUTINE THRU THE PROGRAMMER'S CONSOLE IGP FUNCTION.
C     THE EOR FOLLOWING STMT 999 MUST BE CHANGED TO ADDRESS THE CONSTANT
C     (0-F) IN THE ZERO TABLE WHICH IS THE SAME AS THE LEVEL OF THE PROG
C     CONSOLE ON YOUR JOB (EG. PROG CONS LVL X'F' WOULD NEED AN EOR ON
C     LOC 166, WHICH IS LOC X'A6' IN ZRO TBL, WHICH CONTAINS AN X'F')
C
C
C
C
C
C
C
C
C     SUBROUTINE CALLED:  SYMENT,C:RES,C:REL,A:WDISC,M:RDISC,
C                          WRF:,ARF:,NOF:,RBINRD
C
      SUBROUTINE  ENTSYM
C
      COMMON /SYMPOOL/OLDB,ADRHEX,BUFASC,KODE,PAKBUF(3),SECTOR,NUMWRD,
     X                CORBUF,DORG,DNST1,DNST2,PROBE,SCLD4,ASCTBL,TEMP,
     X                PASS,SCLD8,PREFIX,TAG,SCLS12,LOLIM,HILIM,HEXASC,
     X                TSECT,TVALUE,ERRORS,NUMBER,BFRNUM,BFRORG,BRFSIZ,
     X                ST1ST2,BIAS,NBR,INCR,SPARE,DLEFLG,THEX,TASCII,
     X                TCODE,SCRS12,ASCWRD
C
      INTEGER         OLDB,ADRHEX,BUFASC,KODE,PAKBUF   ,SECTOR,NUMWRD,
     X                CORBUF,DORG,DNST1,DNST2,PROBE,SCLD4,ASCTBL,TEMP,
     X                PASS,SCLD8,PREFIX,TAG,SCLS12,LOLIM,HILIM,HEXASC,
     X                TSECT,TVALUE,ERRORS,NUMBER,BFRNUM,BFRORG,BRFSIZ,
     X                ST1ST2,BIAS,NBR,INCR,SPARE,DLEFLG,THEX,TASCII,
     X                TCODE,SCRS12,ASCWRD
      INTEGER  CODE,BIDEV,BIBUF(54),CHKSUM,ERRORS
      INTEGER CRDNUM,DEBUG
      DIMENSION IO(5)
C
C
      WRITE  (1,105)
      READ   (1,7)  BIDEV
C
C     ASK FOR LISTING OUTPUT
C
 1    WRITE  (1,2)
    2 FORMAT ('  SYM TBL LO DEV =  ')
 3    READ   (1,7)  LODEV
```

```
      WRITE  (1,104)
      READ   (1,7)  DEBUG
C
C     ASK USER FOR TYPE (1-15)
C
 4    WRITE  (1,5)
    5 FORMAT ('  SYM TBL CODE =  ')
 6    READ   (1,7)  CODE
    7 FORMAT (I2)
C
C     CHECK FOR DONE
C
 10   IF (CODE.EQ.0)  GO TO 999
C
C     RETURN CARRAIGE IF LODEV IS NON-ZERO
C
      IF (LODEV.EQ.0)  GO TO 100
      WRITE  (LODEV,103)
      IF (CODE.NE.-1)  WRITE (LODEV,106)  CODE
      WRITE  (LODEV,107)
      CRDNUM = 1
 11   IF (LODEV.EQ.0) GO TO 12
      WRITE (LODEV,102)  CRDNUM
      IF (DEBUG.NE.0)  WRITE (DEBUG,102)  CRDNUM
      CRDNUM = CRDNUM+1
  101 FORMAT ('      ')
  102 FORMAT (' ',I3,' ')
  103 FORMAT (//'  SYMBOL TABLE MAP')
  104 FORMAT ('  SYM TBL DEBUG DEV =  ')
  105 FORMAT ('  SYM TBL INPUT DEV =  ')
  106 FORMAT ('+  -  CODE = ',I2)
  107 FORMAT (//)
C
C     READ IN 1 BINARY RECORD
C
 100  CONTINUE
 12   CALL RBINRD (BIDEV,BIBUF)
C
C     COMPUTE THE CHECKSUM
C
S14   LDE   =51
S     JMP   $+3
      CALL DUMMY (BIBUF)
S     LDA   $-1
S     ADD   1
```

```
S      INC    5
S      STA    2
S      STZ    5
S      ADD    0,C
S      CJP    $+2
S      DCR    5
S      INC    5
S      INC    2
S      DCR    4
S      PJP    $-6
C      STORE 2'S COMPL OF CORRECT CHKSUM IN 'CHKSUM'
S      STA    CHKSUM
C
C      COMPARE THE CHECKSUM BY ADDING AND CHECKING FOR ZERO
C
  16   IF (CHKSUM+BIBUF(54).EQ.0)  GO TO 18
C       ERROR # 1 , BAD CHECKSUM
        ERRORS = 1
        GO TO  900
C
C       ITERATEVLY STORE SYMBOLS ON DISC  (8 SYMBOLS PER RECORD)
C
  18    DO 30  I=1,8
        IF (DEBUG.NE.0.AND.I.EQ.5)  WRITE (DEBUG,101)
        J = (I-1)*6+4
        K = J+4
        IF (BIBUF(J).EQ.0)  GO TO 4
        IF (CODE.EQ.-1)  GO TO 260
C       USE 'SYMENT' TO STORE SYMBOLS
  20    CALL SYMENT (BIBUF(K),BIBUF(J),CODE)
C       CHECK FOR ERRORS
  22    IF (BIBUF(K).NE.-1)  GO TO 26
        ERRORS = 2
        GO TO 900
C
C       CHECK FOR LISTING OUTPUT
C
 260    CONTINUE
  26    IF (LODEV.EQ.0)  GO TO  30
C
C
C       OUTPUT DEBUG STATISTICS
C
        IF (DEBUG.NE.0) WRITE (DEBUG,29) I,TSECT,TASCII.SECTOR,TEMP.
       X                                  PRODE,ERRORS
```

```
C
        DO 270 L=1,5
        M=J+L-1
        IO(L) = BIBUF(M)
 270    CONTINUE
C
 27     WRITE (LODEV,28) IO
   28   FORMAT ('+ ',4A2,'=',Z4)
   29   FORMAT ('+ ',I1,3(':',Z3,':',Z2),'  ')
 30     CONTINUE
        GO TO 11
C
C       OUTPUT ERROR MESSAGE
C
 900    WRITE  (1,901)  ERRORS
   901  FORMAT ('  SYM TBL ERR  ',I2)
        IF (ERRORS.NE.2)  GO TO 4
C
 910    WRITE  (1,911) I
   911  FORMAT ('+ AT SYM  ',I2)
C
        GO TO 26
C
C       PROGRAM EXIT
C
 999    CONTINUE
C       IF RUN UNDER IGP, DO NOT GO TO 'SUBLEVEL EXIT'
S       LDA   192
S       EOR   166
S       ZJP   )9999
S       LDB    1,B
S       JMP   *4,B
 9999   CONTINUE
        RETURN
        END
```

27. Symbol table handlers

A. SYMENT - Enter new symbol

B. SYMPLE - delete old symbol

C..SYMASC - Fetch ASCII given HEX

D. SYMHEX - Fetch HEX given ASCII

```
         TTL      'P2000 HASH-CODED DISC SYMBOL TABLE HANDLERS'
*
*
*        DATE:  6/7/72               REVISION LEVEL:  17
*
*
*
*        TABLE OF CONTENTS FOR HASH-CODED DISC STORAGE ROUTINES
*
*
*        SYMBOL         DESCRIPTION                         CORE      PAGE
*
*                    CALLING SEQUENCES FOR PK3              N/A       02
*                    SPECIAL NOTES TO THE USER              N/A       03
*                    EQU CARDS FOR PACKAGE                  N/A       04
*        SYMHEX    'ACQUIRE HEX GIVEN ASCII'              X'2000'    07
*        SYMASC    'ACQUIRE ASCII GIVEN HEX'              X'2035'    09
*        SYMENT    'ENTER NEW SYM TBL ENTRY'              X'203E'    13
*        SYMDLE    'DELETE OLD SYM TBL ENTRY'             X'2E07'    17
*        RETURN    COMMON RETURN FROM PACKAGE             X'2E62'    21
*        HASHCODE  COMPUTE HASH-CODED SECTOR NBR          X'2E71'    22
*        ASCPAK    PACK 8BIT ASCII INTO 6 BITS            X'2EA3'    24
*        ASCUNPAK  RESTORE 8BIT ASCII W/PARITY            X'2ECF'    26
*        SYMPROC   MAIN PROCESSOR FOR SYM TBL             X'2F25'    30
*        PIPOOL-6  PROGRAM DATA POOL STORAGE              X'2F3A'    35
*        PISCRD14  LAST LOCATION USED FOR PK3             X'2FFE'    37
*                  ZERO TBL ADL'S FOR PACKAGE             X'009A'    38
*
         EJE
*
*
*        WRITTEN BY:   DONALD F. FURGERSON
*
*        SUBROUTINES CALLED:  SATI,MISP,MIUN,MIRDISC,AIWDISC,CIRES,CIRE.
*
*
*                 HANDLERS FOR HASH-CODED DISC SYMBOL TABLE FOR P2000
*
*
*                 TO INCLUDE:   *** SYMHEX * ACQUIRE HEX ADDR GIVEN
```

```
*                               8 CHAR ASCII SYMBOL
*              CALL SYMHEX (HEXADR,ASCBUF,CODE)
*
*
*                     *** SYMASC - ACQUIRE ASCII SYMBOL GIVEN
*                                  HEX ADDR AND CODE
*              CALL SYMASC (HEXADR,ASCBUF,CODE)
*
*
*                     *** SYMENT - ENTER NEW SYMBOL AND
*                                  ADDRESS IN TABLE
*              CALL SYMENT (HEXADR,ASCBUF,CODE)
*
*
*                     *** SYMDLE - DELETE EXISTING SYMBOL
*                                  TABLE ENTRY
*              CALL SYMDLE (ASCBUF,CODE)     (NO HEXADR NEEDED)
        EJE
*
*       NOTES:
*
*             1      SYMBOLIC ENTRIES MUST BE UNIQUE, PREFERABLY
*                    OF 5 TO 8 CHARACTERS IN LENGTH
*
*             2      HEX ADDRESSES MUST BE UNIQUE WITHIN CODE GROUP
*                    BOUNDARIES.  CODE GROUPS CURRENTLY DEFINED
*                    ARE AS FOLLOWS:
*                    CODE #              SYMBOL TYPE
*                      1          LOGICAL BIT ADDRESS (DIGITAL SCAN)
*                      2          SUBLEVEL TASK # (SUBLEVEL PROCESSOR)
*                      3          CORE ADDRESSES  (MAIN MACHINE ONLY)
*                      4          CORE ADDRESSES  (SATELLITE MACHINE)
*                      5          SUBROUTINE NAMES
*                      6          TASK LEVELS   (MAIN MACHINE ONLY)
*                      7          TASK LEVELS   (SATELLITE MACHINE)
*                      8          ANALOG OUTPUTS
*                      9          ANALOG INPUTS
*                     10          DIGITAL INPUTS
*                     11          DEVICE OUTPUTS
*                    12-15        SPARE GROUPS - ASSIGN AS NEEDED
*
*             3      # OF SECTORS NEEDED = # SYMBOLS / 28.5
*
*             4      ASCBUF IS A 4-WORD ARRAY WHICH CONTAINS LEFT-
*                    JUSTIFIED ASCII SYMBOLS OF UP TO 8 CHARACTERS
*
```

```
                 *         A CODE OF ZERO ELIMINATES CODE CHECK AND MAY
                 *         BE USED WHEN CODE IS NOT KNOWN FOR A GIVEN
                 *         ASCII SYMBOL. USE CODE WHEN KNOWN, HOWEVER, AS
                 *         AMBIGUITY MAY RESULT IN CERTAIN CASES WHEN
                 *         USING 'SYMASC' WITH CODE ZERO.
                                  EJE
                        *
                        *              THE FOLLOWING EQU'S MUST BE INITIALIZED FOR EACH JOB
                        *
2000   28 0 00 A        SYM:ORIG EQU   X'2000'    CORE ORIGIN FOR SYMBOL TBL HANDLERS
05C0   00 0 C0 A        SYM:DORG EQU   X'5C0'     DISC ORIGIN FOR SYMBOL TBL STORAGE
00B0   00 0 B0 A        SYM:DNST EQU   X'B0'      NUMBER OF DISC SECTORS FOR STORAGE
009A   00 0 9A A        SYM:ZTBL EQU   X'9A'      START OF ZERO TBL ENTRIES FOR SUBRS
0DEE   08 0 EE A        SYM:ATBL EQU   X'0DEE'    START OF ASCII TBL FOR HEX NUMBERS
5000   50 0 00 A        SYM:BORG EQU   X'5000'    SHARED CORE BUFFER ORIGIN (C:BORG)
0040   00 0 40 A        SYM:BSIZ EQU   64         SHARED CORE BUFFER SIZE   (C:SIZ)
0018   00 0 18 A        SYM:SUSP EQU   24         SUSPEND CODE FOR SYM TBL BUSY
0000   00 0 00 A        C:OPT    EQU   0          RESERVE CORE OPTION CHOSEN
                        *              DATA POOL EQU'S
0001   00 0 01 A        OLDB     EQU   1          (OLD B)
0002   00 0 02 A        HEXADR   EQU   2          HEX ADDRESS
0003   00 0 03 A        ASCBUF   EQU   3          ASCII BUFFER
0004   00 0 04 A        CODE     EQU   4          CODE WORD
0005   00 0 05 A        PAKBUF   EQU   5          PACKED ASCII BUFFER  (1)
                        *        EQU   6          PACKED ASCII BUFFER  (2)
                        *        EQU   7          PACKED ASCII BUFFER  (3)
0008   00 0 08 A        SECTOR   EQU   8          SYMBOL TABLE SECTOR NUMBER
0009   00 0 09 A        NUMWRD   EQU   9          NUMBER OF WORDS TO READ/WRITE
000A   00 0 0A A        CORBUF   EQU   10         START OF CORE BUFFER FOR READ/WRITE
000B   00 0 0B A        DORG     EQU   11         DISC ORIGIN FOR ST1
000C   00 0 0C A        DNST1    EQU   12         SIZE OF ST1
000D   00 0 0D A        DNST2    EQU   13         SIZE OF ST2
000E   00 0 0E A        PROBE    EQU   14         # OF DISC PROBES NEEDED
000F   00 0 0F A        SCLD4    EQU   15         SHIFT CIRC LEFT DBL 4
0010   00 0 10 A        ASCTBL   EQU   16         ADDRESS OF CORE ASCII TBL FOR HEX #S
0011   00 0 11 A        TEMP     EQU   17         TEMPORARY STORAGE
0012   00 0 12 A        PASS     EQU   18         PASS COUNTER
0013   00 0 13 A        SCLS8    EQU   19         SHIFT CIRC LEFT SGL 8
0014   00 0 14 A        PREFIX   EQU   20         ASCII X'
0015   00 0 15 A        TAG      EQU   21         ASCII '
0016   00 0 16 A        SCLS12   EQU   22         SHIFT CIRC LEFT SGL 12
0017   00 0 17 A        LOLIM    EQU   23         LOWER SECTOR LIMIT
0018   00 0 18 A        HILIM    EQU   24         HIGH SECTOR LIMIT
0019   00 0 19 A        HEXASC   EQU   25         HEX/ASCII FLAG
001A   00 0 1A A        TSECT    EQU   26         TEMPORARY SECTOR #
001B   00 0 1B A        TVALUE   EQU   27         TEMPORARY DATA VALUE ADDRESS
```

```
001C  00 0 1C A   0133 ERRORS  EQU   28                    ERROR COUNTER
001D  00 0 1D A   0134 NUMBFR  EQU   29                    CORE BUFFERS NEEDED PER SECTOR
001E  00 0 1E A   0135 BFRNUM  EQU   30                    BUFFER # OF SHARED CORE DATA AREA
001F  00 0 1F A   0136 BFRORG  EQU   31                    ORIGIN OF SHARED CORE BUFFER AREA
0020  00 0 20 A   0137 BFRSIZ  EQU   32                    SIZE OF EACH SHARED CORE BUFFER
0021  00 0 21 A   0138 ST1ST2  EQU   33                    ST1 - ST2 FLAG
0022  00 0 22 A   0139 BIAS    EQU   34                    SEARCH BIAS
0023  00 0 23 A   0140 NBR     EQU   35                    SEARCH NUMBER OF WORDS
0024  00 0 24 A   0141 INCR    EQU   36                    SEARCH INCREMENT
0025  00 0 25 A   0142 SPARE   EQU   37                    SPARE LOCATION FLAG
0026  00 0 26 A   0143 DLEFLG  EQU   38                    DELETE FLAG FOR RETURN TO SYMENT
0027  00 0 27 A   0144 THEX    EQU   39                    TEMPORY STORAGE FOR 'HEXADR'
0028  00 0 28 A   0145 TASCII  EQU   40                    TEMPORY STORAGE FOR 'ASCBUF'
0029  00 0 29 A   0146 TCODE   EQU   41                    TEMPORY STORAGE FOR 'CODE'
002A  00 0 2A A   0147 SCRS12  EQU   42                    TEMPORY STORAGE FOR
002B  00 0 2B A   0148 ASCWRD  EQU   43                    TEMP STORAGE FOR ASCBUF
002C  00 0 2C A   0149 TEMPG   EQU   44                    TEMP STORAGE FOR 3
002D  00 0 2D A   0150 SHIFT   EQU   45                    VARIABLE SHIFT STORAGE
002E  00 0 2E A   0151 ASCMSK  EQU   46                    MASK TO ELIMINATE BITS 5-7
002F  00 0 2F A   0152 SCLD8   EQU   47                    SHIFT CIRC LEFT 8
0030  00 0 30 A   0153 SCLS2   EQU   48                    SHIFT CIRC LEFT 2
0031  00 0 31 A   0154 SCRD6   EQU   49                    SHIFT CIRC RITE 6
0032  00 0 32 A   0155 SCRD18  EQU   50                    SHIFT CIRC RITE 18
0033  00 0 33 A   0156 SCLD12  EQU   51                    SHIFT CIRC DBL LEFT 12
0034  00 0 34 A   0157 SCRD10  EQU   52                    SHIFT CIRC RITE 10
0035  00 0 35 A   0158 WORD    EQU   53                    WORD STORAGE LOC
0036  00 0 36 A   0159 SCLD6   EQU   54                    SHIFT CIRC LEFT DBL 6
0037  00 0 37 A   0160 COUNT   EQU   55                    WORD COUNT
0038  00 0 38 A   0161 SALC1   EQU   56                    SHIFT ARITH SINGLE 1
0039  00 0 39 A   0162 SCRS14  EQU   57
003A  00 0 3A A   0163 SCLD14  EQU   58
003B  00 0 3B A   0164 SCLS4   EQU   59
003C  00 0 3C A   0165 SCLS1   EQU   60
003D  00 0 3D A   0166 SCRD8   EQU   61
003E  00 0 3E A   0167 SCRD14  EQU   62
                  0168         EJE
                  0169 *
                  0170 *             STANDARD EQU'S FROM ZERO TABLE
                  0171 *
00B0  00 0 B0 A   0172 KIX1    EQU   X'B0'
00B1  00 0 B1 A   0173 KIX2    EQU   X'B1'
00AC  00 0 AC A   0174 KIX3    EQU   X'AC'
00B2  00 0 B2 A   0175 KIX4    EQU   X'B2'
00AD  00 0 AD A   0176 KIX5    EQU   X'AD'
00AB  00 0 AB A   0177 KIX6    EQU   X'AB'
00AE  00 0 AE A   0178 KIX7    EQU   X'AE'
```

```
      00B3    00 0 B3 A   0179  K:X8     EQU   X'B3'
      00AF    00 0 AF A   0180  K:X9     EQU   X'AF'
      00B5    00 0 B5 A   0181  K:X40    EQU   X'B5'
      00B7    00 0 B7 A   0182  K:X80    EQU   X'B7'
      00A0    00 0 A0 A   0183  K:XFFFF  EQU   X'A0'
      00A2    00 0 A2 A   0184  K:X00FF  EQU   X'A2'
      00A3    00 0 A3 A   0185  K:XF000  EQU   X'A3'
      00A4    00 0 A4 A   0186  K:X0F00  EQU   X'A4'
      00A8    00 0 A8 A   0187  K:X7FFF  EQU   X'A8'
      00B8    00 0 B8 A   0188  K:X100   EQU   X'B8'
      00BB    00 0 BB A   0189  K:X800   EQU   X'BB'
      00BF    00 0 BF A   0190  K:X8000  EQU   X'BF'
      003C    00 0 3C A   0191  SAT:     EQU   X'3C'
      0048    00 0 48 A   0192  A:WDISC  EQU   X'48'
      004A    00 0 4A A   0193  M:RDISC  EQU   X'4A'
      006D    00 0 6D A   0194  C:RES    EQU   X'6D'
      006E    00 0 6E A   0195  C:REL    EQU   X'6E'
      00D8    00 0 D8 A   0196  M:SP     EQU   X'D8'
      00D9    00 0 D9 A   0197  M:UN     EQU   X'D9'
      0007    00 0 07 A   0198  POSTC    EQU   X'0007'
      0004    00 0 04 A   0199  NOPOST   EQU   X'0004'
      8000    80 0 00 A   0200  IND      EQU   X'8000'
      00F0    00 0 F0 A   0201  SAL      EQU   X'F0'
                          0202           ABS
                          0203           ORG   SYM:ORIG
                          0204           TTL   'SYMHEX  -  ACQUIRE HEX GIVEN ASCII
                          0205  *
                          0206  *              ACQUIRE HEX ADDRESS GIVEN 5 CHR ASCII SYMBOL
                          0207  *
      2000    28 5 00 A   0208  SYMHEX   EQU   *
                          0209  *                            CHECK BUSY FLAG
2000  282F    28 3 2F A   0210           LDA   BSYFLG
2001  F202    F0 2 02 A   0211           ZJP   *+3
2002  1A2E    18 2 2E A   0212           LDQ   =SYM:SUSP
2003  71D8    70 1 D8 A   0213           JMP   *M:SP
                          0214  *
2004  3004    30 0 04 A   0215           CDR   NOPOST
2005  632A    60 3 2A A   0216           INC   BSYFLG             SET BUSY FLAG
2006  7201    70 2 01 A   0217           JMP   *+2
                          0218  *
2007  2FC0    28 7 C0 A   0219           ADL   P:POOL
2008  1800    18 0 00 A   0220           LDQ   P
2009  713C    70 1 3C A   0221           JMP   *SAT:              TRANSFER ARGUMENTS
200A  0002    00 0 02 A   0222           DAT   2
200B  3C0E    38 4 0E A   0223           STZ   PROBE,B
200C  3C1C    38 4 1C A   0224           STZ   ERRORS,B
```

```
2000  3C1E  38 4 1E A  0225          STZ   BFRNUM,B
                       0226  *                        PACK 4 WORDS OF 8 BIT ASCII
                       0227  *                        INTO 3 WORDS OF 6 BIT ASCII
200E  1800  18 0 00 A  0228          LDG   P
200F  7322  70 3 22 A  0229          JMP   ASCPAK
                       0230  *                        COMPUTE HASH CODE FROM PACKED ASCII
2010  2C0C  28 4 0C A  0231          LDA   DNST1,B
2011  20AC  20 0 AC A  0232          LDE   K1X3
2012  1800  18 0 00 A  0233          LDG   P
2013  731F  70 3 1F A  0234          JMP   HASHCODE
2014  0005  00 0 05 A  0235          ADL   PAKBUF
                       0236  *                        CHECK FOR VALID SECTOR  (ST1)
      2015  28 5 15 A  0237  CHECK1  EQU   *          CALL SYMPROC TO CHECK FOR MATCHUP
2015  3805  38 0 05 A  0238          STZ   A          ST1
2016  3804  38 0 04 A  0239          STZ   E
2017  1800  18 0 00 A  0240          LDG   P
2018  7318  70 3 18 A  0241          JMP   SYMPROC
2019  0005  00 0 05 A  0242          ADL   PAKBUF
                       0243  *                        WAS ERROR DISCOVERED IN SYMPROC
201A  B209  B0 2 09 A  0244          PJP   NOSYM2
                       0245  *                        WAS SYMBOL MATCHUP FOUND ON SECTOR
201B  2804  28 0 04 A  0246          LDA   E
201C  F207  F0 2 07 A  0247          ZJP   NOSYM2     NO MATCH - SECTOR NOT FULL
201D  B209  B0 2 09 A  0248          PJP   FOUND1     SYMBOL MATCH
                       0249  *                        NO MATCH - SECTOR IS  FULL
      201E  28 5 1E A  0250  NOSYM1  EQU   *
                       0251  *                        COMPUTE RANDOM SECTOR NUMBER
201E  2C0C  28 4 0C A  0252          LDA   DNST1,B
201F  20B0  20 0 B0 A  0253          LDE   K1X1
2020  1800  18 0 00 A  0254          LDG   P
2021  7311  70 3 11 A  0255          JMP   HASHCODE
2022  0008  00 0 08 A  0256          ADL   SECTOR
2023  72F1  70 2 F1 A  0257          JMP   CHECK1     GO READ ANOTHER SECTOR
                       0258  *
      2024  28 5 24 A  0259  NOSYM2  EQU   *          NOT FULL - REPORT ERROR  (ERR 5)
2024  28A0  28 0 A0 A  0260          LDA   K1XFFFF
2025  AD02  A8 5 02 A  0261          STA   *HEXADR,R
2026  730E  70 3 0E A  0262          JMP   RETURN
                       0263  *                        FOUND THE PACKED ASCII SYMBOL
      2027  28 5 27 A  0264  FOUND1  EQU   *
2027  2E03  28 6 03 A  0265          LDA   3,C
2028  AD02  A8 5 02 A  0266          STA   *HEXADR,R
2029  2802  28 0 02 A  0267          LDA   C
202A  4C0A  48 4 0A A  0268          SUB   CORBUF,B
202B  AC11  A8 4 11 A  0269          STA   TEMP,B
202C  3C1A  38 4 1A A  0270          STZ   TSECT,B
```

```
2020  3C28   38 4 28 A   0271              STZ     TASCII,B
202E  7306   70 3 06 A   0272              JMP     RETURN
202F  2095   28 5 95 A   0273              LPL
2030  0018   00 0 18 A
2031  2EA2   28 6 A2 A
2032  2E70   28 6 70 A
2033  2F25   28 7 25 A
2034  2E61   28 6 61 A
                         0274              TTL     'SYMASC  -  ACQUIRE ASCII GIVEN HEX
                         0275      *
                         0276      *               ACQUIRE ASCII SYMBOL GIVEN HEX ADDRESS
                         0277      *
      2035   28 5 35 A   0278      SYMASC  EQU     $
                         0279      *                          CHECK BUSY FLAG
2035  2A63   28 2 63 A   0280              LDA     BSYFLG
2036  F202   F0 2 02 A   0281              ZJP     $+3
2037  1AF9   18 2 F9 A   0282              LDG     *SYM1BUSP
2038  71D8   70 1 D8 A   0283              JMP     *MISP
                         0284      *
2039  3004   30 0 04 A   0285              COR     NOPOST
203A  625E   60 2 5E A   0286              INC     BSYFLG             SET BUSY FLAG
203B  7201   70 2 01 A   0287              JMP     $+2
                         0288      *
203C  2FC0   28 7 C0 A   0289              ADL     PIPOOL
203D  1800   18 0 00 A   0290              LDG     P
203E  713C   70 1 3C A   0291              JMP     *SAT1              TRANSFER ARGUMENTS
203F  0002   00 0 02 A   0292              DAT     2
                         0293      *                          COMPUTE HASH CODE FOR HEX ADDRESS
2040  3C0E   38 4 0E A   0294              STZ     PROBE,B
2041  3C1C   38 4 1C A   0295              STZ     ERRORS,B
2042  3C1E   38 4 1E A   0296              STZ     BFRNUM,B
2043  2C00   28 4 00 A   0297              LDA     DNST2,B
2044  2080   20 0 80 A   0298              LDE     K1X1
2045  1800   18 0 00 A   0299              LDG     P
2046  73EC   70 3 EC A   0300              JMP     HASHCODE
2047  8002   80 0 02 A   0301              ADL     HEXADR+IND
                         0302      *                          CHECK FOR VALID SECTOR  (ST2)
      2048   28 5 48 A   0303      CHECK2  EQU     $                  GO TO SYMPROC  (ST2)
2048  2880   28 0 80 A   0304              LDA     K1X1               ST2
2049  2080   20 0 80 A   0305              LDE     K1X1               HEX
204A  1800   18 0 00 A   0306              LDG     P
204B  73E8   70 3 E8 A   0307              JMP     SYMPROC
204C  8002   80 0 02 A   0308              ADL     HEXADR+IND
                         0309      *                          SYMPROC ERROR
204D  B209   B0 2 09 A   0310              PJP     NOSYM4
                         0311      *                          SYMBOL MATCHUP
```

```
2D4E  28C4  28 D 04 A          LDA    E
2D4F  F207  F0 2 07 A          ZJP    NOSYM4      NO - TBL NOT FULL
2D50  B225  B0 2 25 A          PJP    FOUND2      YES
                                                  NO - TBL IS FULL
                          *
      2D51  28 D 51 A  NOSYM3  EQU    *
2D51  2C00  28 4 00 A          LDA    DNST2,B
2D52  2080  20 0 80 A          LDE    KIX1
2D53  1800  18 0 00 A          LDG    P
2D54  73DE  70 3 DE A          JMP    HASHCODE
2D55  0008  00 0 08 A          ADL    SECTOR
2D56  72F1  70 2 F1 A          JMP    CHECK2
                          *
      2D57  28 D 57 A  NOSYM4  EQU    *           TBL NOT FULL
                          *                       NO HEX ADDR ON DISC - ASCIIIZE IT
                          *                       ADD PREFIX (X')
      2D57  28 D 57 A  ADDPRFX EQU    *
2D57  2C14  28 4 14 A          LDA    PREFIX,B
2D58  AD03  A8 D 03 A          STA    *ASCBUF,A
2D59  6403  60 4 03 A          INC    ASCBUF,B
                          *
2D5A  3C04  38 4 04 A          STZ    CODE,B
2D5B  6C04  68 4 04 A          DCR    CODE,B
2D5C  2502  20 D 02 A          LDE    *HEXADR,A      CONVERT HEX ADDR TO 2 ASCII WORDS
2D5D  1C0F  18 4 0F A  NXTWRD  LDG    SCLD4,B
2D5E  3C12  38 4 12 A          STZ    PASS,B
2D5F  6C12  68 4 12 A          DCR    PASS,B
2D60  3805  38 0 05 A  NXTHAF  STZ    A
2D61  9804  98 0 04 A          SHF    E
2D62  3007  30 0 07 A          CDR    POSTC
2D63  1005  10 0 05 A          LDC    A
2D64  2D10  28 D 10 A          LDA    *ASCTBL,A      PRE B, POST C
2D65  3004  30 0 04 A          CDR    NOPOST
2D66  6412  60 4 12 A          INC    PASS,B
2D67  F201  F0 2 01 A          ZJP    $+2
2D68  7202  70 2 02 A          JMP    GOTALL
2D69  AC11  A8 4 11 A          STA    TEMP,B
2D6A  72F5  70 2 F5 A          JMP    NXTHAF
                          *
      2D6B  28 D 6B A  GOTALL  EQU    *           WORD IS FULL, STORE IT
2D6B  1C13  18 4 13 A          LDG    SCLS8,B
2D6C  9805  98 0 05 A          SHF    A
2D6D  5411  50 4 11 A          LOR    TEMP,B
2D6E  9805  98 0 05 A          SHF    A
2D6F  AD03  A8 D 03 A          STA    *ASCBUF,A
2D70  6403  60 4 03 A          INC    ASCBUF,B
2D71  6404  60 4 04 A          INC    CODE,B
```

```
2072  F2EA  F0 2 EA A  0358            ZJP   NXTWRD          GET NEXT WORD
            2073  28 5 73 A  0359  *
            2073  28 5 73 A  0360  ADDTAG    EQU   *               STORE TAG (' )
2073  2C15  28 4 15 A  0361            LDA   TAG,B
2074  AD03  A8 5 03 A  0362            STA   *ASCBUF,B
2075  73BF  70 3 BF A  0363            JMP   RETURN
                       0364  *
                       0365  *
      2076  28 5 76 A  0366  FOUND2    EQU   *
2076  2C08  28 4 08 A  0367            LDA   SECTOR,B
2077  AC1A  A8 4 1A A  0368            STA   TSECT,B
2078  2802  28 0 02 A  0369            LDA   C
2079  4C0A  48 4 0A A  0370            SUB   CORBUF,B
207A  AC28  A8 4 28 A  0371            STA   TASCII,B
207B  28A2  28 0 A2 A  0372            LDA   K:X00FF         GET RID OF CODE #
207C  50A4  50 0 A4 A  0373            EOR   K:X0F00
207D  5E01  58 6 01 A  0374            AND   1,C
207E  AC08  A8 4 08 A  0375            STA   SECTOR,B
                       0376  *
      207F  28 5 7F A  0377  CHECK3    EQU   *               VALID HEX ADDRESS FOUND - SEARCH
                       0378  *                               SYMBOL TABLE 1 FOR CORRECT BCD
                       0379  *                               BY USING SYMPROC
207F  3805  38 0 05 A  0380            STZ   A               ST1
2080  20B0  20 0 B0 A  0381            LDE   K:X1            HEX
2081  1800  18 0 00 A  0382            LDG   P
2082  73B1  70 3 B1 A  0383            JMP   SYMPROC
2083  8002  80 0 02 A  0384            ADL   HEXADR+IND
                       0385  *                               SYMPROC ERROR
2084  B2??  B0 2 04 A  0386            PJP   NOSYM6
                       0387  *                               SYMBOL MATCHUP
2085  2804  28 0 04 A  0388            LDA   E
2086  B203  B0 2 03 A  0389            PJP   FOUND3          YES
                       0390  *
      2087  28 5 87 A  0391  NOSYM6    EQU   *
2087  28AB  28 0 AB A  0392            LDA   K:X6            ERROR 6 - ST1 SECTOR # IN WORD 2 OF
2088  AC1C  A8 4 1C A  0393            STA   ERRORS,B        THE ST2 MODULE IS IN ERROR.
2089  72CD  70 2 CD A  0394            JMP   NOSYM4
                       0395  *
      208A  28 5 8A A  0396  FOUND3    EQU   *               FOUND THE ASCII SYMBOL
208A  2E00  28 6 00 A  0397            LDA   0,C
208B  AC05  A8 4 05 A  0398            STA   PAKBUF,B
208C  2E01  28 6 01 A  0399            LDA   1,C
208D  AC06  A8 4 06 A  0400            STA   PAKBUF+1,B
208E  2E02  28 6 02 A  0401            LDA   2,C
208F  AC07  A8 4 07 A  0402            STA   PAKBUF+2,B
2090  2802  28 0 02 A  0403            LDA   C
```

```
2091  4C0A  48 4 0A A  0404           SUB   C0RBUF,B
2092  AC27  A8 4 27 A  0405           STA   THEX,B
                       0406  *
                       0407  *                            CONVERT 5 BIT ASCII TO 8 BITS
2093  1800  18 0 00 A  0408           LDG   P
2094  7305  70 3 05 A  0409           JMP   ASCUNPAK
                       0410  *
2095  2C27  28 4 27 A  0411           LDA   THEX,B
2096  AC11  A8 4 11 A  0412           STA   TEMP,B
2097  7390  70 3 90 A  0413           JMP   RETURN
2098  0000  00 0 00 A  0414  BSYFLG   DAT   0                 BUSY FLAG FOR SYMBOL TABLE HANDLERS
2099  2ECE  28 6 CE A  0415           LPL
      0004  00 0 04 A  0416           RPT   SYM:0RIG+X'9E'-$
209A  0008  00 0 08 A  0417           ADL   SECT0R
209B  0008  00 0 08 A  0417           ADL   SECT0R
209C  0008  00 0 08 A  0417           ADL   SECT0R
209D  0008  00 0 08 A  0417           ADL   SECT0R
                       0418           TTL   'SYMENT  -  ENTER NEW SYMBOL TABLE ENTRY'
                       0419  *
                       0420  *        ENTER NEW SYMB0L INT0 TABLE (ST1=ASCII,ST2=HEX)
                       0421  *
      209E  28 5 9E A  0422  SYMENT   EQU   $
                       0423  *                            CHECK BUSY FLAG
209E  2AFA  28 2 FA A  0424           LDA   BSYFLG
209F  F202  F0 2 02 A  0425           ZJP   $+3
20A0  1A90  18 2 90 A  0426           LDG   *SYM:SUSP
20A1  71D8  70 1 D8 A  0427           JMP   *MISP
                       0428  *
20A2  3004  30 0 04 A  0429           CDR   N0P0ST
20A3  62F5  60 2 F5 A  0430           INC   BSYFLG            SET BUSY FLAG
20A4  7201  70 2 01 A  0431           JMP   $+2
                       0432  *
20A5  2FC0  28 7 C0 A  0433           ADL   P:P00L
20A6  1800  18 0 00 A  0434           LDG   P
20A7  713C  70 1 3C A  0435           JMP   *SAT:             TRANSFER ARGUMENTS
20A8  0002  00 0 02 A  0436           DAT   2
                       0437  *
20A9  3C0E  38 4 0E A  0438           STZ   PR0BE,B
20AA  3C1E  38 4 1E A  0439           STZ   BFRNJM,B
      20AB  28 5 AB A  0440  DELETE0K EQU   $
20AB  3C1C  38 4 1C A  0441           STZ   ERR0RS,B
20AC  3C25  38 4 25 A  0442           STZ   DLEFLG,B
                       0443  *                            PACK 4 WORDS OF 8 BIT ASCII
                       0444  *                            INTO 3 WORDS OF 6 BIT ASCII
20AD  1800  18 0 00 A  0445           LDG   P
20AE  7383  70 3 83 A  0446           JMP   ASCPAK
```

```
                                0447  *                              COMPUTE HASH CODE FROM PACKED ASCII
2DAF  2C0C   28 4 0C A          0448            LDA   DNST1,B
2D30  20AC   20 0 AC A          0449            LDE   K:X3
2D31  1800   18 0 00 A          0450            LDG   P
2D32  7380   70 3 80 A          0451            JMP   HASHCODE
2D33  0005   00 0 05 A          0452            ADL   PAKBUF
                                0453  *                              CHECK VALIDITY OF SECTOR NUMBER
      2D84   28 5 84 A          0454  CHECK4    EQU   *              USE SYMPROC TO CHECK SECTOR
2D34  3805   38 0 05 A          0455            STZ   A
2D35  3804   38 0 04 A          0456            STZ   E
2D36  1800   18 0 00 A          0457            LDG   P
2D37  734C   70 3 4C A          0458            JMP   SYMPROC
2D38  0005   00 0 05 A          0459            ADL   PAKBUF
                                0460  *                              ERRORS
2D39  B20C   B0 2 0C A          0461            PJP   ENTERROR
                                0462  *                              MATCHUP
2D3A  2804   28 0 04 A          0463            LDA   E
2D3B  6805   68 0 05 A          0464            DCR   A
2D3C  B20C   B0 2 0C A          0465            PJP   FOUND4         YES
                                0466  *                              CHECK FOR FULL TABLE
      2DBD   28 5 BD A          0467  FULLCHK   EQU   *
2D3D  1002   10 0 02 A          0468            LDC   C
2D3E  F201   F0 2 01 A          0469            ZJP   NOSYM7
2D3F  7203   70 2 03 A          0470            JMP   NOSYM8
                                0471  *                              NO - TBL IS FULL
      2DC0   28 5 C0 A          0472  NOSYM7    EQU   *
2DC0  2C0C   28 4 0C A          0473            LDA   DNST1,B
2DC1  20B0   20 0 B0 A          0474            LDE   K:X1
2DC2  1800   18 0 00 A          0475            LDG   P
2DC3  7343   70 3 43 A          0476            JMP   HASHCODE
2DC4  0008   00 0 08 A          0477            ADL   SECTOR
2DC5  72EE   70 2 EE A          0478            JMP   CHECK4
                                0479  *                              SYMPROC ERRORS
      2DC6   28 5 C6 A          0480  ENTERROR  EQU   *
2DC6  28A0   28 0 A0 A          0481            LDA   K:XFFFF
2DC7  A002   A8 5 02 A          0482            STA   *HEXADR,R
2DC8  733C   70 3 3C A          0483            JMP   RETURN
                                0484  *                              FOUND SYMBOL ON DISC - FAKE A CALL
                                0485  *                              TO DELETE IT BEFORE RETURNING TO
                                0486  *                              SYMENT AT 'DELETEOK'
      2DC9   28 5 C9 A          0487  FOUND4    EQU   *
2DC9  6C26   68 4 26 A          0488            DCR   DLEFLG,B
2DCA  7240   70 2 40 A          0489            JMP   GODELETE
                                0490  *                              TBL NOT FULL
      2DCB   28 5 CB A          0491  NOSYM8    EQU   *
2DCB  2C05   28 4 05 A          0492            LDA   PAKBUF,B
2DCC  AE00   A8 6 00 A          0493            STA   0,C
```

```
2DCD  2C06  28 * 06 A              LDA   PAKBUF+1,B
2DCE  AE01  A8 6 01 A              STA   1,C
2DCF  2C07  28 * 07 A              LDA   PAKBUF+2,B
2DD0  AE02  A8 6 02 A              STA   2,C
2DD1  2802  28 D 02 A              LDA   *HEXADR,B
2DD2  AE03  A8 6 03 A              STA   3,C
2DD3  2802  28 0 02 A              LDA   C
2DD4  4C0A  48 * 0A A              SUB   CORBUF,B
2DD5  AC28  A8 * 28 A              STA   TASCII,B
2DD6  2C08  28 * 08 A              LDA   SECTOR,B
2DD7  AC1A  A8 * 1A A              STA   TSECT,B
                          *                          WRITE ST1 SECTOR ONTO DISC
2DD8  ED48  E8 D 48 A              SST   *AIWDISC,B
2DD9  800A  80 0 0A A              ADL   CORBUF+IND
2DDA  0008  00 0 08 A              ADL   SECTOR
2DDB  0009  00 0 09 A              ADL   NUMWRD
                          *                          SAVE ST1 SECTOR # FOR LATER USE
                          *
2DDC  2C08  28 * 08 A              LDA   SECTOR,B
2DDD  AC37  A8 * 37 A              STA   COUNT,B
                          *                          COMPUTE  HAS CODE FOR HEX ADDRESS
2DDE  2C0D  28 * 0D A              LDA   DNST2,B
2DDF  20B0  20 0 B0 A              LDE   K:X1
2DE0  1800  18 0 00 A              LDG   P
2DE1  7325  70 3 25 A              JMP   HASHCODE
2DE2  8002  80 0 02 A              ADL   HEXADR+IND
                          *                          CHECK FOR VALID SECTOR  (ST2)
      2DE3  28 D E3 A     CHECK5   EQU   $           CHECK ST2 VIA SYMPROC
2DE3  28B0  28 0 B0 A              LDA   K:X1
2DE4  20B0  20 0 B0 A              LDE   K:X1
2DE5  1800  18 0 00 A              LDG   P
2DE6  7310  70 3 10 A              JMP   SYMPROC
2DE7  8002  80 0 02 A              ADL   HEXADR+IND
                          *                          CHECK SYMPROC ERRORS
2DE8  B2DD  B0 2 DD A              PJP   ENTERROR
                          *                          CHECK FOR MATCHUP
2DE9  2804  28 0 04 A              LDA   E
2DEA  F207  F0 2 07 A              ZJP   NOSYM10     NO - TBL NOT FULL
2DEB  B206  B0 2 06 A              PJP   FOUND5      YES
                          *                          NO - TBL IS FULL
      2DEC  28 D EC A     NOSYM9   EQU   $
2DEC  2C0D  28 * 0D A              LDA   DNST2,B
2DED  20B0  20 0 B0 A              LDE   K:X1
2DEE  1800  18 0 00 A              LDG   P
2DEF  7317  70 3 17 A              JMP   HASHCODE
2DF0  0008  00 0 08 A              ADL   SECTOR
```

```
2DF1  72F1   70 2 F1 A                      JMP   CHECK5
                                   *
                                   *                             FOUND SYMBOL - REPLACE IT
      2DF2   28 5 F2 A             FOUND5   EQU   $
      2DF2   28 5 F2 A             NOSYM10  EQU   $              TBL NOT FULL
2DF2  2D02   28 5 02 A                      LDA   *HEXADR,B
2DF3  AE00   A8 6 00 A                      STA   0,C
2DF4  2D04   28 5 04 A                      LDA   *CODE,B
2DF5  1C16   18 4 16 A                      LDG   SCLS12,B
2DF6  9805   98 0 05 A                      SHF   A
2DF7  A804   A8 0 04 A                      STA   E
2DF8  2C37   28 4 37 A                      LDA   COUNT,B
2DF9  5004   50 0 04 A                      EOR   E
2DFA  AE01   A8 6 01 A                      STA   1,C
2DFB  2802   28 0 02 A                      LDA   C
2DFC  4C0A   48 4 0A A                      SUB   CORBUF,B
2DFD  AC11   A8 4 11 A                      STA   TEMP,B
                                   *                             WRITE SECTOR ON DISC
2DFE  ED48   E8 5 48 A                      SST   *AIWDISC,B
2DFF  800A   80 0 0A A                      ADL   CORBUF+IND
2E00  0008   00 0 08 A                      ADL   SECTOR
2E01  0009   00 0 09 A                      ADL   NUMWRD
2E02  725F   70 2 5F A                      JMP   RETURN
2E03  2F25   28 7 25 A                      LPL
2E04  2E61   28 6 61 A
2E05  2E17   28 6 17 A
2E06  2E70   28 6 70 A
                                            TTL   'SYMDLE  -  DELETE OLD SYMBOL TABLE ENTRY'
                                   *
                                   *              DELETE SYMBOL FROM TABLE
                                   *
      2E07   28 6 07 A             SYMDLE   EQU   $
                                   *                             CHECK BUSY FLAG
2E07  2A91   28 2 91 A                      LDA   BSYFLG
2E08  F202   F0 2 02 A                      ZJP   $+3
2E09  1A64   18 2 64 A                      LDG   *SYM:SUSP
2E0A  71D8   70 1 D8 A                      JMP   *MISP
                                   *
2E0B  3004   30 0 04 A                      COR   NOPOST
2E0C  628C   60 2 8C A                      INC   BSYFLG         SET BUSY FLAG
2E0D  7201   70 2 01 A                      JMP   $+2
                                   *
2E0E  2FC0   28 7 C0 A                      ADL   P:POOL
2E0F  1800   18 0 00 A                      LDG   P
2E10  713C   70 1 3C A                      JMP   *SAT:          TRANSFER ARGUMENTS
2E11  0001   00 0 01 A                      DAT   1              2 ARGS
```

```
                         0583  *                                ADJUST DATA POOL TO ACCOUNT FOR
                         0584  *                                ONLY 2 ARGUMENTS TRANSFERRED THRU
                         0585  *                                SOT: (ASCBUF AND CODE)
2E12  2C02  28 4 02 A    0586             LDA   2,B
2E13  2403  20 4 03 A    0587             LDE   3,B
2E14  AC03  A8 4 03 A    0588             STA   ASCBUF,B
2E15  A404  A0 4 04 A    0589             STE   CODE,B
2E16  3C0E  38 4 0E A    0590             STZ   PROBE,B
2E17  3C1E  38 4 1E A    0591             STZ   BFRNUM,B
                         0592  *                                PACK 4 WORDS OF 8 BIT ASCII
                         0593  *                                INTO 3 WORDS OF 6 BIT ASCII
      2E18  28 6 18 A    0594  GODELETE EQU   *
2E18  3C1C  38 4 1C A    0595             STZ   ERRORS,B
2E19  1800  18 0 00 A    0596             LDG   P
2E1A  7354  70 3 54 A    0597             JMP   ASCPAK
                         0598  *                                COMPUTE HASH CODE FROM PACKED ASCII
                         0599  *
2E1B  2C0C  28 4 0C A    0600             LDA   DNST1,B
2E1C  20AC  20 0 AC A    0601             LDE   KIX3
2E1D  1800  18 0 00 A    0602             LDG   P
2E1E  7252  70 2 52 A    0603             JMP   HASHCODE
2E1F  0005  00 0 05 A    0604             ADL   PAKBUF
                         0605  *                                CHECK SECTOR NUMBER
      2E20  28 6 20 A    0606  CHECK6   EQU   *
2E20  3805  38 0 05 A    0607             STZ   A
2E21  3804  38 0 04 A    0608             STZ   E
2E22  1800  18 0 00 A    0609             LDG   P
2E23  73E0  70 3 E0 A    0610             JMP   SYMPROC
2E24  0005  00 0 05 A    0611             ADL   PAKBUF
                         0612  *                                FOUND ERROR
2E25  B20D  B0 2 0D A    0613             PJP   NOSYM14
                         0614  *                                FOUND MATCHUP
2E26  2804  28 0 04 A    0615             LDA   E
2E27  F209  F0 2 09 A    0616             ZJP   NOSYM12+2         YES
2E28  B208  B0 2 08 A    0617             PJP   FOUND6            NO - TBL IS FULL
                         0618  *
      2E29  28 6 29 A    0619  NOSYM11  EQU   *
2E29  2C0C  28 4 0C A    0620             LDA   DNST1,B
2E2A  20B0  20 0 B0 A    0621             LDE   KIX1
2E2B  1800  18 0 00 A    0622             LDG   P
2E2C  7244  70 2 44 A    0623             JMP   HASHCODE
2E2D  0008  00 0 08 A    0624             ADL   SECTOR
2E2E  72F1  70 2 F1 A    0625             JMP   CHECK6
                         0626  *                                TBL NOT FULL
      2E2F  28 6 2F A    0627  NOSYM12  EQU   *
2E2F  28AF  28 0 AF A    0628             LDA   KIX9
```

```
2E30  7201  70 2 01 A            JMP   $+2
2E31  28B3  28 0 B3 A            LDA   K1X8
2E32  AC1C  A8 4 1C A            STA   ERRORS,B
      2E33  28 6 33 A  NOSYM14   EQU   $
2E33  722E  70 2 2E A            JMP   RETURN
                       *
      2E34  28 6 34 A  FOUND6    EQU   $          FOUND SYMBOL - REMOVE IT
2E34  28A0  28 0 A0 A            LDA   K1XFFFF
2E35  AE00  A8 6 00 A            STA   0,C
2E36  AE01  A8 6 01 A            STA   1,C
2E37  AE02  A8 6 02 A            STA   2,C
2E38  2603  20 6 03 A            LDE   3,C        SAVE HEX ADDRESS
2E39  A437  A0 4 37 A            STE   COUNT,B
2E3A  AE03  A8 6 03 A            STA   3,C
2E3B  2802  28 0 02 A            LDA   C
2E3C  4C0A  48 4 0A A            SUB   CORBUF,B
2E3D  AC28  A8 4 28 A            STA   TASCII,B
2E3E  2C08  28 4 08 A            LDA   SECTOR,B
2E3F  AC1A  A8 4 1A A            STA   TSECT,B
                       *                          WRITE SECTOR ON DISC  (ST1)
2E40  ED48  E8 5 48 A            SST   *AIWDISC,B
2E41  800A  80 0 0A A            ADL   CORBUF+IND
2E42  0008  00 0 08 A            ADL   SECTOR     ST1
2E43  0009  00 0 09 A            ADL   NUMWRD
                       *                          LOOK FOR HEX ADDRESS
2E44  2C00  28 4 00 A            LDA   DNST2,B
2E45  2090  20 0 B0 A            LDE   K1X1
2E46  1800  18 0 00 A            LDG   P          COMPUTE HASH-CODE SECTOR #  (ST2)
2E47  7229  70 2 29 A            JMP   HASHCODE
2E48  0037  00 0 37 A            ADL   COUNT
                       *
      2E49  28 6 49 A  CHECK7    EQU   $          CHECK ST2 MATCHUP VIA SYMPROC
2E49  2890  28 0 B0 A            LDA   K1X1       ST2
2E4A  2090  20 0 B0 A            LDE   K1X1       HEX
2E4B  1800  18 0 00 A            LDG   P
2E4C  73B7  70 3 B7 A            JMP   SYMPROC
2E4D  0037  00 0 37 A            ADL   COUNT
                       *
                       *                          ERRORS
2E4E  B2E4  B0 2 E4 A            PJP   NOSYM14    YES
                       *                          MATCHUP
2E4F  2804  28 0 04 A            LDA   E
2E50  F2DE  F0 2 DE A            ZJP   NOSYM12    NO - TBL NOT FULL
2E51  B205  B0 2 05 A            PJP   FOUND7     YES
                       *                          NO - TBL IS FULL
      2E52  28 6 52 A  NOSYM13   EQU   $
```

```
2E52  2C00  28 4 00 A            LDA    DNST2,B
2E53  20B0  20 0 B0 A            LDE    KIX1
2E54  1800  18 0 00 A            LDG    P
2E55  7218  70 2 18 A            JMP    HASHCODE
2E56  0008  00 0 08 A            ADL    SECTOR
2E57  72F1  70 2 F1 A            JMP    CHECK7
                       *
                       *                                 FOUND HEX ADDRESS - DELETE IT
      2E58  28 6 58 A  FOUND7    EQU    $
2E58  28A0  28 0 A0 A            LDA    KIXFFFF
2E59  AE00  A8 6 00 A            STA    0,C
2E5A  AE01  A8 6 01 A            STA    1,C
                       *                                 WRITE SECTOR ON DISC  (ST2)
2E5B  ED48  E8 5 48 A            BST    *AIWDISC,B
2E5C  800A  80 0 0A A            ADL    CORBUF+IND
2E5D  0008  00 0 08 A            ADL    SECTOR            ST2
2E5E  0009  00 0 09 A            ADL    NUMWRD
                       *                                 RTN TO SYMENT IN SPECIAL CASE
2E5F  2C26  28 4 26 A            LDA    DLEFLG,B
2E60  F201  F0 2 01 A            ZJP    RETURN
2E61  730E  70 3 0E A            JMP    DELETEOK
                       *
                                 TTL    'COMMON RETURN FOR SYMBOL TABLE HANDLERS'
                       *
                       *
                       *                                 RETURN TO CALLER
      2E62  28 6 62 A  RETURN    EQU    $
                                 SKP,CIOPT+1  C3,C4
      2E62  28 6 62 A  C3        EQU    $
                       *                                 RELEASE CORE BUFFER
2E62  ED6E  E8 5 6E A            BST    *CIREL,B
2E63  001D  00 0 1D A            ADL    NUMBER            # OF BUFFERS TO RELEASE
2E64  001E  00 0 1E A            ADL    BFRNUM            STARTING BUFFER #
      2E65  28 6 65 A  C4        EQU    $
                       *
      2E65  28 6 65 A  RETURN1   EQU    $
2E65  3C1E  38 4 1E A            STZ    BFRNUM,B
2E66  30F0  30 0 F0 A            CDR    SAL
2E67  3B09  38 3 09 A            STZ    BSYFLG
2E68  2A05  28 2 05 A            LDA    *SYMISUSP
2E69  1800  18 0 00 A            LDG    P
2E6A  7109  70 1 09 A            JMP    *MIUN
2E6B  0C01  08 4 01 A            LDB    1,B
2E6C  E401  E0 4 01 A            EST    1,B
                       *
2E6D  0018  00 0 18 A            LPL
```

```
2E6E  2EA2   28 6 A2 A
2E6F  2DAA   28 D AA A
2E70  2098   28 D 98 A
                              TTL      'HASH*CODE SUBROUTINE'
                   *
                   *                   THIS ROUTINE TAKES N NUMBERS, ADD THEM TOGETHER,
                   *                   SQUARES THE SUM, AND EXTRACTS THE MIDDLE N BITS
                   *                   AS THE HASH CODE BASE. THIS BASE IS DIVIDED BY THE
                   *                   MAXIMUM NBR OF SECTORS AND THE REMAINDER IS RETURNED
                   *                   TO THE CALLER IN THE A REG.
                   *
                   *                   UPON ENTRY:      LAD   DNST (WHICH SYMBOL TABLE)
                   *                                    LDE   N    (NUMBER OF WORDS TO HASH)
                   *                                    JMP   HSHCOD
                   *                                    ADL   (POOL PTR TO START OF BFR)
                   *
                   *                   UPON EXIT:       A = SECTOR NUMBER MODULO MAX NBR
                   *                                        OF SECTORS IN THIS TABLE
      2E71   28 6 71 A   HASHCODE EQU      *
2E71  AC11   A8 4 11 A            STA      TEMP,B
2E72  A412   A0 4 12 A            .STE     PASS,B
2E73  2803   28 0 03 A            LDA      G                  SAVE G FOR RTN
2E74  6005   60 0 05 A            INC      A
2E75  6005   60 0 05 A            INC      A
2E76  AC2C   A8 4 2C A            STA      TEMPG,B
2E77  A802   A8 0 02 A            STA      C
2E78  2E00   28 6 00 A            LDA      0,C                FETCH ADL
2E79  BA03   B8 2 03 A            NJP      INDRECT
      2E7A   28 6 7A A   NOTINDR  EQU      *
2E7A  4001   40 0 01 A            ADD      B
2E7B  A802   A8 0 02 A            STA      C
2E7C  7204   70 2 04 A            JMP      ADDVALS
      2E7D   28 6 7D A   INDRECT  EQU      *
2E7D  50BF   50 0 BF A            EOR      K:X8000
2E7E  4001   40 0 01 A            ADD      B
2E7F  A802   A8 0 02 A            STA      C
2E80  1600   10 6 00 A            LDC      0,C
      2E81   28 6 81 A   ADDVALS  EQU      *                  ADD UP MULTIPLE ENTRIES
2E81  3805   38 0 05 A            STZ      A
2E82  4600   40 6 00 A   X        ADD      0,C
2E83  6C12   68 4 12 A            DCR      PASS,B
2E84  F202   F0 2 02 A            ZJP      HASHIT
2E85  6002   60 0 02 A            INC      C
2E86  72F3   70 2 F8 A            JMP      X
                   *
      2E87   28 6 87 A   HASHIT   EQU      *                  COMPUTE HASH CODE BASE
```

```
2E87  F208   F0 2 08 A   0764           ZJP   STORE
2E88  1C3C   18 4 3C A   0765           LDG   SCLS1,B
2E89  A804   A8 0 04 A   0766           STA   E
2E8A  2804   28 0 04 A   0767  Y        LDA   E
2E8B  9805   98 0 05 A   0768           SHF   A
2E8C  9804   98 0 04 A   0769           SHF   E                 MAKE SURE BIT 11 IS SET
2E8D  5888   58 0 B8 A   0770           AND   K1X800
2E8E  F2F8   F0 2 F8 A   0771           ZJP   Y                 SQUARE IT
2E8F  2804   28 0 04 A   0772           LDA   E
2E90  D004   D0 0 04 A   0773           MPY   E
2E91  1C3D   18 4 3D A   0774           LDG   SCRD8,B
2E92  9804   98 0 04 A   0775           SHF   E                 HASHED NBR IS IN E
      2E93   28 6 93 A   0776  STORE    EQU   *
2E93  AC12   A8 4 12 A   0777           STA   PASS,B
2E94  3804   38 0 04 A   0778           STZ   E
2E95  2C11   28 4 11 A   0779           LDA   TEMP,B
2E96  4C0D   48 4 0D A   0780           SUB   DNST2,B
2E97  F204   F0 2 04 A   0781           ZJP   ST2PATH
      2E98   28 6 98 A   0782  ST1PATH  EQU   *                 CALC ST1 SECTOR NUMBER
2E98  2C12   28 4 12 A   0783           LDA   PASS,B
2E99  DC0C   D8 4 0C A   0784           DIV   DNST1,B
2E9A  2804   28 0 04 A   0785           LDA   E
2E9B  7204   70 2 04 A   0786           JMP   ST2PATH+4
      2E9C   28 6 9C A   0787  ST2PATH  EQU   *                 CALC ST2 SECTOR NUMBER
2E9C  2C12   28 4 12 A   0788           LDA   PASS,B
2E9D  DC0D   D8 4 0D A   0789           DIV   DNST2,B
2E9E  2804   28 0 04 A   0790           LDA   E
2E9F  440C   40 4 0C A   0791           ADD   DNST1,B
2EA0  4403   40 4 03 A   0792           ADD   DORG,B
      2EA1   28 6 A1 A   0793  GOHOME   EQU   *                 RETURN TO CALLER WITH SECTOR # IN A
2EA1  AC08   A8 4 08 A   0794           STA   SECTOR,B
2EA2  752C   70 5 2C A   0795           JMP   *TEMPG,B
                         0796           TTL   'PACK 8 BIT ASCII INTO 6 BIT FORMAT W/O PARITY'
                         0797  *
                         0798  *              SUBROUTINE TO PACK 8 BIT ASCII WITH EVEN PARITY
                         0799  *              INTO 6 BIT TRUNCATED ASCII WITH NO PARITY.
                         0800  *
                         0801  *                  UPON ENTRY:   ASCBUF  CONTAINS ADDRESS OF 4
                         0802  *                                        WORD BUFFER CONTAINING
                         0803  *                                        UP TO 8 CHARACTERS OF
                         0804  *                                        8 BIT ASCII WITH EVEN
                         0805  *                                        PARITY AND TRAILING
                         0806  *                                        BLANKS
                         0807  *
                         0808  *                  UPON EXIT:    PAKBUF  CONTAINS 2 WORDS OF 6
                         0809  *
```

```
                                   *
                                   *
                                   *
                                   *
                                   *
                                   *
                                   *                                 6BIT PACKED ASCII WITH
                                                                     PARITY STRIPPED OFF
                                                                     FORMAT:
                                                                   (1)  1111112222223333
                                                                   (2)  3344444455555566
                                                                   (3)  6666777777888888
        2EA3   28 6 A3 A   ASCPAK    EQU    *
                           *
2EA3    2803   28 0 03 A             LDA    G            SAVE G FOR RETURN
2EA4    AC2C   A8 4 2C A             STA    TEMP3,B
                           *
2EA5    2C03   28 4 03 A             LDA    ASCBUF,B     STORE STARTING ADDRESS OF 4 WORD
2EA6    AC2B   A8 4 2B A             STA    ASCWRD,B     ASCII BUFFER (2 CHR/WRD) IN ASCWRD
2EA7    2801   28 0 01 A             LDA    B
2EA8    4226   40 2 26 A             ADD    *PAKBUF      STORE START OF 3 WORD PACKED ASCII
2EA9    A802   A8 0 02 A             STA    C            BUFFER (6 BITS/CHR) IN REG C
2EAA    3E00   38 6 00 A             STZ    0,C
2EAB    6C2B   68 4 2B A             DCR    ASCWRD,B
2EAC    2C31   28 4 31 A             LDA    SCRD6,B
        2EAD   28 6 AD A   CYCLE     EQU    $            ENTRY POINT FOR CASE 2,3,4
2EAD    642B   60 4 2B A             INC    ASCWRD,B
2EAE    AC2D   A8 4 2D A             STA    SHIFT,B
2EAF    3804   38 0 04 A             STZ    E
2EB0    2D2B   28 5 2B A             LDA    *ASCWRD,R    LOAD 2 8BIT ASCII CHRS
2EB1    5C2E   58 4 2E A             AND    ASCMSK,B     AND OFF BITS 6,7 OF EACH CHR
2EB2    1C2F   18 4 2F A             LDG    SCLD8,B
2EB3    9804   98 0 04 A             SHF    E            SHIFT HI ORDER CHARACTER INTO E
2EB4    1C30   18 4 30 A             LDG    SCLS2,B
2EB5    9805   98 0 05 A             SHF    A            SHIFT OFF BITS 5,6 OF LS ORDER CHR
2EB6    1C2D   18 4 2D A   VARSHIFT  LDG    SHIFT,B      LOAD VARIABLE SHIFT
2EB7    9804   98 0 04 A             SHF    E
2EB8    5600   50 6 00 A             EOR    0,C
2EB9    AE00   A8 6 00 A             STA    0,C
2EBA    2C2D   28 4 2D A   CHKCASE   LDA    SHIFT,B
2EBB    5431   50 4 31 A             EOR    SCRD6,B
2EBC    F207   F0 2 07 A             ZJP    CASE1
2EBD    2C2D   28 4 2D A             LDA    SHIFT,B
2EBE    5432   50 4 32 A             EOR    SCRD18,B
2EBF    F205   F0 2 05 A             ZJP    CASE2
2EC0    2C2D   28 4 2D A             LDA    SHIFT,B
2EC1    543E   50 4 3E A             EOR    SCRD14,B
2EC2    F205   F0 2 05 A             ZJP    CASE3
2EC3    7208   70 2 08 A             JMP    CASE4
        2EC4   28 6 C4 A   CASE1     EQU    $
2EC4    2C32   28 4 32 A             LDA    SCRD18,B
```

```
2EC5  72E7   70 2 E7 A                 JMP   CYCLE
2EC6  2C3E   28 4 3E A    CASE2        LDA   SCRD14,B
2EC7  7201   70 2 01 A                 JMP   CASE3+1
2EC8  2C34   28 4 34 A    CASE3        LDA   SCRD10,B
2EC9  A601   A0 6 01 A                 STE   1,C
2ECA  6002   60 0 02 A                 INC   C
2ECB  72E1   70 2 E1 A                 JMP   CYCLE
2ECC  642C   60 4 2C A    CASE4        INC   TEMPG,B
2ECD  752C   70 5 2C A                 JMP   *TEMPG,B
                          *
2ECE  0005   00 0 05 A                 LPL
                                       TTL   'UNPACK 6 BIT ASCII AND RE-ESTABLISH EVEN PARITY'
                          *
                          *            UNPACK 3 WORDS OF 6BIT TRUNCATED ASCII,ADD PARITY BIT
                          *            (BIT 7),AND REPACK IN STD 2CHR/WRD ASCII FORMAT
                          *
                          *            RULES:
                          *                  1.  GET BITS 0 THRU 5 FROM UNPACKED SYMBOL
                          *                  2.  BIT 6 SET FOR ALPHA, RESET FOR NUMERIC
                          *                  3.  BIT 7 SET TO ENSURE EVEN PARITY
                          *
                          *              UPON ENTRY:        PAKBUF CONTAINS PACKED 6BIT ASCII
                          *                                 G CONTAINS CALLERS P REGISTER
                          *
                          *              UPON EXIT:         UNPACKED, REPARITYIZED, 8BIT ASCII
                          *                                 IS IN CALLERS ASCII BUFFER (ASCBUF)
                          *
      2ECF   28 6 CF A    ASCUNPAK     EQU   $
                          *                                 STORE G FOR RETURN
2ECF  2803   28 0 03 A                 LDA   G
2ED0  AC2C   A8 4 2C A                 STA   TEMPG,B
                          *                                 INITIALIZE FOR FIRST PASS
2ED1  2C03   28 4 03 A                 LDA   ASCBUF,B
2ED2  AC2B   A8 4 2B A                 STA   ASCWRD,B
2ED3  3C35   38 4 35 A                 STZ   WORD,B
2ED4  3C12   38 4 12 A                 STZ   PASS,B
2ED5  6412   60 4 12 A                 INC   PASS,B
                          *                                 SET UP C TO POINT TO PAKBUF
2ED6  2801   28 0 01 A                 LDA   B
2ED7  42F7   40 2 F7 A                 ADD   *PAKBUF
2ED8  A802   A8 0 02 A                 STA   C
2ED9  2600   20 6 00 A                 LDE   0,C
                          *                                 UNPACK 1 6BIT ASCII CHR
      2EDA   28 6 DA A    CYCLE1       EQU   $
2EDA  3805   38 0 05 A                 STZ   A
2EDB  1C36   18 4 36 A                 LDG   SCLD6,B
```

```
2EDC  9804  98 0 04 A                SHF   E
2EDD  AC11  A8 4 11 A                STA   TEMP,B
2EDE  4A47  48 2 47 A                SUB   *X'20'      TEST FOR NUMERIC (>1F)
2EDF  B203  B0 2 03 A                PJP   ISNUM
      2EE0  28 6 E0 A      ISALPHA   EQU   *           ALPHA CHR
2EE0  2C11  28 4 11 A                LDA   TEMP,B
2EE1  50B6  50 0 B6 A                EOR   KIX40       SET BIT 6 UNCONDITIONALLY
2EE2  7201  70 2 01 A                JMP   PARITY
      2EE3  28 6 E3 A      ISNUM     EQU   *           NUMERIC CHR
2EE3  2C11  28 4 11 A                LDA   TEMP,B
                           *                           COUNT BITS IN WORD FOR PARITY
      2EE4  28 6 E4 A      PARITY    EQU   *
2EE4  3C37  38 4 37 A                STZ   COUNT,B
2EE5  AC11  A8 4 11 A                STA   TEMP,B
2EE6  1C13  18 4 13 A                LDG   SCLS8,B     MOVE TO UPPER BYTE
2EE7  9805  98 0 05 A                SHF   A
2EE8  1C38  18 4 38 A                LDG   SALC1,B
      2EE9  28 6 E9 A      PARLOOP   EQU   *
2EE9  9805  98 0 05 A                SHF   A           ITERATIVELY SHIFT LEFT 1 POSITION
2EEA  BA02  B8 2 02 A                NJP   WASSET
      2EEB  28 6 EB A      NOTSET    EQU   *           SIGN BIT NOT SET
2EEB  F204  F0 2 04 A                ZJP   NOMORE
2EEC  72FC  70 2 FC A                JMP   PARLOOP
      2EED  28 6 ED A      WASSET    EQU   *           IS SET - ADD 1 TO BIT COUNT
2EED  6437  60 4 37 A                INC   COUNT,B
2EEE  50BF  50 0 BF A                EOR   KIX8000
2EEF  72F9  70 2 F9 A                JMP   PARLOOP
      2EF0  28 6 F0 A      NOMORE    EQU   *           ALL BITS COUNTED
2EF0  2C37  28 4 37 A                LDA   COUNT,B
2EF1  58B0  58 0 B0 A                AND   KIX1
2EF2  F203  F0 2 03 A                ZJP   ISEVEN
      2EF3  28 6 F3 A      ISODD     EQU   *           ODD COUNT - SET BIT 7
2EF3  2C11  28 4 11 A                LDA   TEMP,B
2EF4  50B7  50 0 B7 A                EOR   KIX80
2EF5  7201  70 2 01 A                JMP   CKBYTE
      2EF6  28 6 F6 A      ISEVEN    EQU   *           EVEN PARITY - LEAVE IT ALONE
2EF6  2C11  28 4 11 A                LDA   TEMP,B
      2EF7  28 6 F7 A      CKBYTE    EQU   *           CHECK FOR LO OR HI BYTE
2EF7  6C12  68 4 12 A                DCR   PASS,B
2EF8  F206  F0 2 06 A                ZJP   HIBYTE
                                     EJE
      2EF9  28 6 F9 A      LOBYTE    EQU   *           IS LOW ORDER BYTE
2EF9  3C12  38 4 12 A                STZ   PASS,B
2EFA  6412  60 4 12 A                INC   PASS,B
2EFB  5523  50 5 23 A                EOR   *ASCWRD,R   ADD LOBYTE TO HYBYTE PREV STORED
```

```
2EFC  AD29  A8 D 29 A  0947           STA   *ASCWRD,B
2EFD  6428  60 4 28 A  0948           INC   ASCWRD,B
2EFE  7203  70 2 03 A  0949           JMP   CKWORD
      2EFF  28 6 FF A  0950  HIBYTE   EQU   $              IS HI ORDER BYTE
2EFF  1C13  18 4 13 A  0951           LDG   SCLS8,B
2F00  9805  98 0 05 A  0952           SHF   A              SHIFT AND STORE HIBYTE
2F01  AD28  A8 D 28 A  0953           STA   *ASCWRD,B
      2F02  28 7 02 A  0954  CKWORD   EQU   $              CHECK WHICH WORD WE HAVE JUST
2F02  6435  60 4 35 A  0955           INC   WORD,B         PROCESSED AND SET UP FOR NEXT WORD
2F03  2C35  28 4 35 A  0956           LDA   WORD,B
2F04  4000  40 0 00 A  0957           ADD   P
2F05  7105  70 1 05 A  0958           JMP   *A
2F06  7203  70 2 03 A  0959           JMP   CYCLE1
2F07  7206  70 2 06 A  0960           JMP   ISWORD2
2F08  7201  70 2 01 A  0961           JMP   CYCLE1
2F09  720A  70 2 0A A  0962           JMP   ISWORD4
2F0A  720D  70 2 0D A  0963           JMP   ISWORD5
2F0B  7212  70 2 12 A  0964           JMP   ISWORD6
2F0C  72CD  70 2 CD A  0965           JMP   CYCLE1
2F0D  7214  70 2 14 A  0966           JMP   ISWORD8
                       0967  *
      2F0E  28 7 0E A  0968  ISWORD2  EQU   $
2F0E  1C2A  18 4 2A A  0969           LDG   SCRS12,B
2F0F  9804  98 0 04 A  0970           SHF   E
2F10  2E01  28 6 01 A  0971           LDA   1,C
2F11  1C33  18 4 33 A  0972           LDG   SCLD12,B
2F12  9804  98 0 04 A  0973           SHF   E
2F13  72C6  70 2 C6 A  0974           JMP   CYCLE1
      2F14  28 7 14 A  0975  ISWORD4  EQU   $
2F14  2601  20 6 01 A  0976           LDE   1,C
2F15  1C13  18 4 13 A  0977           LDG   SCLS8,B
2F16  9804  98 0 04 A  0978           SHF   E
2F17  72C2  70 2 C2 A  0979           JMP   CYCLE1
                       0980           EJE
      2F18  28 7 18 A  0981  ISWORD5  EQU   $
2F18  1C39  18 4 39 A  0982           LDG   SCRS14,B
2F19  9804  98 0 04 A  0983           SHF   E
2F1A  2E02  28 6 02 A  0984           LDA   2,C
2F1B  1C3A  18 4 3A A  0985           LDG   SCLD14,B
2F1C  9804  98 0 04 A  0986           SHF   E
2F1D  72BC  70 2 BC A  0987           JMP   CYCLE1
      2F1E  28 7 1E A  0988  ISWORD6  EQU   $
2F1E  2602  20 6 02 A  0989           LDE   2,C
2F1F  1C3B  18 4 3B A  0990           LDG   SCLS4,B
2F20  9804  98 0 04 A  0991           SHF   E
```

```
2F21  7235  70 2 B5 A   0992            JMP    CYCLE1            LAST WORD PROCESSED
      2F22  28 7 22 A   0993  ISWORDS   EQU    $
2F22  2C2C  28 4 2C A   0994            LDA    TEMPG,B
2F23  6005  60 0 05 A   0995            INC    A
2F24  7105  70 1 05 A   0996            JMP    *A
                        0997  *
2F25  0020  00 0 20 A   0998            LPL
                        0999            TTL    'SYMPROC  -  MAIN PROCESSOR FOR SYM TABLE SUBRS'
                        1000  *
                        1001  *                SPECIAL PROCEDURE TO:
                        1002  *                   1.  CHECK VALIDITY OF SECTOR NUMBER
                        1003  *                   2.  ACQUIRE SHARED CORE BUFFER
                        1004  *                   3.  READ SECTOR INTO CORE BUFFER
                        1005  *                   4.  SEARCH SECTOR FOR MATCHUP
                        1006  *                   5.  REPORT FOLLOWING CONDITIONS TO CALLER
                        1007  *                       (REG C POINTS TO ENTRY IN QUESTION)
                        1008  *                          A. SUMBOL MATCHUP FOUND
                        1009  *                          B. NO MATCHUP - SECTOR NOT FULL
                        1010  *                          C. NO MATCHUP - SECTOR IS FULL
                        1011  *
                        1012  *                *** CALLING SEQUENCE FOR THIS PROCEDURE
                        1013  *
                        1014  *                  LDA   KIX        STZ  = SYMTBL 1, KIX1 = SYMTBL 2
                        1015  *                  LDE   KIX        STZ  = 68 ASCII, KIX1 = HEX ADDR
                        1016  *                  LDG   P          SAVE P REG FOR RETURN
                        1017  *                  JMP   SYMPROC    BRANCH TO PROCEDURE
                        1018  *                  DAT   SECTOR     ABS SECTOR NUMBER TO SEARCH
                        1019  *                  DAT   VALUE      VALUE TO COMPARE SECTOR ENTRY WITH
                        1020  *                                   (ADD X'8000' TO SHOW INDIRECT)
                        1021  *
                        1022  *
                        1023  *
                        1024  *                *** UPON RETURN TO CALLER
                        1025  *
                        1026  *                    E =  -,0,+      -  =  NO SYM FOUND, SECTOR FULL
                        1027  *                                    0  =  NO SYM FOUND, SECTOR NOT FULL
                        1028  *                                    +  =  SYMBOL FOUND ON THIS SECTOR
                        1029  *                    C =  ABS ADDR OF MATCHED ENTRY   OR
                        1030  *                         ABS ADDR OF 1ST SPARE SLOT  OR
                        1031  *                         ZERO IF NO SPARES ON SECTOR
                        1032  *                    A =  ERROR # OR ZERO IF NO ERRORS (DESIG SET)
                        1033            EJE
      2F26  28 7 26 A   1034  SYMPROC   EQU    $
2F26  A419  A0 4 19 A   1035            STE    HEXASC,B          SAVE HEX/ASCII FLAG WORD
2F27  AC21  A8 4 21 A   1036            STA    ST1ST2,B
2F28  2503  28 0 03 A   1037            LDA    G
2F29  AC2C  A8 4 2C A   1038            STA    TEMPG,B
```

```
                                 1039   *                                   FETCH CALLER'S ARGUMENTS
       2F2A   28 / 2A A          1040   GETARGS  EQU   $
2F2A   1003   10 0 03 A          1041            LDC   0
2F2B   2E02   28 6 02 A          1042            LDA   2,C
2F2C   B205   B0 2 05 A          1043            PJP   NOTIND
2F2D   58A5   58 0 A5 A          1044   ISIND    AND   K:X7FFF              VALUE IS DIRECT
2F2E   4001   40 0 01 A          1045            ADD   B
2F2F   2905   28 1 05 A          1046            LDA   *A
2F30   AC1B   A8 4 1B A          1047            STA   TVALUE,B
2F31   7202   70 2 02 A          1048            JMP   ARGSGOT
2F32   4001   40 0 01 A          1049   NOTIND   ADD   B                    VALUE IS NOT INDIRECT
2F33   AC1B   A8 4 1B A          1050            STA   TVALUE,B
       2F34   28 7 34 A          1051   ARGSGOT  EQU   $
                                 1052            SKP,CIOPT+1  C1,C2
       2F34   28 7 34 A          1053   C1       EQU   $
                                 1054   *                                   OBTAIN SHARED CORE BUFFER
2F34   2C1E   28 4 1E A          1055            LDA   BFRNUM,B
2F35   F201   F0 2 01 A          1056            ZJP   $+2
2F36   7208   70 2 08 A          1057            JMP   CKPROBE
2F37   E56D   E8 5 6D A          1058            SST   *CIRES,B
2F38   001D   00 0 1D A          1059            DAT   NUMBER               # OF BUFFERS NEEDED
2F39   001E   00 0 1E A          1060            DAT   BFRNUM               BUFFER # OF 1ST BFR ASSIGNED
       2F3A   28 7 3A A          1061   CALCADDR EQU   $                    CALC BFR STARTING ADDRESS
2F3A   2C1E   28 4 1E A          1062            LDA   BFRNUM,B
2F3B   6805   68 0 05 A          1063            DCR   A
2F3C   D420   D0 4 20 A          1064            MPY   BFRSIZ,B
2F3D   441F   40 4 1F A          1065            ADD   BFRORG,B
2F3E   AC0A   A8 4 0A A          1066            STA   CORBUF,B
       2F3F   28 7 3F A          1067   C2       EQU   $
                                 1068   *                                   TOO MANY PROBES = ERROR 3
       2F3F   28 7 3F A          1069   CKPROBE  EQU   $
2F3F   640E   60 4 0E A          1070            INC   PROBE,B
2F40   2C0E   28 4 0E A          1071            LDA   PROBE,B
2F41   4C0C   48 4 0C A          1072            SUB   DNST1,B
2F42   BA05   B8 2 05 A          1073            NJP   READISC
2F43   28AD   28 0 AD A          1074            LDA   K:X5
2F44   AC1C   A8 4 1C A          1075            STA   ERRORS,B             THIS IS AN ERROR  (ERR 3)
       2F45   28 / 45 A          1076   ST2ASC   EQU   $
2F45   7268   70 2 68 A          1077            JMP   RTNPROC
2F46   2F47   28 / 47 A          1078            LPL
2F47   2FB0   28 / B0 A
                                 1079   *                                   READ SECTOR INTO CORE
       2F48   28 / 48 A          1080   READISC  EQU   $
2F48   ED4A   E8 5 4A A          1081            SST   *MIRDISC,B
2F49   800A   80 0 0A A          1082            DAT   CORBUF+IND
2F4A   0008   00 0 08 A          1083            DAT   SECTOR               SECTOR #
```

```
2F4B  0009  00 0 09 A  1084          DAT   NUMWRD       # OF WORDS
                       1085  *                          DETERMINE TYPE OF SEARCH
2F4C  2C21  28 * 21 A  1086          LDA   ST1ST2,B
2F4D  F207  F0 2 07 A  1087          ZJP   ISST1
      2F4E  28 / 4E A  1088  ISST2   EQU   *            SYMBOL TABLE 2
2F4E  2C19  28 * 19 A  1089          LDA   HEXASC,B
2F4F  F2F5  F0 2 F5 A  1090          ZJP   ST2ASC
      2F50  28 / 50 A  1091  ST2HEX  EQU   *            HEX SEARCH OF ST2
2F50  3C22  38 * 22 A  1092          STZ   BIAS,B
2F51  28B1  28 0 B1 A  1093          LDA   KIX2
2F52  AC23  A8 * 23 A  1094          STA   NBR,B
2F53  AC24  A8 * 24 A  1095          STA   INCR,B
2F54  720E  70 2 0E A  1096          JMP   SEARCH
      2F55  28 / 55 A  1097  ISST1   EQU   *            SYMBOL TABLE 1
2F55  2C19  28 * 19 A  1098          LDA   HEXASC,B
2F56  F207  F0 2 07 A  1099          ZJP   ST1ASC
      2F57  28 / 57 A  1100  ST1HEX  EQU   *            HEX SEARCH OF ST1
2F57  28B0  28 0 B0 A  1101          LDA   KIX1
2F58  AC23  A8 * 23 A  1102          STA   NBR,B
2F59  28AC  28 0 AC A  1103          LDA   KIX3
2F5A  AC22  A8 * 22 A  1104          STA   BIAS,B
2F5B  28B2  28 0 B2 A  1105          LDA   KIX4
2F5C  AC24  A8 * 24 A  1106          STA   INCR,B
2F5D  7205  70 2 05 A  1107          JMP   SEARCH
      2F5E  28 / 5E A  1108  ST1ASC  EQU   *            ASCII SEARCH OF ST1
2F5E  3C22  38 * 22 A  1109          STZ   BIAS,B
2F5F  28AC  28 0 AC A  1110          LDA   KIX3
2F60  AC23  A8 * 23 A  1111          STA   NBR,B
2F61  6005  60 0 05 A  1112          INC   A
2F62  AC24  A8 * 24 A  1113          STA   INCR,B
      2F63  28 / 63 A  1114  SEARCH  EQU   *            SEARCH CORE BUFFER
2F63  3C11  38 * 11 A  1115          STZ   TEMP,B
2F64  3C25  38 * 25 A  1116          STZ   SPARE,B
2F65  2423  20 * 23 A  1117          LDE   NBR,B
2F66  2C0A  28 * 0A A  1118          LDA   CORBUF,B
2F67  4422  40 * 22 A  1119          ADD   BIAS,B
2F68  A802  A8 0 02 A  1120          STA   C            C POINTS TO 1ST ENTRY TO CHECK
                       1121  *
                       1122  *                          CHECK FOR SPARE AREA (X'FFFF') OR
      2F69  28 / 69 A  1123  LSTSPR  EQU   *            FOR LAST SYMBOL ON SECTOR (X'0000')
2F69  2802  28 0 02 A  1124          LDA   C
2F6A  4C22  48 * 22 A  1125          SUB   BIAS,B
2F6B  1905  18 1 05 A  1126          LDG   *A
2F6C  F203  F0 2 03 A  1127          ZJP   CKLST
2F6D  6003  60 0 03 A  1128          INC   G
2F6E  F205  F0 2 05 A  1129          ZJP   CKSPR
```

```
2F6F  7208  70 2 08 A               JMP   CK1STWRD
      2F70  28 / 70 A  CKLST        EQU   $
2F70  6005  60 0 05 A               INC   A
2F71  1905  18 1 05 A               LDG   *A
2F72  F235  F0 2 35 A               ZJP   LASTSYM
2F73  7204  70 2 04 A               JMP   CK1STWRD
      2F74  28 / 74 A  CKSPR        EQU   $
2F74  6005  60 0 05 A               INC   A
2F75  1905  18 1 05 A               LDG   *A
2F76  6003  60 0 03 A               INC   G
2F77  F235  F0 2 35 A               ZJP   SPARES
2F78  2E00  28 6 00 A  CK1STWRD     LDA   0,C              1ST WORD
2F79  4D1B  48 5 1B A               SUB   *TVALUE,B
2F7A  F201  F0 2 01 A               ZJP   $+2
2F7B  7211  70 2 11 A               JMP   NOMATCH
2F7C  6804  68 0 04 A  CK2NDWRD     DCR   E
2F7D  F225  F0 2 25 A               ZJP   CHK1SOK
2F7E  6804  68 0 04 A               DCR   E
2F7F  F214  F0 2 14 A               ZJP   CODECK
2F80  6004  60 0 04 A               INC   E
2F81  6004  60 0 04 A               INC   E
2F82  2C1B  28 4 1B A               LDA   TVALUE,B
2F83  6005  60 0 05 A               INC   A
2F84  2905  28 1 05 A               LDA   *A
2F85  4E01  48 6 01 A               SUB   1,C
2F86  F201  F0 2 01 A               ZJP   $+2
2F87  7205  70 2 05 A               JMP   NOMATCH
2F88  2C1B  28 4 1B A  CK3RDWRD     LDA   TVALUE,B
2F89  40B1  40 0 B1 A               ADD   KIX2
2F8A  2905  28 1 05 A               LDA   *A
2F8B  4E02  48 6 02 A               SUB   2,C
2F8C  F216  F0 2 16 A               ZJP   MATCHOK
                       *                                THIS ENTRY DOES NOT MATCH
      2F8D  28 / 8D A  NOMATCH      EQU   $
2F8D  2802  28 0 02 A               LDA   C
2F8E  4424  40 4 24 A               ADD   INCR,B
2F8F  A802  A8 0 02 A               STA   C
2F90  4C0A  48 4 0A A               SUB   CORBUF,B
2F91  48B5  48 0 B5 A               SUB   KIX100
2F92  B20C  B0 2 0C A               PJP   PASTEND
2F93  7205  70 2 05 A               JMP   LSTSPR
      2F94  28 / 94 A  CODECK       EQU   $
2F94  6004  60 0 04 A               INC   E
2F95  6004  60 0 04 A               INC   E
2F96  2D04  28 5 04 A               LDA   *CODE,B          IF CODE = 0, NO CODE CHECK
2F97  F20B  F0 2 0B A               ZJP   MATCHOK
```

```
2F98  2E01  28 6 01 A            LDA   1,C
2F99  58A3  58 0 A3 A            AND   KIXF000
2F9A  1C2A  18 4 2A A            LDG   SCRS12,B
2F9B  9805  98 0 05 A            SHF   A
2F9C  4004  48 5 04 A            SUB   *CODE,B
2F9D  F205  F0 2 05 A            ZJP   MATCHOK
2F9E  72EE  70 2 EE A            JMP   NOMATCH
                         *                           PAST END OF 256 WORD CORE BUFFER
      2F9F  28 / 9F A  PASTEND   EQU   $
2F9F  1425  10 4 25 A            LDC   SPARE,B.
2FA0  3804  38 0 04 A            STZ   E
2FA1  6804  68 0 04 A            DCR   E
2FA2  720E  70 2 0E A            JMP   RTNPROC
                         *                           ENTRY MATCH !!!
      2FA3  28 / A3 A  MATCHOK   EQU   $
      2FA3  28 / A3 A  CHKISOK   EQU   $
2FA3  2802  28 0 02 A            LDA   C
2FA4  4C22  48 4 22 A            SUB   BIAS,B
2FA5  A802  A8 0 02 A            STA   C
2FA6  20B0  20 0 B0 A            LDE   KIX1
2FA7  7209  70 2 09 A            JMP   RTNPROC
                         *                           TABLE NOT FULL -NO MATCHUP
      2FA8  28 7 A8 A  LASTSYM   EQU   $
2FA8  3804  38 0 04 A            STZ   E
2FA9  2C25  28 4 25 A            LDA   SPARE,B
2FAA  F201  F0 2 01 A            ZJP   $+2
2FAB  A802  A8 0 02 A            STA   C
2FAC  7204  70 2 04 A            JMP   RTNPROC
                         *                           SPARE ENTRY IS FOUND
      2FAD  28 / AD A  SPARES    EQU   $
2FAD  2802  28 0 02 A            LDA   C
2FAE  4C22  48 4 22 A            SUB   BIAS,B
2FAF  AC25  A8 4 25 A            STA   SPARE,B           SAVE START OF SPARE AREA
2FB0  720C  70 2 DC A            JMP   NOMATCH
                         *                           RETURN TO CALLER
      2FB1  28 / B1 A  RTNPROC   EQU   $
2FB1  642C  60 4 2C A            INC   TEMPG,B
2FB2  642C  60 4 2C A            INC   TEMPG,B
2FB3  2C1C  28 4 1C A            LDA   ERRORS,B
2FB4  6805  68 0 05 A            DCR   A
2FB5  752C  70 5 2C A            JMP   *TEMPG,B
                         *
                                 LPL
      0004  00 0 04 A            RPT   SYMIORIG+X'2BA'-$
2FB6  0000  00 0 00 A            DAT   0
2FB7  0000  00 0 00 A            DAT   0
```

```
2F38  0000  00 0 00 A  1220           DAT    0
2F39  0000  00 0 00 A  1220           DAT    0
                       1221           TTL    'DATA POOL FOR SYMBOL TABLE HANDLERS'
                       1222  *
                       1223  *
                       1224  *               DATA POOL FOR SIMBOL TABLE HANDLERS
                       1225  *
      0006  00 0 06 A  1226           RPT    6                  POOL START
2F3A  0000  00 0 00 A  1227           DAT    0
2F3B  0000  00 0 00 A  1227           DAT    0
2F3C  0000  00 0 00 A  1227           DAT    0
2F3D  0000  00 0 00 A  1227           DAT    0
2F3E  0000  00 0 00 A  1227           DAT    0
2F3F  0000  00 0 00 A  1227           DAT    0
2FC0  0000  00 0 00 A  1228  P:POOL   DAT    0              0   D
2FC1  0000  00 0 00 A  1229  P:OLDB   DAT    0              1   OLD B
2FC2  0000  00 0 00 A  1230  P:HEXADR DAT    0              2   HEX ADDRESS
2FC3  0000  00 0 00 A  1231  P:ASCBUF DAT    0              3   ASCII BUFFER
2FC4  0000  00 0 00 A  1232  P:CODE   DAT    0              4   CODE WORD
2FC5  0000  00 0 00 A  1233  P:PAKBUF DAT    0              5   PACKED ASCII BUFFER  (1)
2FC6  0000  00 0 00 A  1234           DAT    0              6   PACKED ASCII BUFFER  (2)
2FC7  0000  00 0 00 A  1235           DAT    0              7   PACKED ASCII BUFFER  (3)
2FC8  0000  00 0 00 A  1236  P:SECTOR DAT    0              8   SYMBOL TABLE SECTOR NUMBER
2FC9  0100  00 1 00 A  1237  P:NUMWRD DAT    256            9   NUMBER OF WORDS TO READ/WRITE
2FCA  0000  00 0 00 A  1238  P:CORBUF DAT    0             10   START OF CORE BUFFER FOR READ/WRITE
2FCB  05C0  00 5 C0 A  1239  P:DORG   DAT    SYM:DORG      11   DISC ORIGIN FOR ST1
2FCC  0075  00 0 75 A  1240  P:DNST1  DAT    SYM:DNST*2/3  12   SIZE OF ST1
2FCD  003A  00 0 3A A  1241  P:DNST2  DAT    SYM:DNST/3    13   SIZE OF ST2
2FCE  0000  00 0 00 A  1242  P:PROBE  DAT    0             14   # OF DISC PROBES NEEDED
2FCF  A004  A0 0 04 A  1243  P:SCLD4  DAT    X'A004'       15   SHIFT CIRC LEFT DBL 4
2FD0  05EE  05 5 EE A  1244  P:ASCTBL DAT    SYM:ATBL      16   ADDRESS OF CORE ASCII TBL FOR HEX #
2FD1  0000  00 0 00 A  1245  P:TEMP   DAT    0             17   TEMPORARY STORAGE
2FD2  0000  00 0 00 A  1246  P:PASS   DAT    0             18   PASS COUNTER
2FD3  2008  20 0 08 A  1247  P:SCLS8  DAT    X'2008'       19   SHIFT CIRC LEFT SGL 8
2FD4  D827  D8 0 27 A  1248  P:PREFIX DAT    X'D827'       20   ASCII X'
2FD5  27A0  20 7 A0 A  1249  P:TAG    DAT    X'27A0'       21   ASCII '
2FD6  200C  20 0 0C A  1250  P:SCLS12 DAT    X'200C'       22   SHIFT CIRC LEFT SGL 12
2FD7  0000  00 0 00 A  1251  P:LOLIM  DAT    0             23   LOWER SECTOR LIMIT
2FD8  0000  00 0 00 A  1252  P:HILIM  DAT    0             24   HIGH SECTOR LIMIT
2FD9  0000  00 0 00 A  1253  P:HEXASC DAT    0             25   HEX/ASCII FLAG
2FDA  0000  00 0 00 A  1254  P:TSECT  DAT    0             26   TEMPORARY SECTOR #
2FDB  0000  00 0 00 A  1255  P:TVALUE DAT    0             27   TEMPORARY DATA VALUE ADDRESS
2FDC  0000  00 0 00 A  1256  P:ERRORS DAT    0             28   ERROR COUNTER
2FDD  0004  00 0 04 A  1257  P:NUMBFR DAT    256/SYM:BSIZ  29   CORE BUFFERS NEEDED PER SECTOR
2FDE  0000  00 0 00 A  1258  P:BFRNUM DAT    0             30   BUFFER # OF SHARED CORE DATA AREA
2FDF  5000  50 0 00 A  1259  P:BFRORG DAT    SYM:BORG      31   ORIGIN OF SHARED CORE BUFFER AREA
```

```
2FE0  0040  00 0 40 A   1260  P:BFRSIZ DAT   SYM:BSIZ   32  SIZE OF EACH SHARED CORE BUFFER
2FE1  0000  00 0 00 A   1261  P:ST1ST2 DAT   0          33  ST1 - ST2 FLAG
2FE2  0000  00 0 00 A   1262  P:BIAS   DAT   0          34  SEARCH BIAS
2FE3  0000  00 0 00 A   1263  P:NBR    DAT   0          35  SEARCH NUMBER OF WORDS
2FE4  0000  00 0 00 A   1264  P:INCR   DAT   0          36  SEARCH INCREMENT
2FE5  0000  00 0 00 A   1265  P:SPARE  DAT   0          37  SPARE LOCATION FLAG
2FE6  0000  00 0 00 A   1266  P:DLEFLG DAT   0          38  DELETE FLAG FOR RETURN TO SYMENT
2FE7  0000  00 0 00 A   1267  P:THEX   DAT   0          39  TEMPORY STORAGE FOR 'HEXADR'
2FE8  0000  00 0 00 A   1268  P:TASCII DAT   0          40  TEMPORY STORAGE FOR 'ASCBUF'
2FE9  0000  00 0 00 A   1269  P:TCODE  DAT   0          41  TEMPORY STORAGE FOR 'CODE'
2FEA  600C  60 0 0C A   1270  P:SCRS12 DAT   X'600C'    42  SHIFT CIRC RIGHT SGL 12
2FEB  0000  00 0 00 A   1271  P:ASCWRD DAT   0          43
2FEC  0000  00 0 00 A   1272  P:TEMPG  DAT   0          44
2FED  0000  00 0 00 A   1273  P:SHIFT  DAT   0          45
2FEE  3F3F  3F / 3F A   1274  P:ASCMSK DAT   X'3F3F'    46
2FEF  A008  A0 0 08 A   1275  P:SCLD8  DAT   X'A008'    47  SHIFT CIRC LEFT 8
2FF0  2002  20 0 02 A   1276  P:SCLS2  DAT   X'2002'    48  SHIFT CIRC LEFT 2
2FF1  E006  E0 0 06 A   1277  P:SCRD6  DAT   X'E006'    49  SHIFT CIRC RITE 6
2FF2  E012  E0 0 12 A   1278  P:SCRD18 DAT   X'E012'    50  SHIFT CIRC RITE 18
2FF3  A00C  A0 0 0C A   1279  P:SCLD12 DAT   X'A00C'    51  SHIFT CIRC DBL LEFT 12
2FF4  E00A  E0 0 0A A   1280  P:SCRD10 DAT   X'E00A'    52  SHIFT CIRC RITE 10
2FF5  0000  00 0 00 A   1281  P:WORD   DAT   0          53  WORD STORAGE LOC
2FF6  A006  A0 0 06 A   1282  P:SCLD6  DAT   X'A006'    54  SHIFT CIRC LEFT DBL 6
2FF7  0000  00 0 00 A   1283  P:COUNT  DAT   0          55  WORD COUNT
2FF8  0001  00 0 01 A   1284  P:SALC1  DAT   X'0001'    56  SHIFT ARITH SINGLE 1
2FF9  600E  60 0 0E A   1285  P:SCRS14 DAT   X'600E'    57
2FFA  A00E  A0 0 0E A   1286  P:SCLD14 DAT   X'A00E'    58
2FFB  2004  20 0 04 A   1287  P:SCLS4  DAT   X'2004'    59
2FFC  2001  20 0 01 A   1288  P:SCLS1  DAT   X'2001'    60
2FFD  E008  E0 0 08 A   1289  P:SCRD8  DAT   X'E008'    61
2FFE  E00E  E0 0 0E A   1290  P:SCRD14 DAT   X'E00E'    62
                        1291           ...
                        1292  *
                        1293  *
009A                    1294           ORG   SYM:ZTBL
009A  2CFF  2C 4 FF A   1295           ADL   SYMHEX-1
009B  2D34  2D 5 34 A   1296           ADL   SYMASC-1
009C  2D9D  2D 5 9D A   1297           ADL   SYMENT-1
009D  2E06  2E 6 06 A   1298           ADL   SYMDLE-1
      0000  00 0 00 A   1299           END
0000  ERRORS
```

E. COMMON AREA DATA FOR MACHINE #2

```
0034          EJE
0035  *
0036  *     DATE:  6/4/72                REVISION LEVEL:  12
0037  *
```

```
                          0038           REF   CHNACQ,CHNDMP,CHNMOD,CHNENT,CHNREM,CHNPCH,CHNLOD
                          0039           REF   CHNACT,CHNEXE,CHNCOM,CHNABL,CHNTRC,CHNSTR,CHNFET
                          0040           REF   LOGDMP,LOGMOD,LOGTRG,LOGINH,LOGSIM,LOGTRC
                          0041           REF   SYMLOD,SYMDMP,SYMINS,SYMREM,SYMPCH
                          0042           REF   PGMINT
                          0043           REF   SYMDMP,LOGDMP
                          0044  *
                          0045  *
                          0046  *                           COMMON DATA POOL AREA
                          0047  *
                          0048  *              INPUT DEVICE NUMBER
0000  0001  00 0 01 A     0049  PCIN     DAT   1
                          0050  *              OUTPUT DEVICE NUMBER
0001  0001  00 0 01 A     0051  PCOUT    DAT   1
                          0052  *
                          0053  *                           I/O DEVICE NUMBERS
                          0054  *
0002  0005  00 0 05 A     0055  LODEV    DAT   5            LISTING OUTPUT
0003  0004  00 0 04 A     0056  SIDEV    DAT   4            SYMBOLIC INPUT
0004  0003  00 0 03 A     0057  BODEV    DAT   3            BINARY OUTPUT
0005  0002  00 0 02 A     0058  BIDEV    DAT   2            BINARY INPUT
                          0059  *
                          0060  *
                          0061  *                           DATA FOR PROGRAM INTERPRETER
                          0062  *
0006  0000  00 0 00 A     0063  PSTART   DAT   0            INTERPRET START LOCATION
0007  0000  00 0 00 A     0064  PLAST    DAT   0            INTERPRET END  LOCATION
                          0065  *
0008  0000  00 0 00 A     0066  DSTART   DAT   0            DATA POOL START DUMP NUMBER
0009  0000  00 0 00 A     0067  DLAST    DAT   0            DATA POOL END  DUMP NUMBER
                          0068  *
000A  0000  00 0 00 A     0069  CSTART   DAT   0            COMMON START DUMP NUMBER
000B  0000  00 0 00 A     0070  CLAST    DAT   0            COMMON END  DUMP NUMBER
                          0071           EJE
                          0072  *
                          0073  *
                          0074  *
000C  0000  00 0 00 A     0075  CHNLEN   DAT   0            CHAIN LENGTH IN WORKING AREA
000D  0000  00 0 00 A     0076  BLKLEN   DAT   0            LENGTH OF BLOCK IN BLKARK
000E  0000  00 0 00 A     0077  BLKNUM   DAT   0            NUMBER OF BLOCK IN BLKARK
000F  0000  00 0 00 A     0078  TYPNUM   DAT   0            TYPE# OF BLOCK IN BLKARK
0010  0000  00 0 00 A     0079  KEY      DAT   0            MOD/DUMP KEY  (0=ERR,1=MOD,2=DUMP)
                          0080  *
                          0081  *                           ARGUMENT TABLE POINTER
0011  0000  00 0 00 A     0082  ARGPTR   DAT   0
                          0083  *
```

```
0012  0000   00 0 00 A   0084  ARG     DAT   0              ARGUMENT STORAGE
                         0085  *
0013  0000   00 0 00 A   0086  TEMP    DAT   0              PROGRAM TEMPORARY
                         0087  *
                         0088  *             HEXADECIMAL - ASCII CODE LOOKUP TABLE  (15)
                         0089  *
      0014   00 0 14 R   0090  HEXTBL  EQU   *
0014  0030   00 0 30 A   0091          DAT   X'30'          0       (ASCII)
0015  00B1   00 0 B1 A   0092          DAT   X'B1'          1       (ASCII)
0016  00B2   00 0 B2 A   0093          DAT   X'B2'          2       (ASCII)
0017  0033   00 0 33 A   0094          DAT   X'33'          3       (ASCII)
0018  00B4   00 0 B4 A   0095          DAT   X'B4'          4       (ASCII)
0019  0035   00 0 35 A   0096          DAT   X'35'          5       (ASCII)
001A  0036   00 0 36 A   0097          DAT   X'36'          6       (ASCII)
001B  00B7   00 0 B7 A   0098          DAT   X'B7'          7       (ASCII)
001C  00B8   00 0 B8 A   0099          DAT   X'B8'          8       (ASCII)
001D  0039   00 0 39 A   0100          DAT   X'39'          9       (ASCII)
001E  0041   00 0 41 A   0101          DAT   X'41'          A       (ASCII)
001F  0042   00 0 42 A   0102          DAT   X'42'          B       (ASCII)
0020  00C3   00 0 C3 A   0103          DAT   X'C3'          C       (ASCII)
0021  0044   00 0 44 A   0104          DAT   X'44'          D       (ASCII)
0022  00C5   00 0 C5 A   0105          DAT   X'C5'          E       (ASCII)
0023  00C6   00 0 C6 A   0106          DAT   X'C6'          F       (ASCII)
                         0107          EJE
                         0108  *             VALID COMMAND TABLE    (36)
0024  C3D1   C0 3 D1 A   0109  COMTBL  TXT   'CQ'       1   CHAIN ACQUIRE (MOVE TO WORK AREA)
0025  C344   C0 3 44 A   0110          TXT   'CD'       2   CHAIN DUMP TO SELECTED LO DEVICE
0026  C34D   C0 3 4D A   0111          TXT   'CM'       3   CHAIN MODIFY IN WORKING AREA
0027  C3C5   C0 3 C5 A   0112          TXT   'CE'       4   CHAIN ENTER FROM SYMBOLIC CARD RDR
0028  C3D2   C0 3 D2 A   0113          TXT   'CR'       5   CHAIN REMOVE FROM ON-LINE SYSTEM
0029  C350   C0 3 50 A   0114          TXT   'CP'       6   CHAIN PUNCH TO BINARY OUTPUT DEVICE
002A  C3CC   C0 3 CC A   0115          TXT   'CL'       7   CHAIN LOAD FROM BINARY INPUT DEVICE
002B  C356   C0 3 56 A   0116          TXT   'CV'       8   CHAIN ACTIVATE IN ON-LINE SYSTEM
002C  C3D8   C0 3 D8 A   0117          TXT   'CX'       9   CHAIN EXECUTE INTERPRETIVELY
002D  C3C3   C0 3 C3 A   0118          TXT   'CC'      10   CHAIN CONCORDANCE
002E  C341   C0 3 41 A   0119          TXT   'CA'      11   CHAIN ABLE (ALLOW TO RUN ON LINE)
002F  C3D4   C0 3 D4 A   0120          TXT   'CT'      12   CHAIN TRACE TO TRACE DEVICE
0030  C353   C0 3 53 A   0121          TXT   'CS'      13   CHAIN STORE ON 2283 DISC (D/C) SIMULATE
0031  C3C6   C0 3 C6 A   0122          TXT   'CF'      14   CHAIN FETCH FROM 2283 DISC (D/C) SPARE
0032  0000   00 0 00 A   0123          DAT   0         15   * SPARE *
0033  0000   00 0 00 A   0124          DAT   0         16   * SPARE *
0034  CC44   C8 4 44 A   0125          TXT   'LD'      17   LOGICAL DUMP TO LO DEVICE
0035  CC4D   C8 4 4D A   0126          TXT   'LM'      18   LOGICAL MODIFY STATUS
0036  CC47   C8 4 47 A   0127          TXT   'LG'      19   LOGICAL TRIGGER ADDITION
0037  CCC9   C8 4 C9 A   0128          TXT   'LI'      20   LOGICAL INHIBIT TRIGGER
0038  CC53   C8 4 53 A   0129          TXT   'LS'      21   LOGICAL SIMULATE
0039  CCD4   C8 4 D4 A   0130          TXT   'LT'      22   LOGICAL TRACE TO TRACE DEVICE
```

DF 8-25-72

```
003A  0000  00 0 00 A   0131           DAT   0            23   * SPARE *
003B  0000  00 0 00 A   0132           DAT   0            24   * SPARE *
003C  53CC  50 3 CC A   0133           TXT   'SL'         25   SYMBOL TABLE LOAD FROM 31 DEVICE
003D  5344  50 3 44 A   0134           TXT   'SD'         26   SYMBOL TABLE DUMP  TO  L9 DEVICE
003E  53C9  50 3 C9 A   0135           TXT   'SI'         27   SYMBOL TABLE INSERT  IN  CORE IMAGE
003F  53D2  50 3 D2 A   0136           TXT   'SR'         28   SYMBOL TABLE REMOVE FROM CORE IMAGE
0040  5348  50 3 48 A   0137           TXT   'SH'         29   SUMBOL TABLE PUNCH TO 33 DEVICE
0041  0000  00 0 00 A   0138           DAT   0            30   * SPARE *
0042  0000  00 0 00 A   0139           DAT   0            31   * SPARE *
0043  0000  00 0 00 A   0140           DAT   0            32   * SPARE *
0044  0000  00 0 00 A   0141           DAT   0            33   * SPARE *
0045  0000  00 0 00 A   0142           DAT   0            34   * SPARE *
0046  0000  00 0 00 A   0143           DAT   0            35   * SPARE *
0047  50C9  50 0 C9 A   0144           TXT   'PI'         36   PROGRAM INTERPRET TO PR93 CONS
                        0145           EJE
                        0146   *             SUBROUTINE ADDRESS TABLE  (36)
0048  0000  00 0 00 X   0147   SUBADL  ADL   CHNACQ         1   ACQUIRE
0049  0000  00 0 00 X   0148           ADL   CHNDMP         2   DUMP
004A  0000  00 0 00 X   0149           ADL   CHNMOD         3   MODIFY
004B  0000  00 0 00 X   0150           ADL   CHNENT         4   ENTER
004C  0000  00 0 00 X   0151           ADL   CHNREM         5   REMOVE
004D  0000  00 0 00 X   0152           ADL   CHNPCH         6   PUNCH
004E  0000  00 0 00 X   0153           ADL   CHNLOD         7   LOAD
004F  0000  00 0 00 X   0154           ADL   CHNACT         8   ACTIVATE
0050  0000  00 0 00 X   0155           ADL   CHNEXE         9   EXECUTE
0051  0000  00 0 00 X   0156           ADL   CHNCOM        10   COMPRESS
0052  0000  00 0 00 X   0157           ADL   CHNABL        11   ABLE
0053  0000  00 0 00 X   0158           ADL   CHNTRC        12   TRACE
0054  0000  00 0 00 X   0159           ADL   CHNSIM        13   CHAIN SIMULATE
0055  0000  00 0 00 X   0160           ADL   0             14   SPARE
0056  0000  00 0 00 A   0161           ADL   0             15   * SPARE *
0057  0000  00 0 00 A   0162           ADL   0             16   * SPARE *
0058  0000  00 0 00 X   0163           ADL   LOGDMP        17   DUMP
0059  0000  00 0 00 X   0164           ADL   LOGMOD        18   MODIFY
005A  0000  00 0 00 X   0165           ADL   LOGTRG        19   TRIGGER
005B  0000  00 0 00 X   0166           ADL   LOGINH        20   INHIBIT
005C  0000  00 0 00 X   0167           ADL   LOGSIM        21    SIMULATE
005D  0000  00 0 00 X   0168           ADL   LOGTRC        22   TRACE
005E  0000  00 0 00 A   0169           ADL   0             23   * SPARE *
005F  0000  00 0 00 A   0170           ADL   0             24   * SPARE *
0060  0000  00 0 00 X   0171           ADL   SYMLOD        25   LOAD
0061  0000  00 0 00 X   0172           ADL   SYMDMP        26   DUMP
0062  0000  00 0 00 X   0173           ADL   SYMINS        27   INSERT
0063  0000  00 0 00 X   0174           ADL   SYMREM        28   REMOVE
0064  0000  00 0 00 X   0175           ADL   SYMPCH        29   PUNCH
0065  0000  00 0 00 A   0176           ADL   0             30   * SPARE *
0066  0000  00 0 00 A   0177           ADL   0             31   * SPARE *
```

gF 8-25-72 gF 8-25-72

```
0067  0000  00 0 00 A  0178         ADL   0                      32  * SPARE *
0068  0000  00 0 00 A  0179         ADL   0                      33  * SPARE *
0069  0000  00 0 00 A  0180         ADL   0                      34  * SPARE *
006A  0000  00 0 00 A  0181         ADL   0                      35  * SPARE *
006B  0000  00 0 00 X  0182         ADL   P3MINT                 36  INTERPRET
                       0183         EJE
                       0184  *
                       0185  *
                       0186  *
                       0187  *            SPECIALITY CHARACTER TABLE (12)
                       0188  *
006C  0021  00 0 21 A  0189  SPCTBL DAT   X'21'     1    CHARACTER          (ASCII)
006D  00AC  00 0 AC A  0190         DAT   X'AC'     2  , CHARACTER          (ASCII)
006E  002E  00 0 2E A  0191         DAT   X'2E'     3  . CHARACTER          (ASCII)
006F  00BD  00 0 BD A  0192         DAT   X'BD'     4  = CHARACTER          (ASCII)
0070  0028  00 0 28 A  0193         DAT   X'28'     5  ( CHARACTER          (ASCII)
0071  00A9  00 0 A9 A  0194         DAT   X'A9'     6  ) CHARACTER          (ASCII)
0072  003A  00 0 3A A  0195         DAT   X'3A'     7  : CHARACTER
0073  002D  00 0 2D A  0196         DAT   X'2D'     8  - CHARACTER          (ASCII)
0074  00AF  00 0 AF A  0197         DAT   X'AF'     9  / CHARACTER          (ASCII)
0075  002B  00 0 2B A  0198         DAT   X'2B'    10  + CHARACTER          (ASCII)
0076  00A0  00 0 A0 A  0199         DAT   X'A0'    11  SPACE                (ASCII)
0077  008D  00 0 8D A  0200         DAT.  X'8D'    12  CARRIAGE RETURN      (ASCII)
                       0201  *
                       0202  *
                       0203  *            ARGEMENT STORAGE TABLE (INITIALLY ZERO)  (4,2)
                       0204  *
      0078  00 0 78 R  0205  ARGTBL EQU   *
      0008  00 0 08 A  0206         RPT   8
0078  0000  00 0 00 A  0207         DAT   0
0079  0000  00 0 00 A  0207         DAT   0
007A  0000  00 0 00 A  0207         DAT   0
007B  0000  00 0 00 A  0207         DAT   0
007C  0000  00 0 00 A  0207         DAT   0
007D  0000  00 0 00 A  0207         DAT   0
007E  0000  00 0 00 A  0207         DAT   0
007F  0000  00 0 00 A  0207         DAT   0
```

```
                                 0208            EJE
                                 0209  *
                                 0210  *
                                 0211  *                                      LEGAL ALGORITHM TABLE  (54)
                                 0212  *
                                 0213  *
       0080     00 0 80 R        0214  ALGTBL    EQU       $
0080   C348     C0 3 48 A        0215            TXT       'CHAIN    ' 0
0081   41C9     40 1 C9 A
0082   4EA0     48 6 A0 A
0083   A0A0     A0 0 A0 A
0084   CCCF     C8 4 CF A        0216            TXT       'LOGIC    ' 1
0085   47C9     40 7 C9 A
0086   C3A0     C0 3 A0 A
0087   A0A0     A0 0 A0 A
0088   C5D8     C0 5 D8 A        0217            TXT       'EXIT     ' 2    ** USED FOR EXIT **     TYPE = X'FF'
0089   C9D4     C8 1 D4 A
008A   A0A0     A0 0 A0 A
008B   A0A0     A0 0 A0 A
008C   CCCF     C8 4 CF A        0218            TXT       'LOGTDF   ' 3
008D   47D4     40 7 D4 A
008E   44C6     40 4 C6 A
008F   A0A0     A0 0 A0 A
0090   CCCF     C8 4 CF A        0219            TXT       'LOGTDT   ' 4
0091   47D4     40 7 D4 A
0092   44D4     40 4 D4 A
0093   A0A0     A0 0 A0 A
0094   44C5     40 4 C5 A        0220            TXT       'DELAY    ' 5
0095   CC41     C8 4 41 A
0096   59A0     58 1 A0 A
0097   A0A0     A0 0 A0 A
0098   42C9     40 2 C9 A        0221            TXT       'BID      ' 6    BIDH
0099   44A0     40 4 A0 A
009A   A0A0     A0 0 A0 A
009B   A0A0     A0 0 A0 A
009C   50D2     50 0 D2 A        0222            TXT       'PROG     ' 7
009D   CF47     C8 7 47 A
009E   A0A0     A0 0 A0 A
009F   A0A0     A0 0 A0 A
00A0   D453     D0 4 53 A        0223            TXT       'TSTBRL   ' 8
00A1   D442     D0 4 42 A
00A2   D2CC     D0 2 CC A
00A3   A0A0     A0 0 A0 A
00A4   53C5     50 3 C5 A        0224            TXT       'SET      ' 9
00A5   D4A0     D0 4 A0 A
00A6   A0A0     A0 0 A0 A
```

```
00A7  A0A0  A0 0 A0 A
00A8  D2C5  D0 2 C5 A   0225           TXT   'RESET    '  10
00A9  53C5  50 3 C5 A
00AA  D4A0  D0 4 A0 A
00AB  A0A0  A0 0 A0 A
00AC  53C5  50 3 C5 A   0226           TXT   'SETRST  '  11
00AD  D4D2  D0 4 D2 A
00AE  53D4  50 3 D4 A
00AF  A0A0  A0 0 A0 A
0030  47CF  40 7 CF A   0227           TXT   'GOTO     '  12
0031  D4CF  D0 4 CF A
0032  A0A0  A0 0 A0 A
0033  A0A0  A0 0 A0 A
0034  50C5  50 0 C5 A   0228           TXT   'PERM     '  13
0035  D240  D0 2 40 A
0036  A0A0  A0 0 A0 A
0037  A0A0  A0 0 A0 A
0038  4441  40 4 41 A   0229           TXT   'DATRNS   '  14    DATINIT
0039  D4D2  D0 4 D2 A
003A  4E53  48 6 53 A
003B  A0A0  A0 0 A0 A
003C  44C9  40 4 C9 A   0230           TXT   'DIAG     '  15    DIAGH
003D  4147  40 1 47 A
003E  A0A0  A0 0 A0 A
003F  A0A0  A0 0 A0 A
                        0231  *                EXIT        255   X'FF'
                        0232           EJE
                        0233  *
                        0234  *                                  ALGO SUBR ADDR TABLE   (16)
                        0235  *
      00C0  00 0 C0 R   0236  ALGSUB   EQU   *
00C0  0000  00 0 00 X   0237           ADL   SYMDMP
00C1  0000  00 0 00 X   0238           ADL   LOGDMP
      000E  00 0 0E A   0239           RPT   14
00C2  0000  00 0 00 X   0240           ADL   SYMDMP
00C3  0000  00 0 00 X   0240           ADL   SYMDMP
00C4  0000  00 0 00 X   0240           ADL   SYMDMP
00C5  0000  00 0 00 X   0240           ADL   SYMDMP
00C6  0000  00 0 00 X   0240           ADL   SYMDMP
00C7  0000  00 0 00 X   0240           ADL   SYMDMP
00C8  0000  00 0 00 X   0240           ADL   SYMDMP
00C9  0000  00 0 00 X   0240           ADL   SYMDMP
00CA  0000  00 0 00 X   0240           ADL   SYMDMP
00CB  0000  00 0 00 X   0240           ADL   SYMDMP
00CC  0000  00 0 00 X   0240           ADL   SYMDMP
```

```
00CD  0000   00 0 00 X   0240            ADL      SYMDMP
00CE  0000   00 0 00 X   0240            ADL      SYMDMP
00CF  0000   00 0 00 X   0240            ADL      SYMDMP
                         0241            EJE
                         0242  *
                         0243  *
                         0244  *                                  ALGORITHM LENGTH TABLE  (16)
                         0245  *
                         0246  *         VARIABLE TYPES: FLD1 = FLAG TO INDICATE VAR ARG    (1) IVFLG
                         0247  *                         FLD1 = SECTION REQ REAL ARGS       (3) IREAL
                         0248  *                         FLD3 = # OF VARIABLE SECTIONS      (4) INVS
                         0249  *                         FLD4 = FIXED FRONT END BIAS        (4) IFBS
                         0250  *                         FLD5 = FIXED REAR END BIAS         (4) IRBS
      0000   00 0 00 R   0251  ALGLEN    EQU      $
0000  0003   00 0 03 A   0252            DAT      3             0    CHAIN
0001  8200   80 2 00 A   0253            GEN,1,3,4,4,4 1,0,2,0,0  1 LOGIC
0002  0001   00 0 01 A   0254            DAT      1                  ** SPARE **    (TEMP EXIT LENGTH)
0003  0006   00 0 06 A   0255            DAT      6             3    LOGTDF
0004  0006   00 0 06 A   0256            DAT      6             4    LOGTDT
0005  0005   00 0 05 A   0257            DAT      5             5    DELAY
0006  0002   00 0 02 A   0258            DAT      2             6    BID       BIDH
0007  A410   A0 4 10 A   0259            GEN,1,3,4,4,4 1,2,4,1,0  7 PROG
0008  0004   00 0 04 A   0260            DAT      4             8    TSTBRL
0009  0002   00 0 02 A   0261            DAT      2             9    SET
000A  0002   00 0 02 A   0262            DAT      2             10   RESET
000B  8200   80 2 00 A   0263            GEN,1,3,4,4,4 1,0,2,0,0 11 SETRST
000C  0002   00 0 02 A   0264            DAT      2             12   GOTO
000D  8201   80 2 01 A   0265            GEN,1,3,4,4,4 1,0,2,0,1 13 PERM
000E  0004   00 0 04 A   0266            DAT      4             14   DATRNS    DATINIT
000F  0008   00 0 08 A   0267            DAT      8             15   DIAG      DIAGH
                         0268  *                  1             255  EXIT      X'FF'
                         0269            EJE
                         0270  *
                         0271  *                                     VACABULARY TABLE   (3,20)
                         0272  *
      00E0   00 0 E0 R   0273  VOCTBL    EQU      $
00E0  C94E   C8 1 4E A   0274            TXT      'IN    '             1
00E1  A0A0   A0 0 A0 A
00E2  A0A0   A0 0 A0 A
00E3  CF55   C8 7 55 A   0275            TXT      'OUT   '             2
00E4  D4A0   D0 4 A0 A
00E5  A0A0   A0 0 A0 A
00E6  D4D2   D0 4 D2 A   0276            TXT      'TRUE  '             3
00E7  55C5   50 5 C5 A
00E8  A0A0   A0 0 A0 A
00E9  C641   C0 6 41 A   0277            TXT      'FALSE '             4
```

```
00EA  CC53  C8 4 53 A
00EB  C5A0  C0 5 A0 A
00EC  C6D2  C0 6 D2 A    0278          TXT      'FROM  '          5
00ED  CF40  C8 / 40 A
00EE  A0A0  A0 0 A0 A
00EF  D4CF  D0 4 CF A    0279          TXT      'TO    '          6
00F0  A0A0  A0 0 A0 A
00F1  A0A0  A0 0 A0 A
00F2  42CC  40 2 CC A    0280          TXT      'BLK   '          7
00F3  4BA0  48 3 A0 A
00F4  A0A0  A0 0 A0 A
00F5  53C5  50 3 C5 A    0281          TXT      'SEC   '          8
00F6  C3A0  C0 3 A0 A
00F7  A0A0  A0 0 A0 A
00F8  CC56  C8 4 56 A    0282          TXT      'LVL   '          9
00F9  CCA0  C8 4 A0 A
00FA  A0A0  A0 0 A0 A
00FB  5355  50 3 55 A    0283          TXT      'SUB   '          10
00FC  42A0  40 2 A0 A
00FD  A0A0  A0 0 A0 A
00FE  41D2  40 1 D2 A    0284          TXT      'ARGI  '          11
00FF  47C9  40 / C9 A
0100  A0A0  A0 0 A0 A
0101  41D2  40 1 D2 A    0285          TXT      'ARGR  '          12
0102  47D2  40 / D2 A
0103  A0A0  A0 0 A0 A
0104  41D2  40 1 D2 A    0286          TXT      'ARGS  '          13
0105  4753  40 / 53 A
0106  A0A0  A0 0 A0 A
0107  C3CF  C0 3 CF A    0287          TXT      'COUNT '          14
0108  554E  50 5 4E A
0109  D4A0  D0 4 A0 A
010A  42C9  40 2 C9 A    0288          TXT      'BITADR'          15
010B  D441  D0 4 41 A
010C  44D2  40 4 D2 A
010D  41C3  40 1 C3 A    0289          TXT      'ACTION'          16
010E  D4C9  D0 4 C9 A
010F  CF4E  C8 / 4E A
0110  53CC  50 3 CC A    0290          TXT      'SLVL  '          17
0111  56CC  50 6 CC A
0112  A0A0  A0 0 A0 A
0113  D4D2  D0 4 D2 A    0291          TXT      'TRIG  '          18
0114  C947  C8 1 47 A
0115  A0A0  A0 0 A0 A
0116  41D2  40 1 D2 A    0292          TXT      'ARGD  '          19
```

```
0117  4744   40 7 44 A
0118  A0A0   A0 0 A0 A
0119  CF50   C8 7 50 A    0293          TXT     '8P FLD'         20
011A  A0C6   A0 0 C6 A
011B  CC44   C8 4 44 A
                          0294          EJE
                          0295  *                               VOCABULARY KEY TABLE  (35)
                          0296  *
                          0297  *                 FORMAT:   GEN,1,4,3,3,5  RPT,TYPE,BIAS,CODE,VOC#
                          0298  *
                          0299  *                        RPT  *  REPEAT VOCAB WORD FLAG (0=NO,1=YES)
                          0300  *                        TYPE *  ALGORITHM TYPE (0 TO 15)
                          0301  *                        BIAS *  STORAGE BIAS FROM CURRENT PTR (+-4)
                          0302  *                        CODE *  SYMBOL TABLE ACCESS CODE (1 TO 15)
                          0303  *                        VOC# *  VOCABULARY WORD INDEX NUMBER
                          0304  *
                          0305  *
                          0306  *
                          0307  *
      011C   00 1 1C R    0308  VOCKEY  EQU     $
011C  0049   00 0 49 A    0309          GEN,1,4,3,3,5  0,00,00,02,09   CHAIN     LVL
011D  8032   80 0 32 A    0310          GEN,1,4,3,3,5  1,00,00,01,18   CHAIN     TRIG
011E  882F   88 0 2F A    0311          GEN,1,4,3,3,5  1,01,00,01,15   LOGIC     BITADR
011F  88F4   88 0 F4 A    0312          GEN,1,4,3,3,5  1,01,00,07,20   LOGIC     BP FLD
0120  1A08   18 2 08 A    0313          GEN,1,4,3,3,5  0,03,02,00,08   LOGTOF    SEQ
0121  1821   18 0 21 A    0314          GEN,1,4,3,3,5  0,03,00,01,01   LOGTOF    IN
0122  1822   18 0 22 A    0315          GEN,1,4,3,3,5  0,03,00,01,02   LOGTOF    OUT
0123  2208   20 2 08 A    0316          GEN,1,4,3,3,5  0,04,02,00,08   LOGTOT    SEQ
0124  2021   20 0 21 A    0317          GEN,1,4,3,3,5  0,04,00,01,01   LOGTOT    IN
0125  2022   20 0 22 A    0318          GEN,1,4,3,3,5  0,04,00,01,02   LOGTOT    OUT
0126  2808   28 0 08 A    0319          GEN,1,4,3,3,5  0,05,00,00,08   DELAY     SEQ
0127  3051   30 0 51 A    0320          GEN,1,4,3,3,5  0,06,00,02,17   BID       SLVL
0128  38AA   38 0 AA A    0321          GEN,1,4,3,3,5  0,07,00,05,10   PROG      SUB
0129  B80B   B8 0 0B A    0322          GEN,1,4,3,3,5  1,07,00,00,11   PROG      ARGI
012A  B80C   B8 0 0C A    0323          GEN,1,4,3,3,5  1,07,00,00,12   PROG      ARGR
012B  B813   B8 0 13 A    0324          GEN,1,4,3,3,5  1,07,00,00,19   PROG      ARGD
012C  B80D   B8 0 0D A    0325          GEN,1,4,3,3,5  1,07,00,00,13   PROG      ARGS
012D  4021   40 0 21 A    0326          GEN,1,4,3,3,5  0,08,00,01,01   TSTBRL    IN
012E  40C3   40 0 C3 A    0327          GEN,1,4,3,3,5  0,08,00,06,03   TSTBRL    TRUE
012F  40C4   40 0 C4 A    0328          GEN,1,4,3,3,5  0,08,00,06,04   TSTBRL    FALSE
0130  4823   48 0 23 A    0329          GEN,1,4,3,3,5  0,09,00,01,03   SET       TRUE
0131  5024   50 0 24 A    0330          GEN,1,4,3,3,5  0,10,00,01,04   RESET     FALSE
0132  D823   D8 0 23 A    0331          GEN,1,4,3,3,5  1,11,00,01,03   SETRST    TRUE
0133  D824   D8 0 24 A    0332          GEN,1,4,3,3,5  1,11,00,01,04   SETRST    FALSE
0134  60C7   60 0 C7 A    0333          GEN,1,4,3,3,5  0,12,00,06,07   GOTO      BLK
```

```
0135  E823  E8 0 23 A   0334                GEN,1,4,3,3,5  1,13,00,01,03  PERM    TRUE
0136  E824  E8 0 24 A   0335                GEN,1,4,3,3,5  1,13,00,01,04  PERM    FALSE
0137  68C7  68 0 C7 A   0336                GEN,1,4,3,3,5  0,13,00,06,07  PERM    BLK
0138  700E  70 0 0E A   0337                GEN,1,4,3,3,5  0,14,00,00,14  DATRNS  COUNT
0139  7085  70 0 85 A   0338                GEN,1,4,3,3,5  0,14,00,04,05  DATRNS  FROM
013A  7086  70 0 86 A   0339                GEN,1,4,3,3,5  0,14,00,04,06  DATRNS  TO
013B  7A08  7A 0 08 A   0340                GEN,1,4,3,3,5  0,15,02,00,08  DIAG    SEC
013C  7810  78 0 10 A   0341                GEN,1,4,3,3,5  0,15,00,00,16  DIAG    ACTION
013D  7851  78 0 51 A   0342                GEN,1,4,3,3,5  0,15,00,02,17  DIAG    SLVL
013E  7821  78 0 21 A   0343                GEN,1,4,3,3,5  0,15,00,01,01  DIAG    IN
013F  7822  78 0 22 A   0344                GEN,1,4,3,3,5  0,15,00,01,02  DIAG    OUT
                        0345  *
0140  0000  00 0 00 A   0346  BYTPTR  DAT   0                      RDCHR BYTE POINTER
                        0347  *                                     CS SIMULATION FLAG WORD
0141  0000  00 0 00 A   0348  SIMWRD  DAT   0
                        0349  *                                     CS SUBLEVEL ADDRESS TABLE
0142  0000  00 0 00 A   0350  SLVTBL  DAT   0,0,0,0,0
0143  0000  00 0 00 A
0144  0000  00 0 00 A
0145  0000  00 0 00 A
0146  0000  00 0 00 A
      0000  00 0 00 A   0351          END
0000  ERRORS
  EOJ
**JOB OFF AT 00  15  39

  JOB A0776,05 D. F. FURGERSON        USINOR 5 STAND COLD MILL
**JOB ON  AT 00  15  40

   JOB RUN ON NO. 2   06/27/72  4/12 ***
 **                                **
  P2KASM
                        0001          TTL     'FIELD CHANGE BUFFER COMMON FOR USINOR 5 STAND'
                        0002  *
                        0003  *
                        0004  *
                        0005  *
                        0006  *                                     WORKING AREA FOR BLOCK CONSTRUCTION
                        0007  *
      0000  00 0 00 R   0008  BLKWRK  EQU   *
0000                    0009          RES   35
                        0010  *
                        0011  *
                        0012  *                                     INPUT BUFFER FOR ASCII CHARACTERS
                        0013  *                                         (8 WORDS - R1 FORMAT)
```

```
                              0014  *
       0023    00 0 23 R      0015  INBUF     EQU     $
       0008    00 0 08 A      0016            RPT     8
0023   00A0    00 0 A0 A      0017            DAT     X'A0'
0024   00A0    00 0 A0 A      0017            DAT     X'A0'
0025   00A0    00 0 A0 A      0017            DAT     X'A0'
0026   00A0    00 0 A0 A      0017            DAT     X'A0'
0027   00A0    00 0 A0 A      0017            DAT     X'A0'
0028   00A0    00 0 A0 A      0017            DAT     X'A0'
0029   00A0    00 0 A0 A      0017            DAT     X'A0'
002A   00A0    00 0 A0 A      0017            DAT     X'A0'
                              0018  *
                              0019  *
                              0020            EJE
                              0021  *
                              0022  *                          TRIGGER BUFFER
002B   0000    00 0 00 A      0023  NUMTRG    DAT     0
                              0024  *
       002C    00 0 2C R      0025  TRIGBF    EQU     $
002C                          0026            RES     7
                              0027  *
                              0028  *
                              0029  *
                              0030  *                          WORKING AREA FOR CHAIN MODIFICATION
                              0031  *
       0033    00 0 33 R      0032  CHNWRK    EQU     $
0033                          0033            RES     256
0133                          0034            RES     94
                              0035  *                           CS BIT ADDRESS TABLE
0191                          0036  BITTBL    RES     60
                              0037  *                           CS FILE ARRAY FOR SIMULATION
01C0                          0038  SIMFILE   RES     40
       01F4    00 1 F4 R      0039  ENDKOM    EQU     $-1
       0000    00 0 00 A      0040            END
0000   ERRORS
```

APPENDIX A: PROGEN-70

A complete description of the PROGEN-70 system may be found in the Gomola, et al. application cited at the beginning of this specification. Of particular relevance to the present invention are the following sections of the Gyres, et al. application:

1. Overview of the System
7. The Control Chain Processor (herein referred to as the "Control Chain Interpreter")
8. Control Chain Algorithms and the Use of Control Chains.
9. The Auxiliary Synchronizer
10. Task, Subtask, and File Bidding Processor
11. The Logic Initiator Program In addition, the Gomola, et al. application includes a number of program listings which are called upon by the programs and subroutines disclosed above.

APPENDIX A: PROGEN-70 LOGIC SEQUENCING CONTROL

The Westinghouse PROGEN-70 Process Oriented Language is a powerful means of writing director control functions in the form of a sequence of algorithms. The sequence, or 'chain', of algorithms is defined by the user for specific director functions to be accomplished in the process. The functions which can be performed by PROGEN-70 are similar to functions which are performed by 'hard wire' switching logic found in many process director control systems.

The algorithms are chosen to meet the needs of a specific process control application. The algorithms may be chosen from an already existing list, or new algorithms may be defined to meet special needs. Once an algorithm is defined the computer system is initialized to handle the algorithm. The user may then use the algorithm to his best advantage throughout the process.

A great advantage to utilizing PROGEN-70 is the ease of implementation. It has been found that if a detailed flowchart is available for a control function showing the names of signals to be processed in that function in symbolic form, then the PROGEN-70 source deck may be completely coded. The user does not need to know anything about the computer operating system, input/output software or hardware, storage allocations, or in general anything about the computer. This is not generally true of other process control languages.

Algorithms

Algorithms for Logic Sequence Control are listed below:

1. LOGIC—Used to evaluate a logical expression according to the rules defined under 'Logical Operators';
2. TSTBRL—Used to perform a conditional branch within a chain, depending on the state of a logical variable;
3. LOGTDT—Logical Time Delay—True—Used to set an 'output' logical to a true state after a specified period of time, if the 'input' logical remains true. If the input logical changes to the false condition before the timer expires, no action is taken;
4. LOGTDF—Logical Time Delay—False—Used to set an 'output' logical to a false state after a specified period of time, if the 'input' logical remains true. If the input logical changes to the false condition before the timer expires, no action is taken;
5. TIMER—Used as a time delay in a logical sequence;
6. BID—Used to place a bid for another subtask level in the system;
7. PROGRAM—Used to call a subroutine in the system;
8. SET—Used to set a logical variable to the 'true' condition;
9. RESET—Use to set a logical variable to the 'false' condition;
10. SETRST—Used to set and reset a number of logical variables;
11. GOTO—An unconditional branch within a chain;
12. PERM—Used to check a specific group of logical variables which are permissives for a specific action;
13. DIAG—Used as a diagnostic aid when an automatic sequence fails to perform correctly;
14. DATRNS—Used to transfer and/or initialize word oriented data;
15. EXIT—Used to terminate a logical sequence.

Logical Operators

| SYMBOL | DEFINITION | | |
|---|---|---|---|
| .NOT. U | This expression has the value .TRUE. only if U is .FALSE.; it has the value .FALSE. only if U is .TRUE. (i.e., reverse the logical value of U). | | |
| | Example: If T is a .TRUE. expression and F is a .FALSE. expression, then the .NOT. operator gives the following results: | | |
| | | Expression | Results |
| | | .NOT. T | .FALSE. |
| | | .NOT. F | .TRUE. |
| U .AND. V | This expression has the value .TRUE. only if U and V are both .TRUE.; it has the value .FALSE. if either U or V is .FALSE. | | |
| | Example: If T is a .TRUE. expression and F is a .FALSE. expression, then the .AND. operator gives the following results: | | |
| | | Expression | Results |
| | | T .AND. T | .TRUE. |
| | | T .AND. F | .FALSE. |
| | | F .AND. T | .FALSE. |
| | | F .AND. F | .FALSE. |
| U .OR. V | This expression has the value .TRUE. if either U or V is .TRUE.; it is .FALSE. only if both U and V are .FALSE. | | |
| | Example: If T is a .TRUE. expression and F is a .FALSE. expression, then the .OR. operator gives the following results: | | |
| | | Expression | Results |
| | | T .OR. T | .TRUE. |
| | | T .OR. F | .TRUE. |
| | | F .OR. T | .TRUE. |
| | | F .OR. F | .FALSE. |
| U .EOR. V | This expression has the value .TRUE. only if one of the values U or V is .TRUE. and the other .FALSE. The expression is .FALSE. if U and V are the same whether .TRUE. or .FALSE. | | |
| | Example: If T is a .TRUE. expression and F is a .FALSE. expression then the .EOR. operator gives the following results: | | |
| | | Expression | Results |
| | | T .EOR. T | .FALSE. |
| | | T .EOR. F | .TRUE. |
| | | F .EOR. T | .TRUE. |
| | | F .EOR. F | .FALSE. |

APPENDIX B: SUMMARY OF CONTROL COMMANDS

1. General Command Syntax

!CC,PAR1,PAR2,PAR3,PAR4

Where: PAR entry may be of the form: LOC1-LOC2; CC is any valid 2 character control mnemonic.

2. Chain Acquire
   This function 1. copies chain into working area, 2. fetches all chain triggers.

!CQ,CHAINAME

Where:
CHAINAME=Alphanumeric chain name of up to 8 characters or hexadecimal sublevel number of the form X'HHHH'.
HHHH=Four hexadecimal numbers with leading zeroes if needed.

3. Chain Modify
   This function
   1. asks for block and algorithm name of new block;
   2. creates block header;
   3. interrogates user for algorithm parameters in high level syntax;
   4. builds new block in block working area;
   5. inserts new block into local copy of chain;
   6. fixes up all relative references in chain as a result of insertion;
   7. simulate-only blocks created through use of PAR2

!CM,FSTBLK-LSTBLK,SIMONLY

Where:
FSTBLK=Block number of first block to be removed.
LSTBLK=Block number of first block to be retained following modified area in chain.
SIMONLY=0 or 1, if 0 (or not used) normal block is created, if 1 (or any non-zero) simulate-only block is created.
IF FSTBLK=LSTBLK, new block is inserted in front of FSTBLK.

4. Chain Dump
   This function
   1. acquires chain if PAR2 contains valid chain name;
   2. allows selection of listing output device and either regular or extended dump formats via PAR3;
   3. allows 'dump-with-value' option via PAR4;
   4. reconstructs original high-level syntax wherever possible;
   5. outputs hard copy dump to selected listing output device.

!CD,FSTBLK-LSTBLK,CHAINAME,-
LODEV,DMPVAL

Where:
FSTBLK=First block number to be output.
LSTBLK=Last block number to be output.
CHAINAME=Alphanumeric chain name or hex sublevel #.
LODEV=Listing output device (+16 for EXT dump).
DMPVAL=0 or 1, if 0 (or not used) no dump with value, if 1 (or any non-zero) dump with value option is selected.

5. Chain Activate
   This function
   1. disables old chain;
   2. returns core space for old chain to free list;
   3. deletes all triggers for old chain;
   4. acquires core space for new chain from free list;
   5. moves new chain image into active core area;
   6. links new chain into sublevel processor;
   7. ables the new chain;
   8. selects trace on new chain via PAR1;
   9. connects all new chain triggers into digital scan.

!CV,TRACE

Where:
TRACE=0 or 1, if 0 (or not used) do not trace chain, if 1 (or any non-zero) trace chain blocks.

6. Chain Punch
   This function 1. acquires chain if PAR1 contains valid chain name, 2. produces binary copy of chain on selected binary output device.

!CP,CHAINAME

Where:
CHAINAME=Alphanumeric chain name or hex sub-level number (punches from working area if this argument is not present).

7. Chain Simulate
   This function
   1. inputs simulation and trace information from the user;
   2. formats input information and stores into 8 word simulation file;
   3. adds desired logical bit addresses to 60 word bit table;
   4. places a bid for chain if requested;
   5. terminates simulation if requested.

!CS,FBLKT-LBLKT,FIOT-LIOT,TMULT,-
RCOUNT

Where:
FBLKT=First block for block entry trace.
LBLKT=Last block for block entry trace.
FIOT=First block for input/output trace.
LIOT=Last block for input/output trace.
TMULT=Time multiplier.
RCOUNT=Run counter.

APPENDIX C: ERROR DIAGNOSTICS

Summary of Error Diagnostics for Logic Expression Compiler

Recoverable Errors

Error 5 Symbolic input greater than 8 characters.
Error 6 Logical operator prior to assignment statement.
Error 7 Incorrect use of unary operator .NOT.
Error 8 Incorrect use of binary operator .AND. .OR. .EOR.
Error 9 Incorrect use of symbolic logical variable.
Error 10 Undefinable implicit logical variable.
Error 11 Logical variable not in symbol table.
Error 12 Too many right parenthesis.
Error 13 More than 16 logical variables input.
Error 14 Improper termination of input string.
Error 15 Incorrect use of left parenthesis.

Fatal Errors

Error 17 Intermediate buffer length exceeded.
Error 18 Internal branching error.
Error 19 More than 8 parenthesized nests.
Error 20 More than 16 internal temporaries needed.

Error 21 Left-hand operand not located.
Error 22 Right-hand operand not located.
Error 23 More than 32 packed commands processed Summary of Error Diagnostics for Other Processors Error 100 Incorrect command initiation (no exclamation).
Error 101 Command not recognized as valid.
Error 102 Argument not recognized as valid.
Error 103 Incorrect use of delimiter or termination.
Error 200 Illegal block number input.
Error 201 Illegal character in algorithm name.
Error 202 Illegal algorithm name input.
Error 210 Cannot locate block # in current chain.
Error 211 Modified chain exceeds maximum allowable length.
Error 212 Illegal algorithm type encountered in chain.
Error 300 Exit algorithm missing from chain.
Error 400 Invalid sublevel number input for acquire.
Error 401 Chain size too long to acquire.
Error 500 Invalid sublevel number input for activate.
Error 501 Invalid trigger—cannot connect.
Error 502 Invalid subtask #—cannot link.
Error 503 No core available to store new chain.
Error 504 Cannot delete previous triggers.
Error 600 Invalid entry for chain name.
Error 700 Cannot find hex address for given ASCII symbol (SYMHEX).
Error 701 Block length exceeds maximum allowable for this algorithm.

APPENDIX D: TRACE OUTPUT EXAMPLES

| Time | Chain | Blank No. Algorithm | I/O Trace Information |
|---|---|---|---|
| 000.000 | AS00041 | 0 CHAIN | LS704A/1 |
| 000.002 | AS00041 | 10 LOGIC | SV705A/1,LS702B/0,FG705W/1 |
| 000.005 | AS00041 | 15 LOGTDF | LS702B/1,FG9075/1,SEC/4.0 |
| 000.007 | AS00041 | 17 LOGTDT | SW402C/1,FG207W/0,SEC/8.0 |
| 000.010 | AS00041 | 18 DELAY | SEC/1.0 |
| 001.001 | AS00041 | 19 BID | AS00140 |
| 001.006 | AS00041 | 20 PROG | SUBTRAK(4075,81,970,10,4) |
| 001.015 | AS00041 | 21 TSTBRL | LS102A/1 |
| 001.024 | AS00041 | 43 SET | SV702B/1 |
| 001.035 | AS00041 | 87 RESET | SV810A/1 |
| 001.042 | AS00041 | 100 SETRST | SV972B/1,SV875A/1,FG705W/0,FG203X/0 |
| 001.058 | AS00041 | 130 GOTO | |
| 001.062 | AS00041 | 170 PERM | FAILS AT LS702A (OR 'OK') |
| 001.073 | AS00041 | 200 DATRNS | 8174,41,13,0,27 |
| 001.081 | AS00041 | 240 DIAG | SF705W/1,FG207X/1,SEC/10.0 |
| 001.090 | AS00041 | 250 EXIT | |
| ←BLOCK TRACE PORTION→ | | | ←I/O TRACE PORTION→ |

I claim:

1. A system for controlling the operation of devices in an industrial process, said system including:

a process control digital computer system having a memory;

means for applying input signals from said devices to said computer system;

a plurality of algorithm-defining data sets within the memory of said computer system which specify how the states of some input signals are to be adjusted at least in accordance with the state of other input signals;

means for receiving from said memory and for operating display means to display any of said data sets to a human operator on demand, said receiving and operating means including means for translating said data sets into a terminology with which the human operator is familiar prior to display;

means controlled by a human operator for operating on a displayed data set including means for deleting portions of data sets and means for making additions to data sets so as to generate an edited data set for display and so as to establish or modify the operating configuration of the process devices when such data set is re-entered into said memory;

means for coupling edited and unedited displayed data sets to said memory, said coupling means including means for re-translating said data sets into a machine-executable language prior to storage; and means for generating output signals to operate said devices as a function of the input signals and the data sets as established in said memory and edited from time to time.

2. A system in accordance with claim 1 which further includes:

means for operating on specified input signals in accordance with selected data sets to simulate the execution of said data sets in real-time, and means for recording signal state adjustments called for by data sets under simulated execution.

3. A system for controlling the operation of industrial process devices whose states are represented by device-generated input signals and whose states may be altered under output signal control, said system comprising:

a process control digital computer system including a memory;

signal conveyance means for coupling input signals from said devices to said digital computer system;

means within said computer system for receiving said input signals and for maintaining within the memory a machine-readable record of the state of each of said input signals;

means for entering within said computer system and for maintaining within the memory a representation of a human comprehensible name for each input signal along with the address of the corresponding signal record;

means within said computer system for maintaining within the memory machine-readable control chains which are stored sequences of linked algorithm-defining data files, each defining how and when the state of one or more input signals are to be altered at least in accordance with the state of other input signals, and each including variable linkages to the state-records of the one or more input signals to which each control chain relates;

means for executing control chain algorithms at predetermined times to generate computer output signals for the process devices;

means for translating representations of the control chains into representations of algorithm statements understandable when displayed to a human and including means for replacing a variable linkage in such a statement with a representation of the name of the corresponding input signal;

means for operating display means to display the stored representation of any control chain on demand, said means for displaying utilizing said means for translating to render a displayed control chain intelligible;

means for operating on a displayed control chain to generate an edited control chain on demand;

means for re-translating representations of a displayed and edited or unedited control chain into a machine executable language and including means for replacing a representation of an input signal name with a linkage to the corresponding state-record;

means for returning displayed and edited or unedited control chains to the memory on demand, said means for returning calling upon said means for re-translating to place such control chains into condition for execution so as to establish or modify the operating configuration of the process devices; and means for generating output signals to operate said devices as a function of the input signals as defined by the control chains as edited from time to time.

4. A system for controlling the operation of industrial process devices whose states are represented by device-generated signals and whose states may be altered under signal control, said system comprising:

a process control digital computer system including a memory;

signal conveyance means for coupling input signals from said devices to said digital computer system;

means within said computer system for receiving said input signals and for maintaining within the memory a machine-readable record of the state of each of said input signals;

means for entering within said computer system and for maintaining within the memory a representation of a human comprehensible name for each input signal along with the address of the corresponding signal record;

means within said computer system for maintaining within the memory machine-readable control chains which are stored sequences of linked algorithm-defining data files, each defining how and when the state of one or more input signals are to be altered at least in accordance with the state of other signals, and each including variable linkages to the state-record of the one or more signals to which each control chain relates;

means for establishing trigger linkages between selected input signal state records and selected control chains;

means responsive to a change in the state of an input signal for executing the algorithms contained within the control chains linked to the state-record of that input signal;

means for translating representations of the control chains into representations of algorithm statements understandable when displayed to a human, including means for replacing a variable linkage in such a statement with a representation of the name of the corresponding input signal, and also including means for locating trigger linkages to a control chain and separate means for adding to a control chain a representation of a list of the names of input signals to which the chain is trigger-linked;

means for operating display means to display any control chain on demand, said means for displaying utilizing said means for translating to render a displayed control chain intelligible;

means for operating on a displayed control chain to generate an edited control chain on demand;

means for re-translating representations of displayed and edited or unedited control chains into a machine executable language and including means for replacing a representation of an input signal name with a linkage to the corresponding state-record and means for establishing trigger linkages to the chain in accordance with any list of triggering input signals that is part of the displayed chain;

means for returning displayed and edited or unedited control chains to the memory on demand, said means for returning calling upon said means for re-translating to place such control chains into condition for execution so as to establish or modify the operating configuration of the process devices; and means for generating output signals to operate said devices as a function of the input signals as defined by the control chains as edited from time to time.

5. A system for controlling the operation of industrial process devices whose states are represented by device-generated signals and whose states may be altered under signal control, said system comprising:

a process control digital computer system including a memory;

signal conveyance means for coupling input signals from said devices to said digital computer system;

means within said computer system for receiving said input signals and maintaining within the memory a machine-readable record of the state of each of said input signals;

means within said computer system for maintaining within the memory machine-readable control chains which are stored sequences of linked algorithm-defining data files stored within the memory of said computer system, each defining how and when the state of one or more signals are to be altered at least in accordance with the state of other signals, and each including variable linkages to the state-records of the one or more signals to which each control chain relates;

means for executing the control chain algorithms at predetermined times to generate computer output signals for the process devices;

means for translating representations of the control chains into representations of algorithm statements understandable when displayed to a human and including means for replacing a variable linkage in such a statement with a representation of the name of the corresponding input signal;

means for operating display means to display the stored representation of any control chain on demand, said means for displaying utilizing said means for translating to render a displayed control chain intelligible;

means for operating on a displayed control chain to generate an edited control chain on demand;

means for structuring a control chain with an indication that its execution is to be simulated on demand so that such chain can be checked out in a real-time environment before it is placed in an on line status;

means for operating on specified input signals in accordance with selected control chains to simulate the execution of such control chains in real-time, and means for recording signal state adjustments called for by control chains under simulated execution;

means for re-translating representations of a displayed and edited or unedited control chain into a machine executable language and including means for replacing a representation of an input signal name with a linkage to the corresponding state-record;

means for returning displayed and edited or unedited control chains to the memory on demand, said means for returning calling upon said means for re-translating to place such control chains into condition for simulated or active control execution;

means for preventing the execution of any control chain which contains a simulation indication from altering any internal or output signals;

means for monitoring the operation of control chains containing a simulation indication including means for displaying the signal-alternation request of such control chains;

means for removing a simulation indication from any control chain on demand;

means for generating output signals to operate said devices as a function of the input signals as defined by the control chains as edited from time to time.

6. A system in accordance with claim 5 which includes means for operating on a displayed and edited or unedited control chain to enter in it on demand a representation of an algorithm defining data file that is marked for execution only during simulation execution, and wherein the means for executing includes means for bypassing the execution of data files marked for simulation execution except during simulated execution of a control chain, whereby initial conditions different from real-world initial conditions may be established for the simulated execution of control actions.

7. A system for controlling the operation of industrial process devices whose states are represented by device-generated signals and whose states may be altered under signal control, said system comprising:

a process control digital computer system including a memory;

signal conveyance means for coupling input signals from said devices to said digital computer system;

means within said computer system for receiving said input signals and for maintaining within the memory a machine-readable record of the state of each of said input signals;

means for entering within said computer system and for maintaining within the memory a representation of a human comprehensible name for each input signal along with the address of the corresponding input signal record;

means within said computer system for maintaining within the memory machine-readable control chains which are stored sequences of linked algorithm-defining data files, each defining how and when the state of one or more input signals are to be altered at least in accordance with the state of other signals, and each including variable linkages to the state-record of the one or more signals to which each control chain relates;

means for establishing trigger linkages between selected input signal state records and selected control chains;

means responsive to a change in the state of an input signal for executing the algorithms contained within the control chains linked to the state-record of that input signal;

means for translating representations of the control chains into representations of algorithm statements understandable when displayed to a human, including means for replacing a variable linkage in such a statement with a representation of the name of the corresponding input signal, and also including means for locating trigger linkages to a control chain and separate means for adding to a control chain a representation of a list of the names of input signals to which the chain is trigger-linked;

means for operating display means to display any control chain on demand, said means for displaying utilizing said means for translating to render a displayed control chain intelligible;

means for operating on a displayed control chain to generate an edited control chain on demand;

means for structuring a control chain with an indication that its execution is to be simulated on demand so that such chain can be checked out in a real time environment before it is placed in an on line status;

means for operating on specified input signals in accordance with selected control chains to simulate the execution of said control chains in real-time, and means for recording signal state adjustments called for by control chains under simulated execution;

means for re-translating representations of a displayed and edited or unedited control chain into a machine executable language and including means for replacing a representation of an input signal name with a linkage to the corresponding state-record; means for establishing trigger-linkages to the chain in accordance with any list of triggering signals that is part of the displayed chain;

means for returning displayed and edited or unedited control chains to the memory on demand, said means for returning calling upon said means for re-translating to place such control chains into condition for simulated or active control execution;

means for preventing the execution of any control chain which contains a simulated indication from altering any internal or output signals;

means for monitoring the operation of control-chains containing a simulation indication including means for displaying the signal-alteration requests of such control chains;

means for removing a simulation indication from any control chain on demand;

means for inserting into a displayed control chain on request an algorithm-defining data file that is marked for execution only during simulation execution;

means within said algorithm executing means for bypassing the execution of data files as marked for execution only during simulation except during the simulated execution of a control chain; and means for generating output signals to operate said devices as a function of the input signals as defined by the control chains as edited from time to time.

* * * * *